United States Patent
Forstall et al.

(10) Patent No.: US 11,972,103 B2
(45) Date of Patent: *Apr. 30, 2024

(54) PORTABLE ELECTRONIC DEVICE, METHOD, AND GRAPHICAL USER INTERFACE FOR DISPLAYING ELECTRONIC DOCUMENTS AND LISTS

(71) Applicant: Apple Inc., Cupertino, CA (US)

(72) Inventors: Scott Forstall, Los Altos, CA (US); Henri C. Lamiraux, Menlo Park, CA (US); Andrew Emilio Platzer, Santa Clara, CA (US); Michael Matas, Healdsburg, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,353

(22) Filed: Oct. 7, 2022

(65) Prior Publication Data

US 2023/0221852 A1 Jul. 13, 2023

Related U.S. Application Data

(63) Continuation of application No. 17/114,176, filed on Dec. 7, 2020, now Pat. No. 11,467,722, which is a
(Continued)

(51) Int. Cl.
*G06F 3/0485* (2022.01)
*G06F 3/0482* (2013.01)
(Continued)

(52) U.S. Cl.
CPC .......... *G06F 3/0485* (2013.01); *G06F 3/0482* (2013.01); *G06F 3/0486* (2013.01);
(Continued)

(58) Field of Classification Search
CPC .... G06F 3/0485; G06F 3/0482; G06F 3/0486; G06F 3/04883; G06F 3/04886;
(Continued)

(56) References Cited

U.S. PATENT DOCUMENTS

| | | |
|---|---|---|
| 4,868,785 A | 9/1989 | Jordan et al. |
| 4,914,624 A | 4/1990 | Dunthorn |

(Continued)

FOREIGN PATENT DOCUMENTS

| | | |
|---|---|---|
| CN | 1099159 A | 2/1995 |
| CN | 101213542 A | 7/2008 |

(Continued)

OTHER PUBLICATIONS

Applicant-Initiated Interview Summary received for U.S. Appl. No. 16/944,427, dated Aug. 9, 2022, 3 pages.
(Continued)

*Primary Examiner* — James T Tsai
(74) *Attorney, Agent, or Firm* — DLA Piper LLP (US)

(57) ABSTRACT

In a computer-implemented method, a portion of an electronic document is displayed on a touch screen display of a portable multifunction device. The displayed portion has a vertical position and a horizontal position in the electronic document. An object is detected on or near the displayed portion of the electronic document. In response to detecting the object, a vertical bar and a horizontal bar are displayed on top of the displayed portion. The vertical bar has a vertical position on top of the displayed portion that corresponds to the vertical position in the electronic document of the displayed portion. The horizontal bar has a horizontal position on top of the displayed portion that corresponds to the horizontal position in the electronic document of the displayed portion. After a predetermined condition is met, display of the vertical bar and of the horizontal bar is ceased.

30 Claims, 79 Drawing Sheets

Related U.S. Application Data continuation of application No. 13/758,971, filed on Feb. 4, 2013, now Pat. No. 10,860,198, which is a continuation of application No. 13/548,111, filed on Jul. 12, 2012, now Pat. No. 8,368,665, which is a continuation of application No. 13/412,483, filed on Mar. 5, 2012, now Pat. No. 8,223,134, which is a continuation of application No. 11/969,819, filed on Jan. 4, 2008, now Pat. No. 8,130,205.

(60) Provisional application No. 60/937,993, filed on Jun. 29, 2007, provisional application No. 60/947,386, filed on Jun. 29, 2007, provisional application No. 60/879,469, filed on Jan. 8, 2007, provisional application No. 60/879,253, filed on Jan. 7, 2007.

(51) Int. Cl.
| | |
|---|---|
| *G06F 3/0486* | (2013.01) |
| *G06F 3/04883* | (2022.01) |
| *G06F 3/04886* | (2022.01) |
| *G11B 27/034* | (2006.01) |
| *G11B 27/34* | (2006.01) |
| *H04M 1/2746* | (2020.01) |
| *H04M 1/2747* | (2020.01) |
| *H04M 1/72436* | (2021.01) |

(52) U.S. Cl.
CPC ...... *G06F 3/04883* (2013.01); *G06F 3/04886* (2013.01); *G11B 27/034* (2013.01); *G11B 27/34* (2013.01); *H04M 1/2746* (2020.01); *H04M 1/2747* (2020.01); *H04M 1/72436* (2021.01); *G06F 2203/04805* (2013.01); *G06F 2203/04806* (2013.01); *H04M 2250/12* (2013.01); *H04M 2250/22* (2013.01); *H04M 2250/60* (2013.01); *H04M 2250/70* (2013.01)

(58) Field of Classification Search
CPC ............ G06F 2203/04805; G06F 2203/04806; H04M 1/2746; H04M 1/2747; H04M 1/72552; H04M 2250/12; H04M 2250/22; H04M 2250/60; H04M 2250/70; G11B 27/034; G11B 27/34
See application file for complete search history.

(56) References Cited

U.S. PATENT DOCUMENTS

| | | |
|---|---|---|
| 5,023,851 A | 6/1991 | Murray et al. |
| 5,128,672 A | 7/1992 | Kaehler |
| 5,148,541 A | 9/1992 | Lee et al. |
| 5,155,836 A | 10/1992 | Jordan et al. |
| 5,204,969 A | 4/1993 | Capps et al. |
| 5,252,951 A | 10/1993 | Tannenbaum et al. |
| 5,331,335 A | 7/1994 | Iida |
| 5,333,247 A | 7/1994 | Gest et al. |
| 5,339,391 A | 8/1994 | Wroblewski et al. |
| 5,347,295 A | 9/1994 | Agulnick et al. |
| 5,371,846 A | 12/1994 | Bates |
| 5,388,197 A | 2/1995 | Rayner |
| 5,418,549 A | 5/1995 | Anderson et al. |
| 5,428,736 A | 6/1995 | Kahl et al. |
| 5,442,744 A | 8/1995 | Piech et al. |
| 5,510,808 A | 4/1996 | Cina et al. |
| 5,528,260 A | 6/1996 | Ken |
| 5,532,715 A | 7/1996 | Bates et al. |
| 5,553,225 A | 9/1996 | Perry |
| 5,563,996 A | 10/1996 | Tchao |
| 5,568,600 A | 10/1996 | Kaba |
| 5,570,109 A | 10/1996 | Jenson |
| 5,592,195 A | 1/1997 | Misono et al. |
| 5,623,588 A | 4/1997 | Gould |
| 5,655,094 A | 8/1997 | Cline et al. |
| 5,677,708 A | 10/1997 | Matthews et al. |
| 5,734,597 A | 3/1998 | Molnar |
| 5,745,116 A | 4/1998 | Pisutha-Arnond |
| 5,761,334 A | 6/1998 | Nakajima et al. |
| 5,805,161 A | 9/1998 | Tiphane |
| 5,825,308 A | 10/1998 | Rosenberg |
| 5,825,355 A | 10/1998 | Palmer et al. |
| 5,847,706 A | 12/1998 | Kingsley |
| 5,847,709 A | 12/1998 | Card et al. |
| 5,859,638 A | 1/1999 | Coleman et al. |
| 5,873,108 A | 2/1999 | Goyal et al. |
| 5,880,733 A | 3/1999 | Horvitz et al. |
| 5,943,052 A | 8/1999 | Allen et al. |
| 5,949,408 A | 9/1999 | Kang et al. |
| 5,959,628 A | 9/1999 | Cecchini et al. |
| 6,006,227 A | 12/1999 | Freeman et al. |
| 6,018,372 A | 1/2000 | Etheredge |
| 6,037,937 A | 3/2000 | Beaton et al. |
| 6,057,831 A | 5/2000 | Harms et al. |
| 6,057,840 A | 5/2000 | Durrani et al. |
| 6,061,062 A | 5/2000 | Venolia |
| 6,069,606 A | 5/2000 | Sciammarella et al. |
| 6,069,626 A | 5/2000 | Cline et al. |
| 6,073,036 A | 6/2000 | Heikkinen et al. |
| 6,094,197 A | 7/2000 | Buxton et al. |
| 6,141,018 A | 10/2000 | Beri et al. |
| 6,147,683 A | 11/2000 | Martinez et al. |
| 6,166,733 A | 12/2000 | Yamada |
| 6,177,938 B1 | 1/2001 | Gould |
| 6,181,316 B1 | 1/2001 | Little et al. |
| 6,181,339 B1 | 1/2001 | Decarmo et al. |
| 6,195,089 B1 | 2/2001 | Chaney et al. |
| 6,208,805 B1 | 3/2001 | Abecassis |
| 6,278,443 B1 | 8/2001 | Amro et al. |
| 6,285,916 B1 | 9/2001 | Kadaba et al. |
| 6,300,967 B1 | 10/2001 | Wagner et al. |
| 6,310,610 B1 | 10/2001 | Beaton et al. |
| 6,313,855 B1 | 11/2001 | Shuping et al. |
| 6,323,883 B1 | 11/2001 | Minoura et al. |
| 6,330,009 B1 | 12/2001 | Murasaki et al. |
| 6,333,753 B1 | 12/2001 | Hinckley |
| 6,366,302 B1 | 4/2002 | Crosby et al. |
| 6,388,877 B1 | 5/2002 | Canova et al. |
| 6,430,574 B1 | 8/2002 | Stead |
| 6,431,439 B1 | 8/2002 | Suer et al. |
| 6,433,801 B1 | 8/2002 | Moon et al. |
| 6,469,695 B1 | 10/2002 | White |
| 6,476,831 B1 | 11/2002 | Wirth et al. |
| 6,479,949 B1 | 11/2002 | Nerone et al. |
| 6,486,895 B1 | 11/2002 | Robertson et al. |
| 6,489,975 B1 | 12/2002 | Patil et al. |
| 6,489,978 B1 | 12/2002 | Gong et al. |
| 6,559,869 B1 | 5/2003 | Lui et al. |
| 6,570,594 B1 | 5/2003 | Wagner |
| 6,573,844 B1 | 6/2003 | Venolia et al. |
| 6,580,442 B1 | 6/2003 | Singh et al. |
| 6,597,345 B2 | 7/2003 | Hirshberg |
| 6,606,082 B1 | 8/2003 | Zuberec et al. |
| 6,611,285 B1 | 8/2003 | Morita |
| 6,683,628 B1 | 1/2004 | Nakagawa et al. |
| 6,690,365 B2 | 2/2004 | Hinckley et al. |
| 6,714,221 B1 | 3/2004 | Christie et al. |
| 6,757,002 B1 | 6/2004 | Oross et al. |
| 6,803,930 B1 | 10/2004 | Simonson et al. |
| 6,816,174 B2 | 11/2004 | Tiongson et al. |
| 6,825,860 B1 | 11/2004 | Hu et al. |
| 6,826,728 B1 | 11/2004 | Horiyama |
| 6,882,354 B1 | 4/2005 | Nielsen |
| 6,919,879 B2 | 7/2005 | Griffin et al. |
| 6,956,558 B1 | 10/2005 | Rosenberg et al. |
| 6,966,037 B2 | 11/2005 | Fredriksson et al. |
| 7,030,861 B1 | 4/2006 | Westerman et al. |
| 7,054,965 B2 | 5/2006 | Bell et al. |
| 7,103,851 B1 | 9/2006 | Jaeger et al. |
| 7,152,210 B1 | 12/2006 | Van Den Hoven et al. |
| 7,231,231 B2 | 6/2007 | Kokko et al. |
| 7,256,770 B2 | 8/2007 | Hinckley et al. |
| 7,312,790 B2 | 12/2007 | Sato et al. |

(56) References Cited

U.S. PATENT DOCUMENTS

| | | |
|---|---|---|
| 7,404,152 B2 | 7/2008 | Zinn et al. |
| 7,411,575 B2 | 8/2008 | Hill et al. |
| 7,437,678 B2 | 10/2008 | Awada et al. |
| 7,466,307 B2 | 12/2008 | Trent et al. |
| 7,469,381 B2 | 12/2008 | Ording |
| 7,479,949 B2 | 1/2009 | Jobs et al. |
| 7,535,493 B2 | 5/2009 | Morita |
| 7,584,429 B2 | 9/2009 | Fabritius |
| 7,643,006 B2 | 1/2010 | Hill et al. |
| 7,702,632 B2 | 4/2010 | Koori |
| 7,705,830 B2 | 4/2010 | Westerman et al. |
| 7,757,184 B2 | 7/2010 | Martin et al. |
| 7,768,501 B1 | 8/2010 | Maddalozzo et al. |
| 7,786,975 B2 | 8/2010 | Ording et al. |
| 7,864,163 B2 | 1/2011 | Ording et al. |
| 7,865,817 B2 | 1/2011 | Ryan et al. |
| 7,907,124 B2 | 3/2011 | Hillis et al. |
| 7,922,096 B2 | 4/2011 | Eilersen |
| 7,958,456 B2 | 6/2011 | Lemay et al. |
| 8,095,879 B2 | 1/2012 | Goertz |
| 8,117,195 B1 | 2/2012 | Dave et al. |
| 8,130,205 B2 | 3/2012 | Forstall et al. |
| 8,223,134 B1 | 7/2012 | Forstall et al. |
| 8,259,076 B2 | 9/2012 | Trent et al. |
| 8,347,232 B1 | 1/2013 | Prud'hommeaux et al. |
| 8,368,665 B2 | 2/2013 | Forstall et al. |
| 8,400,417 B2 | 3/2013 | Kocienda et al. |
| 8,412,278 B2 | 4/2013 | Shin et al. |
| 8,497,819 B2 | 7/2013 | Hoppenbrouwers et al. |
| 8,504,624 B2 | 8/2013 | Gormish et al. |
| 8,543,904 B1 | 9/2013 | Karls et al. |
| 8,564,544 B2 | 10/2013 | Jobs et al. |
| 8,589,823 B2 | 11/2013 | Lemay et al. |
| 8,669,950 B2 | 3/2014 | Forstall et al. |
| 8,689,132 B2 | 4/2014 | Lamiraux et al. |
| 8,914,743 B2 | 12/2014 | Nakajima et al. |
| 8,984,436 B1 | 3/2015 | Tseng et al. |
| 9,335,924 B2 | 5/2016 | Jobs et al. |
| 9,354,803 B2 | 5/2016 | Ording et al. |
| 9,952,759 B2 | 4/2018 | Jobs et al. |
| 11,322,553 B2 | 5/2022 | Song et al. |
| 2001/0010513 A1 | 8/2001 | Rosenberg et al. |
| 2001/0011995 A1 | 8/2001 | Hinckley et al. |
| 2001/0023436 A1 | 9/2001 | Srinivasan et al. |
| 2001/0024195 A1 | 9/2001 | Hayakawa |
| 2002/0015064 A1 | 2/2002 | Robotham et al. |
| 2002/0030667 A1 | 3/2002 | Hinckley et al. |
| 2002/0033848 A1 | 3/2002 | Sciammarella et al. |
| 2002/0036618 A1 | 3/2002 | Wakai et al. |
| 2002/0040866 A1 | 4/2002 | Tuneld et al. |
| 2002/0051018 A1 | 5/2002 | Yeh |
| 2002/0054126 A1 | 5/2002 | Gamon |
| 2002/0056575 A1 | 5/2002 | Keely et al. |
| 2002/0076231 A1 | 6/2002 | Akiba et al. |
| 2002/0084981 A1 | 7/2002 | Flack et al. |
| 2002/0087245 A1 | 7/2002 | Rossow et al. |
| 2002/0109728 A1 | 8/2002 | Tiongson et al. |
| 2002/0120633 A1 | 8/2002 | Stead et al. |
| 2002/0143741 A1 | 10/2002 | Laiho et al. |
| 2002/0149605 A1 | 10/2002 | Grossman |
| 2002/0167545 A1 | 11/2002 | Kang et al. |
| 2002/0186201 A1 | 12/2002 | Gutta et al. |
| 2002/0186252 A1 | 12/2002 | Himmel et al. |
| 2002/0196238 A1 | 12/2002 | Tsukada et al. |
| 2003/0001898 A1 | 1/2003 | Bernhardson |
| 2003/0016252 A1 | 1/2003 | Noy et al. |
| 2003/0058281 A1 | 3/2003 | Kepros et al. |
| 2003/0063130 A1 | 4/2003 | Barbieri et al. |
| 2003/0076306 A1 | 4/2003 | Zadesky et al. |
| 2003/0080972 A1 | 5/2003 | Gerstner |
| 2003/0095135 A1 | 5/2003 | Kaasila et al. |
| 2003/0095149 A1 | 5/2003 | Fredriksson et al. |
| 2003/0098871 A1 | 5/2003 | Kawano et al. |
| 2003/0110511 A1 | 6/2003 | Schutte et al. |
| 2003/0122787 A1 | 7/2003 | Zimmerman et al. |
| 2003/0128192 A1 | 7/2003 | Van Os |
| 2003/0131317 A1 | 7/2003 | Budka et al. |
| 2003/0154292 A1 | 8/2003 | Spriestersbach et al. |
| 2003/0160816 A1 | 8/2003 | Zoller et al. |
| 2003/0174149 A1 | 9/2003 | Fujisaki et al. |
| 2003/0193525 A1 | 10/2003 | Nygaard, Jr. |
| 2003/0226152 A1 | 12/2003 | Billmaier et al. |
| 2004/0008222 A1 | 1/2004 | Hovatter et al. |
| 2004/0021676 A1 | 2/2004 | Chen et al. |
| 2004/0023696 A1 | 2/2004 | Kim et al. |
| 2004/0027460 A1 | 2/2004 | Morita |
| 2004/0049541 A1 | 3/2004 | Swahn et al. |
| 2004/0085364 A1 | 5/2004 | Keely et al. |
| 2004/0100451 A1 | 5/2004 | Okada |
| 2004/0100479 A1 | 5/2004 | Nakano et al. |
| 2004/0119754 A1 | 6/2004 | Bangalore et al. |
| 2004/0125088 A1 | 7/2004 | Zimmerman et al. |
| 2004/0135818 A1 | 7/2004 | Thomson et al. |
| 2004/0136244 A1 | 7/2004 | Nakamura et al. |
| 2004/0140956 A1 | 7/2004 | Kushler et al. |
| 2004/0150670 A1 | 8/2004 | Feldman et al. |
| 2004/0155888 A1 | 8/2004 | Padgitt et al. |
| 2004/0155908 A1 | 8/2004 | Wagner |
| 2004/0160419 A1 | 8/2004 | Padgitt |
| 2004/0167919 A1 | 8/2004 | Sterling et al. |
| 2004/0181804 A1 | 9/2004 | Billmaier et al. |
| 2004/0216056 A1 | 10/2004 | Tootill |
| 2004/0223004 A1 | 11/2004 | Lincke et al. |
| 2004/0252109 A1 | 12/2004 | Trent, Jr. et al. |
| 2004/0255244 A1 | 12/2004 | Filner et al. |
| 2004/0257346 A1 | 12/2004 | Ong et al. |
| 2005/0012723 A1 | 1/2005 | Pallakoff |
| 2005/0020317 A1 | 1/2005 | Koyama |
| 2005/0022108 A1 | 1/2005 | Carro et al. |
| 2005/0022130 A1 | 1/2005 | Fabritius |
| 2005/0022131 A1 | 1/2005 | Saint-Hilaire et al. |
| 2005/0024239 A1 | 2/2005 | Kupka |
| 2005/0052427 A1 | 3/2005 | Wu et al. |
| 2005/0057524 A1 | 3/2005 | Hill et al. |
| 2005/0071761 A1 | 3/2005 | Kontio |
| 2005/0071782 A1 | 3/2005 | Barrett et al. |
| 2005/0091596 A1 | 4/2005 | Anthony et al. |
| 2005/0093826 A1 | 5/2005 | Huh |
| 2005/0102635 A1 | 5/2005 | Jiang et al. |
| 2005/0117032 A1 | 6/2005 | Ueda et al. |
| 2005/0134578 A1 | 6/2005 | Chambers et al. |
| 2005/0156881 A1 | 7/2005 | Trent et al. |
| 2005/0192727 A1 | 9/2005 | Shostak et al. |
| 2005/0192924 A1 | 9/2005 | Drucker et al. |
| 2005/0210403 A1 | 9/2005 | Satanek |
| 2005/0243069 A1 | 11/2005 | Yorio et al. |
| 2005/0262450 A1 | 11/2005 | Sauermann |
| 2005/0275633 A1 | 12/2005 | Varanda |
| 2005/0278585 A1 | 12/2005 | Spencer et al. |
| 2005/0278656 A1 | 12/2005 | Goldthwaite et al. |
| 2006/0001647 A1 | 1/2006 | Carroll |
| 2006/0001650 A1 | 1/2006 | Robbins et al. |
| 2006/0001652 A1 | 1/2006 | Chiu et al. |
| 2006/0007174 A1 | 1/2006 | Shen |
| 2006/0007176 A1 | 1/2006 | Shen |
| 2006/0015820 A1 | 1/2006 | Wood |
| 2006/0026356 A1 | 2/2006 | Okawa et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0033751 A1 | 2/2006 | Keely et al. |
| 2006/0036942 A1 | 2/2006 | Carter |
| 2006/0047386 A1 | 3/2006 | Kanevsky et al. |
| 2006/0055662 A1 | 3/2006 | Rimas-Ribikauskas et al. |
| 2006/0059436 A1 | 3/2006 | Nurmi |
| 2006/0071942 A1 | 4/2006 | Ubillos et al. |
| 2006/0082554 A1 | 4/2006 | Caine et al. |
| 2006/0095846 A1 | 5/2006 | Nurmi |
| 2006/0101354 A1 | 5/2006 | Hashimoto et al. |
| 2006/0123183 A1 | 6/2006 | Koivisto et al. |
| 2006/0125799 A1 | 6/2006 | Hillis et al. |
| 2006/0125803 A1 | 6/2006 | Westerman et al. |
| 2006/0132440 A1 | 6/2006 | Safai |

(56) References Cited

U.S. PATENT DOCUMENTS

| | | |
|---|---|---|
| 2006/0132460 A1 | 6/2006 | Kolmykov-Zotov et al. |
| 2006/0136836 A1 | 6/2006 | Clee et al. |
| 2006/0143573 A1 | 6/2006 | Harrison et al. |
| 2006/0161846 A1 | 7/2006 | Van Leeuwen |
| 2006/0161861 A1 | 7/2006 | Holecek et al. |
| 2006/0161870 A1 | 7/2006 | Hotelling et al. |
| 2006/0164399 A1 | 7/2006 | Cheston et al. |
| 2006/0174214 A1 | 8/2006 | Mckee et al. |
| 2006/0184901 A1 | 8/2006 | Dietz |
| 2006/0187216 A1 | 8/2006 | Trent et al. |
| 2006/0190833 A1 | 8/2006 | Sangiovanni et al. |
| 2006/0221858 A1 | 10/2006 | Switzer et al. |
| 2006/0227116 A1 | 10/2006 | Zotov et al. |
| 2006/0253547 A1 | 11/2006 | Wood et al. |
| 2006/0265263 A1 | 11/2006 | Burns |
| 2006/0277504 A1 | 12/2006 | Zinn |
| 2007/0008250 A1 | 1/2007 | Hoppenbrouwers et al. |
| 2007/0044028 A1 | 2/2007 | Dunn et al. |
| 2007/0046641 A1 | 3/2007 | Lim |
| 2007/0050732 A1 | 3/2007 | Chapman et al. |
| 2007/0058047 A1 | 3/2007 | Henty |
| 2007/0061744 A1 | 3/2007 | Smith et al. |
| 2007/0067738 A1 | 3/2007 | Flynt et al. |
| 2007/0083823 A1 | 4/2007 | Jaeger |
| 2007/0091075 A1 | 4/2007 | Lii |
| 2007/0100890 A1 | 5/2007 | Kim |
| 2007/0101289 A1 | 5/2007 | Awada et al. |
| 2007/0106950 A1 | 5/2007 | Hutchinson et al. |
| 2007/0109325 A1 | 5/2007 | Eveleigh |
| 2007/0120832 A1 | 5/2007 | Saarinen et al. |
| 2007/0128899 A1 | 6/2007 | Mayer |
| 2007/0129112 A1 | 6/2007 | Tarn |
| 2007/0132789 A1 | 6/2007 | Ording et al. |
| 2007/0136679 A1 | 6/2007 | Yang |
| 2007/0143706 A1 | 6/2007 | Peters |
| 2007/0150830 A1 | 6/2007 | Ording et al. |
| 2007/0157094 A1 | 7/2007 | Lemay et al. |
| 2007/0162667 A1 | 7/2007 | Kim et al. |
| 2007/0180375 A1 | 8/2007 | Gittelman et al. |
| 2007/0204225 A1 | 8/2007 | Berkowitz et al. |
| 2007/0205988 A1 | 9/2007 | Gloyd et al. |
| 2007/0205989 A1 | 9/2007 | Gloyd et al. |
| 2007/0205990 A1 | 9/2007 | Gloyd et al. |
| 2007/0205991 A1 | 9/2007 | Gloyd et al. |
| 2007/0205992 A1 | 9/2007 | Gloyd et al. |
| 2007/0205993 A1 | 9/2007 | Gloyd et al. |
| 2007/0238489 A1 | 10/2007 | Scott |
| 2007/0247436 A1 | 10/2007 | Jacobsen |
| 2007/0250786 A1 | 10/2007 | Jeon et al. |
| 2007/0256031 A1 | 11/2007 | Martin et al. |
| 2007/0262951 A1* | 11/2007 | Huie ............... G06F 3/0485 345/156 |
| 2007/0262964 A1 | 11/2007 | Zotov et al. |
| 2007/0277126 A1 | 11/2007 | Park et al. |
| 2007/0285681 A1 | 12/2007 | Hayakawa |
| 2007/0294635 A1 | 12/2007 | Craddock et al. |
| 2008/0001924 A1 | 1/2008 | De Los Reyes et al. |
| 2008/0022215 A1 | 1/2008 | Lee et al. |
| 2008/0024958 A1 | 1/2008 | Mudd et al. |
| 2008/0033779 A1 | 2/2008 | Coffman et al. |
| 2008/0046824 A1 | 2/2008 | Li et al. |
| 2008/0091635 A1 | 4/2008 | James et al. |
| 2008/0104535 A1 | 5/2008 | Deline et al. |
| 2008/0122796 A1 | 5/2008 | Jobs et al. |
| 2008/0155464 A1 | 6/2008 | Jones et al. |
| 2008/0158261 A1 | 7/2008 | Gould |
| 2008/0163039 A1 | 7/2008 | Ryan et al. |
| 2008/0165151 A1 | 7/2008 | Lemay et al. |
| 2008/0168349 A1 | 7/2008 | Lamiraux et al. |
| 2008/0168361 A1 | 7/2008 | Forstall et al. |
| 2008/0180408 A1 | 7/2008 | Forstall et al. |
| 2008/0184116 A1 | 7/2008 | Error |
| 2008/0250107 A1 | 10/2008 | Holzer et al. |
| 2008/0259040 A1 | 10/2008 | Ording et al. |
| 2008/0294424 A1 | 11/2008 | Naito et al. |
| 2008/0309614 A1 | 12/2008 | Dunton et al. |
| 2009/0024538 A1 | 1/2009 | Joo |
| 2009/0055768 A1 | 2/2009 | Chaudhri et al. |
| 2009/0075694 A1 | 3/2009 | Kim et al. |
| 2009/0228792 A1 | 9/2009 | Van Os et al. |
| 2009/0259969 A1 | 10/2009 | Pallakoff |
| 2009/0327976 A1 | 12/2009 | Williamson et al. |
| 2010/0011315 A1 | 1/2010 | Araki et al. |
| 2010/0060586 A1 | 3/2010 | Pisula et al. |
| 2010/0114857 A1 | 5/2010 | Edwards et al. |
| 2010/0125785 A1 | 5/2010 | Moore et al. |
| 2010/0287154 A1 | 11/2010 | Tee et al. |
| 2011/0107216 A1 | 5/2011 | Bi |
| 2011/0181719 A1 | 7/2011 | Takanezawa et al. |
| 2011/0225175 A1 | 9/2011 | Asaka et al. |
| 2012/0023462 A1 | 1/2012 | Rosing et al. |
| 2012/0159294 A1 | 6/2012 | Gonsalves et al. |
| 2012/0166959 A1 | 6/2012 | Hilerio et al. |
| 2012/0233482 A1 | 9/2012 | Piersol et al. |
| 2012/0240074 A1 | 9/2012 | Migos et al. |
| 2013/0145310 A1 | 6/2013 | Forstall et al. |
| 2013/0152013 A1 | 6/2013 | Forstall et al. |
| 2014/0327629 A1 | 11/2014 | Jobs et al. |
| 2015/0020317 A1 | 1/2015 | Im et al. |
| 2015/0100881 A1 | 4/2015 | Nakajima et al. |
| 2015/0277564 A1 | 10/2015 | Saito |
| 2016/0246473 A1 | 8/2016 | Jobs et al. |
| 2016/0274757 A1 | 9/2016 | Ording et al. |
| 2018/0018073 A1 | 1/2018 | Lemay et al. |
| 2020/0026405 A1 | 1/2020 | Lemay et al. |
| 2020/0110524 A1 | 4/2020 | Lemay et al. |
| 2021/0149537 A1 | 5/2021 | Ording et al. |
| 2021/0200400 A1 | 7/2021 | Forstall et al. |
| 2022/0397996 A1 | 12/2022 | Lemay et al. |

FOREIGN PATENT DOCUMENTS

| | | |
|---|---|---|
| CN | 101336407 A | 12/2008 |
| CN | 101504653 A | 8/2009 |
| CN | 102749997 A | 10/2012 |
| DE | 19621593 A1 | 12/1997 |
| DE | 29824936 U1 | 7/2003 |
| EP | 269364 A2 | 6/1988 |
| EP | 632362 A2 | 1/1995 |
| EP | 651544 A2 | 5/1995 |
| EP | 713187 A2 | 5/1996 |
| EP | 0880091 A2 | 11/1998 |
| EP | 903662 A2 | 3/1999 |
| EP | 994409 A2 | 4/2000 |
| EP | 1124175 A2 | 8/2001 |
| EP | 1517228 A2 | 3/2005 |
| EP | 1901184 A1 | 3/2008 |
| EP | 2040146 A2 | 3/2009 |
| EP | 2219351 A1 | 8/2010 |
| GB | 2331204 A | 5/1999 |
| JP | 62-251922 A | 11/1987 |
| JP | 2-165274 A | 6/1990 |
| JP | 5-224869 A | 9/1993 |
| JP | 6-95794 A | 4/1994 |
| JP | 6-149531 A | 5/1994 |
| JP | 10-13773 A | 1/1998 |
| JP | 11-143604 A | 5/1999 |
| JP | 11-272688 A | 10/1999 |
| JP | 11-338600 A | 12/1999 |
| JP | 2000-75851 A | 3/2000 |
| JP | 2000-75979 A | 3/2000 |
| JP | 2000-101879 A | 4/2000 |
| JP | 2000-105772 A | 4/2000 |
| JP | 2000-148367 A | 5/2000 |
| JP | 2000-163031 A | 6/2000 |
| JP | 2000-194493 A | 7/2000 |
| JP | 2001-184153 A | 7/2001 |
| JP | 2002-123355 A | 4/2002 |
| JP | 2003-76846 A | 3/2003 |
| JP | 2003-173226 A | 6/2003 |
| JP | 2003-186614 A | 7/2003 |
| JP | 2003-198975 A | 7/2003 |
| JP | 2003-263256 A | 9/2003 |
| JP | 2003-330613 A | 11/2003 |

(56) References Cited

FOREIGN PATENT DOCUMENTS

| | | |
|---|---|---|
| JP | 2003-330700 A | 11/2003 |
| JP | 2004-118434 A | 4/2004 |
| JP | 2004-139321 A | 5/2004 |
| JP | 2004-220128 A | 8/2004 |
| JP | 2004-532430 A | 10/2004 |
| JP | 2004-363707 A | 12/2004 |
| JP | 2004-363892 A | 12/2004 |
| JP | 2005-43676 A | 2/2005 |
| JP | 2005-44036 A | 2/2005 |
| JP | 2005-110286 A | 4/2005 |
| JP | 2005-130133 A | 5/2005 |
| JP | 2005-150936 A | 6/2005 |
| JP | 2005-185361 A | 7/2005 |
| JP | 2005-269243 A | 9/2005 |
| JP | 2005-328242 A | 11/2005 |
| JP | 2005-332340 A | 12/2005 |
| JP | 2005-352924 A | 12/2005 |
| JP | 2006-41623 A | 2/2006 |
| JP | 2006-80878 A | 3/2006 |
| JP | 2006-85210 A | 3/2006 |
| JP | 2006-164275 A | 6/2006 |
| JP | 2006-166248 A | 6/2006 |
| JP | 2006-211690 A | 8/2006 |
| JP | 2007-94804 A | 4/2007 |
| JP | 2007-526548 A | 9/2007 |
| JP | 2007-323664 A | 12/2007 |
| JP | 2009-518758 A | 5/2009 |
| JP | 2014-501006 A | 1/2014 |
| JP | 6-427703 B2 | 11/2018 |
| KR | 1998-0032331 A | 7/1998 |
| KR | 10-2001-0105317 A | 11/2001 |
| KR | 10-2003-0088374 A | 11/2003 |
| KR | 10-2005-0052720 A | 6/2005 |
| KR | 10-2005-0078690 A | 8/2005 |
| KR | 10-0537280 B1 | 12/2005 |
| KR | 10-2006-0020352 A | 3/2006 |
| KR | 10-2008-0031166 A | 4/2008 |
| KR | 10-2008-0082683 A | 9/2008 |
| KR | 10-2009-0047551 A | 5/2009 |
| KR | 10-2023663 B1 | 9/2019 |
| TW | 436715 B | 5/2001 |
| TW | 200643786 A | 12/2006 |
| TW | 200905544 A | 2/2009 |
| TW | 200945066 A | 11/2009 |
| TW | 200947241 A | 11/2009 |
| TW | 201030591 A | 8/2010 |
| TW | 201032155 A | 9/2010 |
| TW | 201033887 A | 9/2010 |
| WO | 94/17469 A1 | 8/1994 |
| WO | 99/15982 A1 | 4/1999 |
| WO | 99/28813 A1 | 6/1999 |
| WO | 00/08757 A1 | 2/2000 |
| WO | 00/36496 A1 | 6/2000 |
| WO | 02/08881 A2 | 1/2002 |
| WO | 03/060622 A2 | 7/2003 |
| WO | 2005/001680 A1 | 1/2005 |
| WO | 2005/018129 A2 | 2/2005 |
| WO | 2005/067511 A2 | 7/2005 |
| WO | 2006/020304 A2 | 2/2006 |
| WO | 2006/020305 A2 | 2/2006 |
| WO | 2006/037545 A2 | 4/2006 |
| WO | 2006/045530 A2 | 5/2006 |
| WO | 2006/055675 A1 | 5/2006 |
| WO | 2007/062600 A1 | 6/2007 |
| WO | 2007/067858 A2 | 6/2007 |
| WO | 2008/027809 A2 | 3/2008 |
| WO | 2008/030976 A2 | 3/2008 |
| WO | 2012/065020 A1 | 5/2012 |

OTHER PUBLICATIONS

Applicant-Initiated Interview Summary received for U.S. Appl. No. 16/944,427, dated Feb. 22, 2023, 4 pages.
Applicant-Initiated Interview Summary received for U.S. Appl. No. 17/589,601, dated Apr. 21, 2023, 4 pages.
Applicant-Initiated Interview Summary received for U.S. Appl. No. 17/589,601, dated Jun. 21, 2023, 4 pages.
Decision of Appeal received for Korean Patent Application No. 10-2021-7022553, mailed on Aug. 31, 2022, 27 pages (2 pages of English Translation and 25 pages of Official Copy).
Decision to Grant received for German Patent Application No. 112006004220.3, dated May 3, 2022, 9 pages (1 page of English Translation and 8 pages of Official Copy).
Final Office Action received for U.S. Appl. No. 16/944,427, dated Nov. 15, 2022, 26 pages.
Final Office Action received for U.S. Appl. No. 17/589,601, dated May 23, 2023, 20 pages.
Non-Final Office Action received for U.S. Appl. No. 16/944,427, dated Jul. 5, 2023, 24 pages.
Non-Final Office Action received for U.S. Appl. No. 16/944,427, dated May 11, 2022, 14 pages.
Non-Final Office Action received for U.S. Appl. No. 17/589,601, dated Mar. 8, 2023, 19 pages.
Notice of Acceptance received for Australian Patent Application No. 2022201622, dated May 9, 2023, 4 pages.
Office Action received for Australian Patent Application No. 2022201622, dated Mar. 8, 2023, 3 pages.
Office Action received for Indian Patent Application No. 202048033593, dated May 6, 2022, 8 pages.
Office Action received for Japanese Patent Application No. 2021-167548, dated Dec. 2, 2022, 10 pages (5 pages of English Translation and 5 pages of Official Copy).
Office Action received for Japanese Patent Application No. 2021-167548, dated Jun. 9, 2023, 9 pages (5 pages of English Translation and 4 pages of Official Copy).
Office Action received for Korean Patent Application No. 10-2022-7010233, dated Dec. 27, 2022, 7 pages (3 pages of English Translation and 4 pages of Official Copy).
Office Action received for Korean Patent Application No. 10-2022-7010233, dated May 30, 2022, 10 pages (4 pages of English Translation and 6 pages of Official Copy).
Pogue David, "iPhone The Missing Manual", Pogue Press O'Reilly, 2007, 19 pages.
Toru Sawamura, "Sawamura They are Toru and Superman Mind Software at 5 Minutes Capture!", 7th Volume of Windows Start No. 8, Japan, Mainichi Communications, Inc., Apr. 29, 2002, 5 pages (Official copy only) (See Communication Under Rule 37 CFR § 1.98(a) (3)).
Advisory Action Received for U.S. Appl. No. 13/077,869, dated Apr. 10, 2015, 3 pages.
Advisory Action Received for U.S. Appl. No. 13/077,869, dated Jun. 24, 2016, 3 pages.
Advisory Action received for U.S. Appl. No. 13/758,971, dated Nov. 27, 2019, 7 pages.
Applicant Initiated Interview Summary received for U.S. Appl. No. 13/758,971, dated Jul. 21, 2020, 4 pages.
Applicant-Initiated Interview Summary received for U.S. Appl. No. 15/167,532, dated Feb. 6, 2020, 3 pages.
Applicant-Initiated Interview Summary received for U.S. Appl. No. 16/572,314, dated Aug. 11, 2021, 4 pages.
Applicant-Initiated Interview Summary received for U.S. Appl. No. 16/572,314, dated Dec. 16, 2020, 5 pages.
Applicant-Initiated Interview Summary received for U.S. Appl. No. 16/572,314, dated Mar. 25, 2021, 4 pages.
Applicant-Initiated Interview Summary received for U.S. Appl. No. 17/114,176, dated Apr. 15, 2022, 3 pages.
Board Decision received for Chinese Patent Application No. 201610525800.4, dated Feb. 21, 2022, 13 pages.
Board Opinion received for Chinese Patent Application No. 201610525800.4, dated Dec. 22, 2021, 8 pages.
Communication Prior to Oral Proceedings received for European Patent Application No. 06846397.5, dated Apr. 18, 2018, 16 pages.
Corrected Notice of Allowance received for U.S. Appl. No. 17/114,176, dated Jun. 1, 2022, 2 pages.
Decision on Appeal received for Korean Patent Application No. 10-2017-7023591, dated Apr. 14, 2020, 30 pages.

(56) References Cited

OTHER PUBLICATIONS

Decision to Grant received for European Patent Application No. 06846397.5, dated Jan. 24, 2019, 2 pages.
Decision to Grant received for European Patent Application No. 08705751.9, dated Aug. 10, 2017, 3 pages.
Decision to Grant received for European Patent Application No. 09162953.5, dated Aug. 1, 2019, 2 pages.
Decision to Grant received for European Patent Application No. 12175086.3, dated Nov. 10, 2016, 3 pages.
Decision to Refuse received for European Patent Application No. 12175083.0, dated Dec. 14, 2018, 11 pages.
Final Office Action received for U.S. Appl. No. 13/758,971, dated Jun. 27, 2019, 20 pages.
Final Office Action received for U.S. Appl. No. 13/758,971, dated Oct. 3, 2017, 22 pages.
Final Office Action received for U.S. Appl. No. 14/571,097, dated Aug. 11, 2017, 19 pages.
Final Office Action received for U.S. Appl. No. 15/148,417, dated Jul. 17, 2017, 13 pages.
Final Office Action received for U.S. Appl. No. 15/167,532, dated Oct. 31, 2019, 26 pages.
Final Office Action received for U.S. Appl. No. 15/167,532, dated Sep. 19, 2019, 25 pages.
Final Office Action received for U.S. Appl. No. 15/662,174, dated Sep. 4, 2019, 19 pages.
Final Office Action received for U.S. Appl. No. 16/572,314, dated Aug. 31, 2021, 14 pages.
Final Office Action received for U.S. Appl. No. 16/572,314, dated Dec. 30, 2020, 11 pages.
Final Office Action received for U.S. Appl. No. 15/662,174, dated Sep. 4, 2018, 17 pages.
"Handbook for Palm™ m500 Series Handhelds, User Manual", Available at: http://www.palm.com:80/us/support/handbooks/tungstent/tu ngstent_ ug .pdf, 2002, 286 pages.
"Handbook for Palm™ Tungsten™ T Handhelds", 2002, 290 pages.
Intention to Grant received for European Patent Application No. 06846397.5, dated Sep. 5, 2018, 7 pages.
Intention to Grant received for European Patent Application No. 08705751.9, dated Mar. 27, 2017, 9 pages.
Intention to Grant received for European Patent Application No. 09162953.5, dated Mar. 19, 2019, 7 pages.
Intention to Grant received for European Patent Application No. 12175086.3 dated Jun. 28, 2016, 8 pages.
International Search Report and Written Opinion received for PCT Patent Application No. PCT/US2007/077777, dated Oct. 8, 2009, Oct. 8, 2009, 15 pages.
"Microsoft Outlook 2003 Basic Guide", Available at: <http://it.med.miami.edu/documents/outlook_2003_guide.pdf>, Aug. 15, 2005, 32 pages.
Minutes of Oral Proceedings received for European Patent Application No. 06846397.5, mailed on Aug. 31, 2018, 12 pages.
Minutes of Oral Proceedings received for European Patent Application No. 12175083.0, mailed on Dec. 14, 2018, 6 pages.
Non-Final Office Action received for U.S. Appl. No. 13/758,971, dated Apr. 22, 2020, 20 pages.
Non-Final Office Action received for U.S. Appl. No. 13/758,971, dated Nov. 2, 2018, 16 pages.
Non-Final Office Action received for U.S. Appl. No. 14/571,097, dated Jan. 3, 2017, 17 pages.
Non-Final Office Action received for U.S. Appl. No. 15/148,417, dated Jan. 27, 2017, 12 pages.
Non-Final Office Action received for U.S. Appl. No. 15/167,532, dated Mar. 7, 2019, 18 pages.
Non-Final Office Action received for U.S. Appl. No. 15/662,174, dated Apr. 2, 2019, 21 pages.
Non-Final Office Action received for U.S. Appl. No. 16/572,314, dated Apr. 21, 2021, 12 pages.
Non-Final Office Action received for U.S. Appl. No. 16/572,314, dated Aug. 12, 2020, 16 pages.
Non-Final Office Action received for U.S. Appl. No. 16/703,472, dated Jan. 12, 2021, 8 pages.
Non-Final Office Action received for U.S. Appl. No. 17/114,176 dated Feb. 17, 2022, 20 pages.
Non-Final Office Action received for U.S. Appl. No. 90/012,308, dated Dec. 3, 2012, 47 pages.
Non-Final Office Action received for U.S. Appl. No. 13/758,971, dated Mar. 23, 2017, 20 pages.
Notice Of Acceptance received for Australian Patent Application No. 2016203172, dated Jan. 24, 2018, 3 pages.
Notice of Acceptance received for Australian Patent Application No. 2018203219, dated Jul. 21, 2020, 3 pages.
Notice of Acceptance received for Australian Patent Application No. 2020260488, dated Nov. 25, 2021, 3 pages.
Notice of Allowance received for Chinese Patent Application No. 201410127550.X, dated Oct. 19, 2017, 2 pages.
Notice of Allowance received for Canadian Patent Application No. 2,893,513, dated May 29, 2017, 1 page.
Notice of Allowance received for Canadian Patent Application No. 2,986,582, dated Mar. 22, 2019, 1 page.
Notice of Allowance received for Chinese Patent Application No. 201180058926.0, dated Mar. 14, 2017, 6 pages.
Notice of Allowance received for Chinese Patent Application No. 201410638319.7, dated Oct. 9, 2017, 2 pages.
Notice of Allowance received for Chinese Patent Application No. 200780001219.1, dated Apr. 20, 2016, 3 pages.
Notice of Allowance received for Japanese Patent Application No. 2014-259187, dated Oct. 16, 2020, 3 pages.
Notice of Allowance Received for Japanese Patent Application No. 2014259188, dated Jan. 6, 2017, 3 pages.
Notice of Allowance received for Japanese Patent Application No. 2016-207999, dated Oct. 26, 2018, 4 pages.
Notice of Allowance received for Japanese Patent Application No. 2018-089430, dated Oct. 1, 2018, 4 pages.
Notice of Allowance received for Japanese Patent Application No. 2018-203160, dated Mar. 27, 2020, 4 pages.
Notice of Allowance received for Japanese Patent Application No. 2020-076922, dated Sep. 13, 2021, 4 pages.
Notice of Allowance received for Korean Patent Application No. 10-2018-7029349, dated Jun. 14, 2019, 6 pages.
Notice of Allowance received for Korean Patent Application No. 10-2019-7026997, dated Oct. 16, 2020, 6 pages.
Notice of Allowance received for Korean Patent Application No. 10-2021-7001726, dated Apr. 16, 2021, 4 pages.
Notice of Allowance Received for U.S. Appl. No. 13/077,869, dated Sep. 28, 2016, 12 pages.
Notice of Allowance received for U.S. Appl. No. 13/758,971, dated Aug. 20, 2020, 19 pages.
Notice of Allowance received for U.S. Appl. No. 15/148,417, dated Dec. 7, 2017, 7 pages.
Notice of Allowance received for U.S. Appl. No. 15/167,532, dated Apr. 14, 2020, 9 pages.
Notice of Allowance received for U.S. Appl. No. 16/703,472, dated Feb. 3, 2021, 5 pages.
Notice of Allowance received for U.S. Appl. No. 17/114,176, dated May 16, 2022, 6 pages.
Notice of Amendment Dismissal received for Korean Patent Application No. 10-2016-7016026, dated Sep. 18, 2017, 10 pages.
Notice of Intent to Issue Ex Parte Reexamination Certificate received for U.S. Appl. No. 90/012,308, dated Aug. 23, 2013, 9 pages.
Office Action received for Australian Patent Application No. 2016203172, dated Apr. 21, 2017, 4 pages.
Office Action received for Australian Patent Application No. 2018203219, dated May 13, 2020, 3 pages.
Office Action received for Australian Patent Application No. 2018203219, dated Nov. 1, 2019, 5 pages.
Office Action received for Australian Patent Application No. 2020260488, dated Oct. 15, 2021, 3 pages.
Office Action received for Canadian Patent Application No. 2,893,513, dated Jun. 14, 2016, 5 pages.
Office Action received for Canadian Patent Application No. 2,986,582, dated Sep. 11, 2018, 3 pages.

(56) References Cited

OTHER PUBLICATIONS

Office Action received for Chinese Patent Application No. 201180058926.0, dated Aug. 22, 2016, 12 pages.
Office Action received for Chinese Patent Application No. 201410127550.X, dated Apr. 5, 2017, 6 pages.
Office Action received for Chinese Patent Application No. 201410127550X, dated Jul. 28, 2016, 14 pages.
Office Action received for Chinese Patent Application No. 201410638319.7, dated Mar. 1, 2017, 20 pages.
Office Action received for Chinese Patent Application No. 201610525800.4, dated Apr. 10, 2019, 8 pages.
Office Action received for Chinese Patent Application No. 201610525800.4, dated Aug. 22, 2019, 8 pages.
Office Action received for Chinese Patent Application No. 201610525800.4, dated Aug. 27, 2018, 13 pages.
Office Action received for Chinese Patent Application No. 201610525800.4, dated Feb. 8, 2020, 7 pages.
Office Action received for European Patent Application No. 06846397.5, dated Jun. 20, 2016, 7 pages.
Office Action received for European Patent Application No. 09162953.5, dated Jun. 20, 2016, 7 pages.
Office Action received for German Patent Application No. 112006004220.3, dated Apr. 1, 2022, 6 pages.
Office Action received for Indian Patent Application No. 5933/CHENP/2014, dated Feb. 7, 2020, 7 pages.
Office Action received for Japanese Patent Application No. 2014-259187, dated Feb. 3, 2017, 4 pages.
Office Action received for Japanese Patent Application No. 2014-259187, dated Feb. 14, 2020, 44 pages.
Office Action received for Japanese Patent Application No. 2014-259187, dated Jan. 4, 2018, 6 pages.
Office Action received for Japanese Patent Application No. 2014-259187, dated May 31, 2019, 44 pages.
Office Action received for Japanese Patent Application No. 2015-112376, dated Dec. 2, 2016, 3 pages.
Office Action received for Japanese Patent Application No. 2015-112376, dated Sep. 5, 2016, 4 pages.
Office Action received for Japanese Patent Application No. 2016-207999, dated Apr. 27, 2018, 6 pages.
Office Action received for Japanese Patent Application No. 2016-207999, dated Aug. 4, 2017, 10 pages.
Office Action received for Japanese Patent Application No. 2018-203160, dated Oct. 11, 2019, 5 pages.
Office Action received for Japanese Patent Application No. 2020-076922, dated Mar. 19, 2021, 7 pages.
Office Action Received for Korean Patent Application No. 1020167016026, dated Apr. 24, 2017, 7 pages.
Office Action Received for Korean Patent Application No. 1020167016026, dated Jul. 29, 2016, 9 pages.
Office Action received for Korean Patent Application No. 10-2017-7023591, dated Oct. 31, 2017, 12 pages.
Office Action received for Korean Patent Application No. 10-2017-7023591, dated Sep. 10, 2018, 7 pages.
Office Action received for Korean Patent Application No. 10-2018-7029349, dated Dec. 17, 2018, 8 pages.
Office Action received for Korean Patent Application No. 10-2019-7026997, dated May 7, 2020, 10 pages.
Office Action received for Korean Patent Application No. 10-2019-7026997, dated Nov. 18, 2019, 9 pages.
Office Action received for Korean Patent Application No. 10-2021-7022553, dated Aug. 20, 2021, 10 pages.
Office Action received for Korean Patent Application No. 10-2021-7022553, dated Jan. 24, 2022, 7 pages.
Office Action received for Taiwanese Patent Application No. 103135410, dated Sep. 30, 2016, 2 pages.
Second Corrected Notice of Allowance received for U.S. Appl. No. 17/114,176, dated Jul. 27, 2022, 3 pages.
Summons to Attend Oral proceedings received for European Patent Application No. 06846397.5, mailed on Oct. 25, 2017, 14 pages.
Summons to Attend Oral Proceedings received for European Patent Application No. 08705751.9, mailed on Jun. 23, 2016, 11 pages.
Summons to Attend Oral Proceedings received for European Patent Application No. 08705751.9, mailed on Oct. 28, 2011, 9 pages.
Summons to Attend Oral Proceedings received for European Patent Application No. 12175083.0, mailed on Jun. 25, 2018, 9 pages.
Summons to Oral Proceedings received for European Patent Application No. 07841984.3, mailed on Dec. 22, 2015, 11 pages.
Office Action Received for European Patent Application No. 06846397.5, dated Aug. 15, 2013, 6 pages.
Office Action received for European Patent Application No. 06846397.5, dated Jan. 28, 2009, 5 pages.
Office Action Received for European Patent Application No. 06846397.5, dated Oct. 27, 2015, 6 pages.
Office Action received European Patent Application No. 06846477.5, dated Apr. 21, 2009, 6 pages.
Office Action received for European Patent Application No. 07841984.3, dated Jul. 6, 2010, Jul. 6, 2010, 10 pages.
Summons to Attend Oral Proceedings received for European Patent Application No. 07841984.3, mailed on Jun. 28, 18 pages.
Decision to Refusal received for European Patent Application No. 08705751.9, dated Jul. 13, 2012, 13 pages.
Office Action received for European Patent Application No. 08705751.9, dated Dec. 28, 2009, 4 pages.
Summons to Attend Oral Proceedings, received for European Patent Application No. 08705751.9, mailed on Jan. 19, 2012, 1 page.
Extended European Search Report received for European Patent Application No. 09162953.5, dated Sep. 2, 2009, 6 pages.
Office Action Received for European Patent Application No. 09162953.5, dated Aug. 15, 2013, 5 pages.
Office Action received for European Patent Application No. 09162953.5, dated Jan. 27, 2010, 6 pages.
Office Action Received for European Patent Application No. 09162953.5, dated Oct. 27, 2015, 6 pages.
Notice of Allowance received for Taiwan Patent Application No. 100141378, dated Sep. 10, 2014, 3 pages.
Office Action received for Taiwan Patent Application No. 100141378, dated May 28, 2014, 20 pages.
Notice of Allowance received for Korean Patent Application No. 10-2009-7006231, dated Sep. 23, 2014, 3 pages.
Office Action received for Korean Patent Application No. 10-2009-7006231, dated Mar. 19, 2014, 5 pages.
Notice of Allowance received for Korean Patent Application No. 10-2012-7023375, dated Sep. 30, 2014, 3 pages.
Office Action received for Korean Patent Application No. 10-2012-7023375, dated Nov. 5, 2013, 8 pages.
Notice of Allowance received for Korean Patent Application No. 10-2013-7014787, dated Jul. 30, 2015, 3 pages.
Office Action received for Korean Patent Application No. 10-2013-7014787, dated Mar. 26, 2014, 4 pages.
Office Action received for Korean Patent Application No. 10-2013-7014787, dated Nov. 28, 2014, 4 pages.
Notice of Allowance received for Korean Patent Application No. 10-2013-7019464, dated Sep. 30, 2014, 3 pages.
Office Action received for Korean Patent Application No. 10-2013-7019464, dated Nov. 5, 2013, 6 pages.
Notice of Allowance received for Korean Patent Application No. 10-2014-7013454, dated Mar. 15, 2016, 6 pages.
Office Action received for Korean Patent Application No. 10-2014-7013454, dated Apr. 17, 2015, 11 pages.
Office Action received for Korean Patent Application No. 10-2014-7013454, dated Aug. 11, 2014, 11 pages.
Office Action received for Korean Patent Application No. 10-2014-7013455, dated Apr. 14, 2015, 8 pages.
Office Action received for Korean Patent Application No. 10-2014-7013455, dated Aug. 11, 2014, 12 pages.
Office Action Received for Korean Patent Application No. 10-2014-7013455, dated Jan. 28, 2016, 7 pages.
Notice of Allowance received for Korean Patent Application No. 10-2015-7005337, dated Jan. 27, 2016, 3 pages.
Office Action received for Korean Patent Application No. 10-2015-7005337, dated May 28, 2015, 4 pages.

(56) References Cited

OTHER PUBLICATIONS

Office Action received for Taiwan Patent Application No. 103135410, dated Mar. 1, 2016, 35 pages.
Final Office Action received for U.S. Appl. No. 11/322,547, dated Jun. 9, 2008, Jun. 9, 2008, 15 pages.
Final Office Action received for U.S. Appl. No. 11/322,547, dated May 28, 2010, May 28, 2010, 12 pages.
Non-Final Office Action received for U.S. Appl. No. 11/322,547, dated Aug. 6, 2009, 10 pages.
Non-Final Office Action received for U.S. Appl. No. 11/322,547, dated Feb. 5, 2009, 11 pages.
Non-Final Office Action received for U.S. Appl. No. 11/322,547, dated Oct. 30, 2007, 16 pages.
Notice of Allowance received for U.S. Appl. No. 11/322,547, dated Aug. 6, 2010, 11 pages.
Final Office Action received for U.S. Appl. No. 11/322,553, dated Aug. 5, 2008, 25 pages.
Non-Final Office Action received for U.S. Appl. No. 11/322,553, dated Apr. 5, 2010, 18 pages.
Non-Final Office Action received for U.S. Appl. No. 11/322,553, dated Dec. 26, 2008, 26 pages.
Non-Final Office Action received for U.S. Appl. No. 11/322,553, dated Feb. 5, 2008, 11 pages.
Non-Final Office Action received for U.S. Appl. No. 11/322,553, dated Jun. 15, 2007, 16 pages.
Non-Final Office Action received for U.S. Appl. No. 11/322,553, dated Jun. 17, 2009, 27 pages.
Final Office Action received for U.S. Appl. No. 11/850,635, dated Apr. 24, 2012, 10 pages.
Final Office Action received for U.S. Appl. No. 11/850,635, dated Jan. 28, 2011, 21 pages.
Non-Final Office Action received for U.S. Appl. No. 11/850,635, dated Oct. 6, 2010, 28 pages.
Non-Final Office Action received for U.S. Appl. No. 11/850,635, dated Jan. 4, 2012, 10 pages.
Notice of Allowance received for U.S. Appl. No. 11/850,635, dated Jun. 11, 2013, 9 pages.
Final Office Action received for U.S. Appl. No. 11/968,059, dated Oct. 31, 2011, 30 pages.
Non-Final Office Action received for U.S. Appl. No. 11/968,059, dated Apr. 4, 2011, 46 pages.
Notice of Allowance received for U.S. Appl. No. 11/968,059, dated Dec. 11, 2013, 10 pages.
Notice of Allowance received for U.S. Appl. No. 11/968,059, dated Mar. 14, 2012, 21 pages.
Final Office Action received for U.S. Appl. No. 11/969,786 dated May 9, 2012, 39 pages.
Final Office Action received for U.S. Appl. No. 11/969,786, dated Jun. 15, 2011, 22 pages.
Non-Final Office Action received for U.S. Appl. No. 11/969,786, dated Dec. 8, 2011, 21 pages.
Non-Final Office Action received for U.S. Appl. No. 11/969,786, dated Feb. 11, 2011, 27 pages.
Final Office Action received for U.S. Appl. No. 11/969,819, dated Oct. 17, 2011, 32 pages.
Non-Final Office Action received for U.S. Appl. No. 11/969,819, dated Mar. 14, 2011, 33 pages.
Notice of Allowance received for U.S. Appl. No. 11/969,819, dated Jan. 18, 2012, 20 pages.
Notice of Allowance received for U.S. Appl. No. 12/101,832, dated Feb. 2, 2009, 6 pages.
Notice of Allowance received for U.S. Appl. No. 12/101,832, dated Sep. 26, 2008, 9 pages.
Final Office Action received for U.S. Appl. No. 12/891,705, dated Jun. 27, 2013, 12 pages.
Final Office Action received for U.S. Appl. No. 12/891,705, dated Oct. 23, 2014, 32 pages.
Non Final Office Action received for U.S. Appl. No. 12/891,705, dated Jun. 4, 2015, 33 pages.
Non-Final Office Action received for U.S. Appl. No. 12/891,705, dated Mar. 13, 2013, 11 pages.
Non-Final Office Action received for U.S. Appl. No. 12/891,705, dated Mar. 31, 2014, 23 pages.
Notice of Allowance received for U.S. Appl. No. 12/891,705, dated Feb. 3, 2016, 6 pages.
Extended European Search Report (includes Supplementary European Search Report and Search Opinion) received for European Patent Application No. 12175083.0, dated Oct. 26, 2012, 7 pages.
Office Action Received for European Patent Application No. 121750830, dated Nov. 30, 2015, 5 pages.
Extended European Search Report (includes Supplementary European Search Report and Search Opinion) received for European Patent Application No. 12175086.3, dated Dec. 4, 2012, 7 pages.
Non-Final Office Action received for U.S. Appl. No. 13/076,416, dated Jan. 2, 2014, 24 pages.
Non-Final Office Action received for U.S. Appl. No. 13/076,416, dated Jul. 25, 2013, 19 pages.
Notice of Allowance received for U.S. Appl. No. 13/076,416, dated Aug. 5, 2014, 10 pages.
Final Office Action received for U.S. Appl. No. 13/077,869, dated Feb. 26, 2016, 15 pages.
Final Office Action received for U.S. Appl. No. 13/077,869, dated Jan. 2, 2015, 15 pages.
Non-Final Office Action received for U.S. Appl. No. 13/077,869, dated Aug. 5, 2015, 14 pages.
Non-Final Office Action received for U.S. Appl. No. 13/077,869, dated Jun. 4, 2014, 13 pages.
Non-Final Office Action received for U.S. Appl. No. 13/412,483, dated May 1, 2012, 10 pages.
Notice of Allowance received for U.S. Appl. No. 13/412,483, dated May 25, 2012, 5 pages.
Non-Final Office Action received for U.S. Appl. No. 13/458,995, dated Jul. 5, 2012, 13 pages.
Notice of Allowance received for U.S. Appl. No. 13/458,995, dated Nov. 13, 2012, 8 pages.
Non-Final Office Action received for U.S. Appl. No. 13/548,111, dated Aug. 27, 2012, 13 pages.
Notice of Allowance received for U.S. Appl. No. 13/548,111, dated Dec. 28, 2012, 5 pages.
Final Office Action received for U.S. Appl. No. 13/758,967, dated May 20, 2016, 17 pages.
Non Final Office Action received for U.S. Appl. No. 13/758,967, dated Dec. 17, 2015, 19 pages.
Non-Final Office Action received for U.S. Appl. No. 13/758,967, dated Apr. 24, 2015, 17 pages.
Final Office Action received for U.S. Appl. No. 13/758,971, dated May 19, 2016, 19 pages.
Non-Final Office Action received for U.S. Appl. No. 13/758,971, dated Dec. 11, 2015, 18 pages.
Non-Final Office Action received for U.S. Appl. No. 13/758,971, dated Apr. 24, 2015, 17 pages.
Non-Final Office Action received for U.S. Appl. No. 14/056,350, dated Nov. 13, 2014, 10 pages.
Notice of Allowance received for U.S. Appl. No. 14/056,350, dated Apr. 24, 2015, 10 pages.
Notice of Allowance received for U.S. Appl. No. 14/056,350, dated Sep. 16, 2015, 7 pages.
Notice of Allowance received for U.S. Appl. No. 14/056,350, dated Jan. 7, 2016, 5 pages.
Non-Final Office Action received for U.S. Appl. No. 15/662,174, dated Jan. 10, 2018, 25 pages.
Notice of Allowance received for Canadian Patent Application No. 2,735,309, dated Dec. 9, 2014, 1 page.
Board Opinion received for Chinese Patent Application No. 200780001219.1, dated Mar. 25, 2015, 7 pages.
Board Opinion received for Chinese Patent Application No. 200780001219.1, dated Sep. 18, 2014, 10 pages.
Notice of Allowance received for Chinese Patent Application No. 200880006520.6, dated Jan. 22, 2014, 2 pages.
Office Action received for Chinese Patent Application No. 200880006520.6, dated Dec. 5, 2012, 42 pages.

(56) References Cited

OTHER PUBLICATIONS

Office Action received for Chinese Patent Application No. 200880006520.6, dated Feb. 2, 2012, 14 pages.
Office Action received for Chinese Patent Application No. 200880006520.6, dated May 27, 2013, 8 pages.
Office Action Received for Chinese Patent Application No. 201180058926.0, dated Oct. 8, 2015, 22 pages.
Notice of Allowance received for Japanese Patent Application No. 2012-173257, dated Dec. 1, 2014, 3 pages.
Office Action received for Japanese Patent Application No. 2012-173257, dated Dec. 13, 2013, 2 pages.
Notice of Acceptance received for Australian Patent Application No. 2013200529, dated Feb. 9, 2016, 3 pages.
Office Action received for Australian Patent Application No. 2013200529, dated Dec. 12, 2014, 3 pages.
Examiner's Pre-Review Report received for Japanese Patent Application No. 2013-538920, dated Aug. 20, 2015, 6 pages.
Notice of Allowance received for Japanese Patent Application No. 2013-538920, dated Feb. 19, 2016, 18 pages.
Office Action received for Japanese Patent Application No. 2013-538920, dated Feb. 2, 2015, 3 pages.
Office Action received for Japanese Patent Application No. 2013-538920, dated Jun. 6, 2014, 8 pages.
Office Action Received for Japanese Patent Application No. 2014259187, dated Mar. 11, 2016, 4 pages.
Office Action Received for Japanese Patent Application No. 2014259188, dated Feb. 1, 2016, 8 pages.
Office Action received for Japanese Patent Application No. 2015-112376, dated May 6, 2016, 6 pages.
Ahlberg et al., "The Alphaslider: A Compact and Rapid Selector", CHI '94 Proceedings of the SIGCHI Conference on Human Factors in Computing Systems, Apr. 24-28, 1994, pp. 365-371.
Al-Baker Asri, "AquaCalendar, a Review by i-Symbian.Com", available at <http://www.i-symbian.com/forum/articles.php?action=viewarticle&artid=40>, 2005, 11 pages.
Arar Yardena, "Microsoft Reveals Office 2003 Prices, Release", PC World, http://www.pcworld.com/article/112077/microsoft_reveals_office_2003_prices_release.html, Aug. 19, 2003, 3 pages.
Archos Team, "English Language User Manual Pocket Media Assistant PMA430(TM) Video Player & Recorder/Music & Audio/Wifi /Linux/Personal Information Manager (PIM)", XP055525286, Retrieved on Nov. 20, 2018, Dec. 31, 2015, 39 pages.
ask.com,"A Taxonomy of See-through Tools", available at <http://www.ask.com/web?qsrc=2990&o=0&l=dir&q=A+Taxonomy+of+See-through+Tools>, retrieved on Mar. 3, 2011, 2 pages.
ask.com,"Hide Scroll Bar Touch Screen", available at <http://www.ask.com/web?q=hide+scroll+bar+touch+screen&qsrc=2990&frstpgo=0&o=0&l . . . >, retrieved on Mar. 9, 2011, 2 pages.
ask.com,"Pop Up Scroll Bar Touch Screen", available at <http://www.ask.com/web?qsrc=2990&o=0&l=dir&q=pop+Up+scroll+bar+touch+screen>, retrieved on Mar. 9, 2011, 3 pages.
ask.com,"Popup Scroll Bar", available at <http://www.ask.com/web?q=popup+scroll+bar&qsrc=0&0=0&1=dir>, retrieved on Mar. 9, 2011, 2 pages.
ask.com,"Popup Scroll Bar Touch Screen", available at <http://www.ask.com/web?qsrc=2990&o=0&l=dir&q=popup+scroll+bar+touch+screen>, retrieved on Mar. 9, 2011, 2 pages.
ask.com,"Rd 453161 IBM Technical Disclosure", available at <http://www.ask.com/web?qsrc=1&o=0&1=dir&q=rd+453161+ibm+technical+disclosure>, retrieved on Oct. 16, 2011, 1 page.
ask.com, "Shorten Scroll Bar", available at <http://www.ask.com/web?q=shorten+scroll+bar&qsrc=0&0=0&1=dir>, retrieved on Feb. 21, 2012, 1 page.
ask.com,"Shorten Scroll Slider", available at <http://www.ask.com/web?qsrc=1&o=0&1=dir&q=shorten+scroll+slider>, retrieved on Feb. 21, 2012, 2 pages.
ask.com,"Shorten Scroll Thumb", available at <http://www.ask.com/web?q=shorten+scroll+thumb&qsrc=1&0=0&1=dir&qid=0E97B1726 . . . >, retrieved on Feb. 21, 2012, 1 page.
ask.com,"Smaller Scroll (Slider or Thumb or Bar)", available at <http://www.ask.com/web?qsrc=1&o=0&1=dir&q=smaller+scroll+%28slider+or+thumb+or . . . >, retrieved on Feb. 21, 2012, 2 pages.
ask.com,"The Design of a GUI Paradigm Based on Tablets, Two-Hands", available at <http://www.ask.com/web?q=The+Design+of+a+GUI+Paradigm+based+on+Tablets%2C+. . . >, retrieved on Mar. 13, 2011, 2 pages.
ask.com,"Toolglass and Magic Lenses: The See-through Interface", available at <http://www.ask.com/web?qsrc=2990&o=0&1=dir&q=Toolglass+and+Magic+Lenses%3A . . . >, retrieved on Mar. 13, 2011, 2 pages.
Bederson Benjaminb. , "Fisheye Menus", Human-Computer Interaction Lab, Institute for Advanced Computer Studies, Computer Science Department, University of Maryland, College Park, ACM 2000, CHI Letters vol. 2, No. 2,, 2000, pp. 217-225.
Conneally Tim, "Apple Secures a Patent for a Multitouch Methodology", available at <http://www.betanews.com/article/Apple-secures-a-patent-for-a-multitouch-methodology/1233074799>, Jan. 27, 2009, 1 page.
EBSCOHOST,"Scroll Bar", available at <http://ehis.ebscohost.com/ehost/resultsadvanced?sid=b815aec7-bd4d-46b8-badf-5e233888 . . . >, retrieved on Feb. 21, 2012, 4 pages.
EBSCOHOST,"Scroll Slider", available at <http://ehis.ebscohost.com/ehost/resultsadvanced?sid=b815aec7-bd4d-46b8-badf-5e233888 . . . >, retrieved on Feb. 21, 2012, 4 pages.
EBSCOHOST,"Scroll Thumb", available at <http://ehis.ebscohost.com/ehost/resultsadvanced?sid=b815aec7-bd4d-46b8-badf-5e233888 . . . >, retrieved on Feb. 21, 2012, 1 page.
EBSCOHOST,"Shorten Scroll (Bar or Thumb or Slider)", available at <http://ehis.ebscohost.com/ehost/resultsadvanced?sid=b815aec7-bd4d-46b8-badf-5e233888 . . . >, retrieved on Feb. 21, 2012, 4 pages.
GSMARENA Team,"Sony Ericsson P990 Review: A Coveted Smartphone", available at <http://web.archive.org/web/20061227185520/http://www.gsmarena.com/sony_ericsson_P990-review-101p8.php>, Aug. 4, 2006, 3 pages.
Hayashi Nobuyuki, "iPhone 3G Full Review & Trial of 100 Applications", Mac Power, vol. 3, Japan, Ascii Media Works, Aug. 8, 2008, 6 pages.
Hayashi Nobuyuki, "IPhone 3G In-Depth Verification & Try of 100 apps", MACPOWER, vol. 3, Aug. 8, 2008, 6 pages.
Hotelling et al., "U.S. Appl. No. 12/118,659, filed May 9, 2008, titled "Gestures for Touch Sensitive Input Devices"", 81 pages.
HOWPC,"Windows XP Manual", Available at <http://cfile208.uf.daum.net/attach/152FF50A4968C827141411>, Feb. 2003, pp. 1-4.
IBM, "Method for Providing Position Relative Audio Feedback in a Scrollable Content Area", IBM Research Disclosure RD 418078, Feb. 1999, 2 pages.
IBM, "Responsive Scrollbar for Handheld Devices", IBM Research Disclosure RD 453161, Jan. 2002, 4 pages.
Kurtenbach et al., "The Design of a GUI Paradigm Based on Tablets, Two-Hands, and Transparency", Mar. 27, 1997, 8 pages.
McCrickard et al., "Beyond the Scrollbar: An Evolution and Evaluation of Alternative List Navigation Techniques", GVU Technical Report;GIT-GVU-97-19, available at <https://smartech.gatech.edu/handle/1853/3537>, 1997, 2 pages.
Microsoft,"Microsoft Outlook Calendar", Available at <http://emedia.leeward.hawaii.edu/teachtech/documents/Personal_Manage/MSOutlook_Cal.pdf>, May 3, 2012, 9 pages.
Milic-Frayling et al., "SmartView: Enhanced Document Viewer for Mobile Devices", Microsoft Technical Report, available at <ftp://ftp.research.microsoft.com/pub/tr/tr-2002-114.pdf>, Retrieved on Dec. 17, 2007, Nov. 15, 2002, 10 pages.
International Preliminary Report on Patentability received for PCT Patent Application No. PCT/US2006/061337, dated Jun. 11, 2008, 6 pages.
International Search Report and Written Opinion received for PCT Patent Application No. PCT/US2006/061337, dated Feb. 15, 2008, 7 pages.
International Preliminary Report on Patentability received for PCT Patent Application No. PCT/US2006/061627, completed on May 15, 2012, 6 pages.

(56) References Cited

OTHER PUBLICATIONS

International Preliminary Report on Patentability received for PCT Patent Application No. PCT/US2007/077777, dated Oct. 13, 2009, 11 pages.
International Preliminary Report on Patentability received for PCT Patent Application No. PCT/US2008/050423, dated Jul. 7, 2009, 11 pages.
International Search Report and Written Opinion received for PCT Patent Application No. PCT/US2008/050423, dated Sep. 1, 2008, 15 pages.
International Preliminary Report on Patentability received for PCT Patent Application No. PCT/US2008/050446, dated Jul. 7, 2009, 15 pages.
International Search Report and Written Opinion received for PCT Patent Application No. PCT/US2008/050446, dated Apr. 10, 2008, 17 pages.
International Preliminary Report on Patentability received for PCT Patent Application No. PCT/US2011/060296, dated May 23, 2013, 6 pages.
International Search Report and Written Opinion received for PCT Patent Application No. PCT/US2011/060296, dated Feb. 28, 2012, 8 pages.
Potala Software,"My Time!", Available at <http://web.archive.org/web/20060615204517/potalasoftware.com/Products/MyTime/Default.aspx>, Jun. 15, 2006, 2 pages.
Ramos et al., "Zliding: Fluid Zooming and Sliding for High Precision Parameter Manipulation", Proceedings of the 18th annual ACM Symposium on User Interface Software and Technology,, Oct. 23-27, 2005, pp. 143-152.
Rekimoto Jun, "SmartSkin: An Infrastructure for Freehand Manipulation on Interactive Surfaces", Proceedings of the SIGCHI conference on Human factors in computing systems, vol. 4, No. 1, Apr. 20-25, 2002, pp. 113-120.
Rubine D., "Specifying Gestures by Example", Computer Graphics vol. 25, No. 4, Jul. 1991, pp. 329-337.

Safari Books Online,"Shorten Scroll Slider", available at <http://academic.safaribooksonline.com/search/shorten+scroll+slider>, retrieved on Feb. 21, 2012, 2 pages.
Safari Books Online,"Shorten Scroll Thumb", available at <http://academic.safaribooksonline.com/search/shorten+scroll+thumb>, retrieved on Feb. 21, 2012, 1 page.
Safari Books Online,"Shorten Scrollbar", available at <http://academic.safaribooksonline.com/search/shorten+scrollbar>, retrieved on Feb. 21, 2012, 3 pages.
Smith Rush, "Sygic. Mobile Contacts V1.0", Available online at: http://www.pocketnow.com/index.php?a=portaldetail&id=467, Sep. 2, 2004, 13 pages.
The Oxford English Dictionary,"Scrolling", Draft Additions 1993, 2015, 4 pages.
Wikipedia, "Microsoft Excel", Available at <http://web.archive.org/web/20061005083106/http://en.wikipedia.org/wiki/Microsoft_Excel>, Oct. 5, 2006.
Yoshino Mariko, "Let's use! Outlook Express", Nikkei PC Beginners, Nikkei Business Publications, Inc., vol. 7, No. 24, Dec. 13, 2002, 75 pages.
Non-Final Office Action received for U.S. Appl. No. 17/589,601, dated Aug. 18, 2023, 13 pages.
Office Action received for Korean Patent Application No. 10-2022-7010233, dated Aug. 7, 2023, 9 pages (4 pages of English Translation and 5 pages of Official Copy).
Final Office Action received for U.S. Appl. No. 17/589,601, dated Nov. 13, 2023, 13 pages.
Applicant-Initiated Interview Summary received for U.S. Appl. No. 16/944,427, dated Oct. 4, 2023, 4 pages.
Applicant-Initiated Interview Summary received for U.S. Appl. No. 17/589,601, dated Oct. 17, 2023, 4 pages.
Notice of Allowance received for Japanese Patent Application No. 2021-167548, dated Oct. 6, 2023, 4 pages (1 page of English Translation and 3 pages of Official Copy).
Decision on Appeal received for Korean Patent Application No. 10-2022-7010233, mailed on Nov. 16, 2023, 27 pages (4 pages of English Translation and 23 pages of Official Copy).

* cited by examiner

PORTABLE ELECTRONIC DEVICE, METHOD, AND GRAPHICAL USER INTERFACE FOR DISPLAYING ELECTRONIC DOCUMENTS AND LISTS

RELATED APPLICATIONS

This application is a continuation of U.S. application Ser. No. 17/114,776, filed Dec. 7, 2020, entitled "Portable Electronic Device, Method, and Graphical User Interface for Displaying Electronic Lists and Documents," now U.S. Pat. No. 11,467,722, which is a continuation of U.S. application Ser. No. 13/758,971, filed Feb. 4, 2013, entitled "Portable Electronic Device, Method, and Graphical User Interface for Displaying Electronic Lists and Documents," now U.S. Pat. No. 10,860,198, which is a continuation of U.S. application Ser. No. 13/548,111, filed Jul. 12, 2012, entitled "Portable Electronic Device, Method, and Graphical User Interface for Displaying Electronic Lists and Documents," now U.S. Pat. No. 8,368,665, which is a continuation of U.S. application Ser. No. 13/412,483, filed Mar. 5, 2012, entitled "Portable Electronic Device, Method, and Graphical User Interface for Displaying Electronic Lists and Documents," now U.S. Pat. No. 8,223,134, which is a continuation of U.S. application Ser. No. 11/969,819, filed Jan. 4, 2008, entitled "Portable Electronic Device, Method, and Graphical User Interface for Displaying Electronic Lists and Documents," now U.S. Pat. No. 8,130,205, which claims priority to U.S. Provisional Patent Application Nos. 60/947,386, "Portable Electronic Device. Method, and Graphical User Interface for Displaying Electronic Documents and Lists," filed Jun. 29, 2007; 60/937,993, "Portable Multifunction Device," filed Jun. 29, 2007; 60/879,469, "Portable Multifunction Device," filed Jan. 8, 2007; and 60/879,253, "Portable Multifunction Device," filed Jan. 7, 2007 All of these applications are incorporated by reference herein in their entireties.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; (11) U.S. Provisional Patent Application No. 60/824,769, "Portable Multifunction Device," filed Sep. 6, 2006; and (12) U.S. patent application No. 11/968,059, "Portable Electronic Device, Method, and Graphical User Interface for Displaying Electronic Lists and Documents," filed December 31, 2007. All of these applications are incorporated by reference herein in their entirety.

TECHNICAL FIELD

The disclosed embodiments relate generally to portable electronic devices, and more particularly, to portable devices that display portions of electronic documents and/or portions of lists of items.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

In particular, when a conventional user interface on a portable device is used to display a portion of an electronic document or of a list of items, a user may not be able to tell the position in the document or list of the displayed portion. The user also may not be able to tell what fraction of the document or list corresponds to the displayed portion. Lacking this knowledge, the user may find viewing and navigating the document or list to be confusing and frustrating. In some portable devices, scroll bars are used to indicate the position in the document or list of the displayed portion. But scroll bars are fixed user interface features that take up valuable display screen area on an already small display screen.

Accordingly, there is a need for portable multifunction devices with more transparent and intuitive user interfaces for navigating portions of electronic documents and/or lists of items that are easy to use and that do not reduce the screen area available for the display of documents, lists, and other content. Such interfaces increase the effectiveness, efficiency and user satisfaction with portable multifunction devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital vidcoing, wcb browsing, digital music playing, and/or digital video playing. Instructions for performing these functions may be included in a computer program product configured for execution by one or more processors.

In one aspect of the invention, a computer-implemented method is used in conjunction with a portable multifunction device with a touch screen display. In the method, a portion of an electronic document is displayed on the touch screen display. The displayed portion of the electronic document has a vertical position in the electronic document and a horizontal position in the electronic document. An object is detected on or near the displayed portion of the electronic document. In response to detecting the object, a vertical bar and a horizontal bar are displayed on top of the displayed portion of the electronic document. The vertical bar has a vertical position on top of the displayed portion of the electronic document that corresponds to the vertical position in the electronic document of the displayed portion of the electronic document. The horizontal bar has a horizontal position on top of the displayed portion of the electronic document that corresponds to the horizontal position in the electronic document of the displayed portion of the electronic document. After a predetermined condition is met, display of the vertical bar and of the horizontal bar is ceased.

In another aspect of the invention, a graphical user interface on a portable multifunction device with a touch screen display comprises: a portion of an electronic document displayed on the touch screen display, wherein the displayed portion of the electronic document has a vertical position in the electronic document and a horizontal position in the electronic document; a vertical bar displayed on top of the portion of the electronic document; and a horizontal bar displayed on top of the portion of the electronic document. In response to detecting an object on or near the displayed portion of the electronic document, the vertical bar and the horizontal bar are displayed on top of the portion of the electronic document. The vertical bar has a vertical position on top of the displayed portion of the electronic document that corresponds to the vertical position in the electronic document of the displayed portion of the electronic document. The horizontal bar has a horizontal position on top of the displayed portion of the electronic document that corresponds to the horizontal position in the electronic document of the displayed portion of the electronic document. After a predetermined condition is met, the display of the vertical bar and the horizontal bar is ceased while continuing to display the displayed portion of the electronic document, wherein the displayed portion of the electronic document has a vertical extent and horizontal extent that are less than a vertical extent and horizontal extent of the electronic document, respectively.

In another aspect of the invention, a portable multifunction device comprises: a touch screen display; one or more processors; memory; and one or more programs. The one or more programs are stored in the memory and configured to be executed by the one or more processors. The one or more programs include: instructions for displaying a portion of an electronic document on the touch screen display, wherein the displayed portion of the electronic document has a vertical position in the electronic document and a horizontal position in the electronic document; instructions for detecting an object on or near the displayed portion of the electronic document; and instructions for displaying a vertical bar and a horizontal bar on top of the displayed portion of the electronic document in response to detecting the object on or near the displayed portion of the electronic document. The vertical bar has a vertical position on top of the displayed portion of the electronic document that corresponds to the vertical position in the electronic document of the displayed portion of the electronic document. The horizontal bar has a horizontal position on top of the displayed portion of the electronic document that corresponds to the horizontal position in the electronic document of the displayed portion of the electronic document. The one or more programs also include instructions for ceasing to display the vertical bar and the horizontal bar after a predetermined condition is met while continuing to display the displayed portion of the electronic document, wherein the displayed portion of the electronic document has a vertical extent and horizontal extent that are less than a vertical extent and horizontal extent of the electronic document, respectively.

In another aspect of the invention, a computer readable storage medium stores one or more programs. The one or more programs include instructions, which when executed by a portable multifunction device with a touch screen display, cause the device to: display a portion of an electronic document on the touch screen display, wherein the displayed portion of the electronic document has a vertical position in the electronic document and a horizontal position in the electronic document; detect an object on or near the displayed portion of the electronic document; and display a vertical bar and a horizontal bar on top of the displayed portion of the electronic document in response to detecting the object on or near the displayed portion of the electronic document. The vertical bar has a vertical position on top of the displayed portion of the electronic document that corresponds to the vertical position in the electronic document of the displayed portion of the electronic document. The horizontal bar has a horizontal position on top of the displayed portion of the electronic document that corresponds to the horizontal position in the electronic document of the displayed portion of the electronic document. The instructions also cause the device to cease to display the vertical bar and the horizontal bar after a predetermined condition is met while continuing to display the displayed portion of the electronic document, wherein the displayed portion of the electronic document has a vertical extent and horizontal extent that are less than a vertical extent and horizontal extent of the electronic document, respectively.

In another aspect of the invention, a portable multifunction device with a touch screen display comprises: means for displaying a portion of an electronic document on the touch screen display, wherein the displayed portion of the electronic document has a vertical position in the electronic document and a horizontal position in the electronic document; means for detecting an object on or near the displayed portion of the electronic document; and means for displaying a vertical bar and a horizontal bar on top of the displayed portion of the electronic document in response to detecting the object on or near the displayed portion of the electronic document. The vertical bar has a vertical position on top of the displayed portion of the electronic document that corresponds to the vertical position in the electronic document of the displayed portion of the electronic document. The horizontal bar has a horizontal position on top of the displayed portion of the electronic document that corresponds to the horizontal position in the electronic document of the displayed portion of the electronic document. The device also comprises means for ceasing to display the vertical bar and the horizontal bar after a predetermined condition is met while continuing to display the displayed portion of the electronic document, wherein the displayed portion of the electronic document has a vertical extent and horizontal extent that are less than a vertical extent and horizontal extent of the electronic document, respectively.

In another aspect of the invention, a computer-implemented method is used in conjunction with a portable multifunction device with a touch screen display. In the method a portion of a list of items is displayed on the touch screen display. The displayed portion of the list has a vertical position in the list. An object is detected on or near the displayed portion of the list. In response to detecting the object on or near the displayed portion of the list, a vertical bar is displayed on top of the displayed portion of the list. The vertical bar has a vertical position on top of the displayed portion of the list that corresponds to the vertical position in the list of the displayed portion of the list. After a predetermined condition is met, display of the vertical bar is ceased while continuing to display the displayed portion of the electronic document, wherein the displayed portion of the electronic document has a vertical extent less than a vertical extent of the electronic document.

In another aspect of the invention, a graphical user interface on a portable multifunction device with a touch screen display comprises: a portion of a list of items displayed on the touch screen display, wherein the displayed portion of the list has a vertical position in the list; and a vertical bar displayed on top of the portion of the list of items. In response to detecting an object on or near the displayed portion of the list, the vertical bar is displayed on top of the portion of the list of items. The vertical bar has a vertical position on top of the displayed portion of the list that corresponds to the vertical position in the list of the displayed portion of the list. After a predetermined condition is met, the display of the vertical bar is ceased.

In another aspect of the invention, a portable multifunction device comprises: a touch screen display; one or more processors; memory; and one or more programs. The one or more programs are stored in the memory and configured to be executed by the one or more processors. The one or more programs include: instructions for displaying a portion of a list of items on the touch screen display, wherein the displayed portion of the list has a vertical position in the list; instructions for detecting an object on or near the displayed portion of the list; instructions for displaying a vertical bar on top of the displayed portion of the list in response to detecting the object on or near the displayed portion of the list, wherein the vertical bar has a vertical position on top of the displayed portion of the list that corresponds to the vertical position in the list of the displayed portion of the list; and instructions for ceasing to display the vertical bar after a predetermined condition is met.

In another aspect of the invention, a computer readable storage medium stores one or more programs. The one or more programs include instructions, which when executed by a portable multifunction device with a touch screen display, cause the device to: display a portion of a list of items on the touch screen display, wherein the displayed portion of the list has a vertical position in the list; detect an object on or near the displayed portion of the list; display a vertical bar on top of the displayed portion of the list in response to detecting the object on or near the displayed portion of the list, wherein the vertical bar has a vertical position on top of the displayed portion of the list that corresponds to the vertical position in the list of the displayed portion of the list; and cease to display the vertical bar after a predetermined condition is met.

In another aspect of the invention, a portable multifunction device with a touch screen display comprises: means for displaying a portion of a list of items on the touch screen display, wherein the displayed portion of the list has a vertical position in the list; means for detecting an object on or near the displayed portion of the list; means for displaying a vertical bar on top of the displayed portion of the list in response to detecting the object on or near the displayed portion of the list, wherein the vertical bar has a vertical position on top of the displayed portion of the list that corresponds to the vertical position in the list of the displayed portion of the list; and means for ceasing to display the vertical bar after a predetermined condition is met.

In another aspect of the invention, a computer-implemented method is used in conjunction with a portable multifunction device with a touch screen display. In the method, a portion of an electronic document is displayed on the touch screen display. The displayed portion of the electronic document has a vertical position in the electronic document. An object is detected on or near the displayed portion of the electronic document. In response to detecting the object on or near the displayed portion of the electronic document, a vertical bar is displayed on top of the displayed portion of the electronic document. The vertical bar has a vertical position on top of the displayed portion of the electronic document that corresponds to the vertical position in the electronic document of the displayed portion of the electronic document. After a predetermined condition is met, display of the vertical bar is ceased.

In another aspect of the invention, a graphical user interface on a portable multifunction device with a touch screen display comprises: a portion of an electronic document displayed on the touch screen display, wherein the displayed portion of the electronic document has a vertical position in the electronic document; and a vertical bar displayed on top of the portion of the electronic document. In response to detecting an object on or near the displayed portion of the electronic document, the vertical bar is displayed on top of the portion of the electronic document. The vertical bar has a vertical position on top of the displayed portion of the electronic document that corresponds to the vertical position in the electronic document of the displayed portion of the electronic document. After a predetermined condition is met, the display of the vertical bar is ceased.

In another aspect of the invention, a portable multifunction device comprises: a touch screen display; one or more processors; memory; and one or more programs. The one or more programs are stored in the memory and configured to be executed by the one or more processors. The one or more programs include: instructions for displaying a portion of an electronic document on the touch screen display, wherein the displayed portion of the electronic document has a vertical position in the electronic document; instructions for detecting an object on or near the displayed portion of the electronic document; instructions for displaying a vertical bar on top of the displayed portion of the electronic document in response to detecting the object on or near the displayed portion of the electronic document, wherein the vertical bar has a vertical position on top of the displayed portion of the electronic document that corresponds to the vertical position in the electronic document of the displayed portion of the electronic document; and instructions for ceasing to display the vertical bar after a predetermined condition is met.

In another aspect of the invention, a computer readable storage medium stores one or more programs. The one or more programs include instructions, which when executed by a portable multifunction device with a touch screen display, cause the device to: display a portion of an electronic document on the touch screen display, wherein the displayed portion of the electronic document has a vertical position in the electronic document; detect an object on or near the displayed portion of the electronic document; display a vertical bar on top of the displayed portion of the electronic document in response to detecting the object on or near the displayed portion of the electronic document, wherein the vertical bar has a vertical position on top of the displayed portion of the electronic document that corresponds to the vertical position in the electronic document of the displayed portion of the electronic document; and cease to display the vertical bar after a predetermined condition is met.

In another aspect of the invention, a portable multifunction device with a touch screen display comprises: means for displaying a portion of an electronic document on the touch screen display, wherein the displayed portion of the electronic document has a vertical position in the electronic document; means for detecting an object on or near the displayed portion of the electronic document; means for displaying a vertical bar on top of the displayed portion of the electronic document in response to detecting the object on or near the displayed portion of the electronic document, wherein the vertical bar has a vertical position on top of the displayed portion of the electronic document that corresponds to the vertical position in the electronic document of the displayed portion of the electronic document; and means for ceasing to display the vertical bar after a predetermined condition is met.

The disclosed embodiments allow a user to understand what portion of an electronic document or list of items is being displayed.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
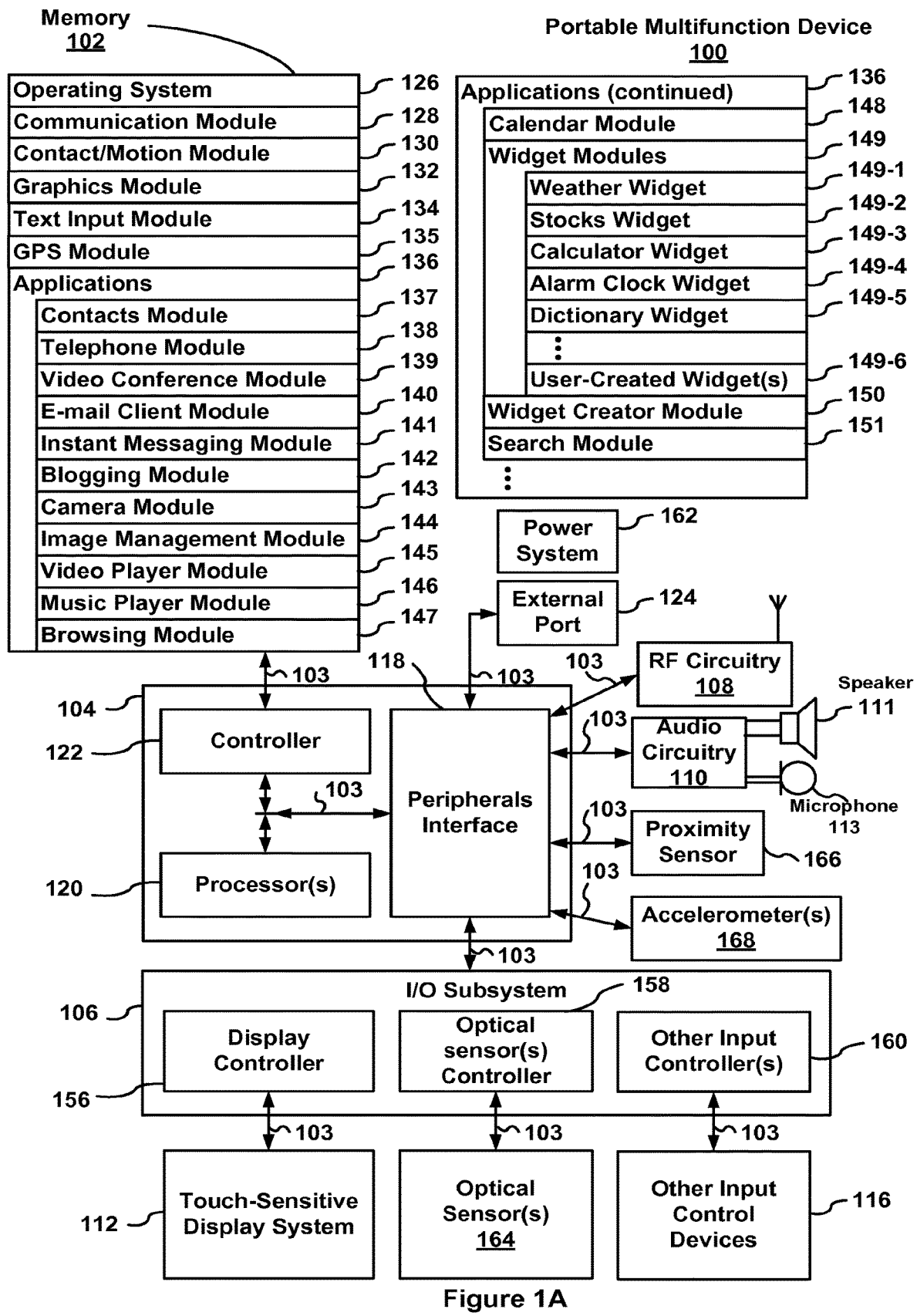
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments.

The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
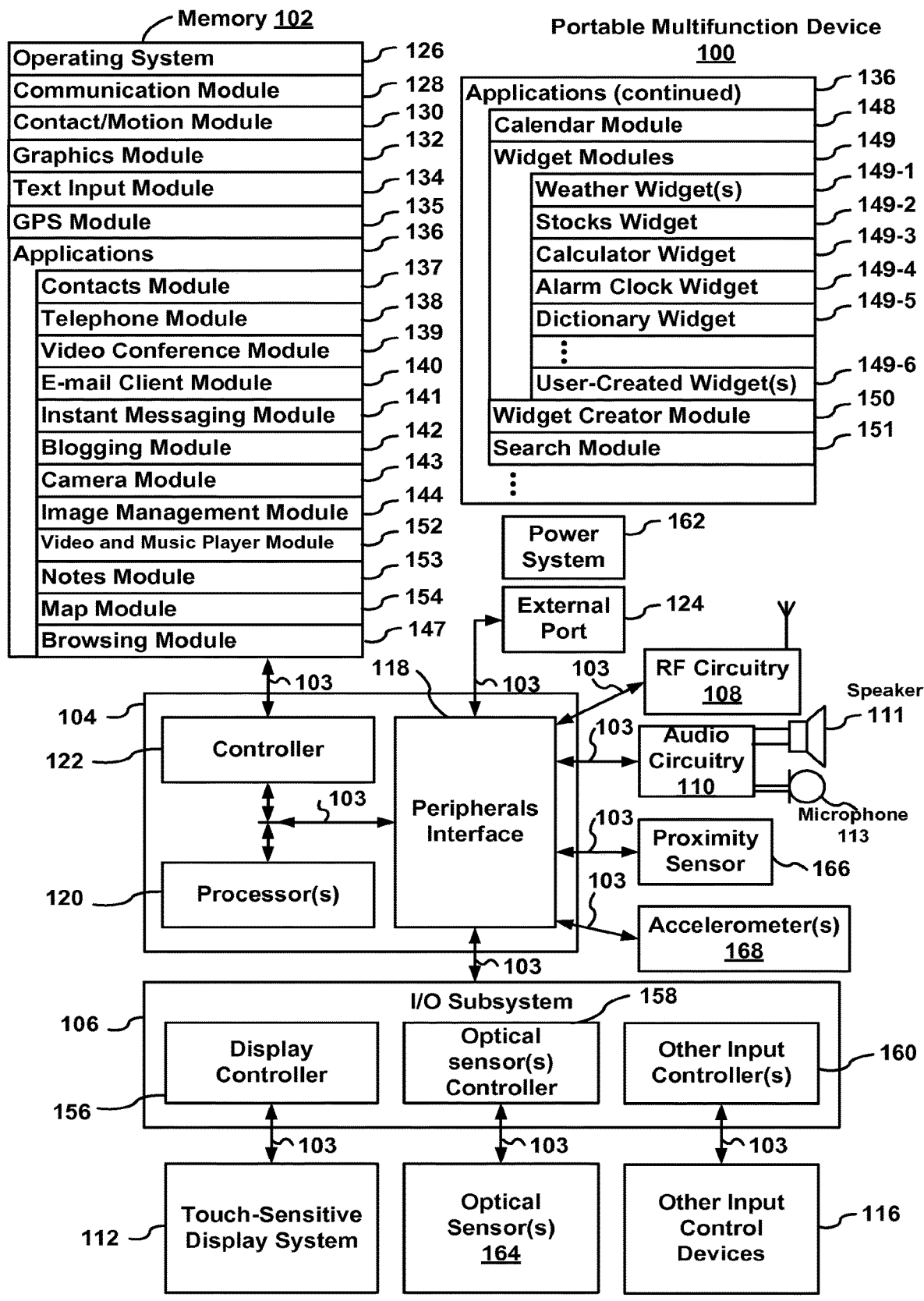

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381, 313, "Multipoint Touch Surface Controller," filed May 2, 2006; (2) U.S. patent application Ser. No. 10/840,862, "Multipoint Touchscreen," filed May 6, 2004; (3) U.S.

patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 11/620,702, "Using Ambient Light Sensor To Augment Proximity Sensor Output"; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of re incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/ motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as moving an email message to a folder). In this context, a respective animation that confirms an action by the user of the device typically takes a predefined, finite amount of time, such as an amount of time between 0.2 and 1.0 seconds, or between 0.5 and 2.0 seconds, depending on the context.

The text input module 134, which may be a component of graphics module 132, provides soft keyboards for entering text in various applications (e.g., contacts 137, e-mail 140, IM 141, blogging 142, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153; and/or map module 154.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS). Embodiments of user interfaces and associated processes using instant messaging module 141 are described further below.

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102. Embodiments of user interfaces and associated processes using camera module 143 are described further below.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124). Embodiments of user interfaces and associated processes using video player module 145 are described further below.

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.). Embodiments of user interfaces and associated processes using music player module 146 are described further below.

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.). Embodiments of user interfaces and associated processes using calendar module 148 are described further below.

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
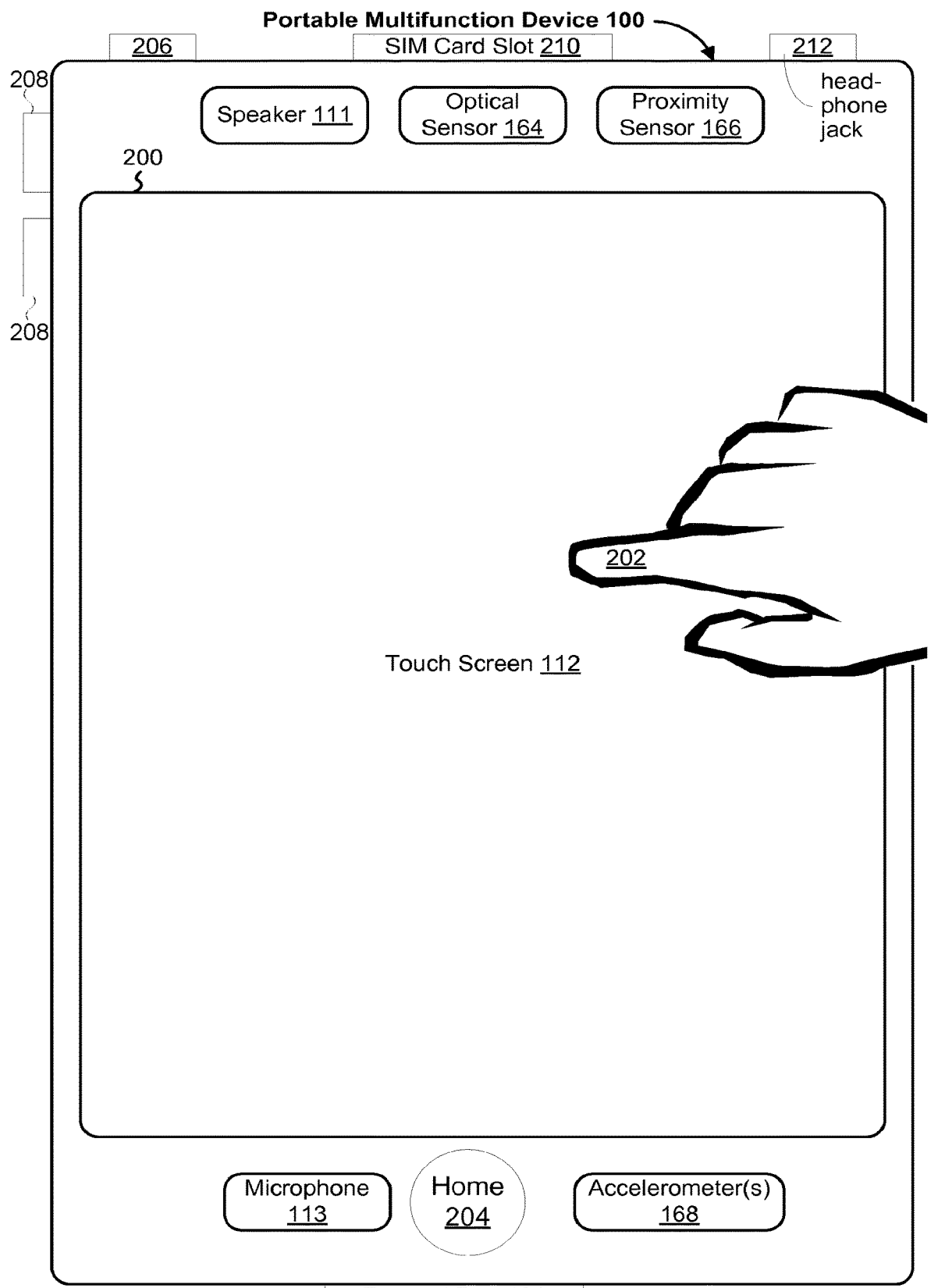
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
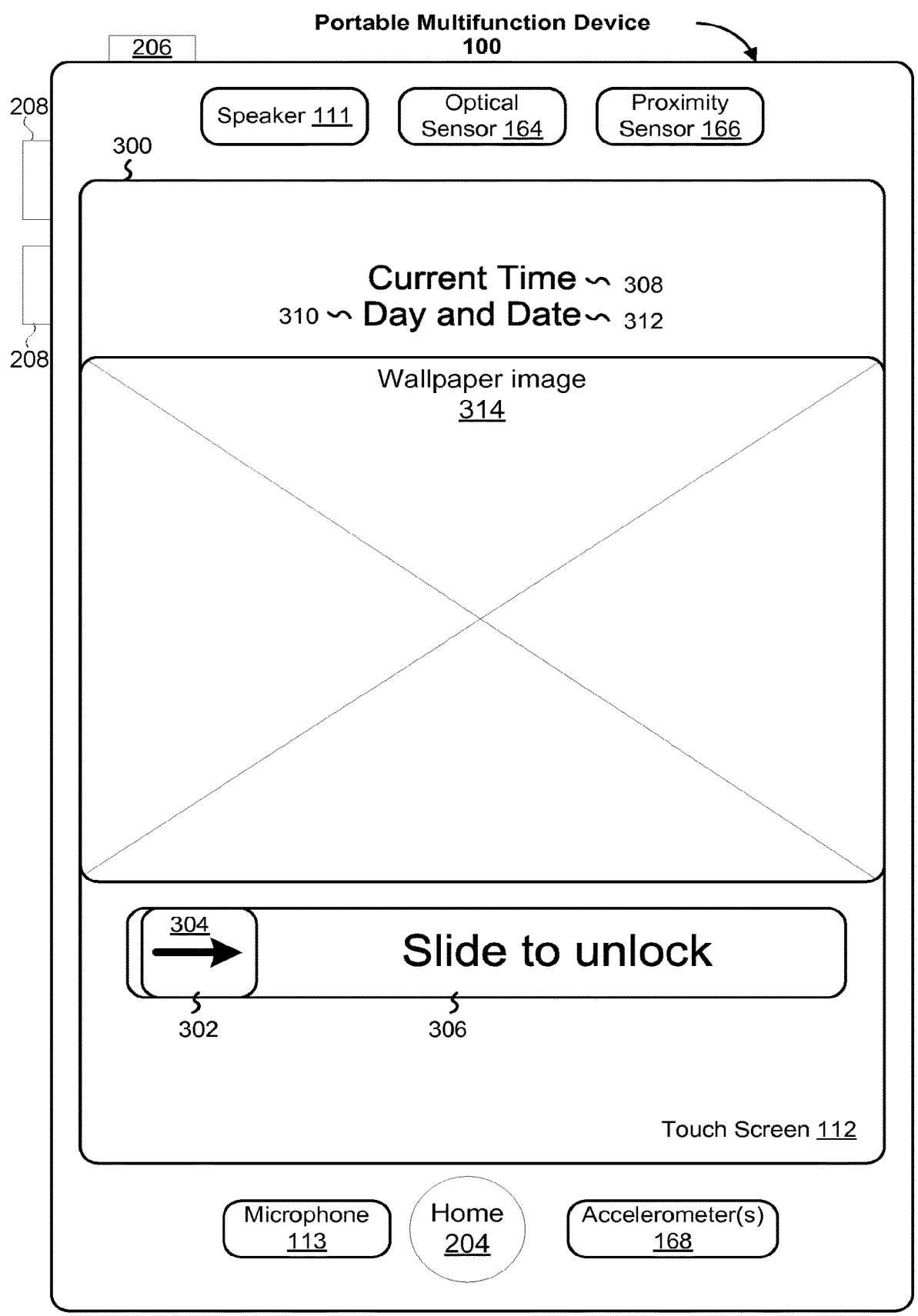
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4A:
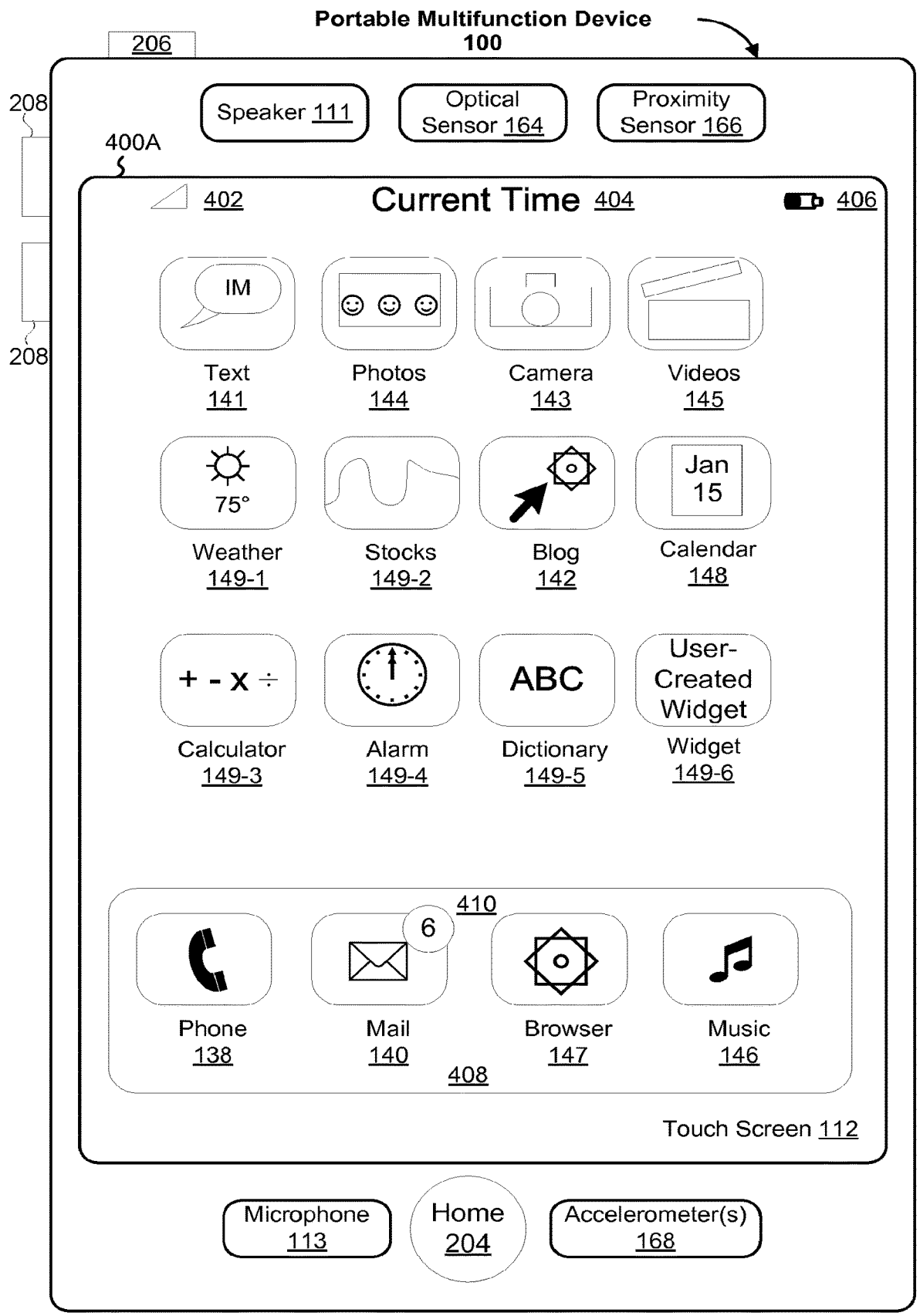
FIGS. 4A and 4B illustrate exemplary user interfaces for a menu of applications on a portable multifunction device in accordance with some embodiments.
Figure 4B:
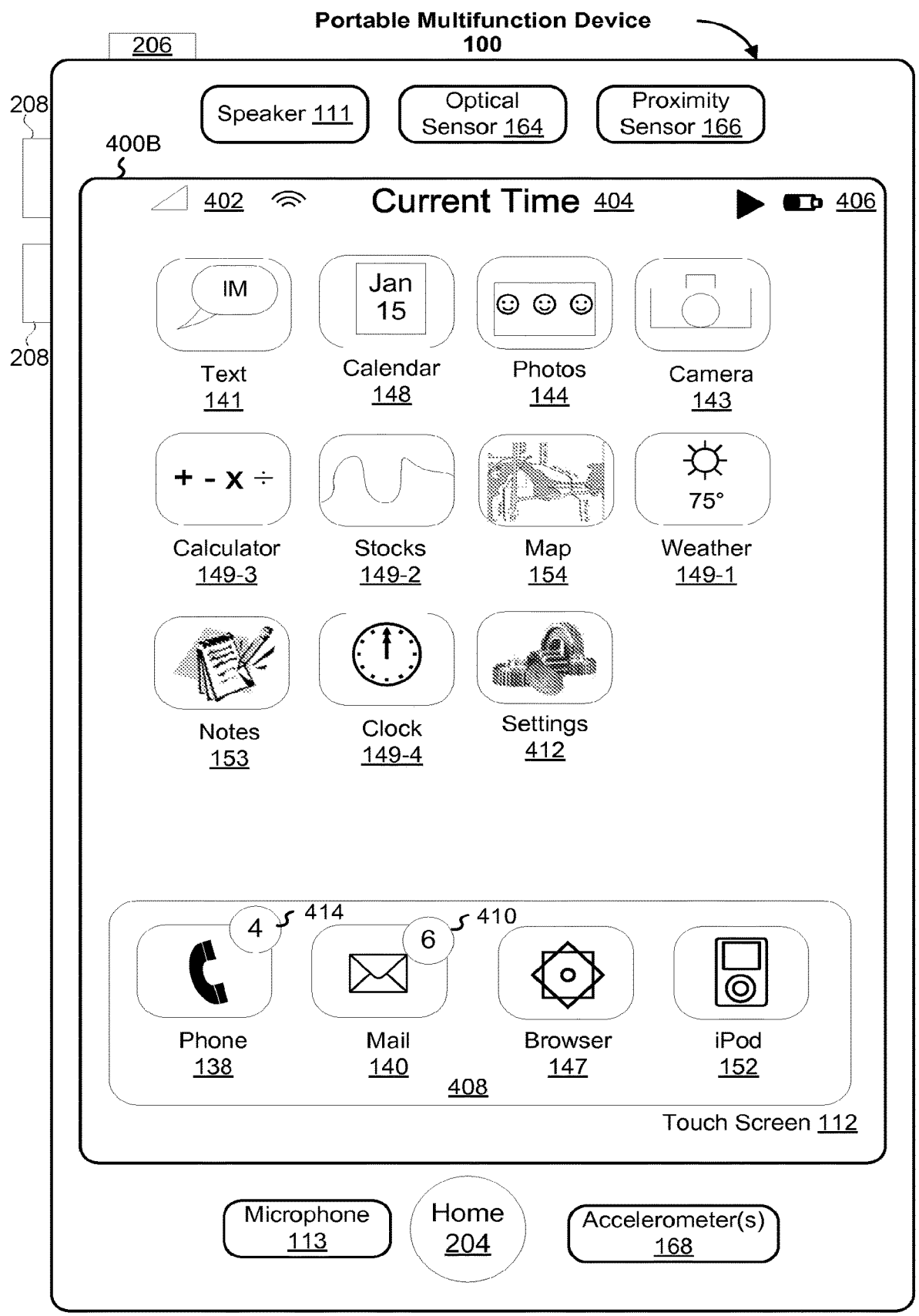

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;
Time 404;
Battery status indicator 406;
Tray 408 with icons for frequently used applications, such as one or more of the following:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as one or more of the following:
  IM 141;
  Image management 144;
  Camera 143;
  Video player 145;
  Weather 149-1;
  Stocks 149-2;
  Blog 142;
  Calendar 148;
  Calculator 149-3;

Alarm clock 149-4;

Dictionary 149-5; and

User-created widget 149-6.

In some embodiments, user interface 400B includes the following elements, or a subset or superset thereof:

402, 404, 406, 141, 148, 144, 143, 149-3, 149-2, 149-1, 149-4, 410, 414, 138, 140, and 147, as described above;

Map 154;

Notes 153;

Settings 412, which provides access to settings for the device 100 and its various applications 136, as described further below; and Video and music player module 152, also referred to as iPod (trademark of Apple Computer, Inc.) module 152.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Figure 5:
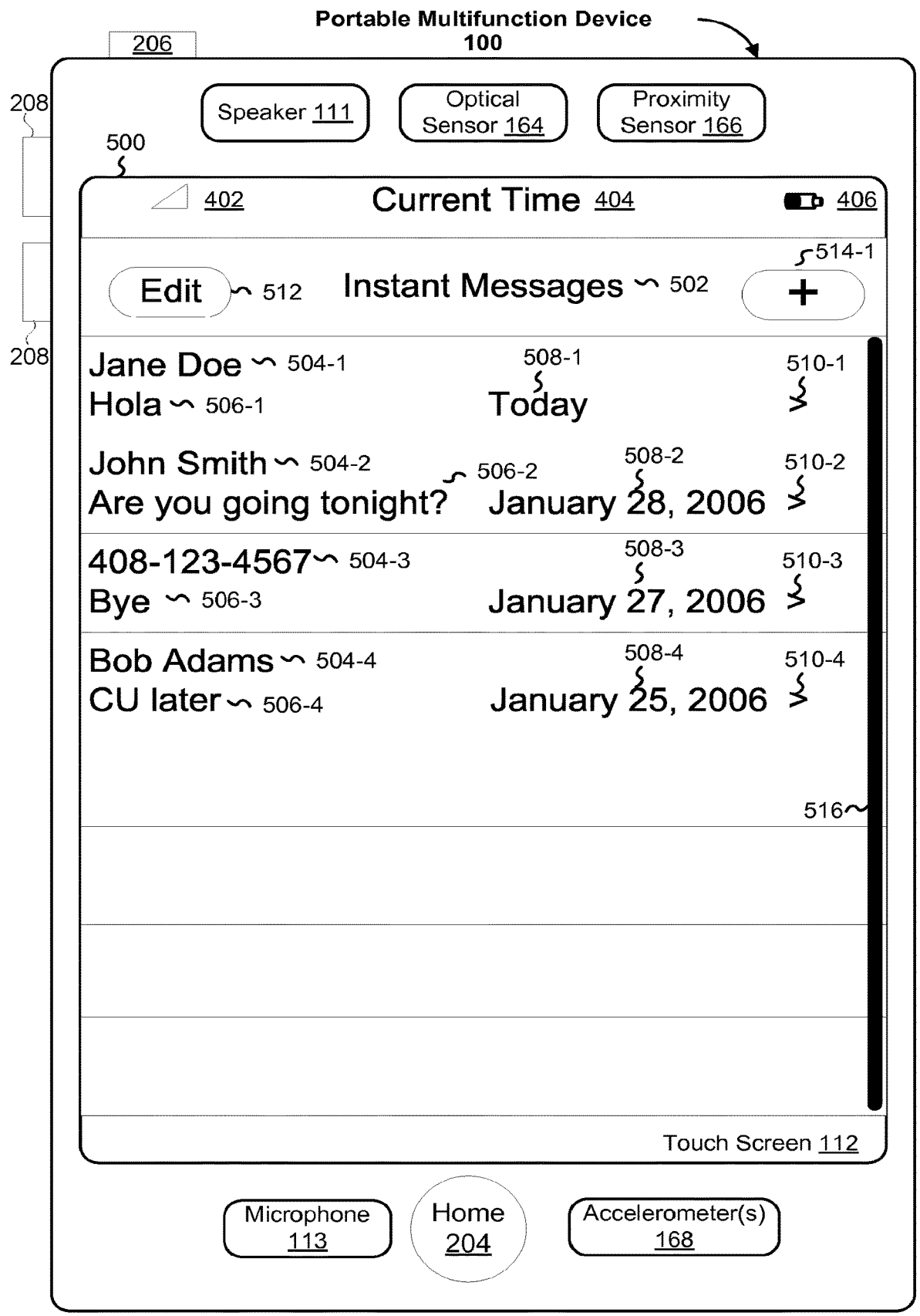
FIG. 5 illustrates an exemplary user interface for listing instant message conversations on a portable multifunction device in accordance with some embodiments.
Figure 6A:
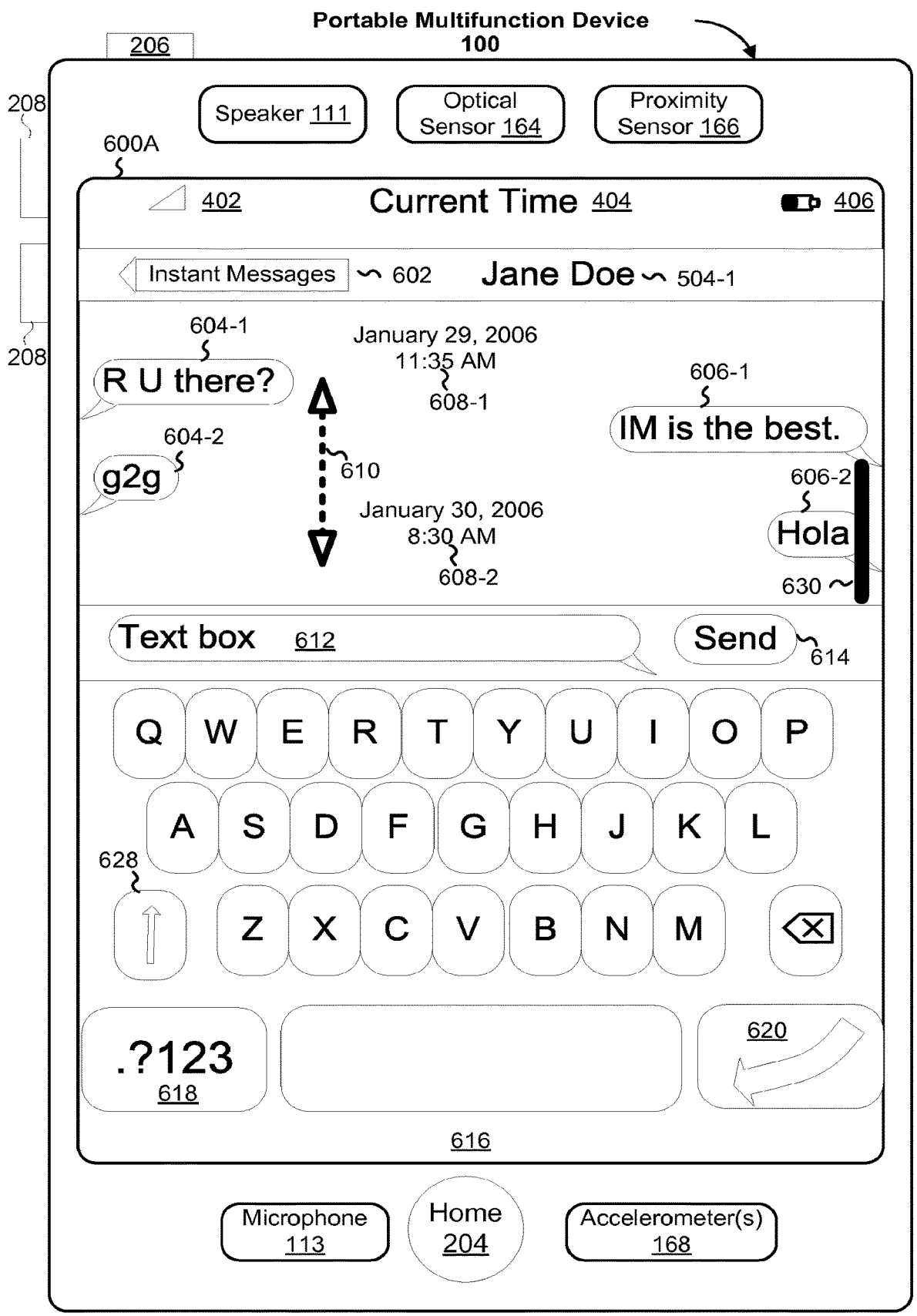
FIGS. 6A-6K illustrate an exemplary user interface for inputting text for an instant message in accordance with some embodiments.
Figure 6B:
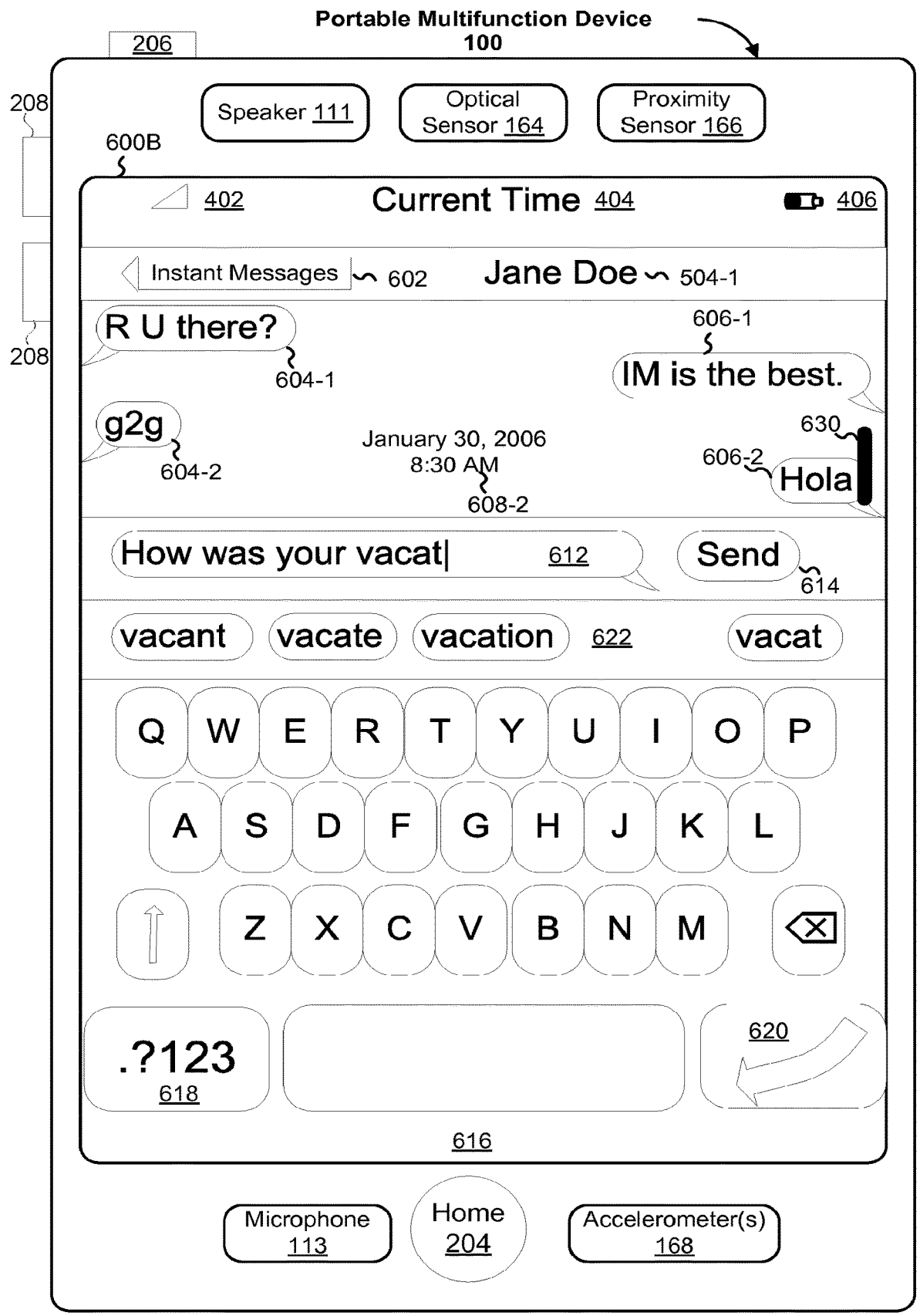

FIG. 5 illustrates an exemplary user interface for listing instant message conversations on a portable multifunction device in accordance with some embodiments. In some embodiments, user interface 500 includes the following elements, or a subset or superset thereof:

402, 404, and 406, as described above;

"Instant Messages" or other similar label 502:

Names 504 of the people a user is having instant message conversations with (e.g., Jane Doe 504-1) or the phone number if the person's name is not available (e.g., 408-123-4567 504-3);

Text 506 of the last message in the conversation;

Date 508 and/or time of the last message in the conversation;

Selection icon 510 that when activated (e.g., by a finger tap on the icon) initiates transition to a UI for the corresponding conversation (e.g., FIG. 6A for Jane Doe 504-1);

Edit icon 512 that when activated (e.g., by a finger tap on the icon) initiates transition to a UI for deleting conversations;

Create message icon 514 that when activated (e.g., by a finger tap on the icon) initiates transition to the users contact list (e.g., FIG. 7A); and Vertical bar 516 that helps a user understand what portion of the list of instant message conversations is being displayed.

In some embodiments, the name 504 used for an instant message conversation is determined by finding an entry in the user's contact list 137 that contains the phone number used for the instant message conversation. If no such entry is found, then just the phone number is displayed (e.g., 504-3). In some embodiments, if the other party sends messages from two or more different phone numbers, the messages may appear as a single conversation under a single name if all of the phone numbers used are found in the same entry (i.e., the entry for the other party) in the user's contact list 137.

Automatically grouping the instant messages into "conversations" (instant message exchanges with the same user or the same phone number) makes it easier for the user to carry on and keep track of instant message exchanges with multiple parties.

In some embodiments, vertical bar 516 is displayed temporarily after an object is detected on or near the touch screen display (e.g., a finger touch is detected anywhere on the list of instant message conversations). In some embodiments, the vertical bar 516 has a vertical position on top of the displayed portion of the list that corresponds to the vertical position in the list of the displayed portion of the list. In some embodiments, the vertical bar 516 has a vertical length that corresponds to the portion of the list being displayed. In some embodiments, if the entire list of IM conversations can be displayed simultaneously on the touch screen 112, the vertical bar 516 is not displayed. In some embodiments, if the entire list of IM conversations can be displayed simultaneously on the touch screen 112, the vertical bar 516 is displayed with a length that corresponds to the length of the list display area (e.g., as shown in FIG. 5).

FIGS. 6A-6K illustrate an exemplary user interface for inputting text for an instant message in accordance with some embodiments.

Figure 6C:
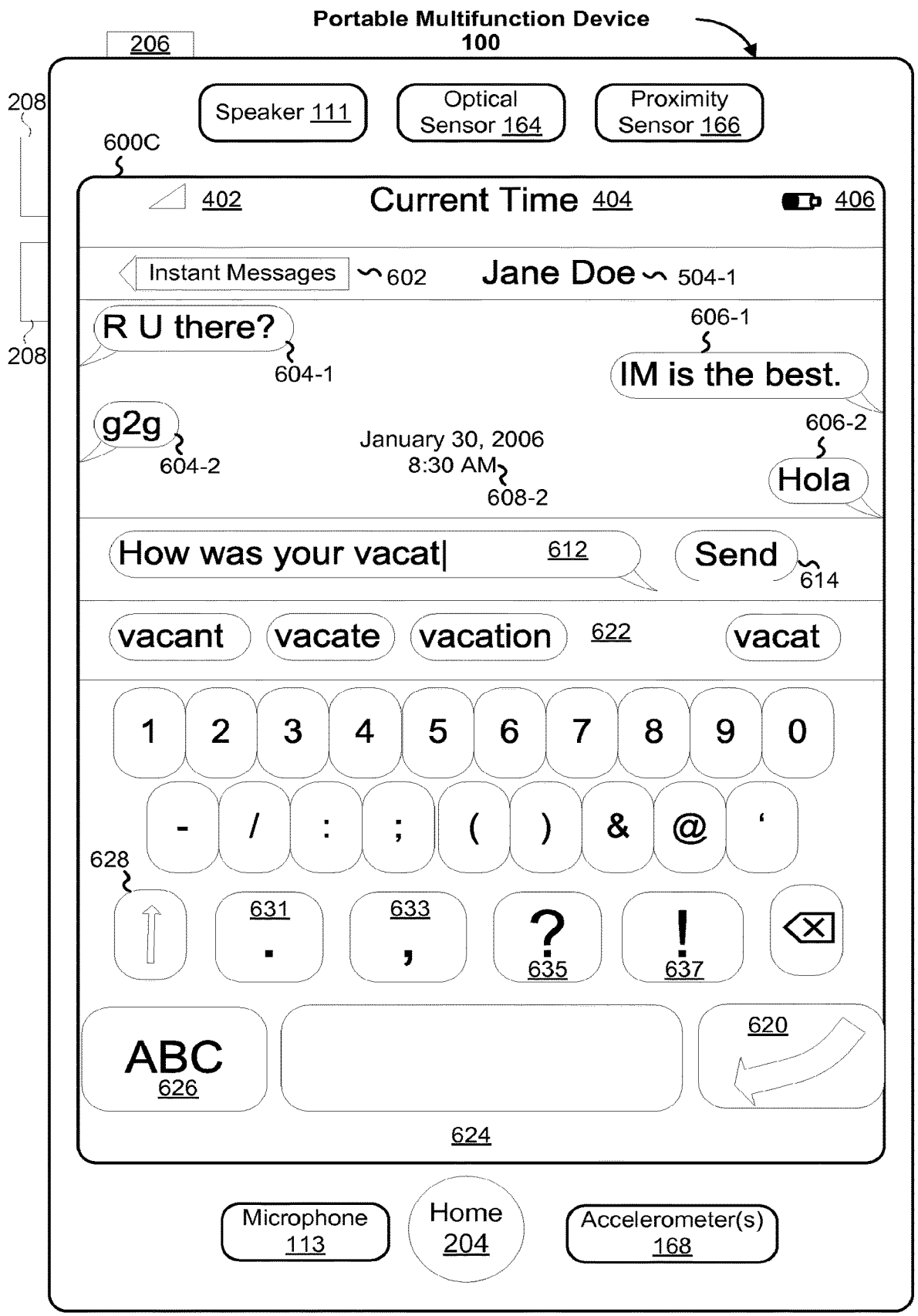
Figure 6D:
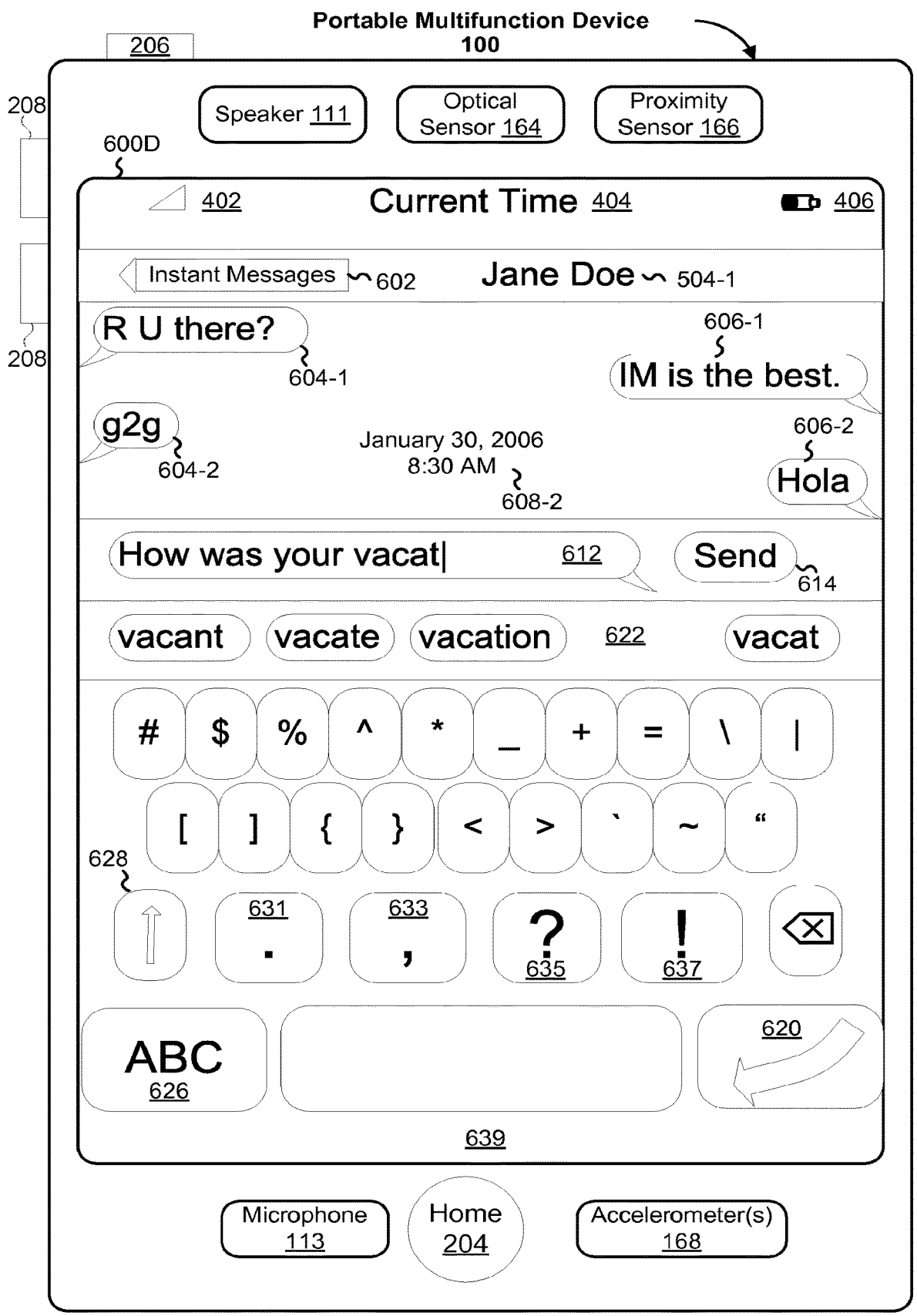

In some embodiments, user interface 600A includes the following elements, or a subset or superset thereof:

402, 404, and 406, as described above;

Name 504 corresponding to the phone number used in the instant message conversation (or the phone number itself if the name is not available);

Instant messages icon 602 that when activated (e.g., by a finger tap on the icon) initiates transition to a UI listing instant message conversations (e.g., UI 500);

Instant messages 604 from the other party, typically listed in order along one side of UI 600A;

Instant messages 606 to the other party, typically listed in order along the opposite side of UI 600A to show the back and forth interplay of messages in the conversation;

Timestamps 608 for at least some of the instant messages;

Text entry box 612;

Send icon 614 that when activated (e.g., by a finger tap on the icon) initiates sending of the message in text box 612 to the other party (e.g., Jane Doe 504-1);

Letter keyboard 616 for entering text in box 612;

Alternate keyboard selector icon 618 that when activated (e.g., by a finger tap on the icon) initiates the display of a different keyboard (e.g., 624, FIG. 6C);

Send icon 620 that when activated (e.g., by a finger tap on the icon) initiates sending of the message in text box 612 to the other party (e.g., Jane Doe 504-1);

Shift key 628 that when activated (e.g., by a finger tap on the icon) capitalizes the next letter chosen on letter keyboard 616; and Vertical bar 630 that helps a user understand what portion of the list of instant messages in an IM conversation is being displayed.

In some embodiments, a user can scroll through the message conversation (comprised of messages 604 and 606) by applying a vertical swipe gesture 610 to the area displaying the conversation. In some embodiments, a vertically downward gesture scrolls the conversation downward, thereby showing older messages in the conversation. In some embodiments, a vertically upward gesture scrolls the conversation upward, thereby showing newer, more recent messages in the conversation. In some embodiments, as noted above, the last message in the conversation (e.g., 606-2) is displayed in the list of instant messages 500 (e.g., 506-1).

In some embodiments, keys in keyboards 616 (FIGS. 6A, 6B, 6E-6K), 624 (FIG. 6C), and/or 639 (FIG. 6D) briefly change shade and/or color when touched/activated by a user to help the user learn to activate the desired keys.

In some embodiments, vertical bar 630 is displayed temporarily after an object is detected on or near the touch screen display (e.g., a finger touch is detected anywhere on the list of instant messages). In some embodiments, the vertical bar 630 has a vertical position on top of the displayed portion of the list that corresponds to the vertical position in the list of the displayed portion of the list. In some embodiments, the vertical bar 630 has a vertical length that corresponds to the portion of the list being displayed. For example, in FIG. 6A, the vertical position of the vertical bar 630 indicates that the bottom of the list of messages is being displayed (which correspond to the most recent messages) and the vertical length of the vertical bar 630 indicates that roughly half of the messages in the conversation are being displayed.

In some embodiments, user interface 600B includes the following elements, or a subset or superset thereof:
402, 404, 406, 504, 602, 604, 606, 608, 612, 614, 616, 618, 620, and 630 as described above; and
word suggestion area 622 that provides a list of possible words to complete the word fragment being typed by the user in box 612.

In some embodiments, the word suggestion area does not appear in UI 600B until after a predefined time delay (e.g., 2-3 seconds) in text being entered by the user. In some embodiments, the word suggestion area is not used or can be turned off by the user.

In some embodiments, user interface 600C includes the following elements, or a subset or superset thereof:
402, 404, 406, 602, 604, 606, 608, 612, 614, 620, and 622 as described above;
Alternate keyboard 624, which may be made up primarily of digits and punctuation, with frequently used punctuation keys (e.g., period key 631, comma key 633, question mark key 635, and exclamation point key 637) made larger than the other keys;
Letter keyboard selector icon 626 that when activated (e.g., by a finger tap on the icon) initiates the display of a letter keyboard (e.g., 616, FIG. 6A); and Shift key 628 that when activated (e.g., by a finger tap on the icon) initiates display of yet another keyboard (e.g., 639, FIG. 6D).

In some embodiments, keeping the period key 631 near keyboard selector icon 626 reduces the distance that a user's finger needs to travel to enter the oft-used period.

In some embodiments, user interface 600D includes the following elements, or a subset or superset thereof:
402, 404, 406, 504, 602, 604, 606, 608, 612, 614, 620, 622, 626, 628 as described above; and
Another alternate keyboard 639, which may be made up primarily of symbols and punctuation, with frequently used punctuation keys (e.g., period key 631, comma key 633, question mark key 635, and exclamation point key 637) made larger than the other keys.

In some embodiments, user interface 600E includes the following elements, or a subset or superset thereof:
402, 404, 406, 504, 602, 604, 606, 608, 612, 614, 616, 618, and 620, as described above; and
New instant message 606-3 sent to the other party.

Figure 6E:
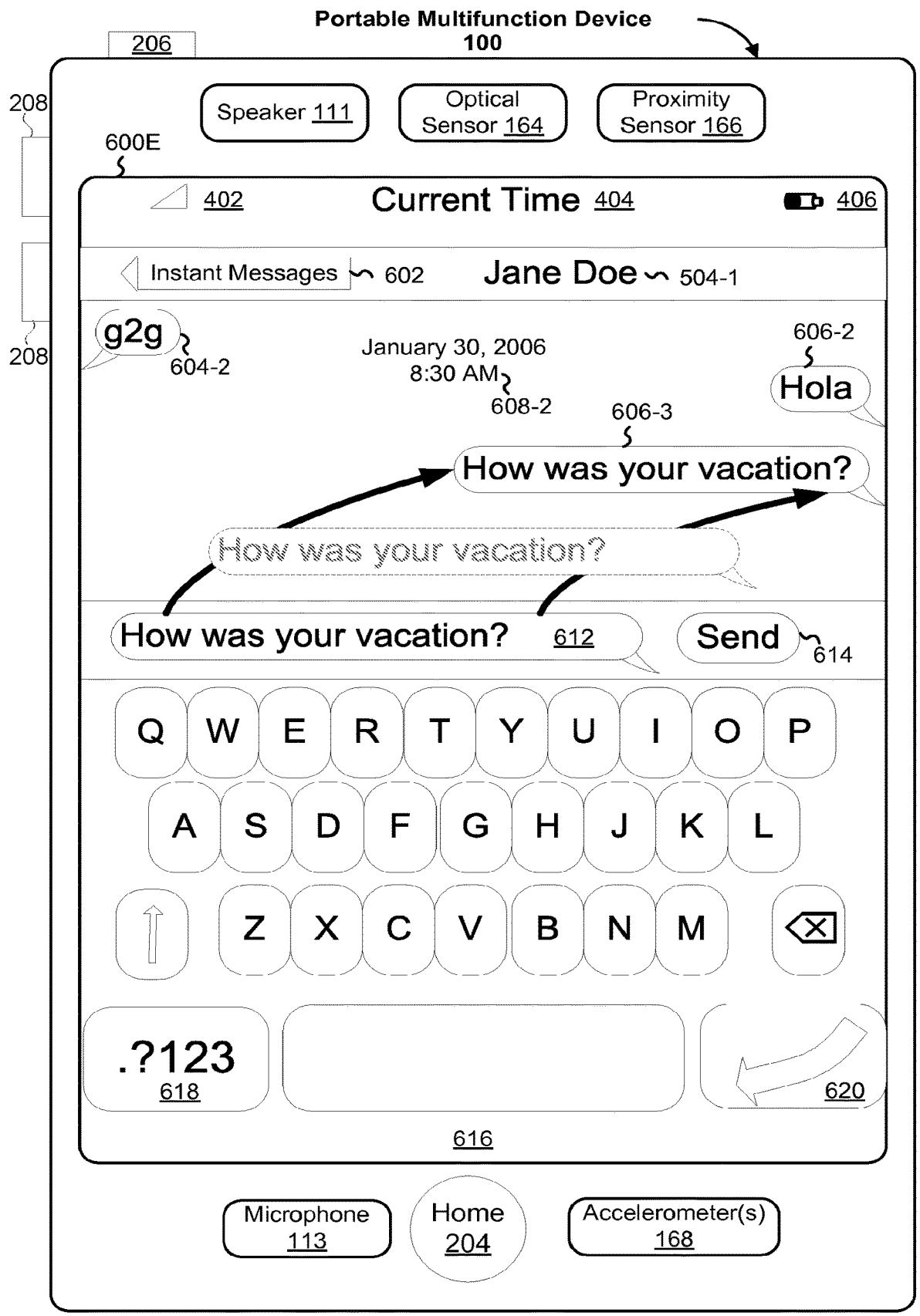
Figure 6F:
Figure 6G:
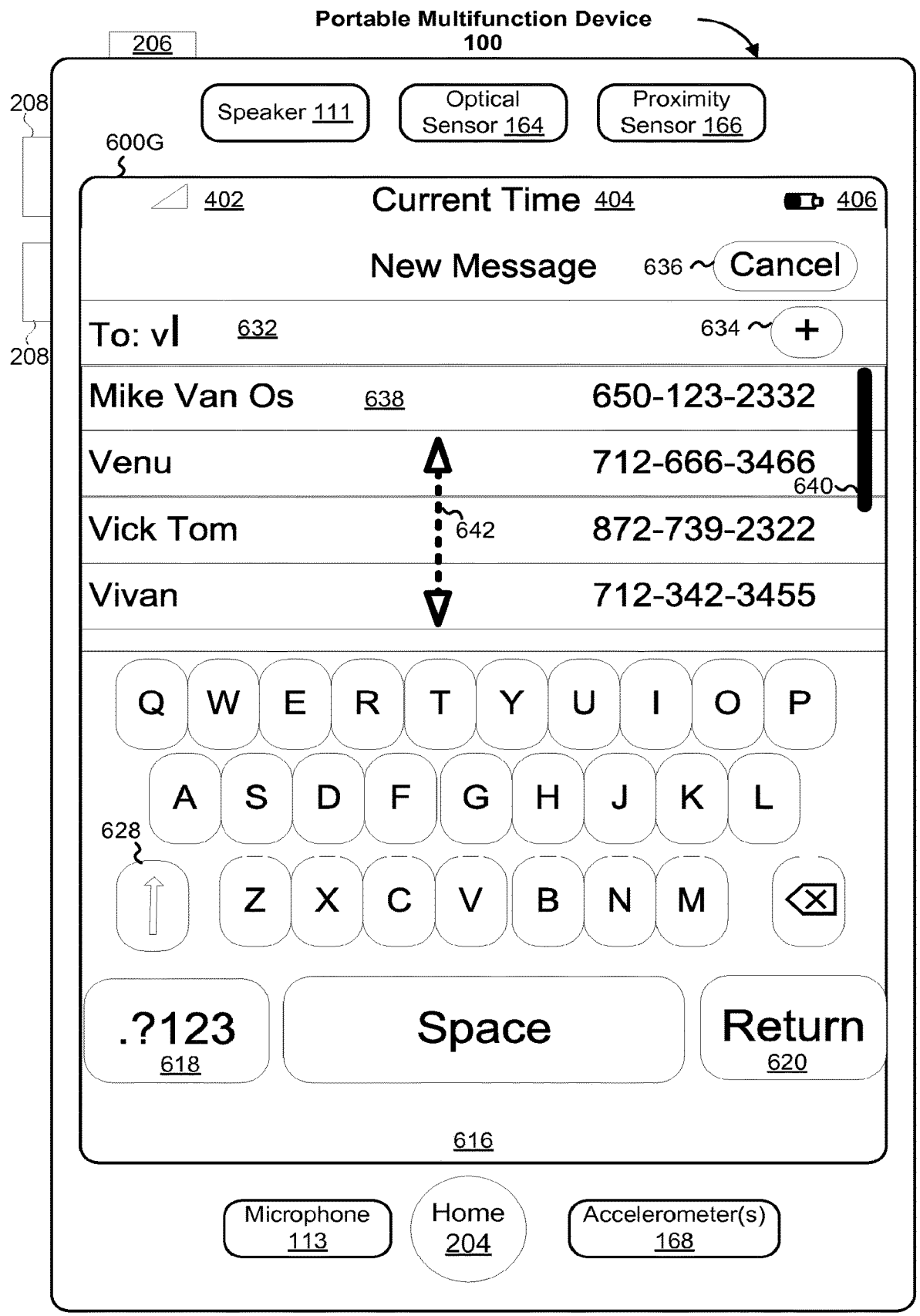
Figure 6H:
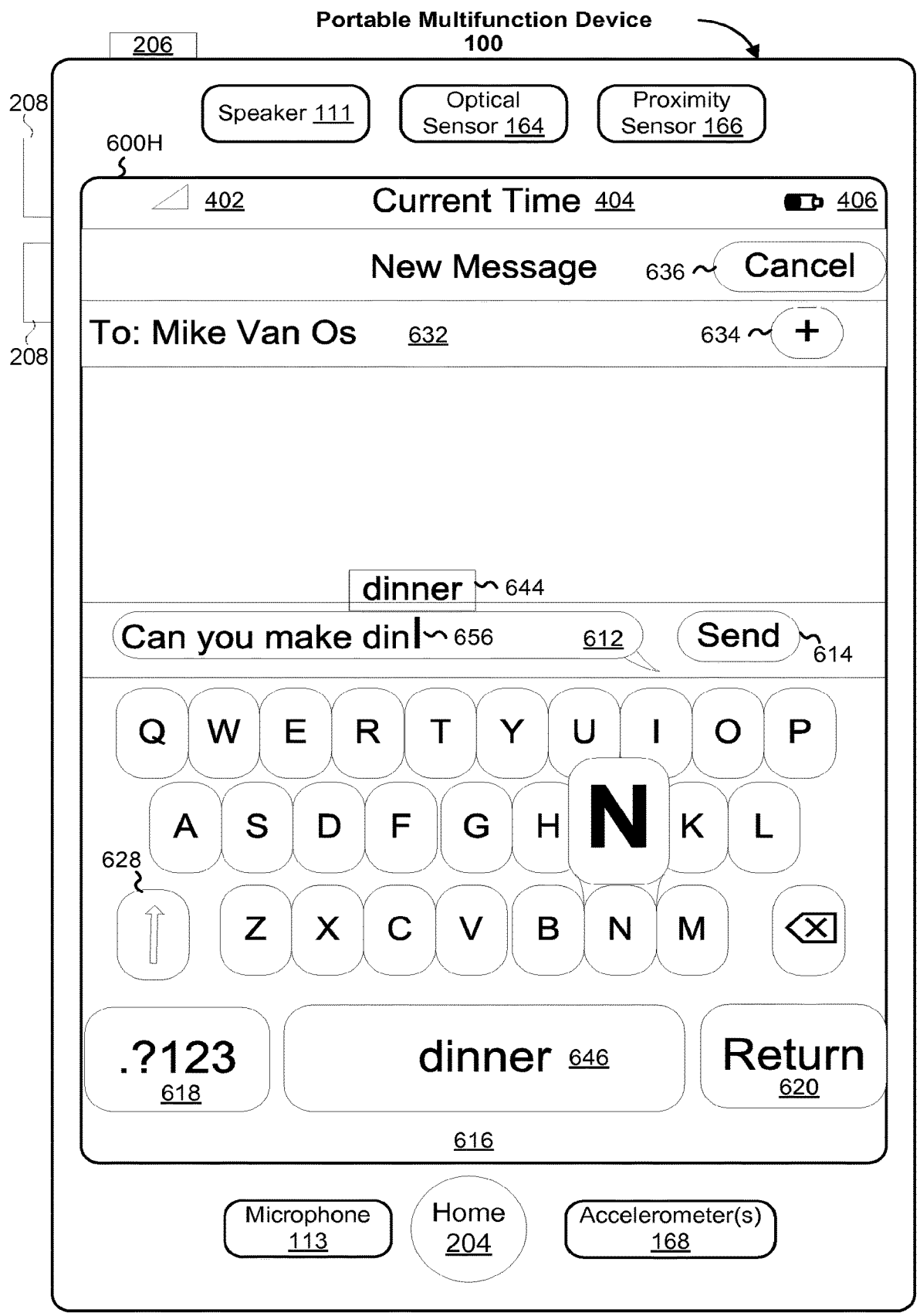

In some embodiments, when the user activates a send key (e.g., either 614 or 620), the text in text box 612 "pops" or otherwise comes out of the box and becomes part of the string of user messages 606 to the other party. The black arrows in FIG. 6E illustrate an animated formation of a quote bubble 606-3. In some embodiments, the size of the quote bubble scales with the size of the message. In some embodiments, a sound is also made when the message is sent, such as a droplet sound, to notify the user.

In some embodiments, user interface 600F includes the following elements, or a subset or superset thereof:
402, 404, 406, 612, 614, 616, 618, 620, and 628, as described above;
Recipient input field 632 that when activated (e.g., by a finger tap on the field) receives and displays the phone number of the recipient of the instant message (or the recipient's name if the recipient is already in the user's contact list);
Add recipient icon 634 that when activated (e.g., by a finger tap on the icon) initiates the display of a scrollable list of contacts (e.g., 638, FIG. 6G); and
Cancel icon 636 that when activated (e.g., by a finger tap on the icon) cancels the new instant message.

In some embodiments, user interface 600G includes the following elements, or a subset or superset thereof:
402, 404, 406, 612, 614, 616, 618, 620, 628, 632, 634, and 636, as described above;
Scrollable list 638 of contacts that match the input in recipient input field 632; and
Vertical bar 640 that helps a user understand how many items in the contact list that match the input in recipient input field 632 are being displayed.

In some embodiments, list 638 contains contacts that match the input in recipient input field 632. For example, if the letter "v" is input, then contacts with either a first name or last name beginning with "v" are shown. If the letters "va" are input in field 632, then the list of contacts is narrowed to contacts with either a first name or last name beginning with "va", and so on until one of the displayed contacts is selected (e.g., by a tap on a contact in the list 638).

In some embodiments, a user can scroll through the list 638 by applying a vertical swipe gesture 642 to the area displaying the list 638. In some embodiments, a vertically downward gesture scrolls the list downward and a vertically upward gesture scrolls the list upward.

In some embodiments, vertical bar 640 is displayed temporarily after an object is detected on or near the touch screen display (e.g., a finger touch is detected anywhere on the list 638). In some embodiments, the vertical bar 640 has a vertical position on top of the displayed portion of the list that corresponds to the vertical position in the list of the displayed portion of the list. In some embodiments, the vertical bar 640 has a vertical length that corresponds to the portion of the list being displayed.

In some embodiments, user interfaces 600H and 600I include the following elements, or a subset or superset thereof:
- 402, 404, 406, 612, 614, 616, 618, 620, 628, 632, 634, and 636, as described above;
- Suggested word 644 adjacent to the word being input;
- Suggested word 646 in the space bar in keyboard 616; and/or
- Insertion marker 656 (e.g., a cursor, insertion bar, insertion point, or pointer).

In some embodiments, activating suggested word 644 (e.g., by a finger tap on the suggested word) replaces the word being typed with the suggested word 644. In some embodiments, activating suggested word 646 (e.g., by a finger tap on the space bar) replaces the word being typed with the suggested word 646. In some embodiments, a user can set whether suggested words 644 and/or 646 are shown (e.g., by setting a user preference).

In some embodiments, a letter is enlarged briefly after it is selected (e.g., "N" is enlarged briefly after typing "din" in FIG. 6H) to provide feedback to the user.

In some embodiments, user interfaces 600J and 600K include the following elements, or a subset or superset thereof:
- 402, 404, 406, 612, 614, 616, 618, 620, 628, 632, 634, 636, and 656 as described above; and
- Expanded portion 650 of graphics that helps a user adjust the position of an expanded insertion marker 657 (sometimes called an "insertion point magnifier"); and
- Expanded insertion marker 657.

In some embodiments, a finger contact 648-1 on or near the insertion marker 656 initiates display of insertion point magnifier 650 and expanded insertion marker 657-1. In some embodiments, as the finger contact is moved on the touch screen (e.g., to position 648-2), there is corresponding motion of the expanded insertion marker (e.g., to 657-2) and the insertion point magnifier 650. Thus, the insertion point magnifier 650 provides an efficient way to position a cursor or other insertion marker using finger input on the touch screen. In some embodiments, the magnifier 650 remains visible and can be repositioned as long as continuous contact is maintained with the touch screen (e.g., from 648-1 to 648-2 to even 648-3).

Figure 6I:

In some embodiments, a portable electronic device displays graphics and an insertion marker (e.g., marker 656, FIG. 6I) at a first location in the graphics on a touch screen display (e.g., FIG. 6I). In some embodiments, the insertion marker 656 is a cursor, insertion bar, insertion point, or pointer. In some embodiments, the graphics comprise text (e.g., text in box 612, FIG. 6I).

A finger contact is detected with the touch screen display (e.g., contact 648-1, FIG. 6I). In some embodiments, the location of the finger contact is proximate to the location of the insertion marker. In some embodiments, the location of the finger contact is anywhere within a text entry area (e.g., box 612, FIG. 6I).

In response to the detected finger contact, the insertion marker is expanded from a first size (e.g., marker 656, FIG. 6I) to a second size (e.g., marker 657-1, FIG. 6J) on the touch screen display, and a portion (e.g., portion 650-1, FIG. 6J) of the graphics on the touch screen display is expanded from an original size to an expanded size.

In some embodiments, the portion of the graphics that is expanded includes the insertion marker and adjacent graphics. In some embodiments, after the insertion point and the portion of the graphics are expanded, graphics are displayed that include the insertion marker and adjacent graphics at the original size and at the expanded size.

Figure 6J:
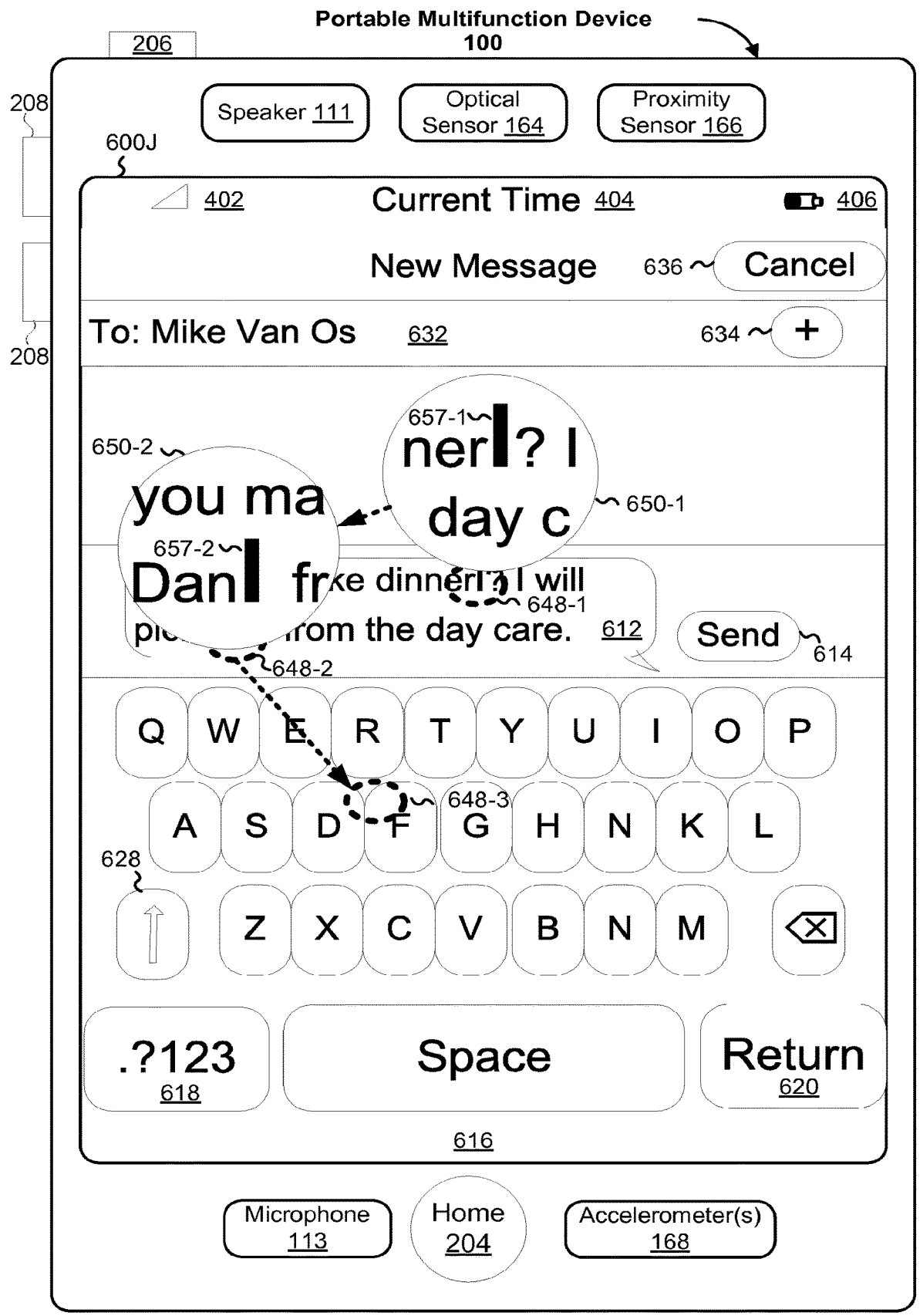

Movement of the finger contact is detected on the touch screen display (e.g., from 648-1 to 648-2, FIG. 6J).

The expanded insertion marker is moved in accordance with the detected movement of the finger contact from the first location (e.g., 657-1, FIG. 6J) to a second location in the graphics (e.g., 657-2, FIG. 6J).

In some embodiments, the portion of the graphics that is expanded changes as the insertion marker moves from the first location to the second location (e.g., from 650-1 to 650-2, FIG. 6J). In some embodiments, the portion of the graphics that is expanded is displayed in a predefined shape. In some embodiments the portion (e.g., 650, FIG. 6J) of the graphics that is expanded is displayed in a circle. In some embodiments, the expanded insertion marker 657 is within the circle.

In some embodiments, the detected movement of the finger contact has a horizontal component on the touch screen display and a vertical component on the touch screen display. In some embodiments, moving the expanded insertion marker 657 in accordance with the detected movement of the finger contact includes moving the expanded insertion marker and the expanded portion of the graphics in accordance with the horizontal component of motion of the finger contact if the finger contact moves outside a text entry area without breaking contact. For example, in FIG. 6I, if the finger contact moves from 648-2 (inside the text entry area 612) to 648-3 (in the keyboard area), the expanded insertion point 657 and the expanded portion 650 of the graphics may move horizontally along the lower portion of the text entry area in accordance with the horizontal component of the movement from 648-2 to 648-3 (not shown).

In some embodiments, moving the expanded insertion marker in accordance with the detected movement of the finger contact includes moving the expanded insertion marker in a first area of the touch screen that includes characters entered using a soft keyboard (e.g., text box 612, FIG. 6J), wherein the soft keyboard is located in a second area of the touch screen that is separate from the first area (e.g., keyboard 616, FIG. 6J).

Figure 6K:
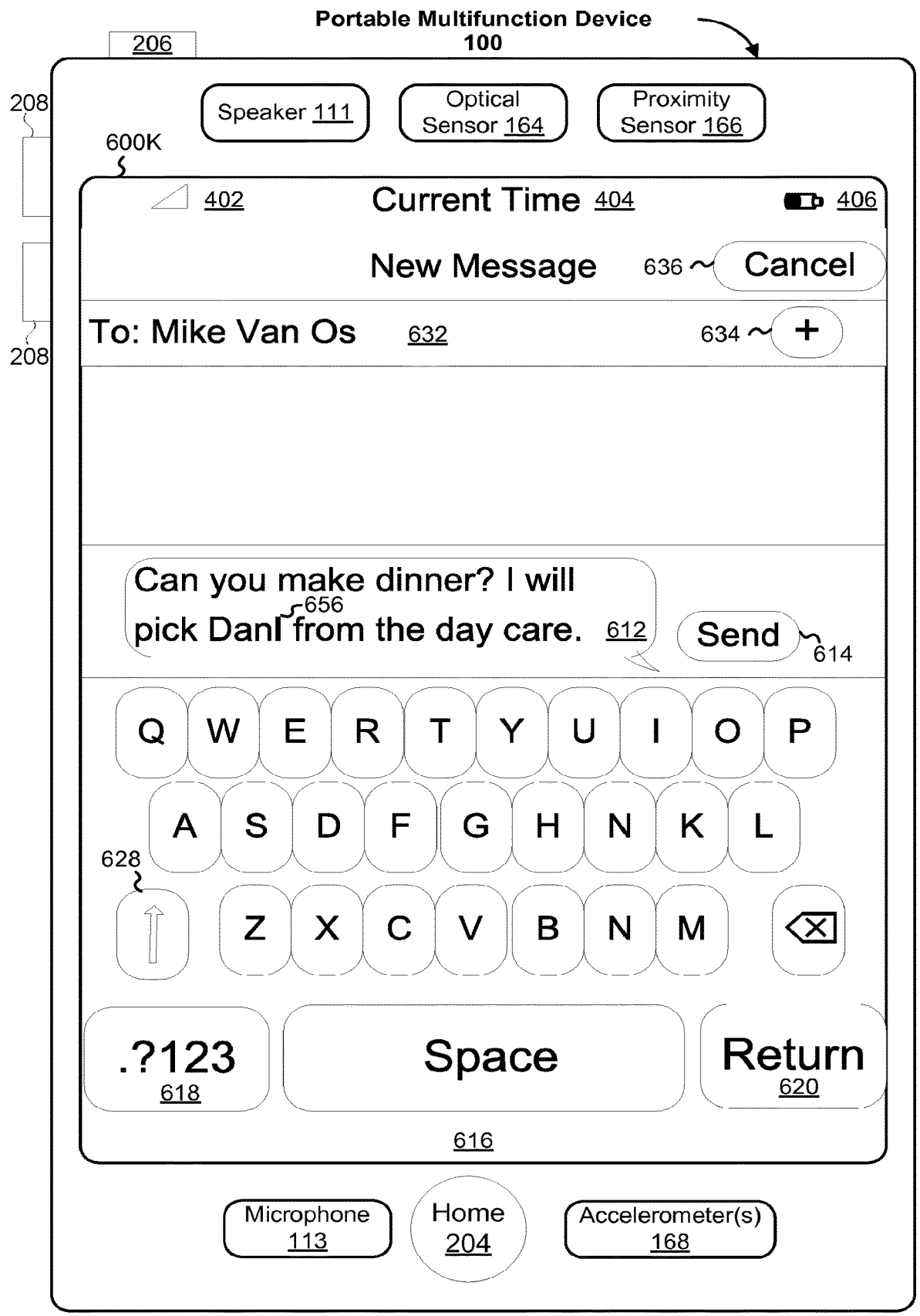

In some embodiments, the expanded insertion marker is contracted from the second size to the first size if finger contact with the touch screen display is broken (e.g., insertion marker 656, FIG. 6K). In some embodiments, the contracting includes an animation of the expanded insertion marker 657 shrinking into the insertion marker 656 at the second location.

In some embodiments, the expanded portion 650 of the graphics is contracted if finger contact with the touch screen display is no longer detected for a predetermined time.

A graphical user interface on a portable electronic device with a touch screen display comprises an insertion marker and graphics. In response to detecting a finger contact 648 with the touch screen display, the insertion marker is expanded from a first size 656 to a second size 657, and a portion 650 of the graphics is expanded. In response to detecting movement of the finger contact on the touch screen display, the expanded insertion marker is moved in accordance with the detected movement of the finger contact from a first location 657-1 in the graphics to a second location 657-2 in the graphics.

Additional description of insertion marker positioning can be found in U.S. patent application Ser. No. 11/553,436, "Method, System, And Graphical User Interface For Positioning An Insertion Marker In A Touch Screen Display," filed Oct. 26, 2006, the content of which is hereby incorporated by reference in its entirety.

Additional description of instant messaging on portable electronic devices can be found in U.S. Patent Application No. 60/883,819, "Portable Electronic Device For Instant Messaging," filed Jan. 7, 2007, the content of which is hereby incorporated by reference in its entirety.

Figure 7A:
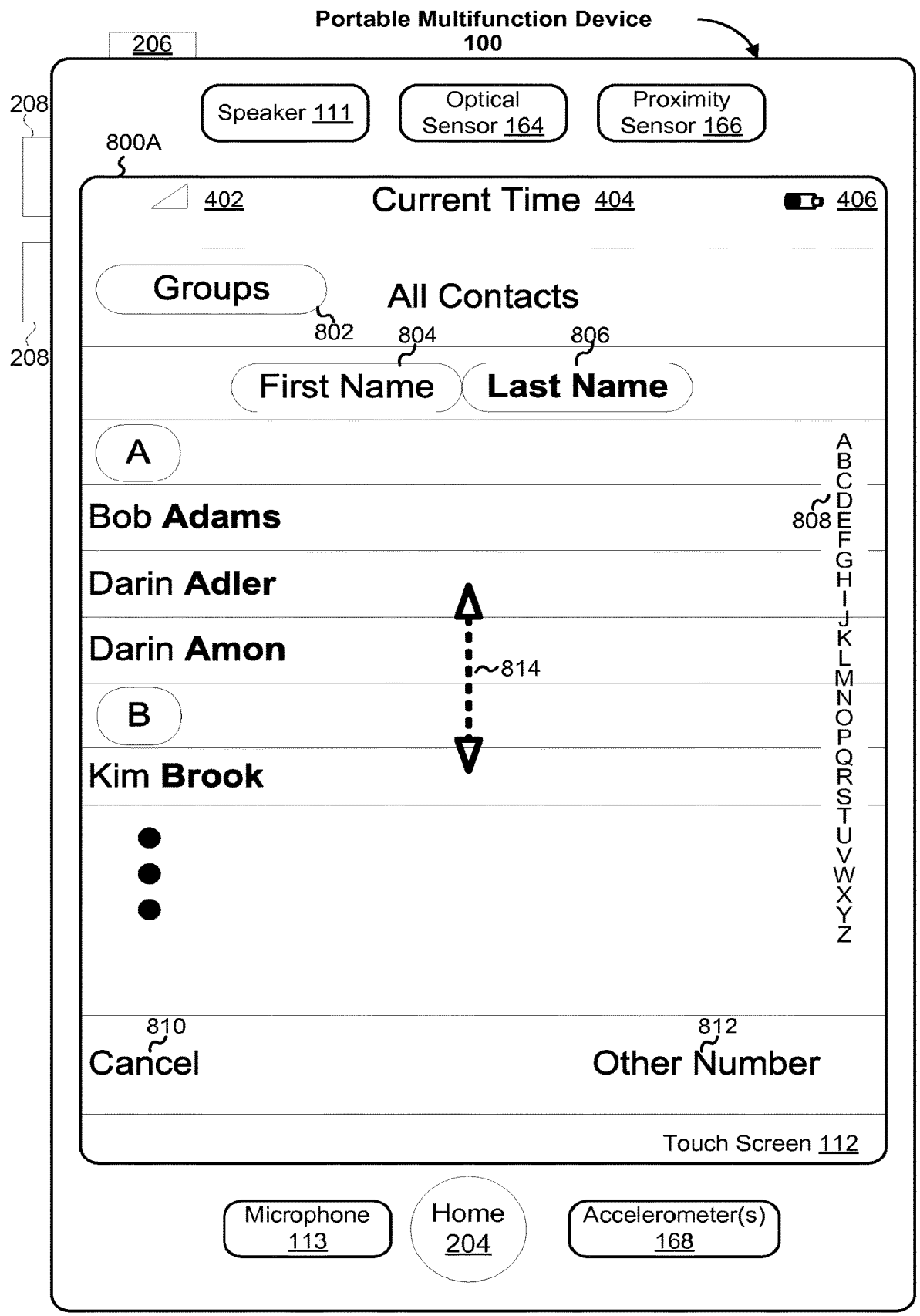
FIGS. 7A and 7B illustrate an exemplary user interface for a contact list in accordance with some embodiments.
Figure 7B:
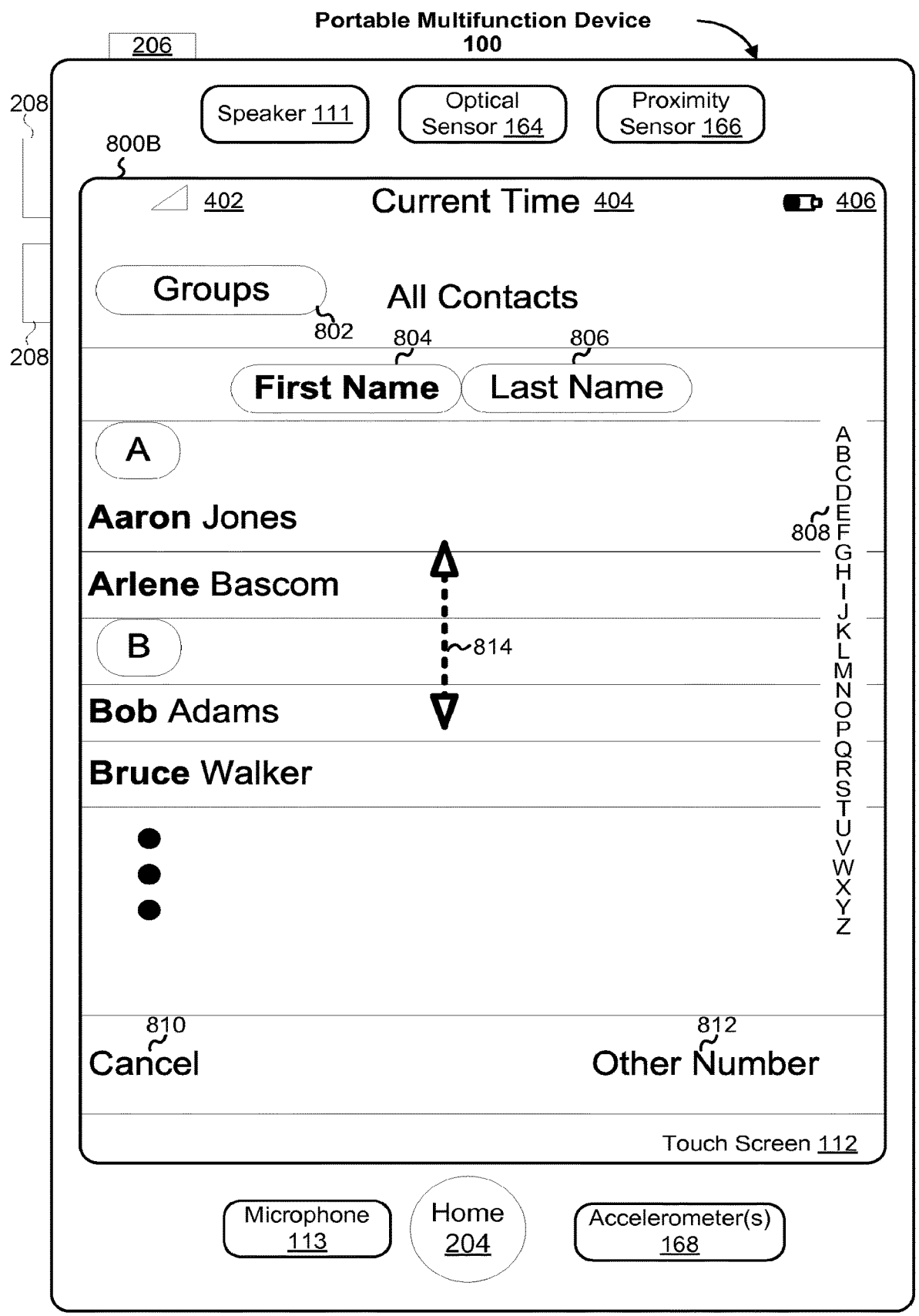

FIGS. 7A and 7B illustrate an exemplary user interface for a contact list in accordance with some embodiments.

In some embodiments, user interfaces 800A and 800B (FIGS. 7A and 7B) include the following elements, or a subset or superset thereof:
- 402, 404, 406, as described above;
- Groups icon 802 that when activated (e.g., by a finger tap on the icon) initiates display of groups of contacts;
- First name icon 804 that when activated (e.g., by a finger tap on the icon) initiates an alphabetical display of the user's contacts by their first names (FIG. 7B);
- Last name icon 806 that when activated (e.g., by a finger tap on the icon) initiates an alphabetical display of the user's contacts by their last names (FIG. 7A);
- Alphabet list icons 808 that the user can touch to quickly arrive at a particular first letter in the displayed contact list;
- Cancel icon 810 that when activated (e.g., by a finger tap on the icon) initiates transfer back to the previous UI (e.g., UI 500, FIG. 5); and
- Other number icon 812 that when activated (e.g., by a finger tap on the icon) initiates transfer to a UI for entering a phone number for instant messaging, such as a phone number that is not in the user's contact list.

In some embodiments, the functions of first name icon 804 and last name icon 806 are incorporated into settings 412 (FIG. 4B, e.g., as a user preference setting) rather than being displayed in a contacts list UI (e.g., 800A and 800B, FIGS. 7A and 7B).

As described in U.S. patent application Ser. No. 11/322,547, "Scrolling List With Floating Adjacent Index Symbols," filed Dec. 23, 2005; Ser. No. 11/322,551, "Continuous Scrolling List With Acceleration," filed Dec. 23, 2005; and Ser. No. 11/322,553, "List Scrolling In Response To Moving Contact Over List Of Index Symbols," filed Dec. 23, 2005, which are hereby incorporated by reference in their entirety, the user may scroll through the contact list using vertically upward and/or vertically downward gestures 814 on the touch screen.

Figure 8:
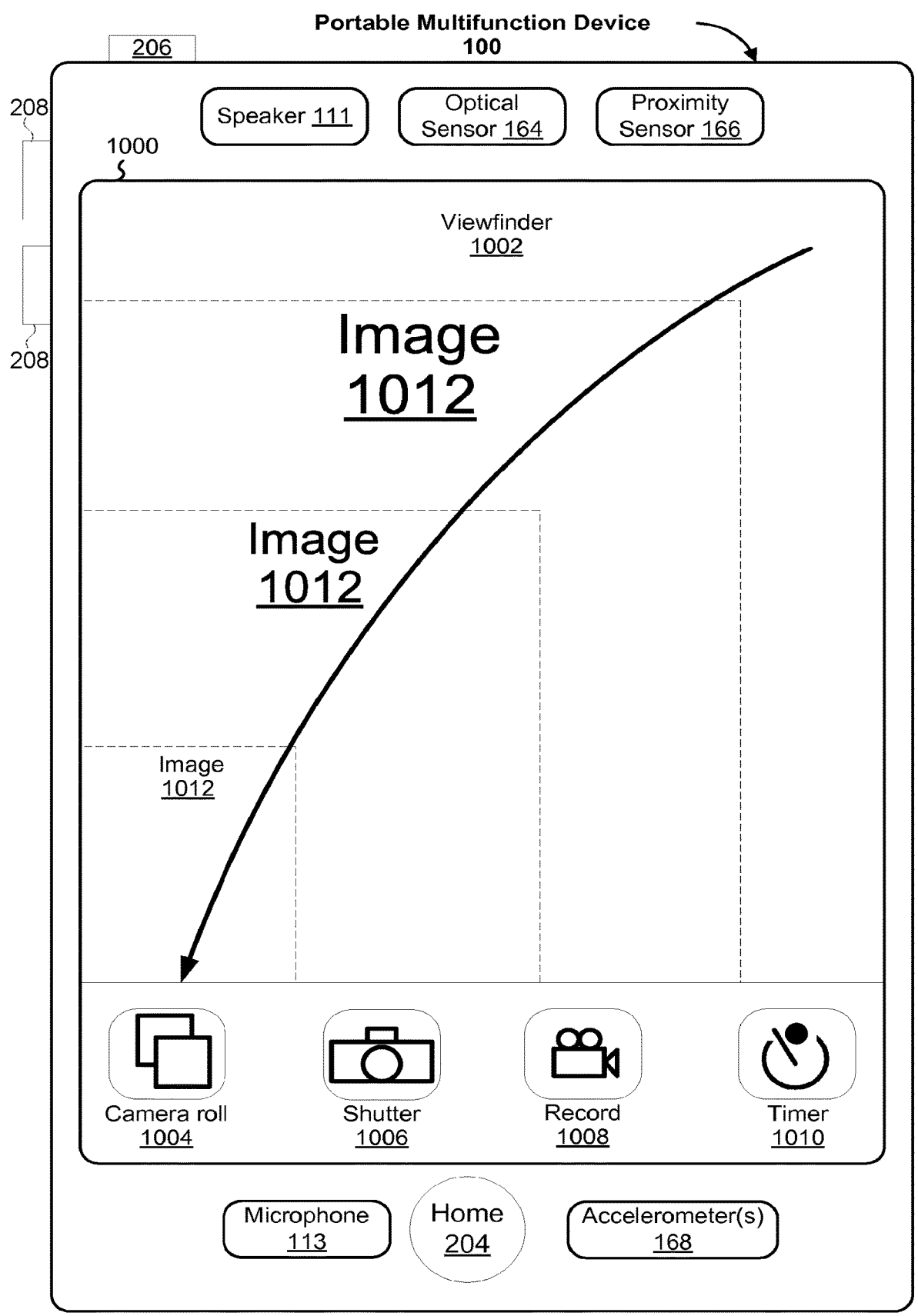
FIG. 8 illustrates an exemplary user interface for a camera in accordance with some embodiments.

FIG. 8 illustrates an exemplary user interface for a camera in accordance with some embodiments. In some embodiments, user interface 1000 (FIG. 8) includes the following elements, or a subset or superset thereof:
- Viewfinder 1002;
- Camera roll 1004 that manages images and/or videos taken with the camera;
- Shutter 1006 for taking still images;
- Record button 1008 for starting and stopping video recording;
- Timer 1010 for taking an image after a predefined time delay; and
- Image 1012 that appears (e.g., via the animation illustrated schematically in FIG. 8) to be added to camera roll 1004 when it is obtained.

In some embodiments, the orientation of the camera in the shutter icon 1006 rotates as the device 100 is rotated between portrait and landscape orientations.

Figure 9:
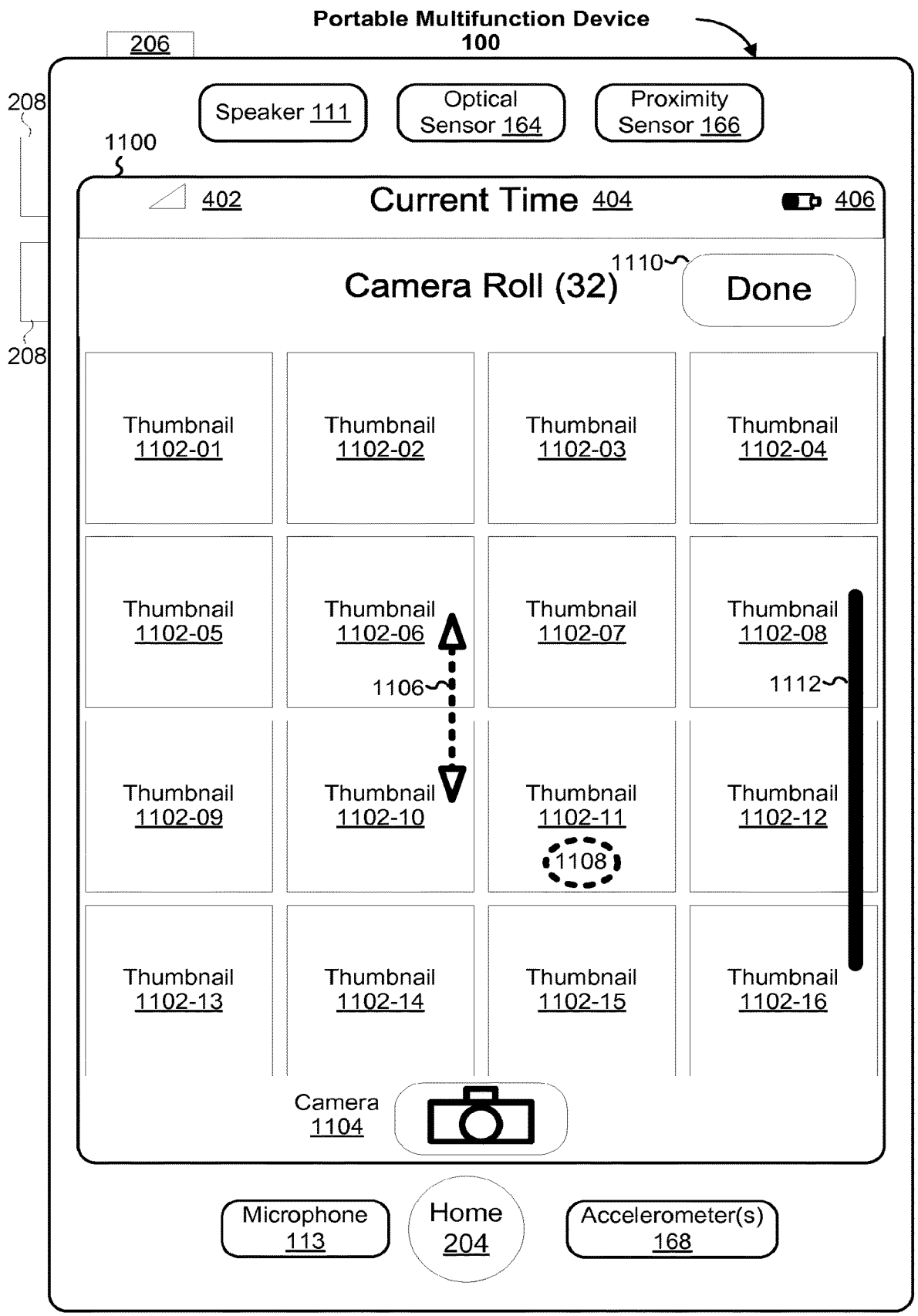
FIG. 9 illustrates an exemplary user interface for a camera roll in accordance with some embodiments.

FIG. 9 illustrates an exemplary user interface for a camera roll in accordance with some embodiments. In some embodiments, user interface 1100 (FIG. 9) includes the following elements, or a subset or superset thereof:
- 402, 404, and 406, as described above;
- Thumbnail images 1102 of images and/or videos obtained by camera 143;
- Camera icon 1104 or done icon 1110 that when activated (e.g., by a finger tap on the icon) initiates transfer to the camera UI (e.g., UI 1000); and
- Vertical bar 1112 that helps a user understand what portion of the camera roll is being displayed.

In some embodiments, the user may scroll through the thumbnails 1102 using vertically upward and/or vertically downward gestures 1106 on the touch screen. In some embodiments, a stationary gesture on a particular thumbnail (e.g., a tap gesture 1108 on thumbnail 1102-11) initiates transfer to an enlarged display of the corresponding image (e.g., UI 1200A, FIG. 10A).

In some embodiments, vertical bar 1112 is displayed temporarily after an object is detected on or near the touch screen display (e.g., a finger touch is detected anywhere on the thumbnails 1102). In some embodiments, the vertical bar 1112 has a vertical position on top of the displayed portion of the camera roll that corresponds to the vertical position in the camera roll of the displayed portion of the camera roll. In some embodiments, the vertical bar 1112 has a vertical length that corresponds to the portion of the camera roll being displayed. For example, in FIG. 9, the vertical position of the vertical bar 1112 indicates that the middle of the camera roll is being displayed and the vertical length of the vertical bar 1112 indicates that roughly half of the images in the camera roll are being displayed.

Figure 10A:
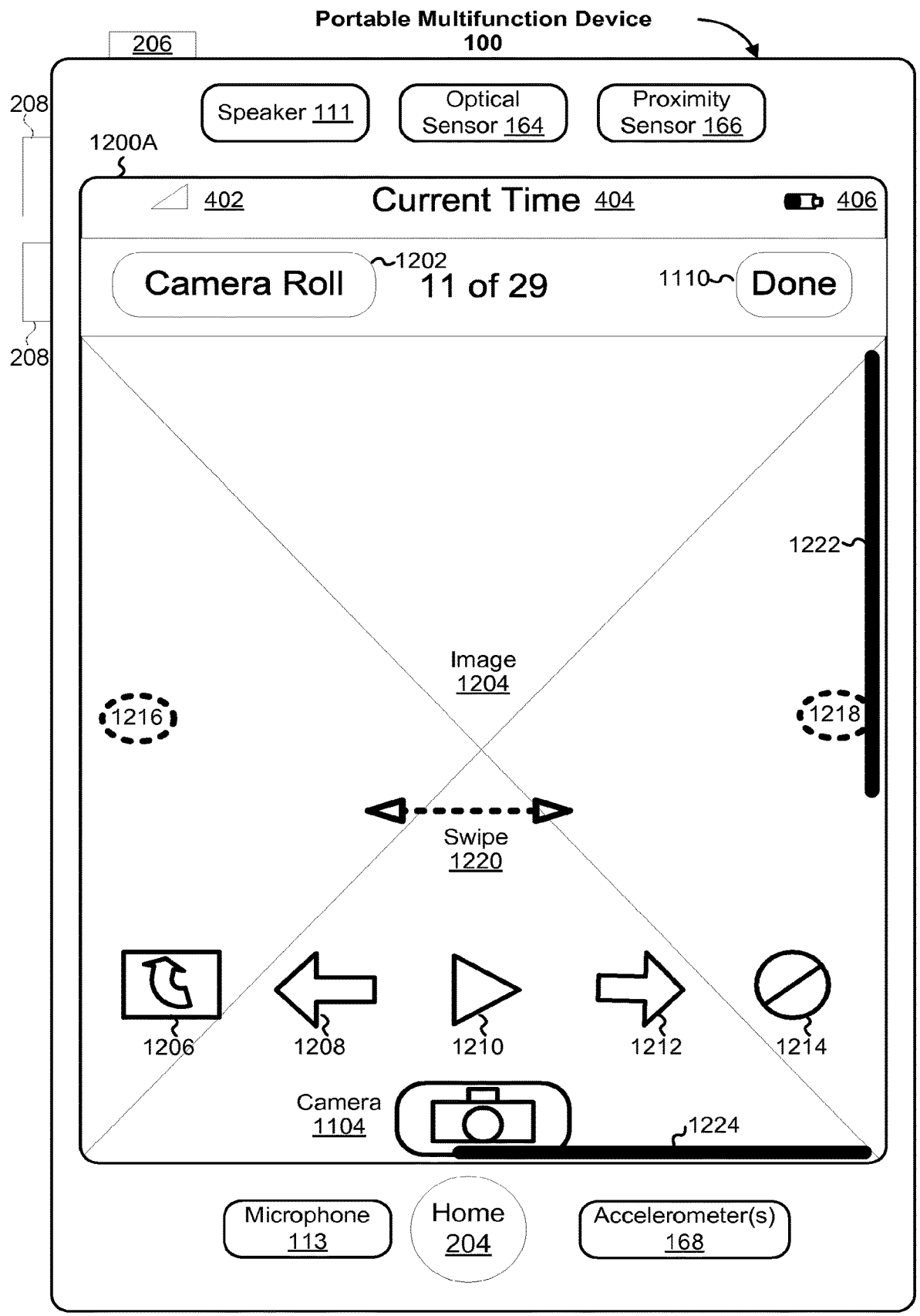
FIGS. 10A-10C illustrate an exemplary user interface for viewing and manipulating acquired images in accordance with some embodiments.
Figure 10B:
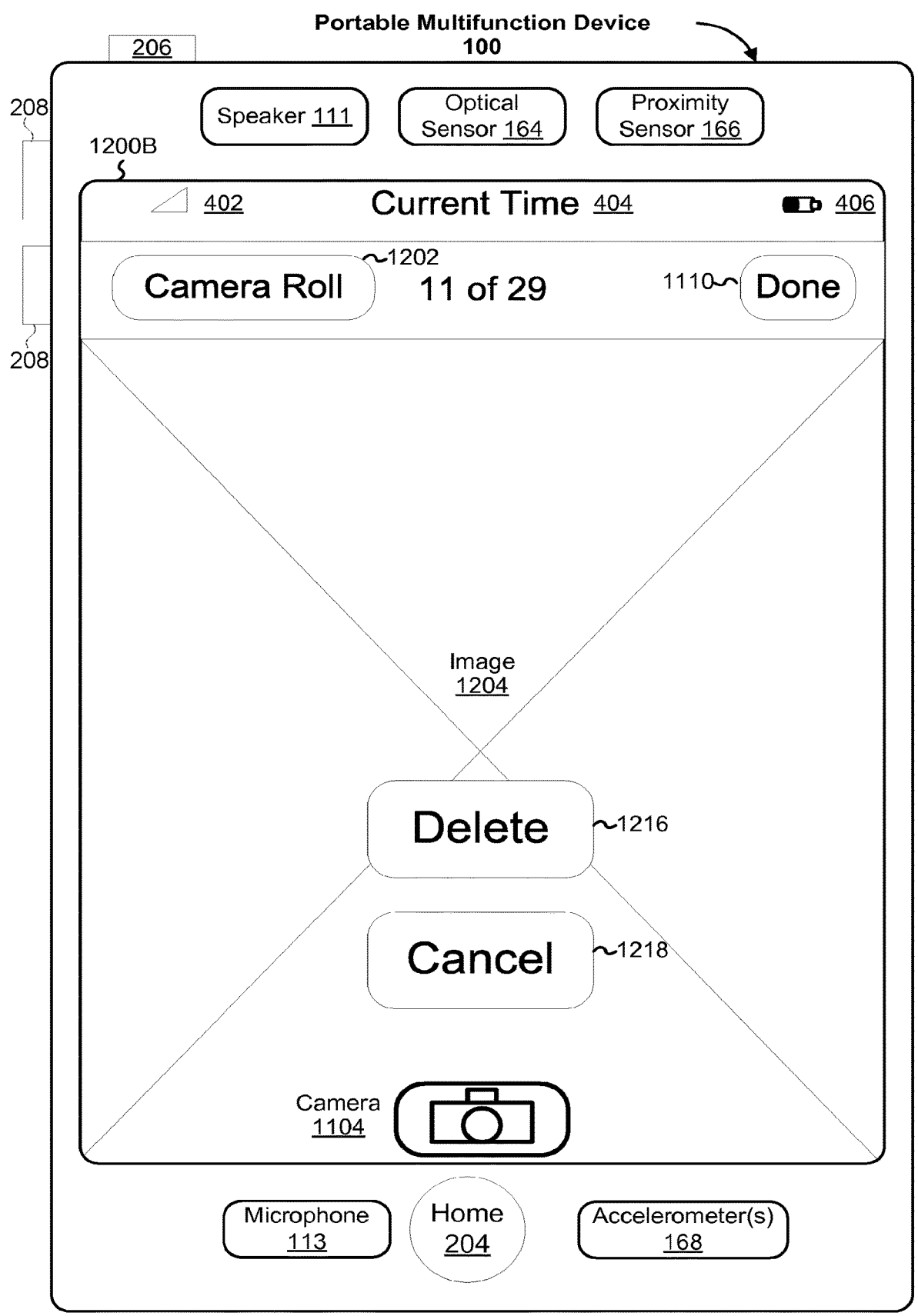
Figure 10C:
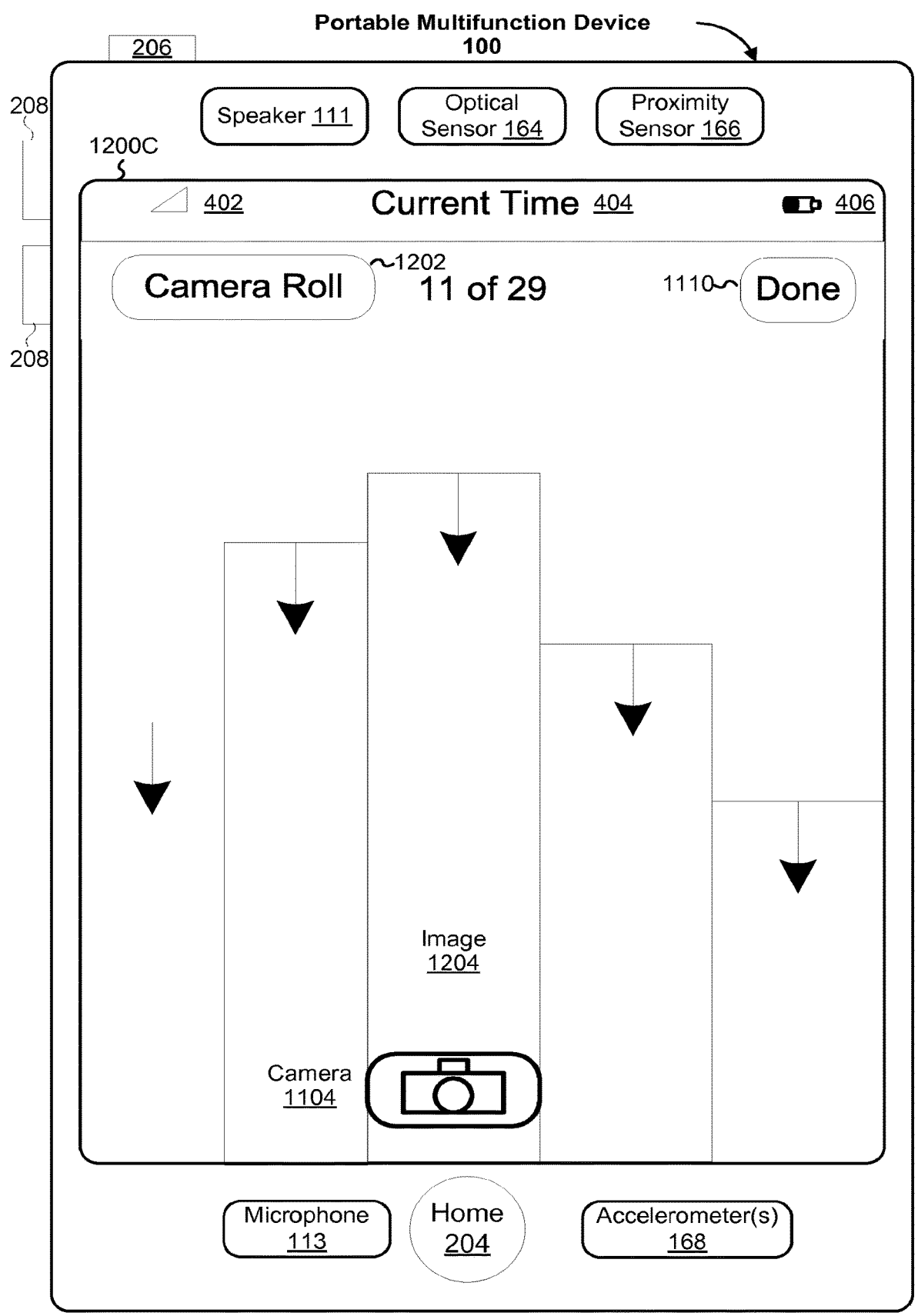

FIGS. 10A-10C illustrate an exemplary user interface for viewing and manipulating acquired images in accordance with some embodiments.

In some embodiments, user interface 1200A (FIG. 10A) includes the following elements, or a subset or superset thereof:
- 402, 404, 406, 1104, and 1110, as described above;
- Camera roll icon 1202 that when activated (e.g., by a finger tap on the icon) initiates transfer to the camera roll UI (e.g., UI 1100, FIG. 9);
- Image 1204;
- Additional options icon 1206 that when activated (e.g., by a finger tap on the icon) initiates transfer to a UI with additional options for use of image 1204;
- Previous image icon 1208 that when activated (e.g., by a finger tap on the icon) initiates display of the previous image in the camera roll (e.g., 1102-10);
- Play icon 1210 that when activated (e.g., by a finger tap on the icon) initiates a slide show of the images in the camera roll;
- Next image icon 1212 that when activated (e.g., by a finger tap on the icon) initiates display of the next image in the camera roll (e.g., 1102-12);
- Delete symbol icon 1214 that when activated (e.g., by a finger tap on the icon) initiates display of a UI to confirm that the user wants to delete image 1204 (e.g. UI 1200B, FIG. 10B);

Vertical bar 1222 that helps a user understand what portion of the image 1204 is being displayed; and Horizontal bar 1224 that helps a user understand what portion of the image 1204 is being displayed.

In some embodiments, the user can also initiate viewing of the previous image by making a tap gesture 1216 on the left side of the image. In some embodiments, the user can also initiate viewing of the previous image by making a swipe gesture 1220 from left to right on the image.

In some embodiments, the user can also initiate viewing of the next image by making a tap gesture 1218 on the right side of the image. In some embodiments, the user can also initiate viewing of the next image by making a swipe gesture 1220 from right to left on the image.

By offering multiple ways to perform the same task (e.g., to view the next image by tapping icon 1212, tap 1218, or right to left swipe 1220), the user can choose whichever way the user prefers, thereby making the UI simpler and more intuitive for the user.

In some embodiments, image 1204 moves off screen to the left as the next image moves on screen from the right. In some embodiments, image 1204 moves off screen to the right as the previous image moves on screen from the left.

In some embodiments, a tap gesture such as 1216 or 1218 magnifies the image 1204 by a predetermined amount, rather than initiating viewing of another image, so that just a portion of image 1204 is displayed. In some embodiments, when the image is already magnified, repeating the tap gesture demagnifies the image (e.g., so that the entire image is displayed).

In some embodiments, if just a portion of image 1204 is displayed, vertical bar 1222 is displayed temporarily after an object is detected on or near the touch screen display (e.g., a finger touch is detected anywhere on the image 1204). In some embodiments, the vertical bar 1222 has a vertical position on top of the displayed portion of the image that corresponds to the vertical position in the image of the displayed portion of the image. In some embodiments, the vertical bar 1222 has a vertical length that corresponds to the portion of the image being displayed. For example, in FIG. 10A, the vertical position of the vertical bar 1222 indicates that the top of the image is being displayed and the vertical length of the vertical bar 1222 indicates that a portion from the top half of the image is being displayed.

In some embodiments, if just a portion of image 1204 is displayed, horizontal bar 1224 is displayed temporarily after an object is detected on or near the touch screen display (e.g., a finger touch is detected anywhere on the image 1204). In some embodiments, the horizontal bar 1224 has a horizontal position on top of the displayed portion of the image that corresponds to the horizontal position in the image of the displayed portion of the image. In some embodiments, the horizontal bar 1224 has a horizontal length that corresponds to the portion of the image being displayed. For example, in FIG. 10A, the horizontal position of the horizontal bar 1224 indicates that a portion of the right side of the image is being displayed and the horizontal length of the horizontal bar 1224 indicates that a portion from the right half of the image is being displayed. Together, vertical bar 1222 and horizontal bar 1224 indicate that the northeast quadrant of the image 1204 is being displayed.

In some embodiments, user interface 1200B (FIG. 10B) includes the following elements, or a subset or superset thereof:

402, 404, 406, 1104, 1110, 1202, and 1204, as described above;

Delete icon 1216 that when activated (e.g., by a finger tap on the icon) deletes the image 1204; and Cancel icon 1218 that when activated (e.g., by a finger tap on the icon) returns the device to the previous user interface (e.g. UI 1200A, FIG. 10A)

In some embodiments, as illustrated in FIG. 10C, the image may go through a deletion animation to show the user that the image is being deleted.

This deletion process, which requires gestures by the user on two different user interfaces (e.g., 1200A and 1200B, FIGS. 10A and 10B), greatly reduces the chance that a user will accidentally delete an image or other similar item.

Figure 11A:
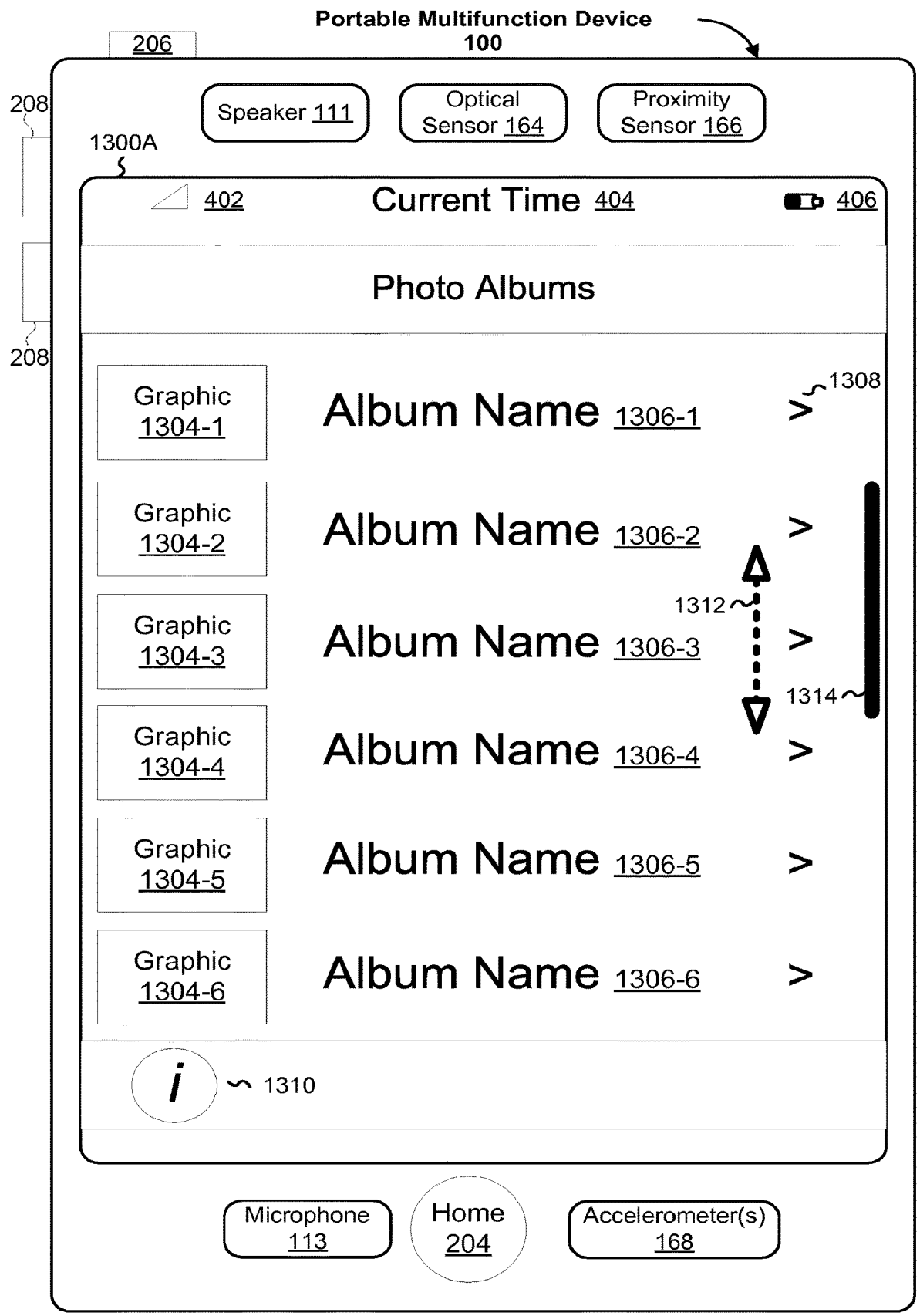
FIGS. 11A and 11B illustrate exemplary user interfaces for viewing albums in accordance with some embodiments.
Figure 11B:
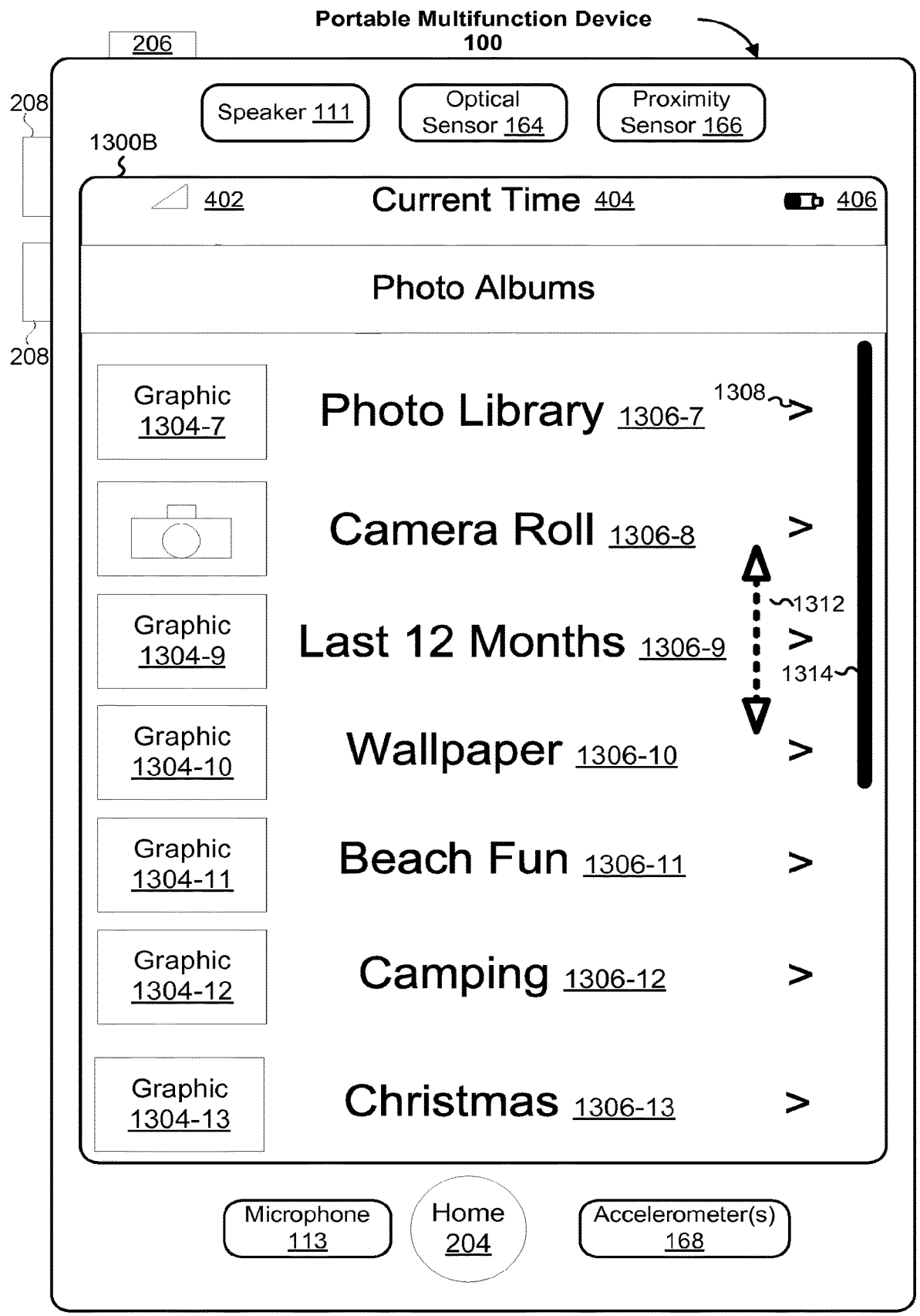

FIGS. 11A and 11B illustrate exemplary user interfaces for viewing albums in accordance with some embodiments.

Figure 12:
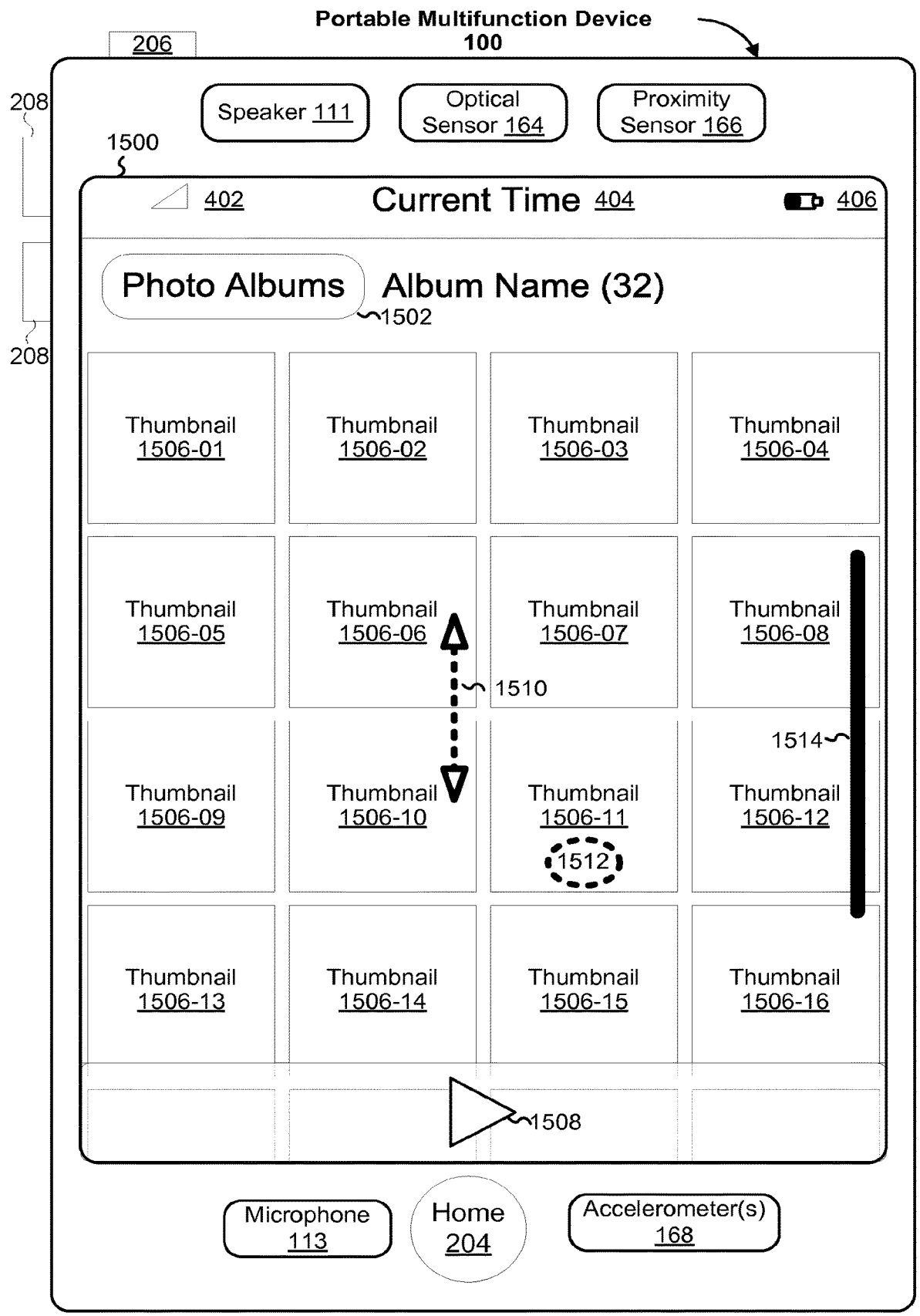
FIG. 12 illustrates an exemplary user interface for viewing an album in accordance with some embodiments.

In some embodiments, user interface 1300A (FIG. 11A) includes the following elements, or a subset or superset thereof:

402, 404, and 406, as described above;

Graphics 1304, e.g., thumbnail images of the first picture or a user-selected picture in the corresponding albums;

Album names 1306;

Selection icons 1308 that when activated (e.g., by a finger tap on the icon) initiates display of the corresponding album (e.g., UI 1500, FIG. 12);

Settings icon 1310, that brings up a settings menu when activated by a user gesture (e.g., a tap gesture); and Vertical bar 1314 that helps a user understand what portion of the list of albums is being displayed.

In some embodiments, as shown in FIG. 11B, one of the photo albums (e.g., 1306-7) may correspond to the user's photo library; another album (e.g., 1306-8) may correspond to the camera roll (FIG. 9); another album (e.g., 1306-9) may correspond to images added to the photo library in the last 12 months; and other albums (e.g., 1306-10-1306-13) may correspond to albums created and organized by the user.

The albums may be downloaded on to the device from a wide range of sources, such as the user's desktop or laptop computer, the Internet, etc.

If there is a long list of albums that fill more than the screen area, the user may scroll through the list using vertically upward and/or vertically downward gestures 1312 on the touch screen.

In some embodiments, a user may tap anywhere in the row for a particular album (e.g., a tap on the graphic 1304, album name 1306, or selection icon 1308) to initiate display of the corresponding album (e.g., UI 1500, FIG. 12).

In some embodiments, vertical bar 1314 is displayed temporarily after an object is detected on or near the touch screen display (e.g., a finger touch is detected anywhere on the list of albums). In some embodiments, the vertical bar 1314 has a vertical position on top of the displayed portion of the list that corresponds to the vertical position in the list of the displayed portion of the list. In some embodiments, the vertical bar 1314 has a vertical length that corresponds to the portion of the list being displayed. For example, in FIG. 11B, the vertical position of the vertical bar 1314 indicates that the top of the list of albums is being displayed and the vertical length of the vertical bar 1314 indicates that roughly half of the albums in the list are being displayed.

FIG. 12 illustrates an exemplary user interface for viewing an album in accordance with some embodiments. In some embodiments, user interface 1500 (FIG. 12) includes the following elements, or a subset or superset thereof:

402, 404, and 406, as described above;

Photo albums icon 1502 that when activated (e.g., by a finger tap on the icon) initiates transfer to the photo albums UI (e.g., UI 1300B, FIG. 11B);

Thumbnail images 1506 of images in the corresponding album;

Play icon 1508 that when activated (e.g., by a finger tap on the icon) initiates a slide show of the images in the album; and Vertical bar 1514 that helps a user understand what portion of the list of thumbnail images 1506 in an album is being displayed.

In some embodiments, the user may scroll through the thumbnails 1506 using vertically upward and/or vertically downward gestures 1510 on the touch screen. In some embodiments, a stationary gesture on a particular thumbnail (e.g., a tap gesture 1512 on thumbnail 1506-11) initiates transfer to an enlarged display of the corresponding image (e.g., UI 1600A and 1600B, FIGS. 13A and 13B).

In some embodiments, vertical bar 1514 is displayed temporarily after an object is detected on or near the touch screen display (e.g., a finger touch is detected anywhere on the list of thumbnails). In some embodiments, the vertical bar 1514 has a vertical position on top of the displayed portion of the list that corresponds to the vertical position in the list of the displayed portion of the list. In some embodiments, the vertical bar 1514 has a vertical length that corresponds to the portion of the list being displayed. For example, in FIG. 12, the vertical position of the vertical bar 1514 indicates that the middle of the list of thumbnails is being displayed and the vertical length of the vertical bar 1514 indicates that roughly half of the thumbnails in the album are being displayed.

Figure 13A:
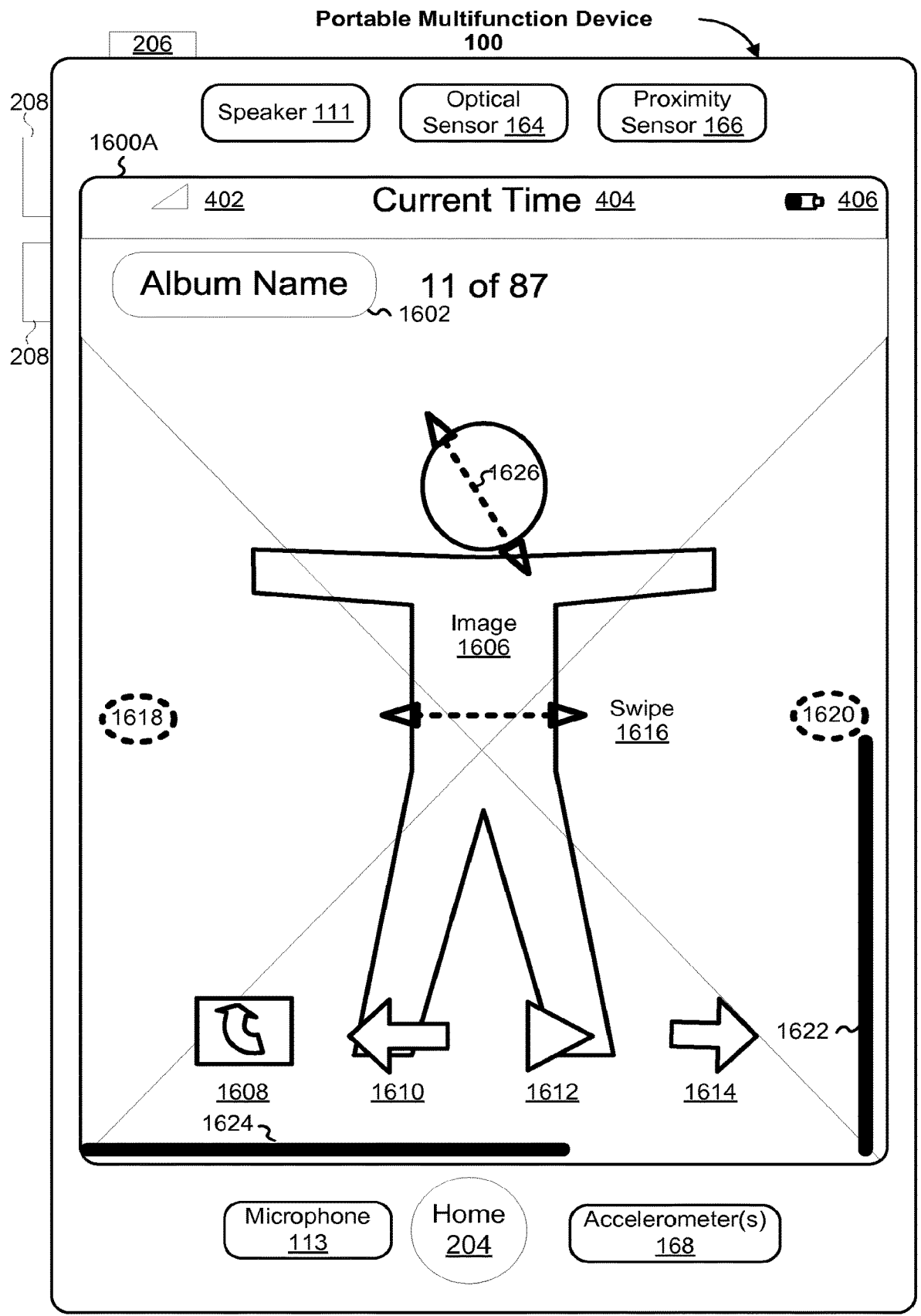
FIGS. 13A and 13B illustrate exemplary user interfaces for viewing images in an album in accordance with some embodiments.
Figure 13B:
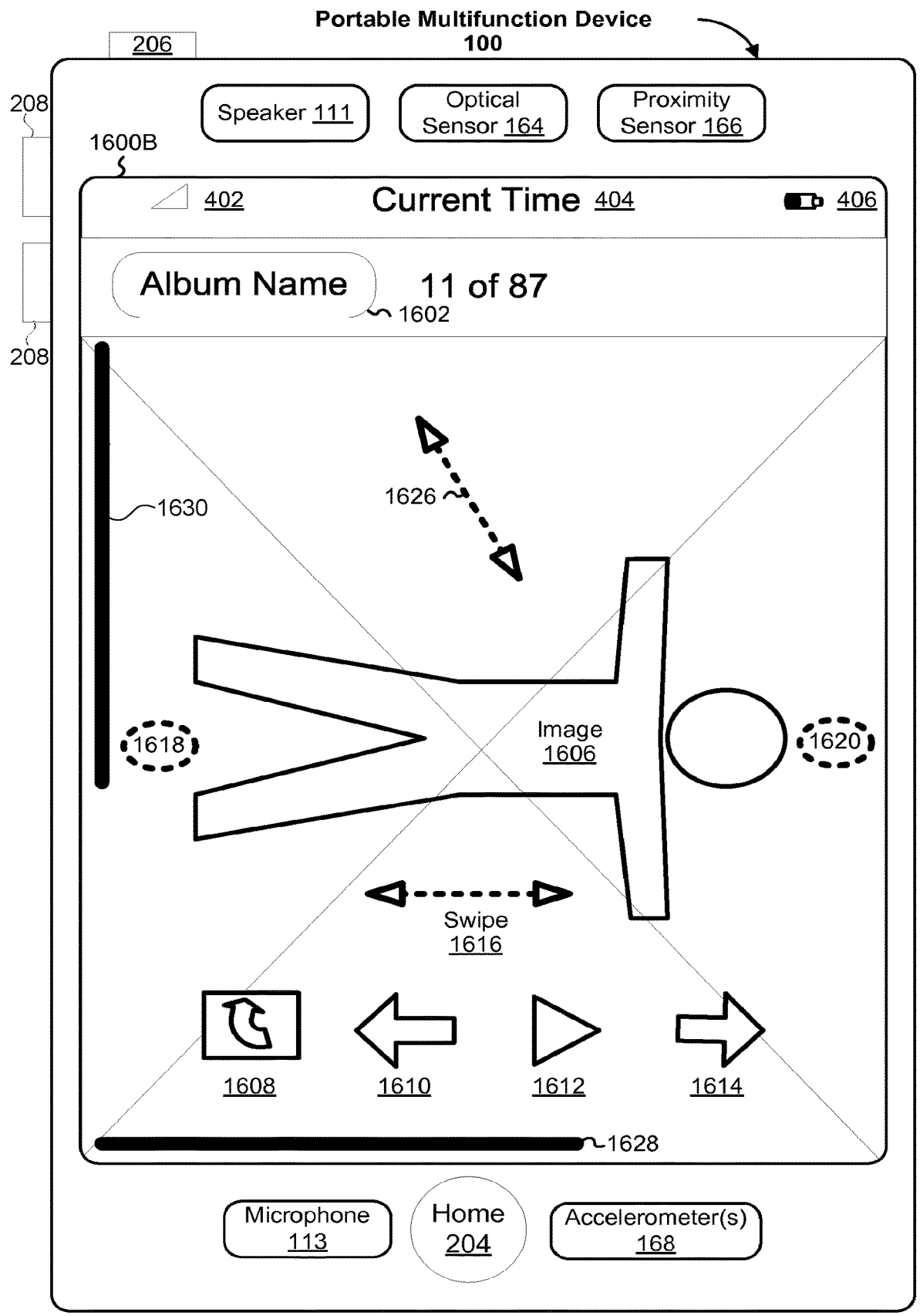

FIGS. 13A and 13B illustrate exemplary user interfaces for viewing images in an album in accordance with some embodiments. In some embodiments, user interfaces 1600A and 1600B (FIGS. 13A and 13B) include the following elements, or a subset or superset thereof:

402, 404, and 406, as described above;

Album name icon 1602 that when activated (e.g., by a finger tap on the icon) initiates transfer to the corresponding album UI (e.g., UI 1500, FIG. 12);

Image 1606;

Additional options icon 1608 that when activated (e.g., by a finger tap on the icon) initiates transfer to a UI with additional options for use of image 1606;

Previous image icon 1610 that when activated (e.g., by a finger tap on the icon) initiates display of the previous image in the album (e.g., 1506-10);

Play icon 1612 that when activated (e.g., by a finger tap on the icon) initiates a slide show of the images in the album; and Next image icon 1614 that when activated (e.g., by a finger tap on the icon) initiates display of the next image in the album (e.g., 1506-12).

In some embodiments, icons 1608, 1610, 1612, and 1614 are displayed in response to detecting a gesture on the touch screen (e.g., a single finger tap on the image 1606) and then cease to be displayed if no interaction with the touch screen is detected after a predetermined time (e.g., 3-5 seconds), thereby providing a "heads up display" effect for these icons.

In some embodiments, the user can also initiate viewing of the previous image by making a tap gesture 1618 on the left side of the image. In some embodiments, the user can also initiate viewing of the previous image by making a swipe gesture 1616 from left to right on the image.

In some embodiments, the user can also initiate viewing of the next image by making a tap gesture 1620 on the right side of the image. In some embodiments, the user can also initiate viewing of the next image by making a swipe gesture 1616 from right to left on the image.

By offering multiple ways to perform the same task (e.g., to view the next image by tapping icon 1614, tap 1620, or right to left swipe 1616), the user can choose whichever way the user prefers, thereby making the UI simpler and more intuitive for the user.

In some embodiments, image 1606 moves off screen to the left as the next image moves on screen from the right. In some embodiments, image 1606 moves off screen to the right as the previous image moves on screen from the left.

In some embodiments, a double tap gesture such as 1618 or 1620 magnifies the image 1606 by a predetermined amount, rather than initiating viewing of another image, so that just a portion of image 1606 is displayed. In some embodiments, when the image is already magnified, repeating the double tap gesture demagnifies the image (e.g., so that the entire image is displayed).

In some embodiments, a multi-finger de-pinching gesture magnifies the image 1606 by a variable amount in accordance with the position of the multi-finger de-pinching gesture and the amount of finger movement in the multi-finger de-pinching gesture. In some embodiments, a multi-finger pinching gesture demagnifies the image 1606 by a variable amount in accordance with the position of the multi-finger pinching gesture and the amount of finger movement in the multi-finger pinching gesture.

In some embodiments, if just a portion of image 1606 is displayed, vertical bar 1622 is displayed temporarily after an object is detected on or near the touch screen display (e.g., a finger touch is detected anywhere on the image 1606). In some embodiments, the vertical bar 1622 has a vertical position on top of the displayed portion of the image that corresponds to the vertical position in the image of the displayed portion of the image. In some embodiments, the vertical bar 1622 has a vertical length that corresponds to the portion of the image being displayed. For example, in FIG. 13A, the vertical position of the vertical bar 1622 indicates that the bottom of the image is being displayed and the vertical length of the vertical bar 1622 indicates that a portion from the bottom half of the image is being displayed.

In some embodiments, if just a portion of image 1606 is displayed, horizontal bar 1624 is displayed temporarily after an object is detected on or near the touch screen display (e.g., a finger touch is detected anywhere on the image 1606). In some embodiments, the horizontal bar 1624 has a horizontal position on top of the displayed portion of the image that corresponds to the horizontal position in the image of the displayed portion of the image. In some embodiments, the horizontal bar 1624 has a horizontal length that corresponds to the portion of the image being displayed. For example, in FIG. 13A, the horizontal position of the horizontal bar 1224 indicates that a portion of the left side of the image is being displayed and the horizontal length of the horizontal bar 1624 indicates that a portion from the left half of the image is being displayed. Together, vertical bar 1622 and horizontal bar 1624 indicate that the southwest quadrant of the image 1606 is being displayed.

In some embodiments, in response to detecting a change in orientation of the device 100 from a portrait orientation to a landscape orientation (e.g., using accelerometer 168), UI 1600A (including image 1606) is rotated by 90° to UI 1600B (FIG. 13B). In some embodiments, if just a portion of image 1606 is displayed in landscape orientation (UI 1600B, FIG. 13B), vertical bar 1628 and horizontal bar 1630 are displayed and act in an analogous manner to vertical bar 1622 and horizontal bar 1624 (UI 1600A, FIG. 13A), described above. In some embodiments, in response to detecting a change in orientation of the device 100 from a landscape orientation to a portrait orientation (e.g., using accelerometer 168), the UI 1600B is rotated by 90° to UI 1600A (FIG. 13A).

In some embodiments, if just a portion of image 1606 is displayed, in response to detecting a finger drag or swipe gesture (e.g., 1626), the displayed portion of the image is translated in accordance with the direction of the drag or swipe gesture (e.g., vertical, horizontal, or diagonal translation).

Figure 14A:
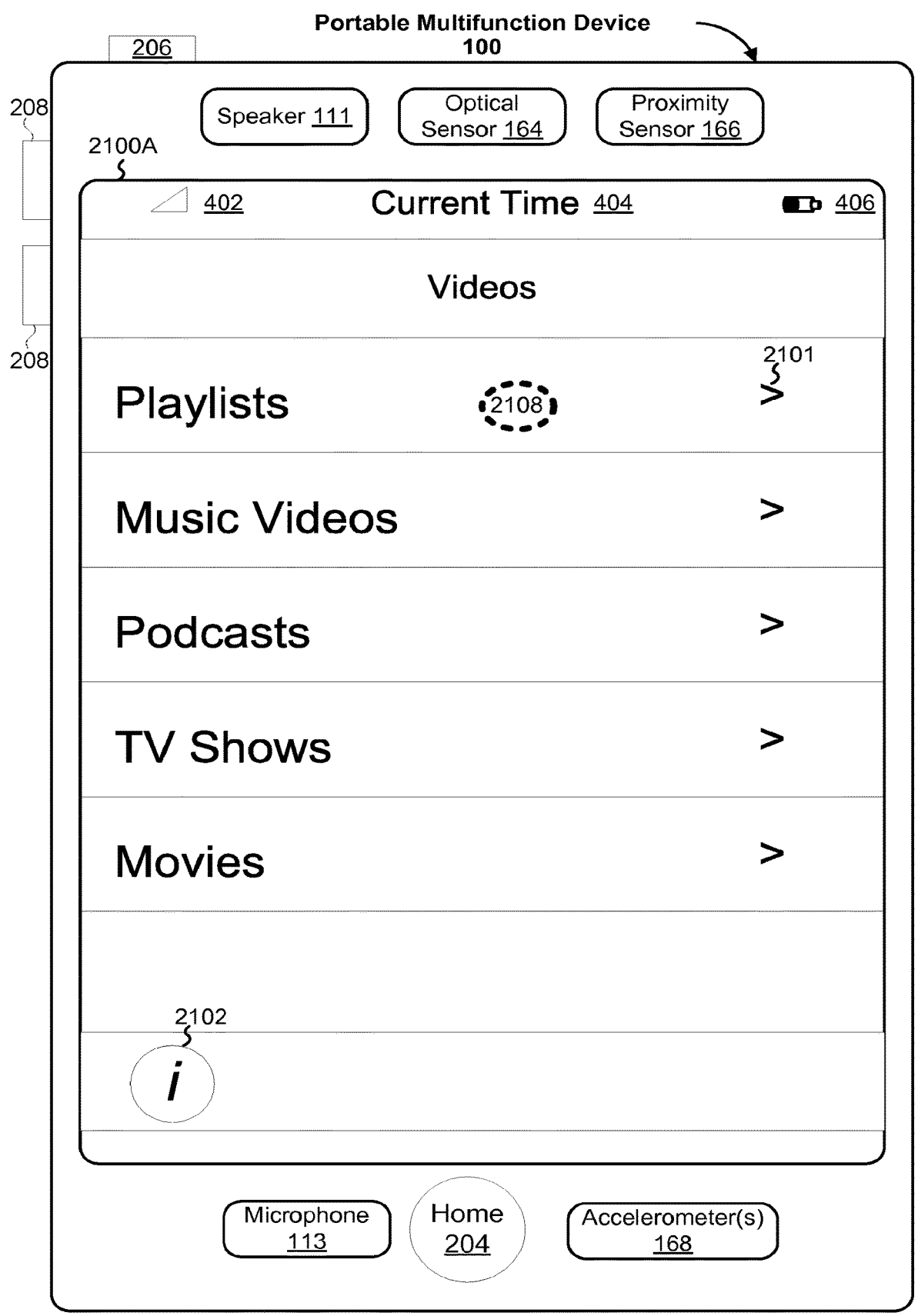
FIGS. 14A-14C illustrate an exemplary user interface for organizing and managing videos in accordance with some embodiments.
Figure 14B:
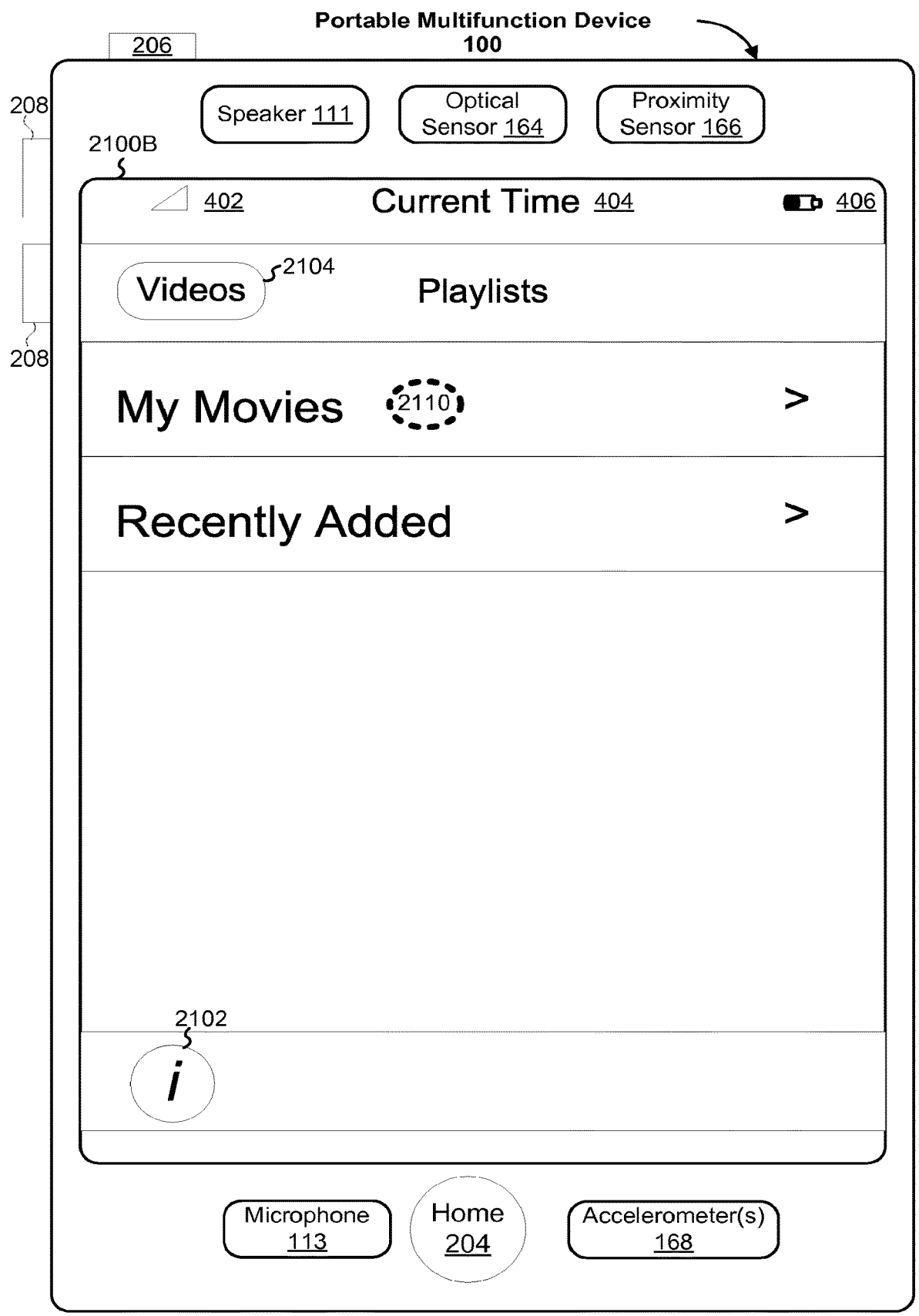
Figure 14C:
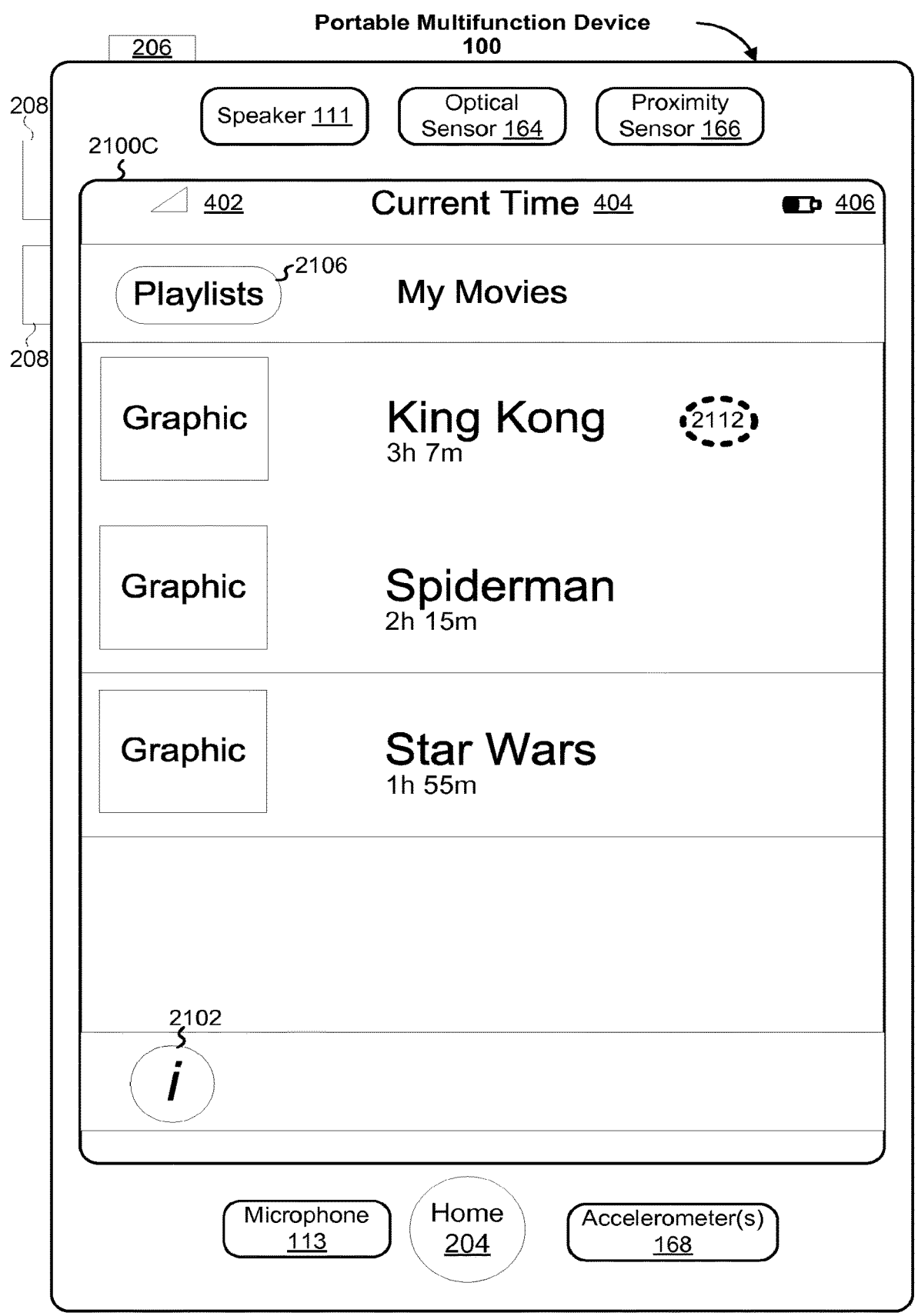

FIGS. 14A-14C illustrate an exemplary user interface for organizing and managing videos in accordance with some embodiments.

In some embodiments, in response to a series of gestures (e.g., finger taps) by the user, the device displays a series of video categories and sub-categories. For example, if the user activates selection icon 2101 (e.g., by a finger tap on the icon) or, in some embodiments, taps anywhere in the Playlists row 2108, the UI changes from a display of video categories (UI 2100A, FIG. 14A) to a display of Playlist sub-categories (UT 2100B, FIG. 14B). In turn, if the user activates the selection icon for My Movies (e.g., by a finger tap on the icon) or, in some embodiments, taps anywhere in the My Movies row 2110, the UI changes from a display of Playlist sub-categories (UI 2100B, FIG. 14B) to a display of My Movies sub-categories (UI 2100C, FIG. 14C), and so forth.

In some embodiments, in response to a series of gestures (e.g., finger taps) by the user, the device navigates back up through the hierarchy of video categories and sub-categories. For example, if the user activates Playlists icon 2106 (e.g., by a finger tap on the icon), the UT changes from a display of My Movies sub-categories (UI 2100C, FIG. 14C) to a display of Playlist sub-categories (UI 2100B, FIG. 14B). In turn, if the user activates the Videos icon 2104 (e.g., by a finger tap on the icon), the UI changes from a display of Playlist sub-categories (UI 2100B, FIG. 14B) to a display of video categories (UI 2100A, FIG. 14A).

In some embodiments, in response to user selection of a particular video (e.g., by a tap or other predefined gesture on the graphic, title, or anywhere 2112 (FIG. 14C) in the row for a particular video), the device displays the selected video (e.g., King Kong) in a video player UI.

In some embodiments, in response to user selection of settings icon 2102 (e.g., by a finger tap on the icon), the device displays a settings UI for a video player.

FIGS. 15A-15D illustrate an exemplary user interface for displaying and managing recent calls in accordance with some embodiments.

Figure 15A:
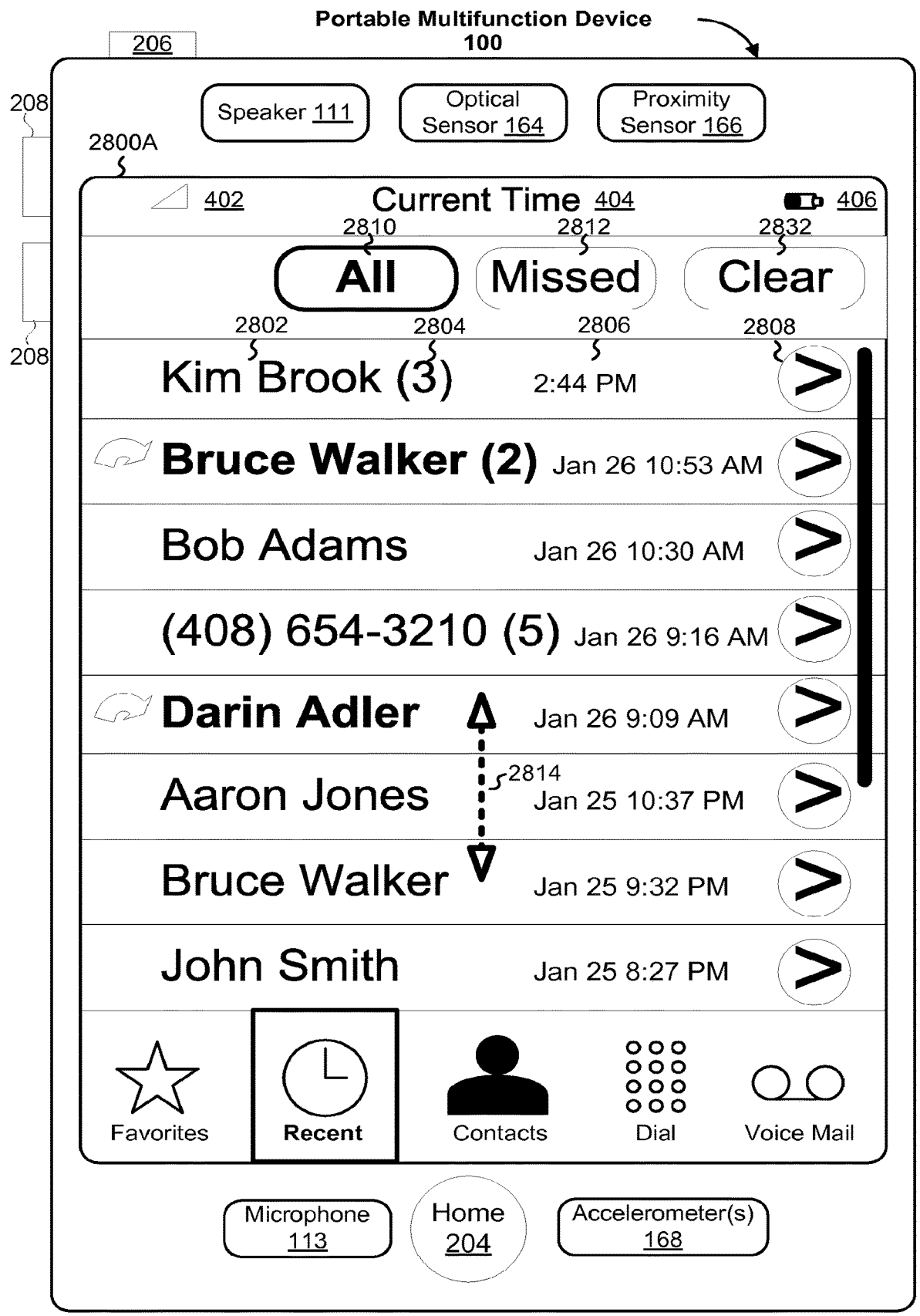
FIGS. 15A-15D illustrate an exemplary user interface for displaying and managing recent calls in accordance with some embodiments.
Figure 15B:
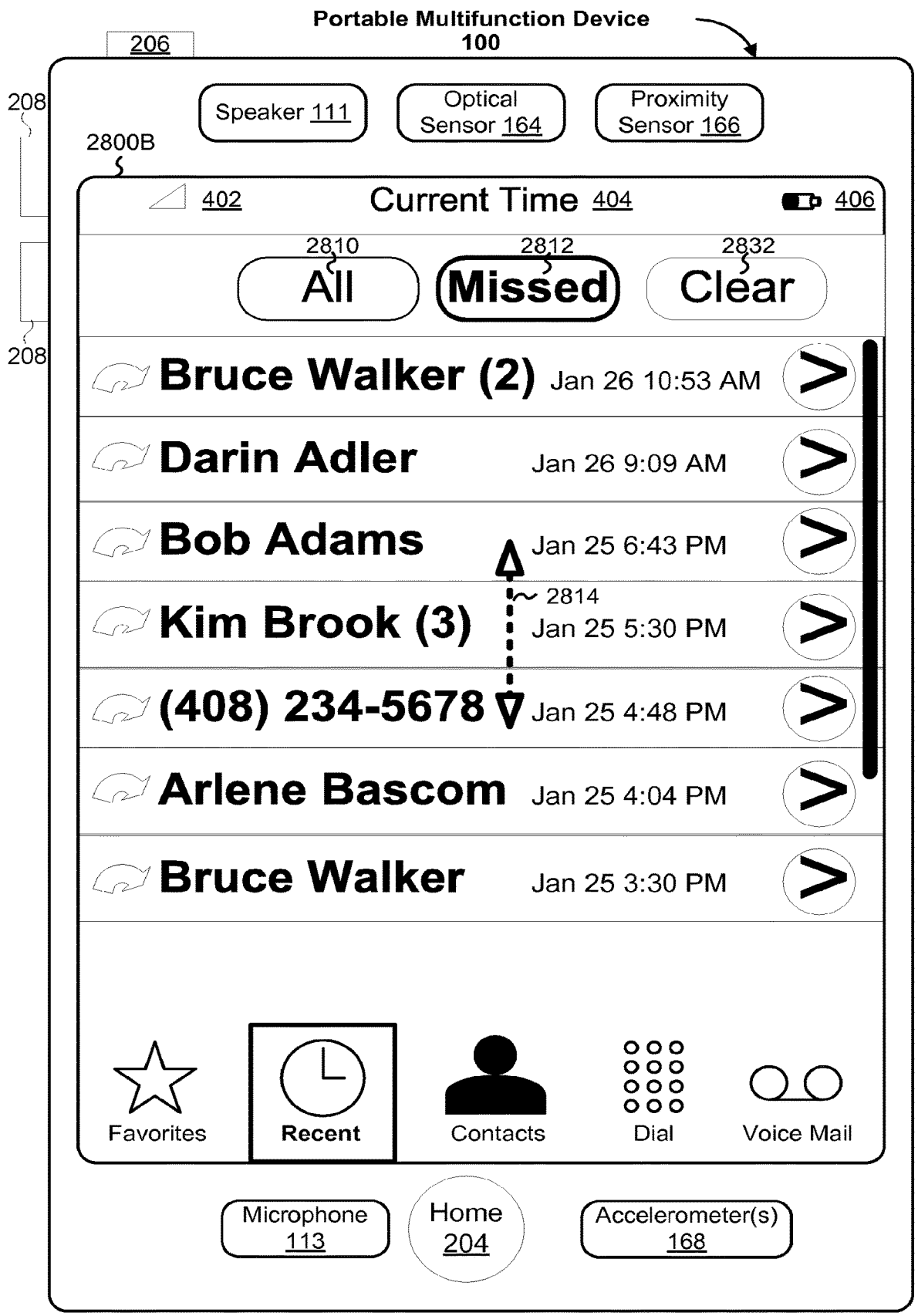
Figure 15C:
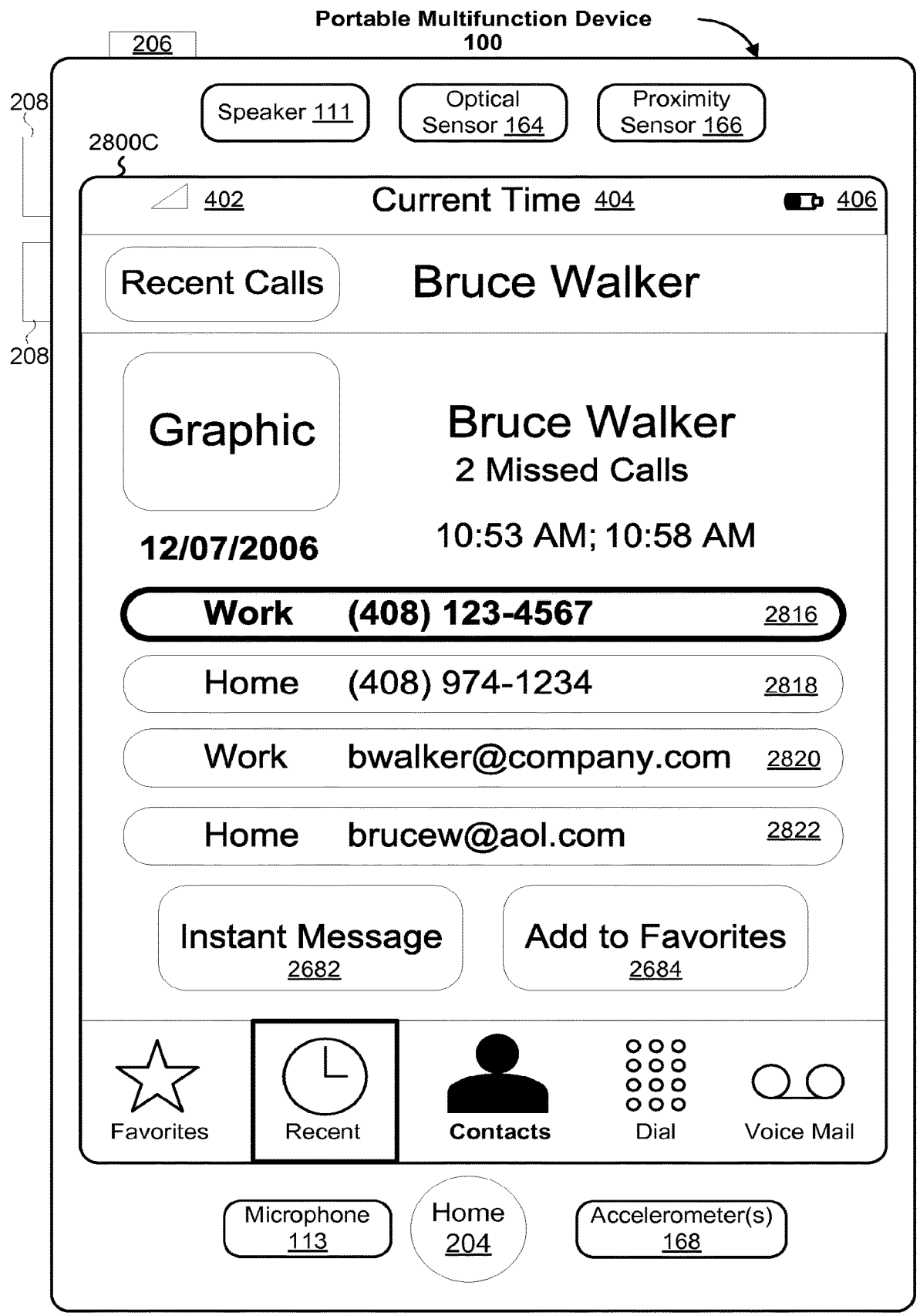

In some embodiments, in response to the user activating All icon 2810, the touch screen displays a list of all recent calls (e.g., UI 2800A, FIG. 15A). In some embodiments, in response to the user activating Missed icon 2812, the touch screen displays a list of recent missed calls (e.g., UT 2800B, FIG. 15B).

In some embodiments, each row in a list corresponds to a call or a consecutive sequence of calls involving the same person or the same number (without an intervening call involving another person or another phone number). In some embodiments, each row includes: the name 2802 of the other party (if available via the contact module) or the phone number (if the name of the other party is not available); the number 2804 of consecutive calls; the date and/or time 2806 of the last call; and an additional information icon 2808. In some embodiments, in response to the user activating icon 2808 for a particular row (e.g., by a finger tap on the icon), the touch screen displays the corresponding contact list entry for the other party (e.g., UI 2800C, FIG. 15C) or UI 2800D (FIG. 15D) if the phone number cannot be associated with an entry in the user's contact list. In some embodiments, in response to a user tap or other predefined gesture elsewhere (i.e., a tap or gesture other than on icon 2808) in a given row, the phone module dials the corresponding phone number for that row.

In some embodiments, some rows may include icons indicating whether the last call associated with the row was missed or answered.

If the list of recent calls fills more than the screen area, the user may scroll through the list using vertically upward and/or vertically downward gestures 2814 on the touch screen.

In some embodiments, UI 2800C (FIG. 15C) highlights (e.g., with color, shading, and/or bolding) the phone number associated with the recent call (e.g., the two recent incoming calls from Bruce Walker in UI 2800A, FIG. 15A, came from Bruce Walker's work number 2816). In some embodiments, in response to a user tap or other predefined gesture on the highlighted number 2816, the phone module dials the highlighted number (e.g., 2816). In some embodiments, in response to a user tap or other predefined gesture on another number in the contact list entry (e.g., home number 2818), the phone module dials the corresponding number. In some embodiments, in response to a user tap or other predefined gesture on an email address in the contact list entry (e.g., either work email 2820 or home email 2822), the mail module prepares an email message with the selected email address, ready for text input by the user. Thus, by selecting icon 2808 (FIG. 15A), the user may then easily respond to a caller using the same number involved in the previous call (e.g., 2816), another number associated with the same caller (e.g., 2818), or another mode of communication besides the phone (e.g., an email to the caller's work 2820 or home 2822 email address).

In some embodiments, UI 2800D (FIG. 15D) provides one or more options for a user to make use of a phone number in a recent call that is not associated with an entry in the user's contact list. In some embodiments, in response to a tap or other predefined user gesture, the device may: call the phone number (e.g., if the gesture is applied to icon 2824); initiate creation of a text message or other instant message to the phone number (e.g., if the gesture is applied to icon 2825); create a new contact with the phone number (e.g., if the gesture is applied to icon 2826); or add the phone number to an existing contact (e.g., if the gesture is applied to icon 2828).

In some embodiments, in response to detecting a gesture on the clear icon 2832 (e.g., a single finger tap on the icon 2832), one or more recent calls selected by the user are deleted from the list of recent calls.

Additional description of missed call management can be found in U.S. Patent Application No. 60/883,782, "Telephone Call Management For A Portable Multifunction Device," filed Jan. 6, 2007, the content of which is hereby incorporated by reference in its entirety.

Figure 15D:
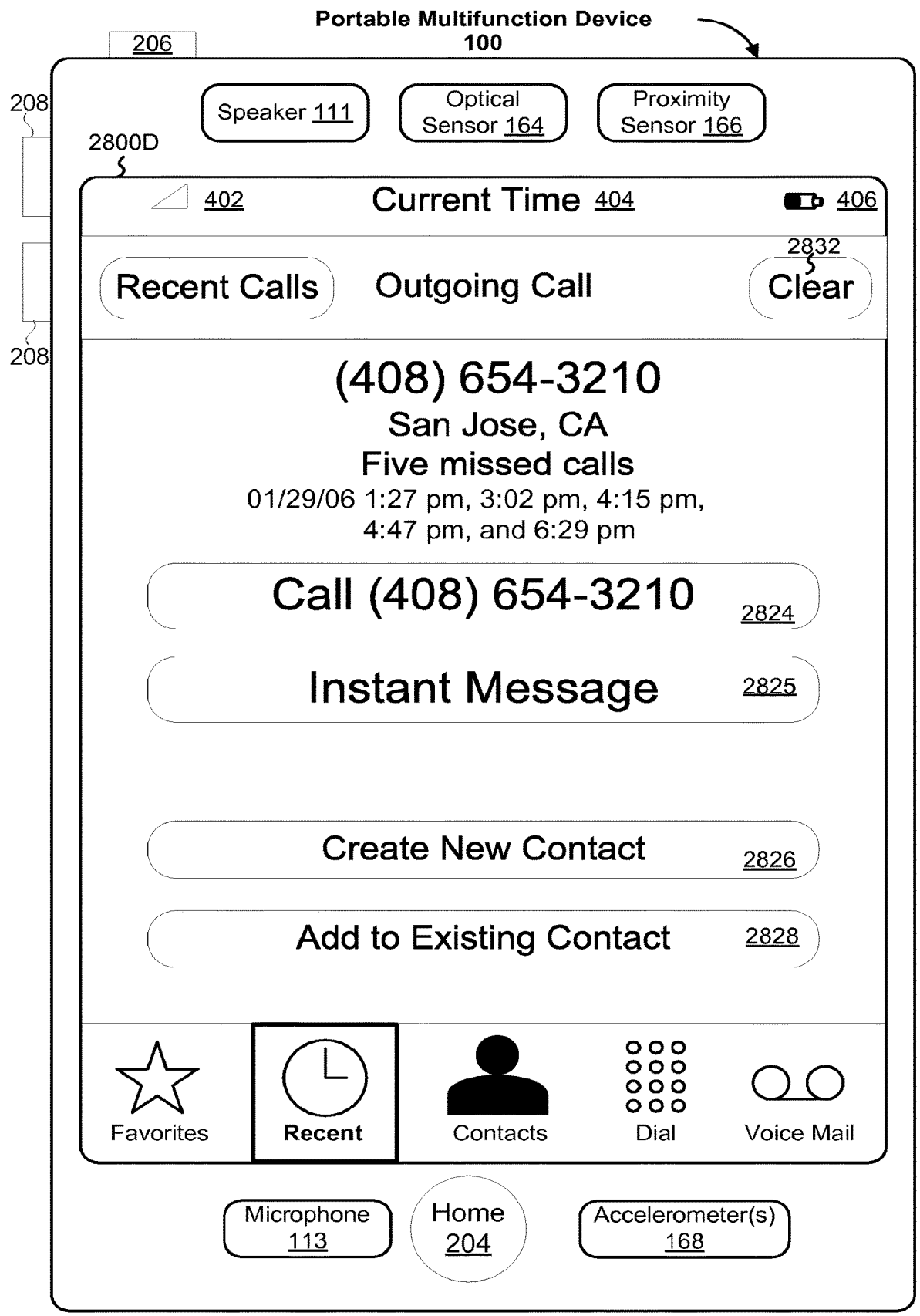
Figure 16A:
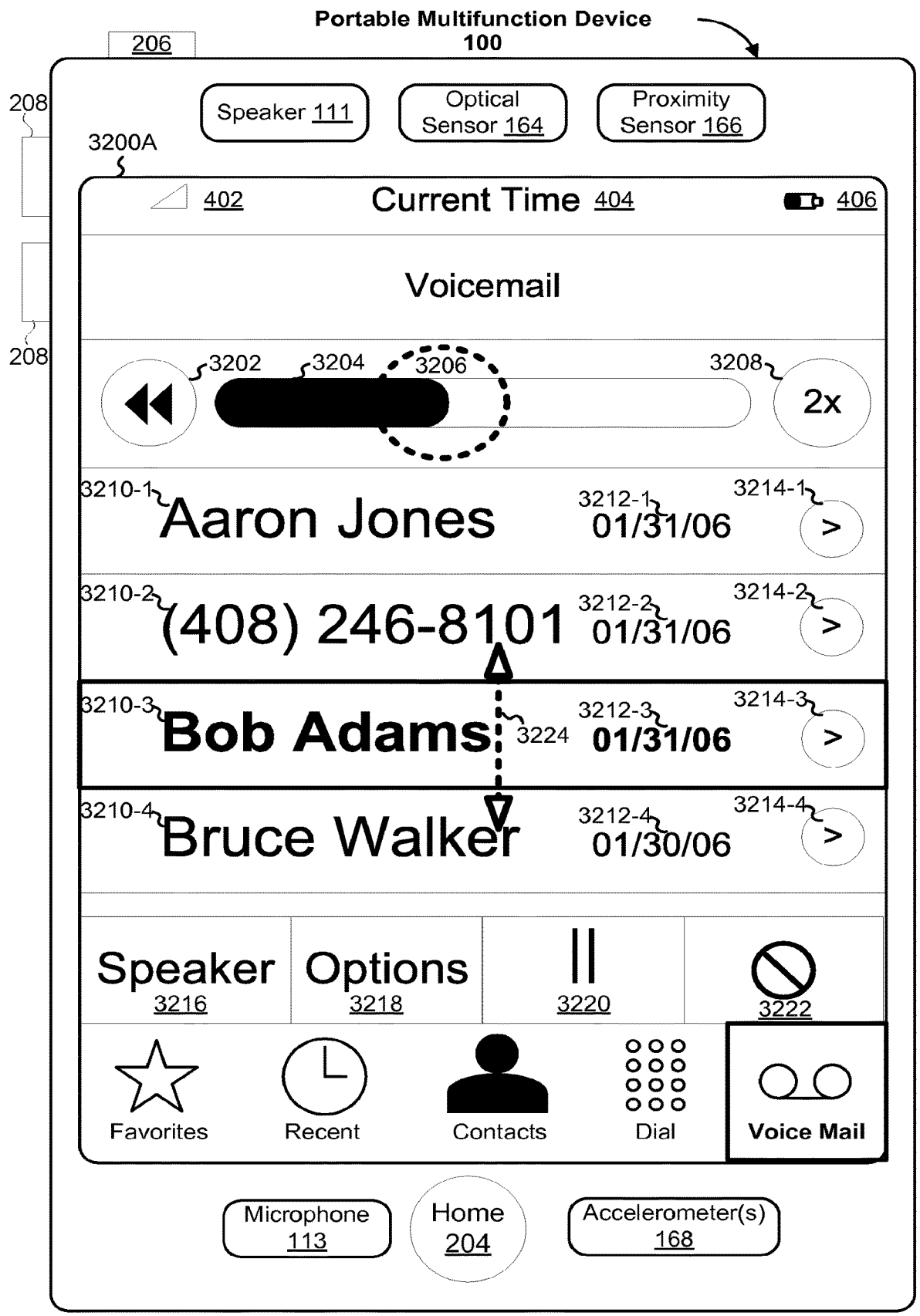
FIGS. 16A-16D illustrate exemplary user interfaces for voicemail in accordance with some embodiments.
Figure 16B:
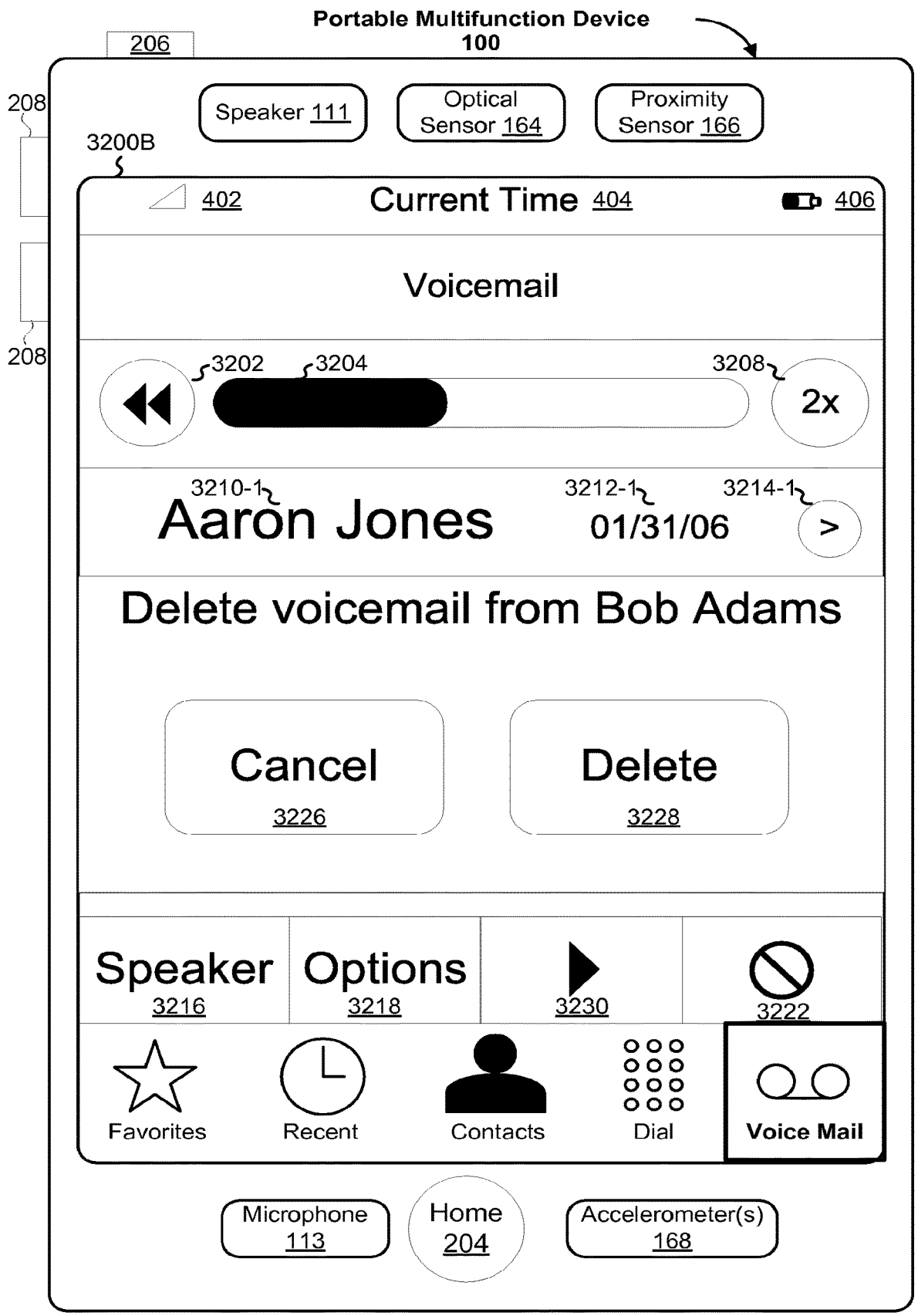
Figure 16C:
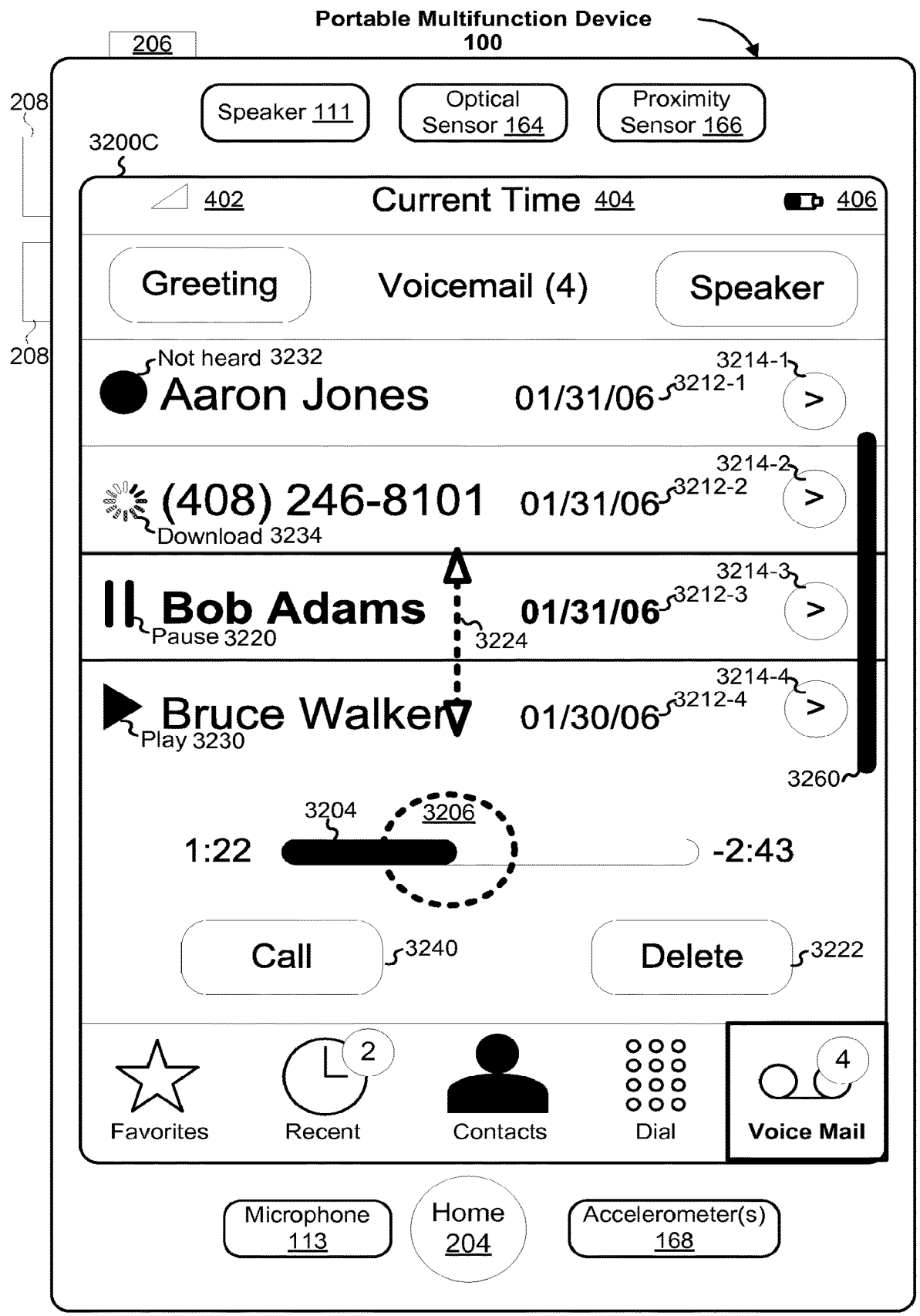
Figure 16D:
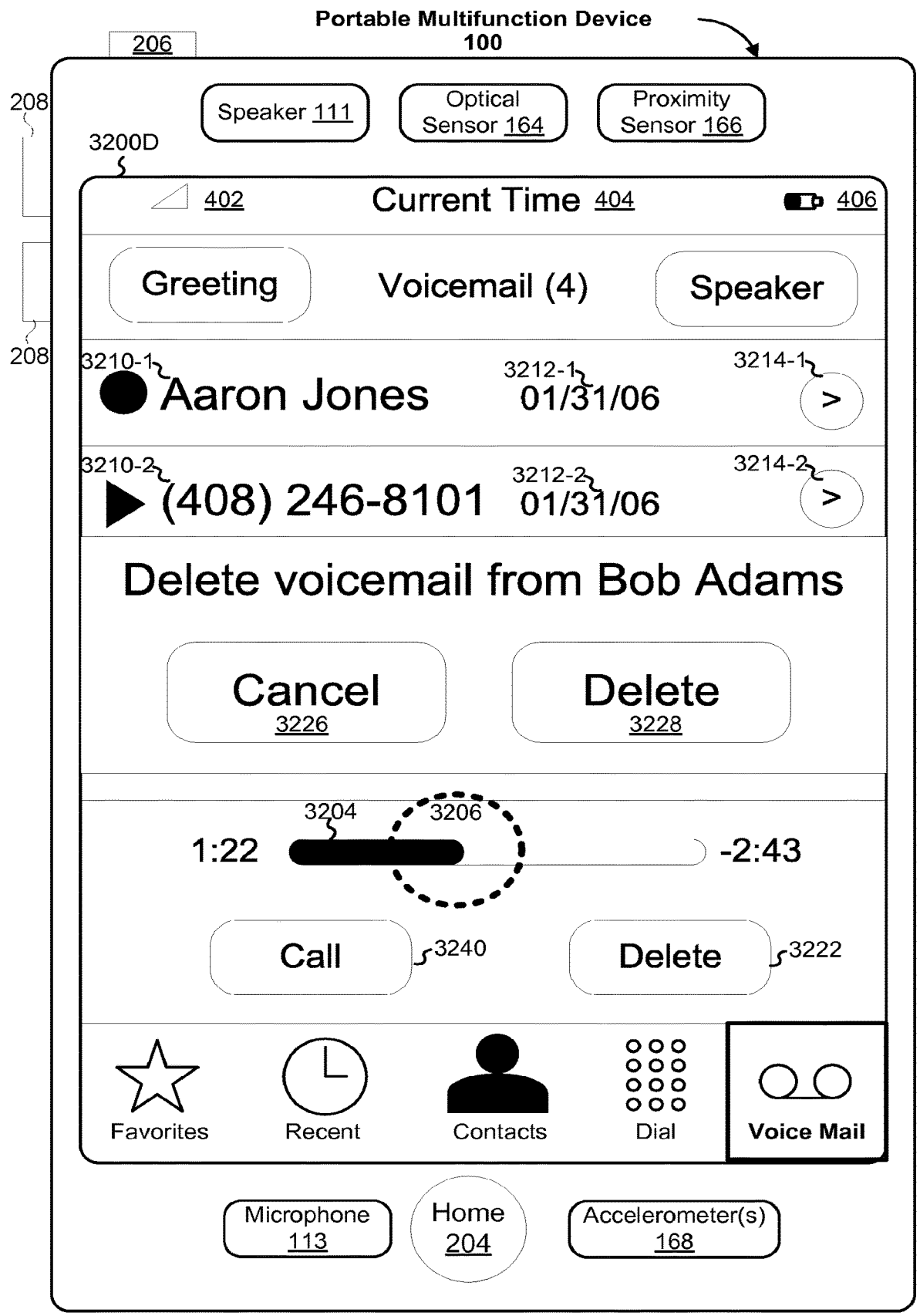

FIGS. 16A-16D illustrate exemplary user interfaces for voicemail in accordance with some embodiments. In some embodiments, user interfaces 3200A-3200D (FIGS. 16A-16D) include the following elements, or a subset or superset thereof:

402, 404, and 406, as described above;

backup icon 3202 that when activated (e.g., by a finger tap on the icon) initiates a process that backs up and replays the preceding few seconds of the voicemail message;

Progress bar 3204 that indicates what fraction of a voicemail message has been played and that may be used to help scroll through the message in response to a user gesture 3206;

Speed up icon 3208 that when activated (e.g., by a finger tap on the icon) initiates a process that speeds up playback of the voicemail message, which may also adjust the sound frequency or pitch of the fast playback so that the words, although spoken quickly, are still easy to understand;

Names 3210 of the people (associated with incoming phone numbers via the user's contact list) who have left voicemail messages (e.g., Aaron Jones 3210-1) or the phone number if the person's name is not available (e.g., 408-246-8101 3210-2);

Date 3212 and/or time of the voicemail;

Additional information icon 3214 that when activated (e.g., by a finger tap on the icon) initiates transition to the corresponding contact list entry (e.g., UI 2800C, FIG. 15C) or to a UI for unknown phone numbers (e.g., UI 2800D, FIG. 15D);

Speaker icon 3216 that when activated (e.g., by a finger tap on the icon) initiates playback of the voicemail through a speaker;

Options icon 3218 that when activated (e.g., by a finger tap on the icon) initiates display of a menu of additional voicemail options;

Pause icon 3220 that when activated (e.g., by a finger tap on the icon) initiates pausing of the voicemail, which may be displayed apart from individual messages (FIG. 16A) or adjacent to a selected message (FIG. 16C);

Delete symbol icon 3222 that when activated (e.g., by a finger tap on the icon) initiates display of a UI to confirm that the user wants to delete the corresponding voicemail (e.g. UI 3200B, FIG. 16B or UI 3200D, FIG. 16D).

Cancel icon 3226 that when activated (e.g., by a finger tap on the icon) changes the display from UI 3200B to UI 3200A (or from UI 3200D to UI 3200C) without deleting the corresponding voicemail;

Confirm delete icon 3228 that when activated (e.g., by a finger tap on the icon) deletes the corresponding voicemail and changes the display from UI 3200B to UI 3200A (or from UI 3200D to UI 3200C);

Play icon 3230 that when activated (e.g., by a finger tap on the icon) initiates or continues playback of the voicemail, which may be displayed apart from individual messages (FIG. 16B) or adjacent to a selected message (FIG. 16C);

Not heard icon 3232 that indicates that the corresponding voicemail has not been heard;

Downloading icon 3234 that indicates that the corresponding voicemail is being downloaded to the device 100; and Call icon 3240 that when activated (e.g., by a finger tap on the icon) initiates a call to the phone number associated with the selected voicemail.

If the list of voicemail messages fills more than the screen area, the user may scroll through the list using vertically upward and/or vertically downward gestures 3224 on the touch screen.

In some embodiments, a vertical bar 3260 (FIG. 16C), analogous to the vertical bars described above, is displayed on top of the list of voicemails that helps a user understand what portion of the list is being displayed.

In some embodiments, in response to a user tap or other predefined gesture in the row corresponding to a particular voicemail (but other than a tap or gesture on icon 3214), the phone module initiates playback of the corresponding voicemail. Thus, there is random access to the voicemails and the voicemails may be heard in any order.

In some embodiments, in response to a user gesture, the playback position in the voicemail can be modified. For example, in response to the user's finger touching 3206 at or near the end of the progress bar and then sliding along the progress bar, the playback position may be altered to correspond to the position of the user's finger along the progress bar. This user gesture on the progress bar makes it easy for a user to skip to and/or replay portions of interest in the voicemail message.

Figure 17:
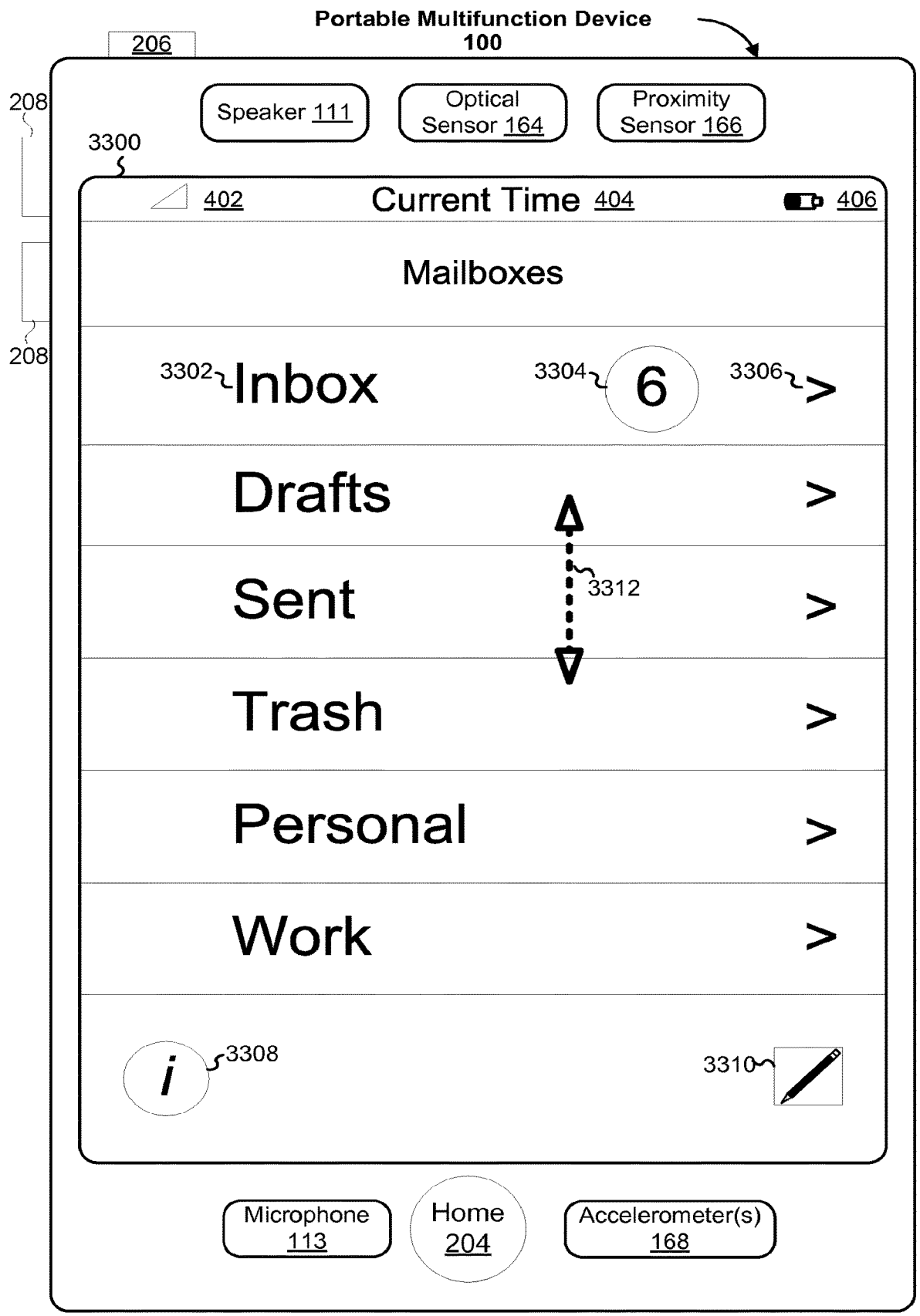
FIG. 17 illustrates an exemplary user interface for organizing and managing email in accordance with some embodiments.
Figure 18A:
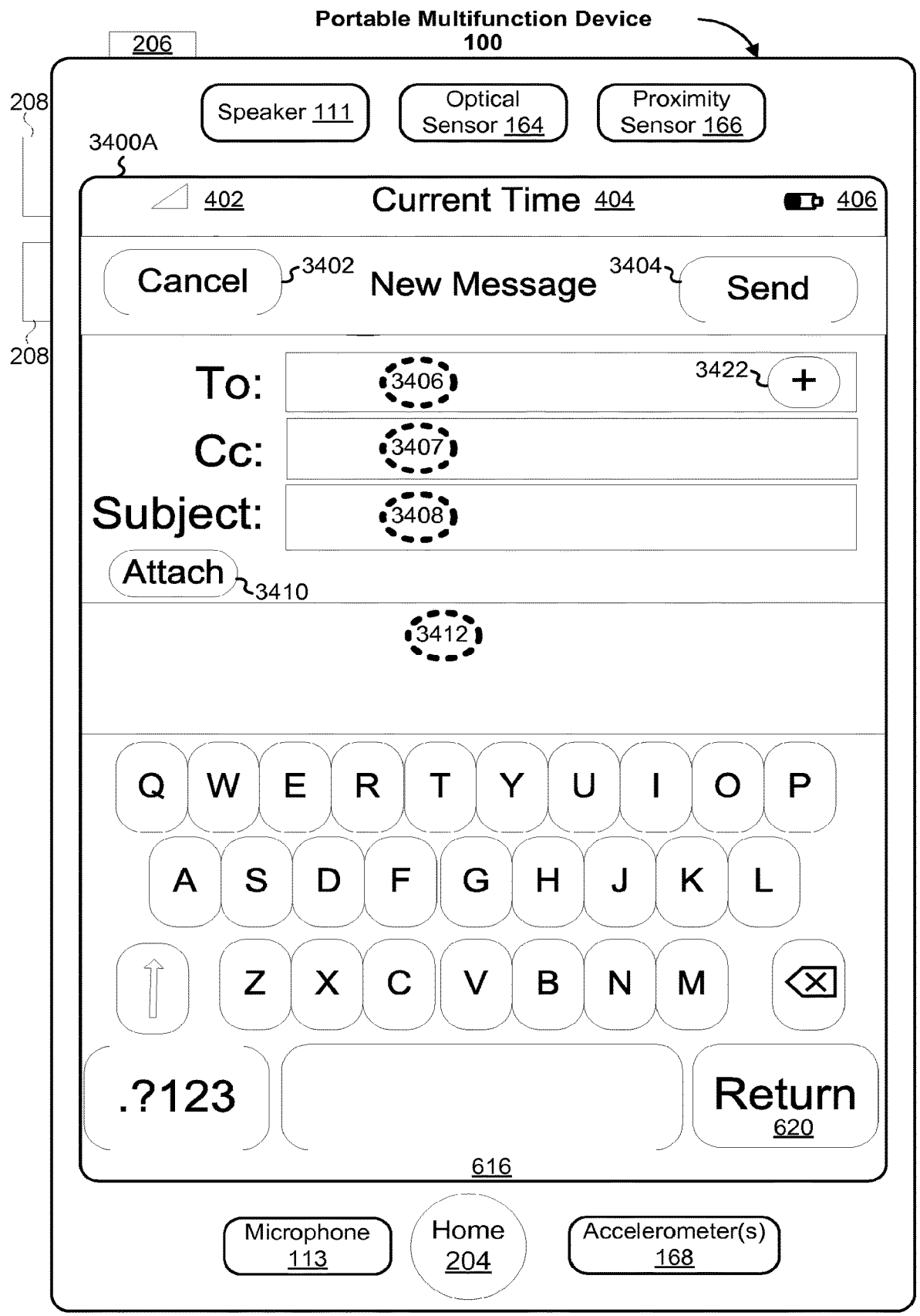
FIGS. 18A-18C illustrate an exemplary user interface for creating emails in accordance with some embodiments.

FIG. 17 illustrates an exemplary user interface for organizing and managing email in accordance with some embodiments. In some embodiments, user interface 3300 (FIG. 17) includes the following elements, or a subset or superset thereof:

402, 404, and 406, as described above;

a set of mailboxes, such as inbox 3302, which may be organized in rows with a selection icon 3306 for each row;

an unread messages icon 3304 that indicates the number of unread messages;

a settings icon 3308 that when activated (e.g., by a finger tap on the icon) initiates display of a UI to input mailbox settings; and a create email icon 3310 that when activated (e.g., by a finger tap on the icon) initiates display of a UI for creating a new email message (e.g. UI 3400A, FIG. 18A).

If the set of mailboxes fills more than the screen area, the user may scroll through the mailboxes using vertically upward and/or vertically downward gestures 3312 on the touch screen.

In some embodiments, a vertical bar, analogous to the vertical bars described above, is displayed on top of the list of mailboxes that helps a user understand what portion of the list is being displayed.

Figure 18B:
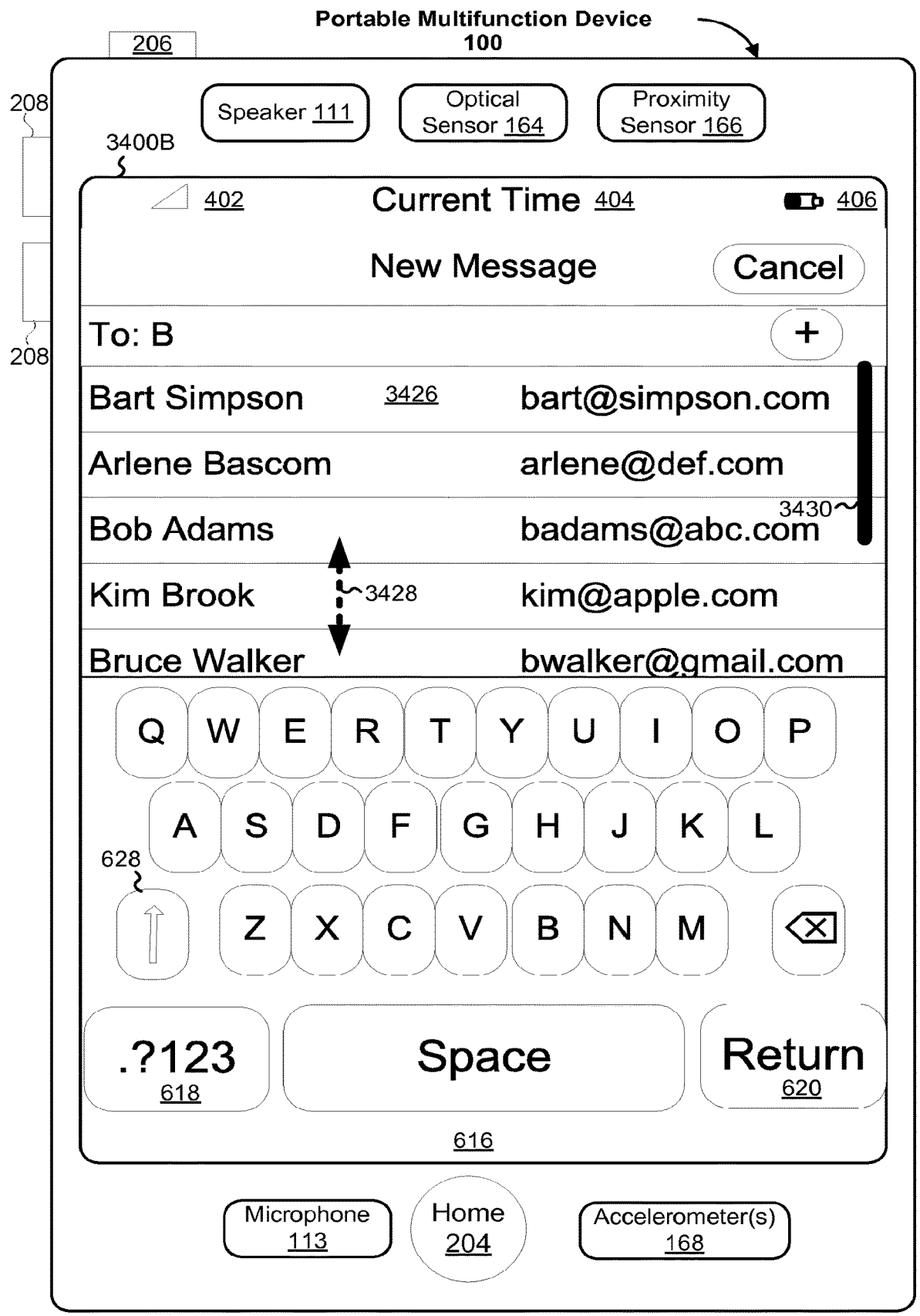
Figure 18C:
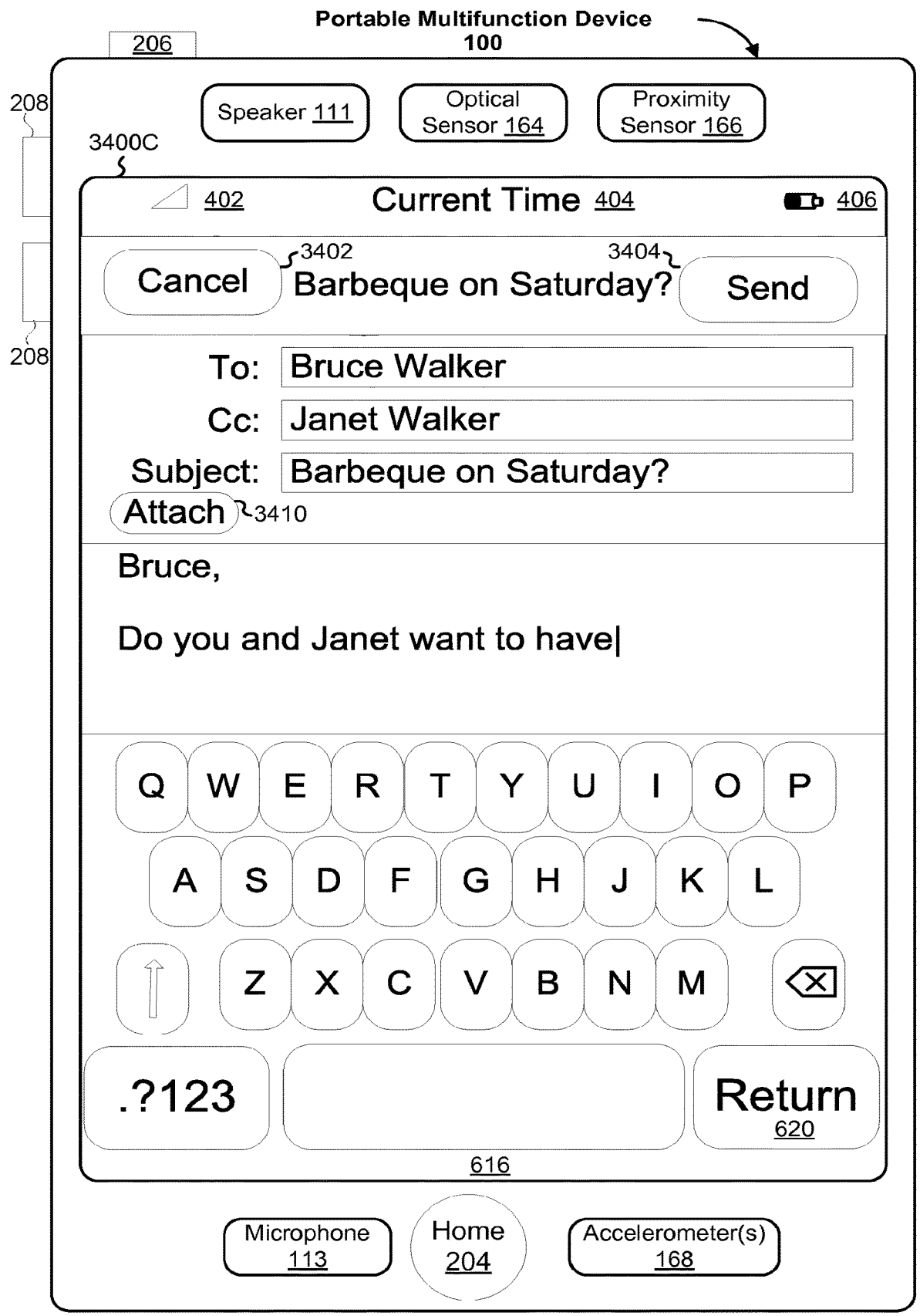

FIGS. 18A-18C illustrate an exemplary user interface for creating emails in accordance with some embodiments.

In response to the user activating create email icon 3310 (FIG. 17), the device displays UI 3400A (FIG. 18A).

In some embodiments, if the user makes a tap or other predefined gesture on the subject line 3408 or in the body of the email 3412 (FIG. 18A), a letter keyboard 616 appears and the user may input the subject and/or body text (FIG. 18C). In some embodiments, to enter the email address, the user makes a tap or other predefined gesture on the To: line 3406 of the email; the user's contact list appears; the user makes a tap or other predefined gesture on the desired recipient/contact; and the device places the corresponding email address in the email message (FIG. 18C). If others need to be copied on the email, the user makes a tap or other predefined gesture on the CC: line 3407 of the email; the user's contact list appears; the user makes a tap or other predefined gesture on the desired recipient/contact (e.g., tapping on Janet Walker in the contact list); and the device places the corresponding email address in the email message (FIG. 18C).

In some embodiments, to enter the email address, the user makes a tap or other predefined gesture on the To: line 3406 of the email (FIG. 18A). Add recipient icon 3422 appears, which when activated (e.g., by a finger tap on the icon 3422) initiates the display of a scrollable list of contacts (e.g., 3426, FIG. 18B) that match the input, if any, in the To: field. For example, if the letter "B" is input, then contacts with either a first name or last name beginning with "B" are shown. If the letters "Br" are input in the To: field, then the list of contacts is narrowed to contacts with either a first name or last name beginning with "Br", and so on until one of the displayed contacts is selected (e.g., by a tap on a contact in the list 3426). If others need to be copied on the email, the user makes a tap or other predefined gesture on the CC: line 3407 of the email and follows an analogous procedure to that used for inputting addresses in the To: field.

In some embodiments, a user can scroll through the list 3426 by applying a vertical swipe gesture 3428 to the area displaying the list 3426. In some embodiments, a vertically downward gesture scrolls the list downward and a vertically upward gesture scrolls the list upward, In some embodiments, a vertical bar 3430 (FIG. 18B) is displayed temporarily after an object is detected on or near the touch screen display (e.g., a finger touch is detected anywhere on the list 3426). In some embodiments, the vertical bar 3430 has a vertical position on top of the displayed portion of the list that corresponds to the vertical position in the list of the displayed portion of the list. In some embodiments, the vertical bar 3430 has a vertical length that corresponds to the portion of the list being displayed.

In some embodiments, the user may also enter the email address using one or more keyboards (e.g., 616 and 624, not shown).

The device sends the email message in response to the user activating the send icon 3404 (FIG. 18C) (e.g., by a finger tap on the icon). Alternatively, if the user activates the cancel icon 3402, the device may display a save draft icon and a don't save (or delete message) icon. The device saves the draft if the user activates the save draft icon 1810, e.g., in a drafts folder in mail client 140 (FIG. 17). The device deletes the draft if the user activates the don't save icon 1812.

In some embodiments, in response to the user activating the attach icon 3410 (e.g., by a finger tap on the icon), the touch screen displays a UI for adding attachments (not shown).

FIGS. 19A-19I illustrate exemplary user interfaces for displaying and managing an inbox in accordance with some embodiments. Analogous user interfaces may be used to display and manage the other mailboxes (e.g., drafts, sent, trash, personal, and/or work in UI 3300, FIG. 17). In some embodiments, user interfaces 3500A-3500I (FIGS. 19A-19I) include the following elements, or a subset or superset thereof:

- 402, 404, 406, and 3310, as described above;
- mailboxes icon 3502 that when activated (e.g., by a finger tap on the icon) initiates the display of mailbox UI 3300 (FIG. 17);
- unread messages icon 3504 that displays the number of unread messages in the inbox;
- names 3506 of the senders of the email messages;
- subject lines 3508 for the email messages;
- dates 3510 of the email messages;
- unread message icons 3512 that indicate messages that have not been opened;
- preview pane separator 3518 that separates the list of messages from a preview of a selected message in the list;
- settings icon 3520 that when activated (e.g., by a finger tap on the icon) initiates the display of a settings user interface;
- move message icon 3522 that when activated (e.g., by a finger tap on the icon) initiates the display of a move message user interface;
- Delete symbol icon 3524 that when activated (e.g., by a finger tap on the icon) initiates display of a UI to confirm that the user wants to delete the selected email (e.g. UI 3500E, FIG. 19E);
- Reply/Forward icon 3526 that when activated (e.g., by a finger tap on the icon) initiates display of a UI to select how to reply or forward the selected email (e.g. UI 3500F, FIG. 19F or UI 3500I, FIG. 19I);
- Preview pane 3528 that displays a portion of the selected email message;
- Details icon 3530 that when activated (e.g., by a finger tap on the icon) initiates display of email addressing details 3534 (FIG. 19C);
- Cancel icon 3540 that when activated (e.g., by a finger tap on the icon) returns the device to the previous user interface (e.g. UI 3500D, FIG. 19D);
- Confirm delete icon 3542 that when activated (e.g., by a finger tap on the icon) deletes the selected email;
- Reply icon 3544 that when activated (e.g., by a finger tap on the icon) initiates creation of an email replying to the sender;
- Reply All icon 3546 that when activated (e.g., by a finger tap on the icon) initiates creation of an email replying to the sender and the other parties included in the selected email (e.g., by cc:);
- Forward icon 3548 that when activated (e.g., by a finger tap on the icon) initiates creation of an email to be forwarded;
- Show preview pane icon 3550 that when activated (e.g., by a finger tap on the icon) initiates display of preview pane 3528;
- Don't show preview pane icon 3552 that when activated (e.g., by a finger tap on the icon) stops display of preview pane 3528;
- Vertical bar 3554 for the list of email messages that helps a user understand what portion of the list of email messages is being displayed;
- Vertical bar 3556 for the email message in the preview pane that helps a user understand what portion of the message is being displayed;
- Horizontal bar 3558 for the email message in the preview pane that helps a user understand what portion of the message is being displayed; and
- Refresh mailbox icon 3560 that when activated (e.g., by a finger tap on the icon) initiates downloading of new email messages, if any, from a remote server.

If the set of emails fill more than the screen area (or more than the screen area above the preview pane), the user may scroll through the emails using vertically upward and/or vertically downward gestures 3514 on the touch screen.

In some embodiments, vertical bar 3554 is displayed temporarily after an object is detected on or near the touch screen display (e.g., a finger touch is detected anywhere on the list of email messages). In some embodiments, the vertical bar 3554 has a vertical position on top of the displayed portion of the email list that corresponds to the vertical position in the list of the displayed portion of the list. In some embodiments, the vertical bar 3554 has a vertical length that corresponds to the portion of the email list being displayed. For example, in FIG. 19H, the vertical position of the vertical bar 3554 indicates that the middle of the email list is being displayed and the vertical length of the vertical bar 3554 indicates that roughly one third of the e-mail list is being displayed.

In some embodiments, the email subjects 3508 are not displayed if the preview pane 3528 is used. In some embodiments, the position of the preview pane separator can be adjusted by the user making contact 3516 at or near the preview pane separator and moving the separator to the desired location by dragging the finger contact 3538. In some embodiments, arrows 3539 or other graphics appear during the positioning of the preview pane separator (e.g., UI 3500D, FIG. 19D) to help guide the user.

In some embodiments, in response to a tap or other predefined gesture by the user in a row containing information (e.g., 3506, 3510, and/or 3508) about a particular email message, some or all of the text in the row is highlighted (e.g., by coloring, shading, or bolding) and the corresponding message is displayed in the preview pane area. In some embodiments, in response to a tap or other predefined gesture by the user in a row containing information (e.g., 3506, 3510, and/or 3508) about a particular email message, the email message is displayed on the full screen if the preview pane is not being used.

In some embodiments, if the selected email fills more than the preview pane area, the user may scroll through the email using two-dimensional gestures 3532 in the preview pane with vertical and/or horizontal movement of the email on the touch screen.

In some embodiments, vertical bar 3556 is displayed temporarily after an object is detected on or near the touch screen display (e.g., a finger touch is detected anywhere on the email message in the preview pane 3528). In some embodiments, the vertical bar 3556 has a vertical position on top of the displayed portion of the email message that corresponds to the vertical position in the email of the displayed portion of the email. In some embodiments, the vertical bar 3556 has a vertical length that corresponds to the portion of the email being displayed. For example, in FIG. 19H, the vertical position of the vertical bar 3556 indicates that the top of the email is being displayed and the vertical length of the vertical bar 3556 indicates that a portion from the top quarter of the email is being displayed.

In some embodiments, horizontal bar 3558 is displayed temporarily after an object is detected on or near the touch screen display (e.g., a finger touch is detected anywhere on the email message in the preview pane 3528). In some embodiments, the horizontal bar 3558 has a horizontal position on top of the displayed portion of the email that corresponds to the horizontal position in the email of the displayed portion of the email. In some embodiments, the horizontal bar 3558 has a horizontal length that corresponds to the portion of the email being displayed. For example, in FIG. 19H, the horizontal position of the horizontal bar 3558 indicates that a portion of the left side of the email is being displayed and the horizontal length of the horizontal bar 3558 indicates that a portion from the left half of the email is being displayed. Together, vertical bar 3556 and horizontal bar 3558 indicate that the northwest corner of the email message in the preview pane is being displayed.

Figure 19A:
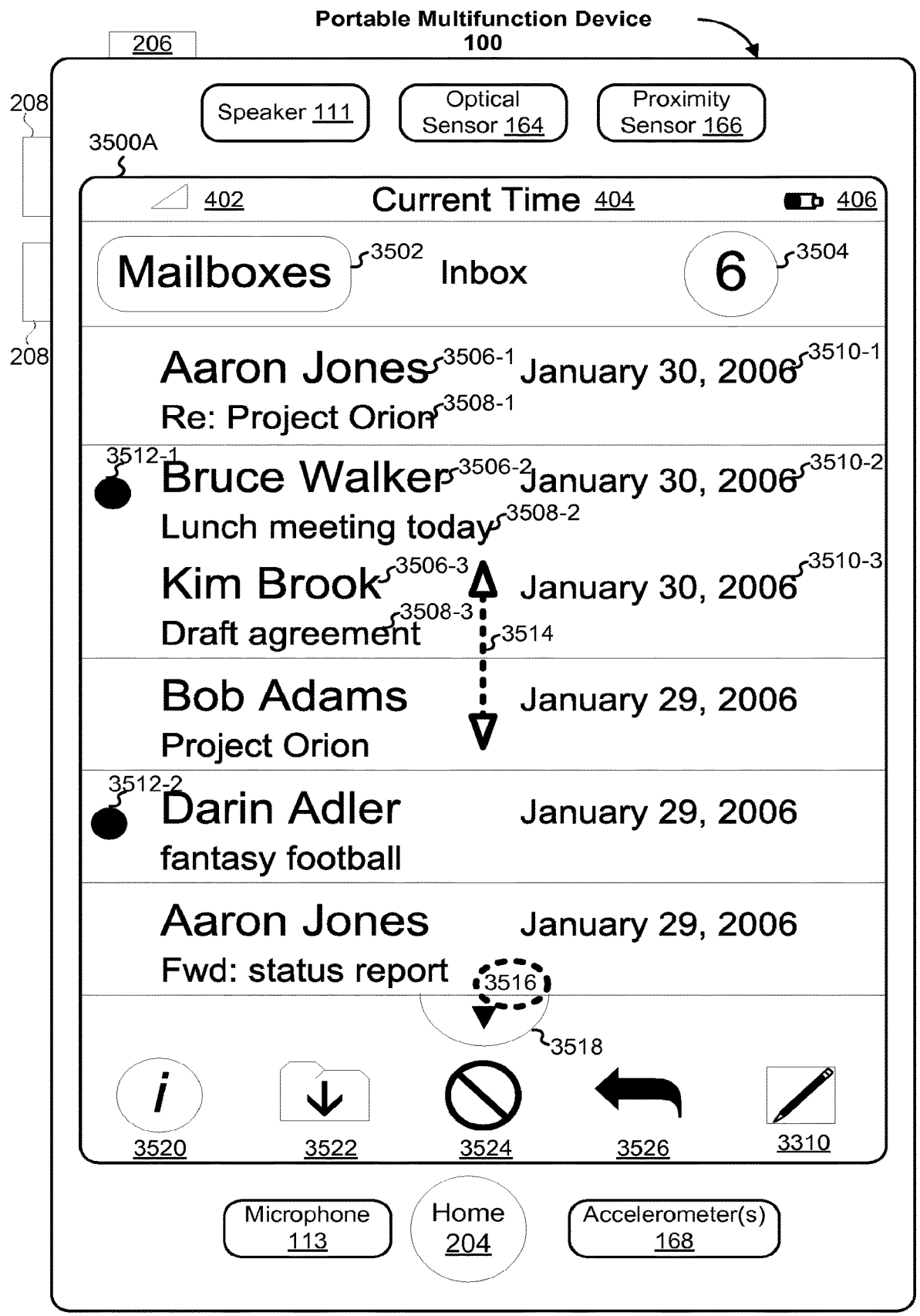
FIGS. 19A-19I illustrate exemplary user interfaces for displaying and managing an inbox in accordance with some embodiments.
Figure 19B:
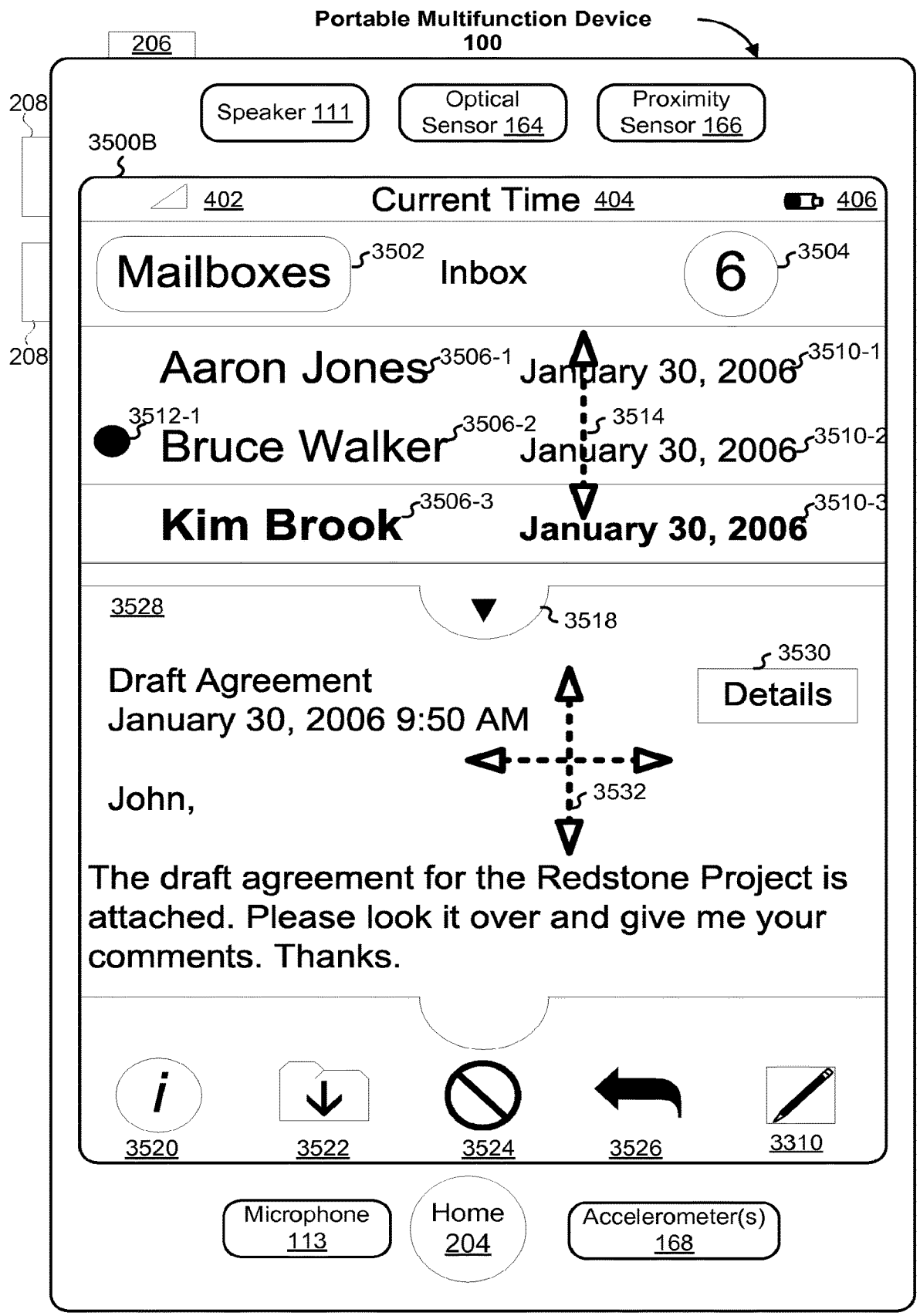
Figure 19C:
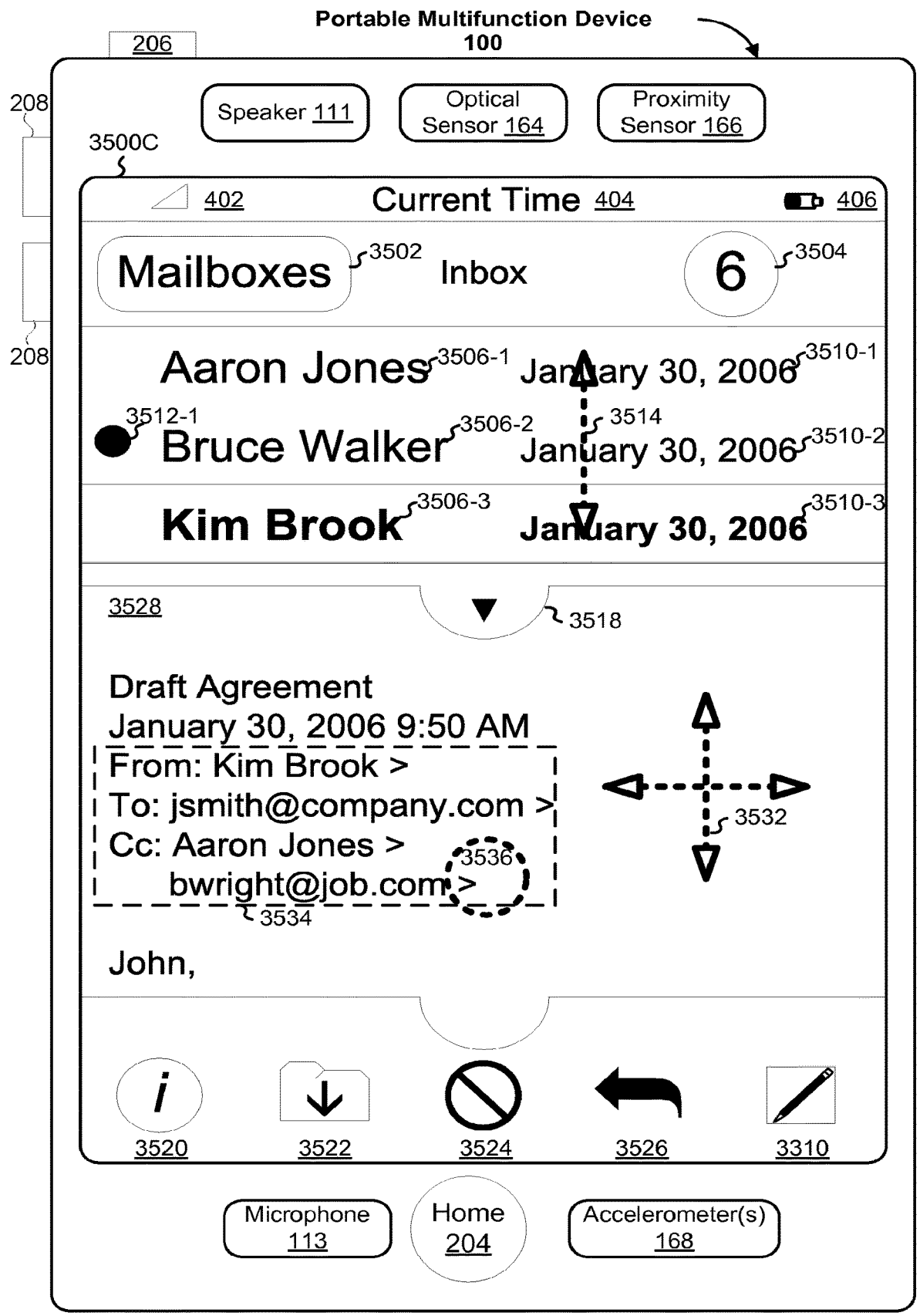
Figure 19D:
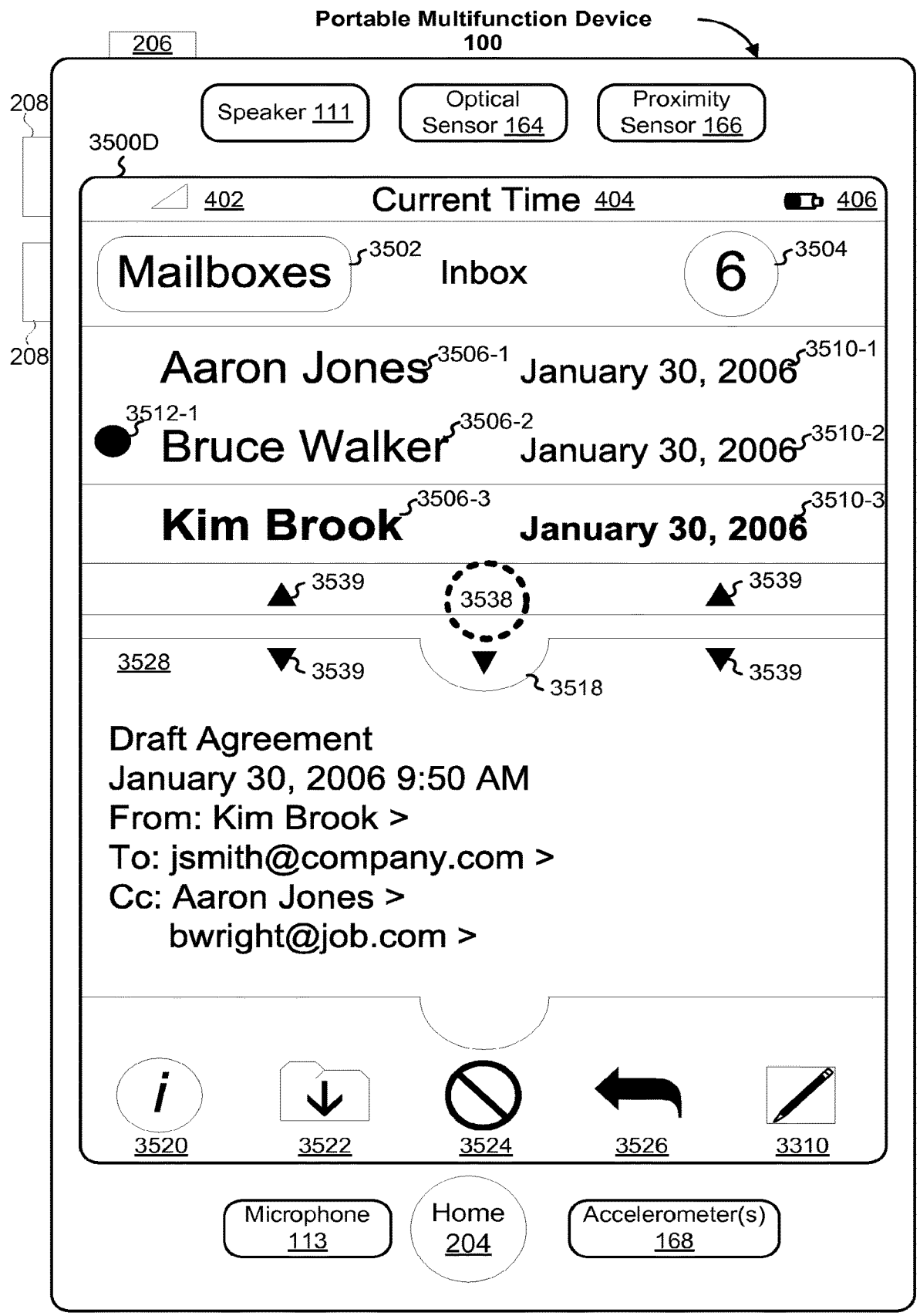
Figure 19E:
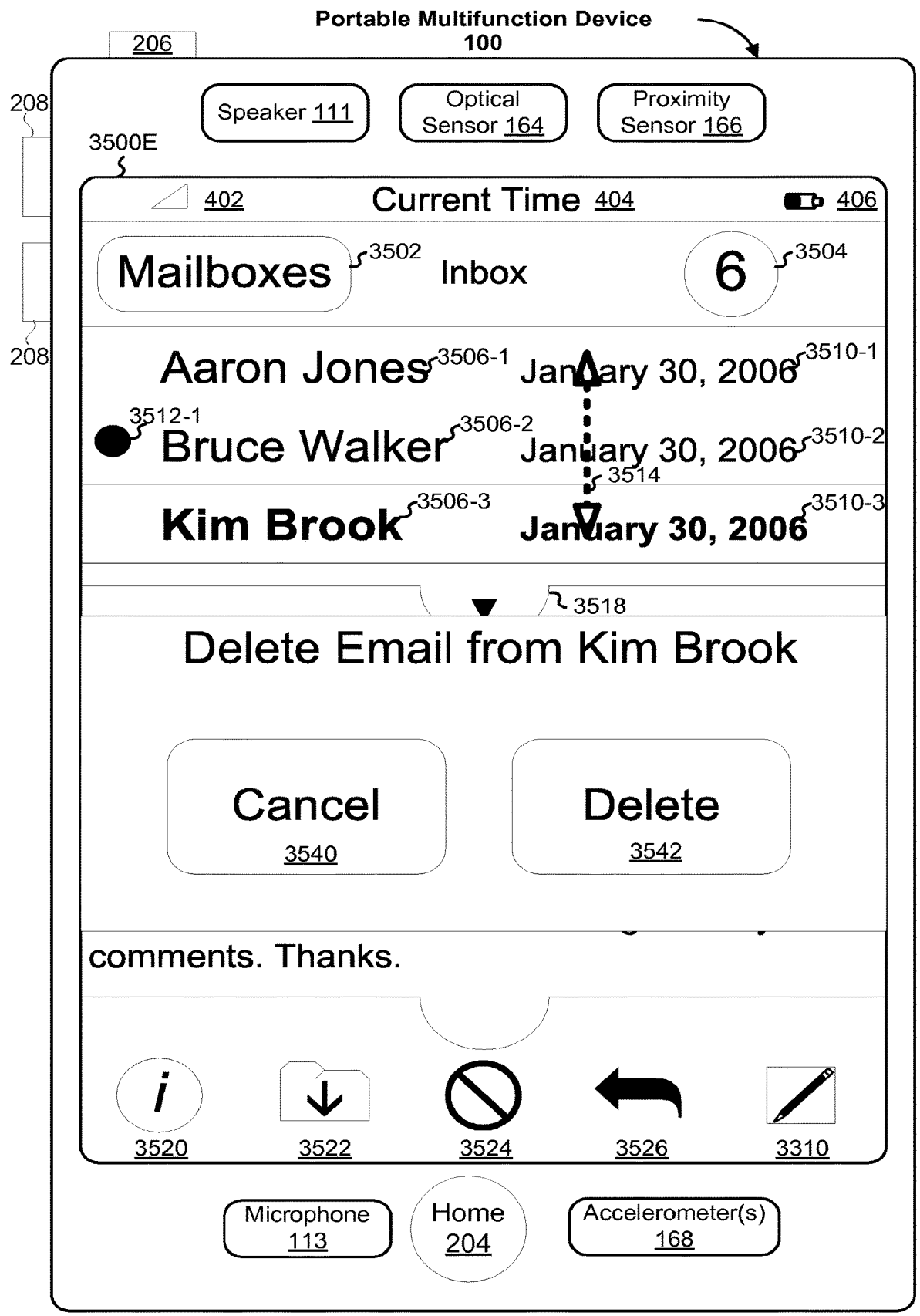
Figure 19F:
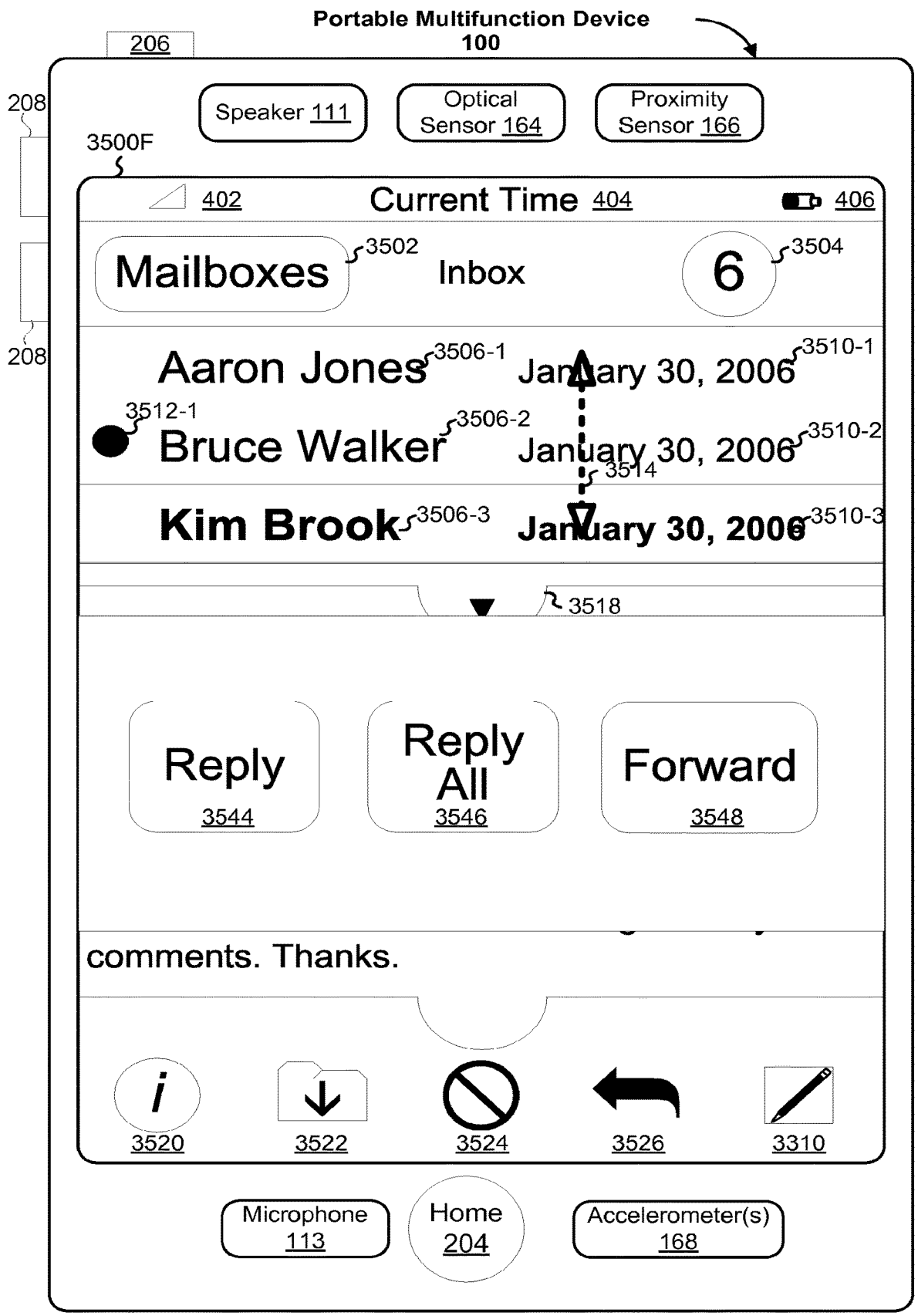

In some embodiments, an email is displayed such that only vertical scrolling is needed, in which case horizontal bar 3558 is not used In some embodiments, in response to user activation of an additional information icon (e.g., ">") on the detail information 3534 in FIG. 19C (e.g., by a finger tap 3536 on the icon), the touch screen may display contact list information for the corresponding party, if available (e.g., UI 2800C, FIG. 15C) or a UI analogous to UI 2800D, FIG. 15D.

Figure 19G:
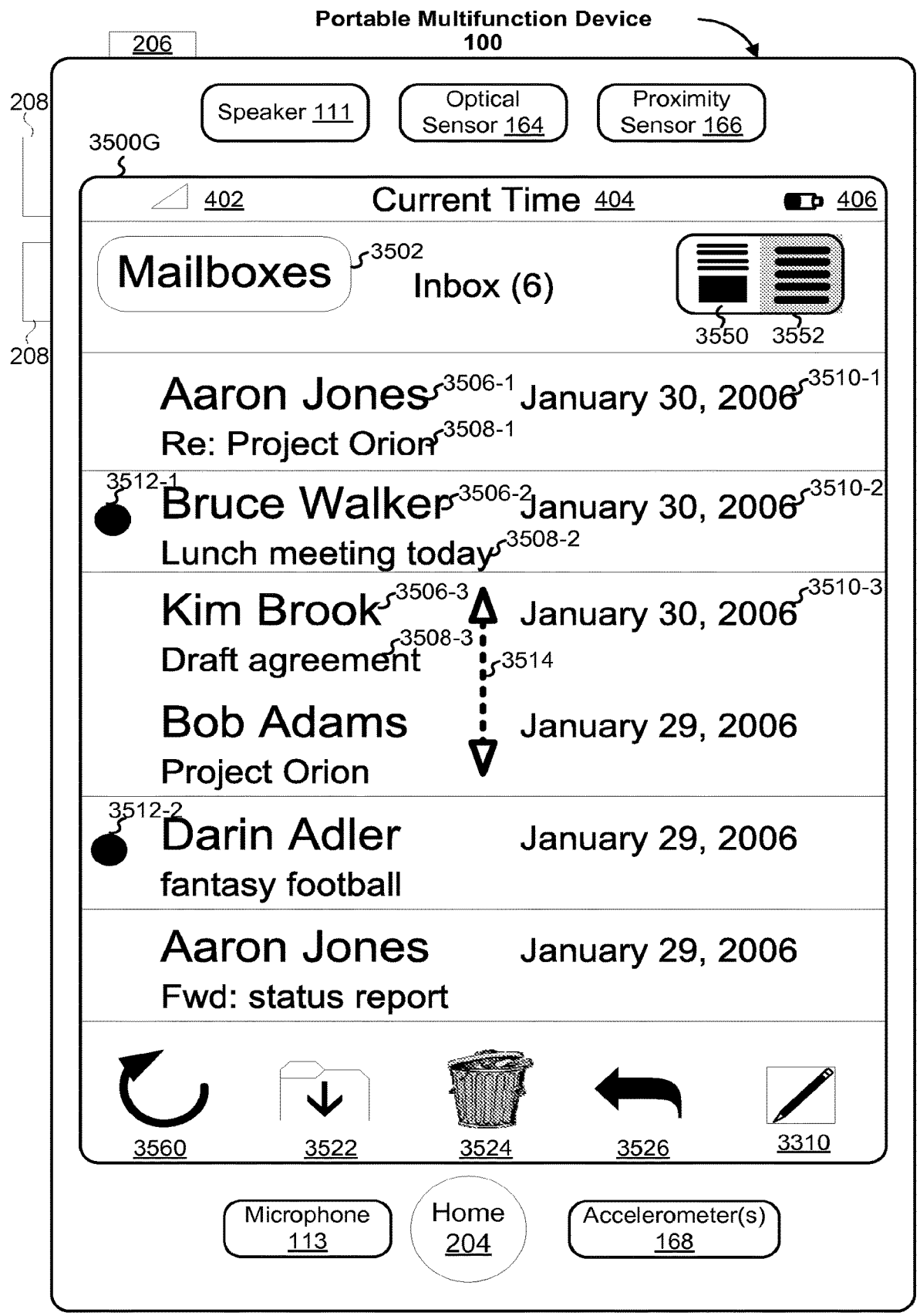
Figure 19H:
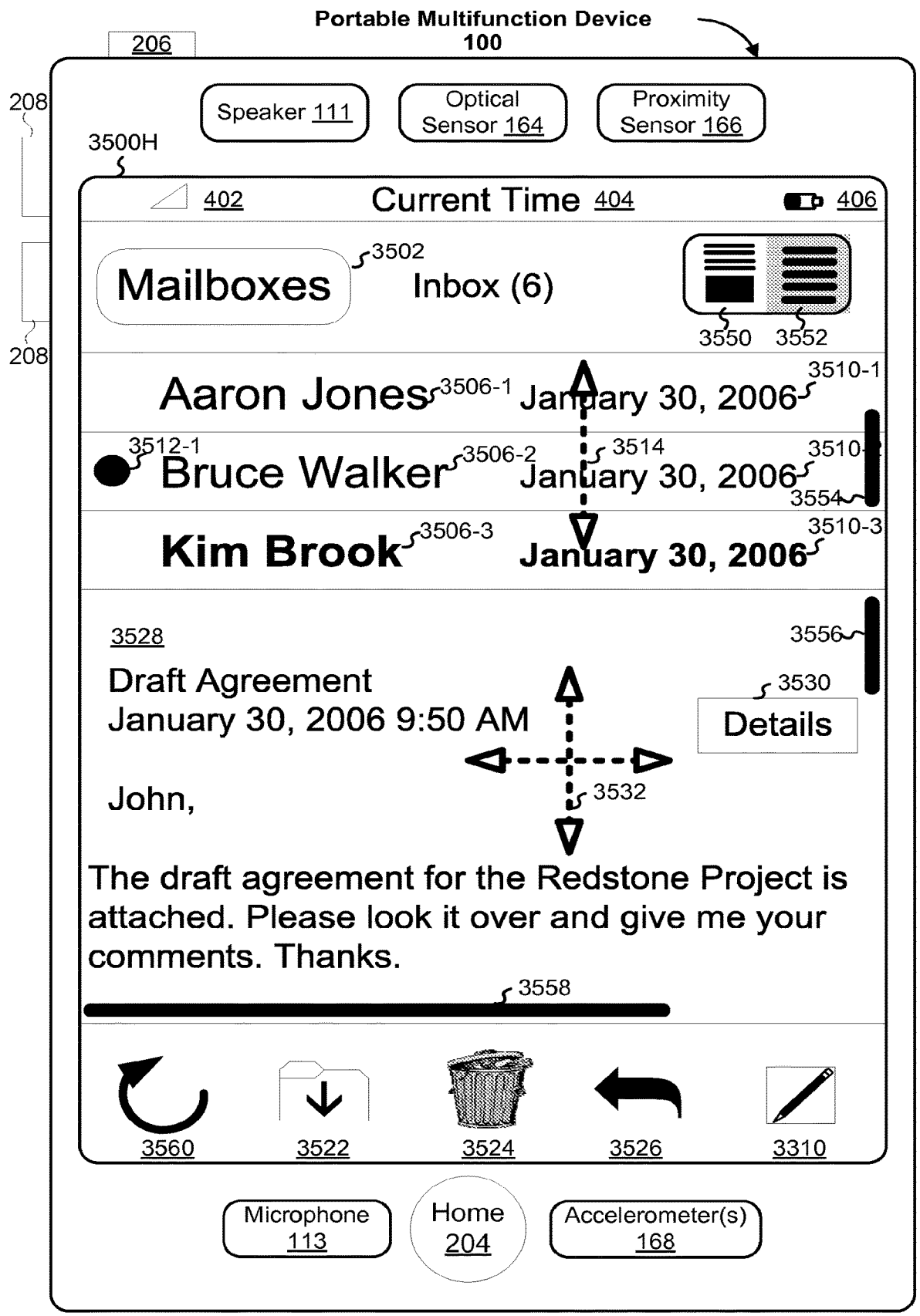
Figure 19I:
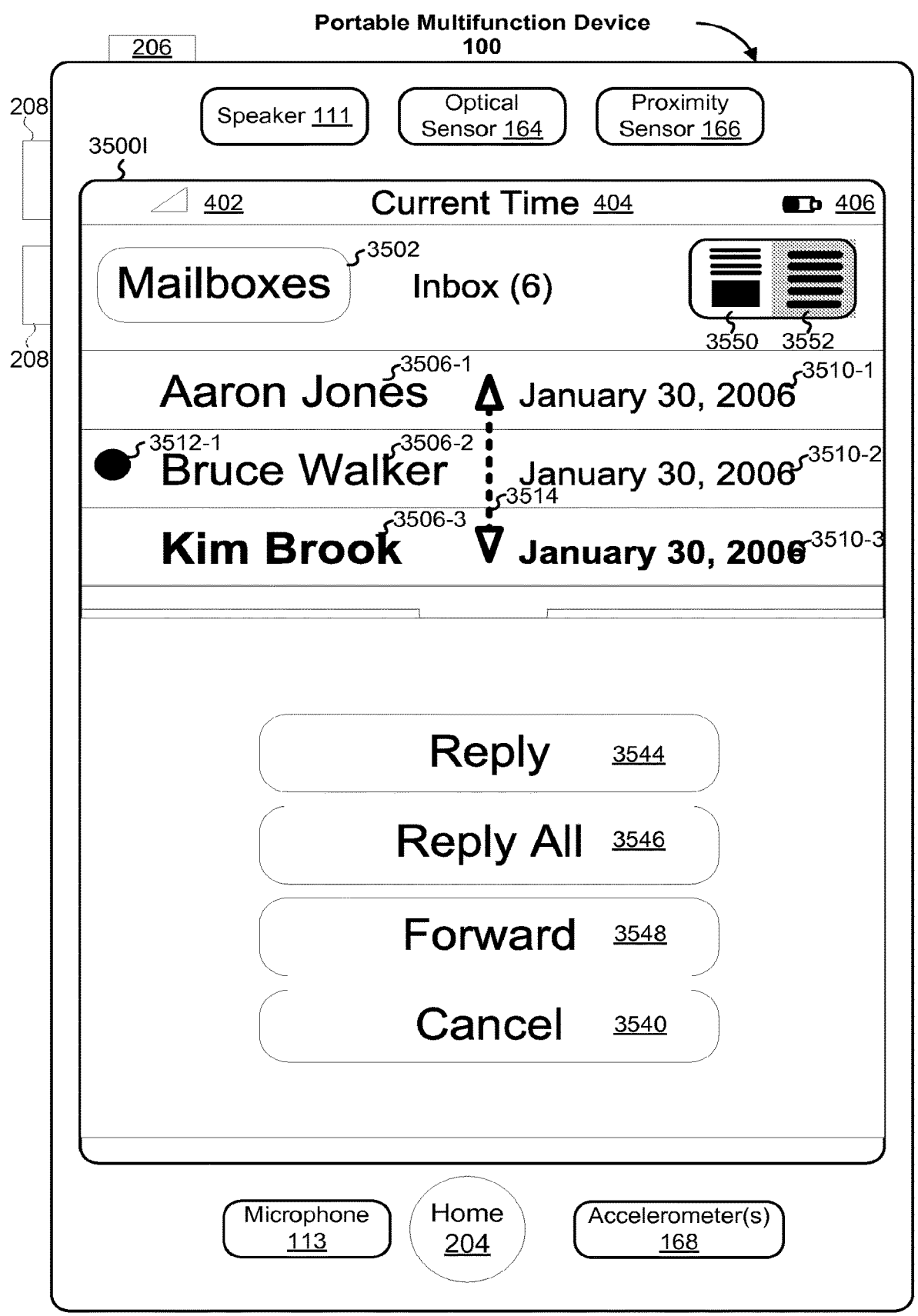
Figure 19J:
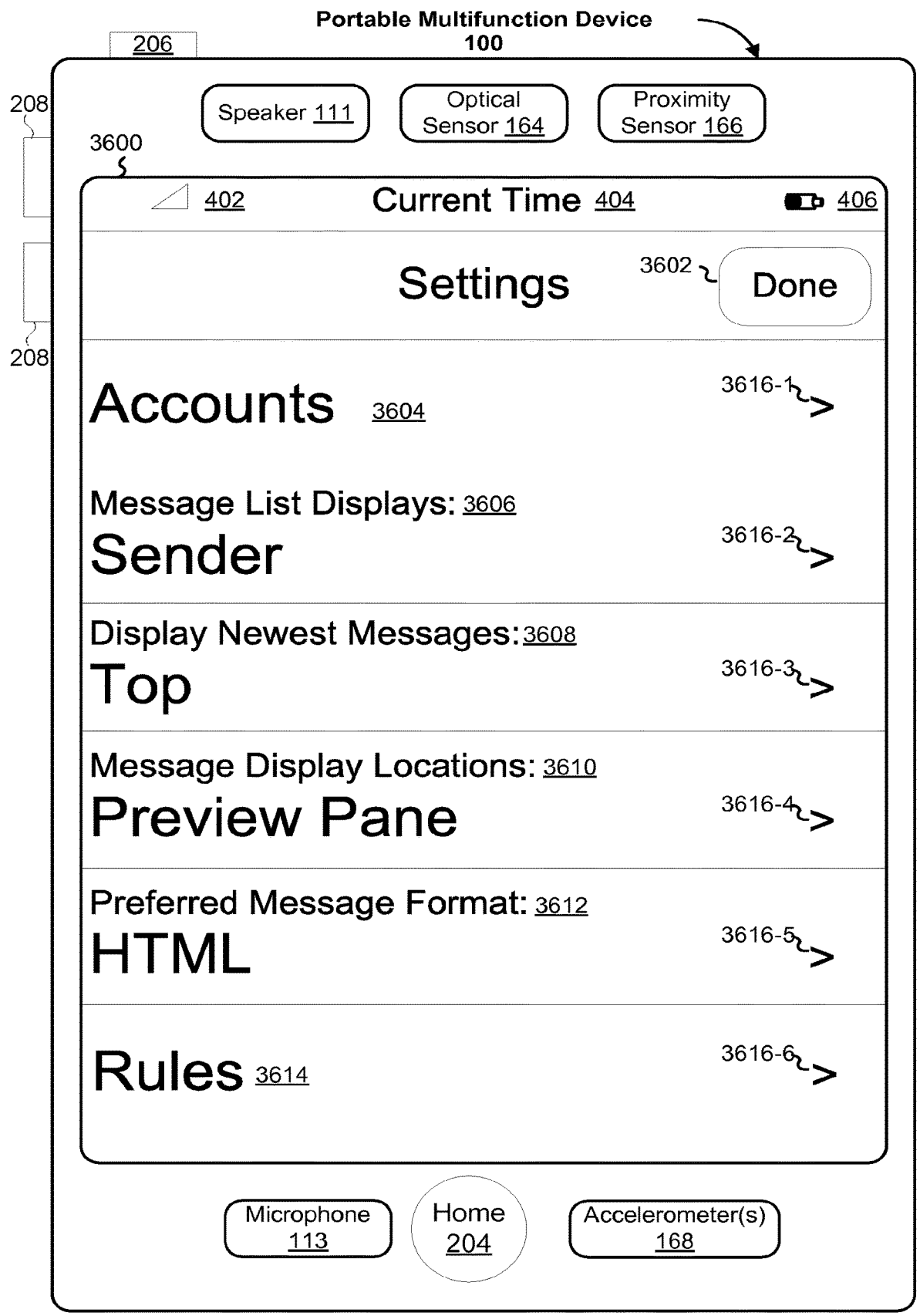
FIG. 19J illustrates an exemplary user interface for setting email user preferences in accordance with some embodiments.

FIG. 19J illustrates an exemplary user interface for setting email user preferences in accordance with some embodiments. In some embodiments, user interface 3600 (FIG. 19J) includes the following elements, or a subset or superset thereof:

- 402, 404, and 406, as described above;
- Done icon 3602 that when activated (e.g., by a finger tap on the icon) returns the device to the previous UI;
- Accounts 3604 for entering email account information;
- Message list displays 3606 for selecting whether sender 3506 and/or subject 3508 information is displayed in the emails lists;
- Display newest messages 3608 for selecting whether the newest messages are displayed at the top or bottom of the screen;
- Message display locations 3610 for selecting whether the messages are displayed in the preview pane or full screen;
- Preferred message format 3612 for selecting how the messages are formatted (e.g., HTML or plain text);
- Rules 3614 for creating rules for managing email messages;
- Selection icons 3616 that when activated (e.g., by a finger tap on the icon) show choices for the corresponding settings.

In some embodiments, a user may tap anywhere in the row for a particular setting to initiate display of the corresponding setting choices.

In some embodiments, the settings in FIG. 19J are incorporated into settings 412 (FIG. 4B) and settings icon 3520 need not be displayed in the email application 140 (e.g., FIG. 19G).

FIGS. 20A-20G illustrate exemplary user interfaces for a browser in accordance with some embodiments.

In some embodiments, user interfaces 3900A-3900G (FIGS. 20A-20G) include the following elements, or a subset or superset thereof:

- 402, 404, and 406, as described above;
- Previous page icon 3902 that when activated (e.g., by a finger tap on the icon) initiates display of the previous web page;
- Web page name 3904;
- Next page icon 3906 that when activated (e.g., by a finger tap on the icon) initiates display of the next web page;
- URL (Uniform Resource Locator) entry box 3908 for inputting URLs of web pages;
- Refresh icon 3910 that when activated (e.g., by a finger tap on the icon) initiates a refresh of the web page;
- Web page 3912 or other structured document, which is made of blocks 3914 of text content and other graphics (e.g., images and inline multimedia);
- Settings icon 3916 that when activated (e.g., by a finger tap on the icon) initiates display of a settings menu for the browser;
- Bookmarks icon 3918 that when activated (e.g., by a finger tap on the icon) initiates display of a bookmarks list or menu for the browser;
- Add bookmark icon 3920 that when activated (e.g., by a finger tap on the icon) initiates display of a UI for adding bookmarks;
- New window icon 3922 that when activated (e.g., by a finger tap on the icon) initiates display of a UI for adding new windows to the browser;
- Vertical bar 3962 (FIGS. 20F and 20G), analogous to the vertical bars described above, for the web page 3912 or other structured document that helps a user understand what portion of the web page 3912 or other structured document is being displayed;

Horizontal bar 3964 (FIGS. 20F and 20G), analogous to the horizontal bars described above, for the web page 3912 or other structured document that helps a user understand what portion of the web page 3912 or other structured document is being displayed;

In some embodiments, in response to a predefined gesture by the user on a block 3914 (e.g., a single tap gesture or a double tap gesture), the block is enlarged and centered (or substantially centered) in the web page display. For example, in response to a single tap gesture 3923 on block 3914-5, block 3914-5 may be enlarged and centered in the display, as shown in UI 3900C, FIG. 20C. In some embodiments, the width of the block is scaled to fill the touch screen display. In some embodiments, the width of the block is scaled to fill the touch screen display with a predefined amount of padding along the sides of the display. In some embodiments, a zooming animation of the block is displayed during enlargement of the block. Similarly, in response to a single tap gesture 3925 on block 3914-2, block 3914-2 may be enlarged with a zooming animation and two-dimensionally scrolled to the center of the display (not shown).

In some embodiments, the device analyzes the render tree of the web page 3912 to determine the blocks 3914 in the web page. In some embodiments, a block 3914 corresponds to a render node that is: replaced; a block; an inline block; or an inline table.

In some embodiments, in response to the same predefined gesture by the user on a block 3914 (e.g., a single tap gesture or a double tap gesture) that is already enlarged and centered, the enlargement and/or centering is substantially or completely reversed. For example, in response to a single tap gesture 3929 (FIG. 20C) on block 3914-5, the web page image may zoom out and return to UI 3900A, FIG. 20A.

In some embodiments, in response to a predefined gesture (e.g., a single tap gesture or a double tap gesture) by the user on a block 3914 that is already enlarged but not centered, the block is centered (or substantially centered) in the web page display. For example, in response to a single tap gesture 3927 (FIG. 20C) on block 3914-4, block 3914-4 may be centered (or substantially centered) in the web page display. Similarly, in response to a single tap gesture 3935 (FIG. 20C) on block 3914-6, block 3914-6 may be centered (or substantially centered) in the web page display. Thus, for a web page display that is already enlarged, in response to a predefined gesture, the device may display in an intuitive manner a series of blocks that the user wants to view. This same gesture may initiate different actions in different contexts (e.g., (1) zooming and/or enlarging in combination with scrolling when the web page is reduced in size, UI 3900A and (2) reversing the enlargement and/or centering if the block is already centered and enlarged).

In some embodiments, in response to a multi-touch 3931 and 3933 de-pinching gesture by the user (FIG. 20C), the web page may be enlarged. Conversely, in response to a multi-touch pinching gesture by the user, the web page may be reduced.

In some embodiments, in response to a substantially vertical upward (or downward) swipe gesture by the user, the web page (or, more generally, other electronic documents) may scroll one-dimensionally upward (or downward) in the vertical direction. For example, in response to an upward swipe gesture 3937 by the user that is within a predetermined angle (e.g., 27°) of being perfectly vertical, the web page may scroll one-dimensionally upward in the vertical direction.

Conversely, in some embodiments, in response to a swipe gesture that is not within a predetermined angle (e.g., 27°) of being perfectly vertical, the web page may scroll two-dimensionally (i.e., with simultaneous movement in both the vertical and horizontal directions). For example, in response to an upward swipe gesture 3939 (FIG. 20C) by the user that is not within a predetermined angle (e.g., 27°) of being perfectly vertical, the web page may scroll two-dimensionally along the direction of the swipe 3939.

In some embodiments, in response to a multi-touch 3941 and 3943 rotation gesture by the user (FIG. 20C), the web page may be rotated exactly 90° (UI 3900D, FIG. 20D) for landscape viewing, even if the amount of rotation in the multi-touch 3941 and 3943 rotation gesture is substantially different from 90°. Similarly, in response to a multi-touch 3945 and 3947 rotation gesture by the user (UI 3900D, FIG. 20D), the web page may be rotated exactly 90° for portrait viewing, even if the amount of rotation in the multi-touch 3945 and 3947 rotation gesture is substantially different from 90°.

Thus, in response to imprecise gestures by the user, precise movements of graphics occur. The device behaves in the manner desired by the user despite inaccurate input by the user. Also, note that the gestures described for UI 3900C, which has a portrait view, are also applicable to UIs with a landscape view (e.g., UI 3900D, FIG. 20D) so that the user can choose whichever view the user prefers for web browsing.

In some embodiments, a portable electronic device with a touch screen display (e.g., device 100) displays at least a portion of a structured electronic document on the touch screen display. The structured electronic document comprises a plurality of boxes of content (e.g., blocks 3914, FIG. 20A).

In some embodiments, the plurality of boxes are defined by a style sheet language. In some embodiments, the style sheet language is a cascading style sheet language. In some embodiments, the structured electronic document is a web page (e.g., web page 3912, FIG. 20A). In some embodiments, the structured electronic document is an HTML or XML document.

In some embodiments, displaying at least a portion of the structured electronic document comprises scaling the document width to fit within the touch screen display width independent of the document length.

Figure 20A:
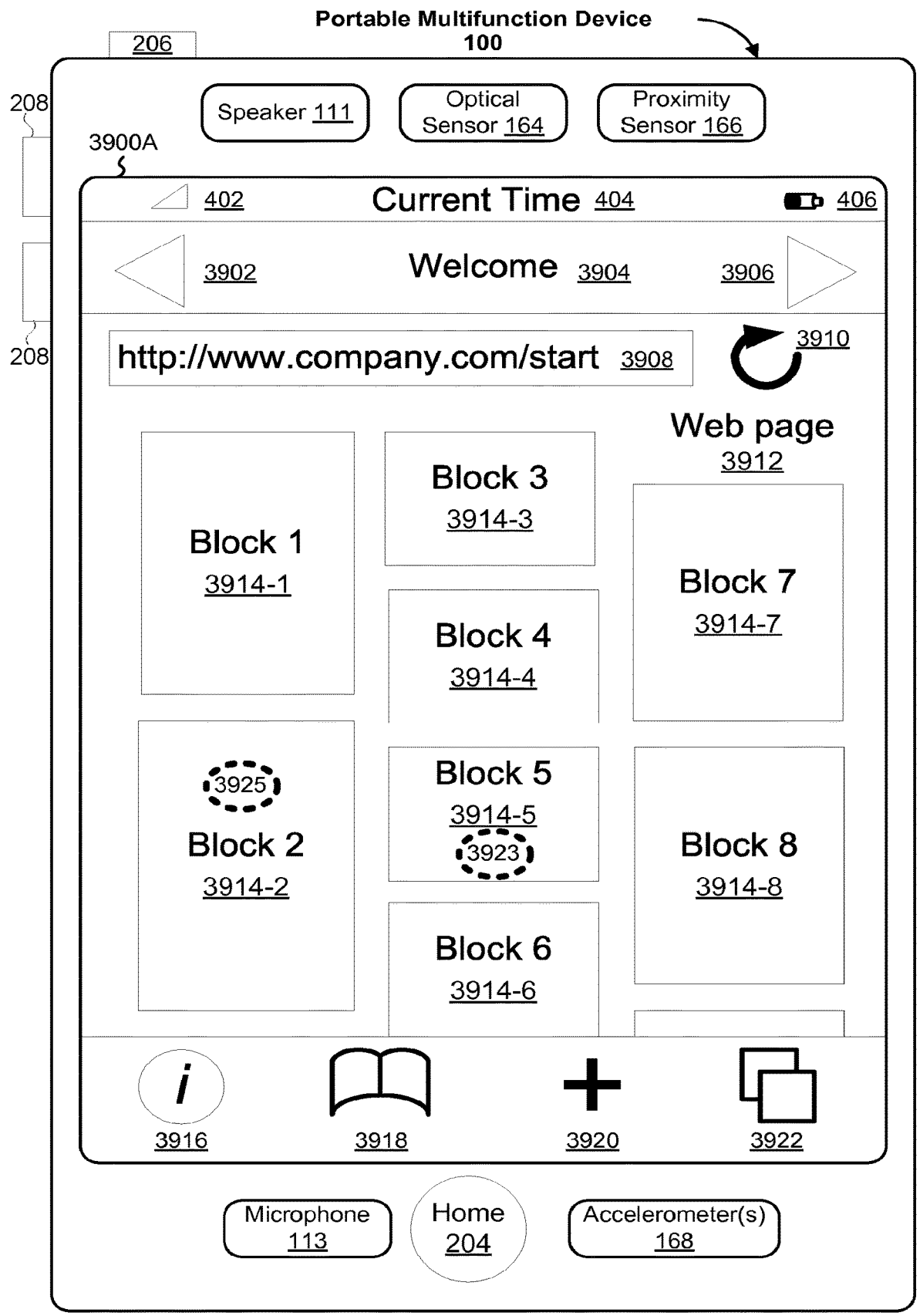
FIGS. 20A-20G illustrate exemplary user interfaces for a browser in accordance with some embodiments.
Figure 20B:
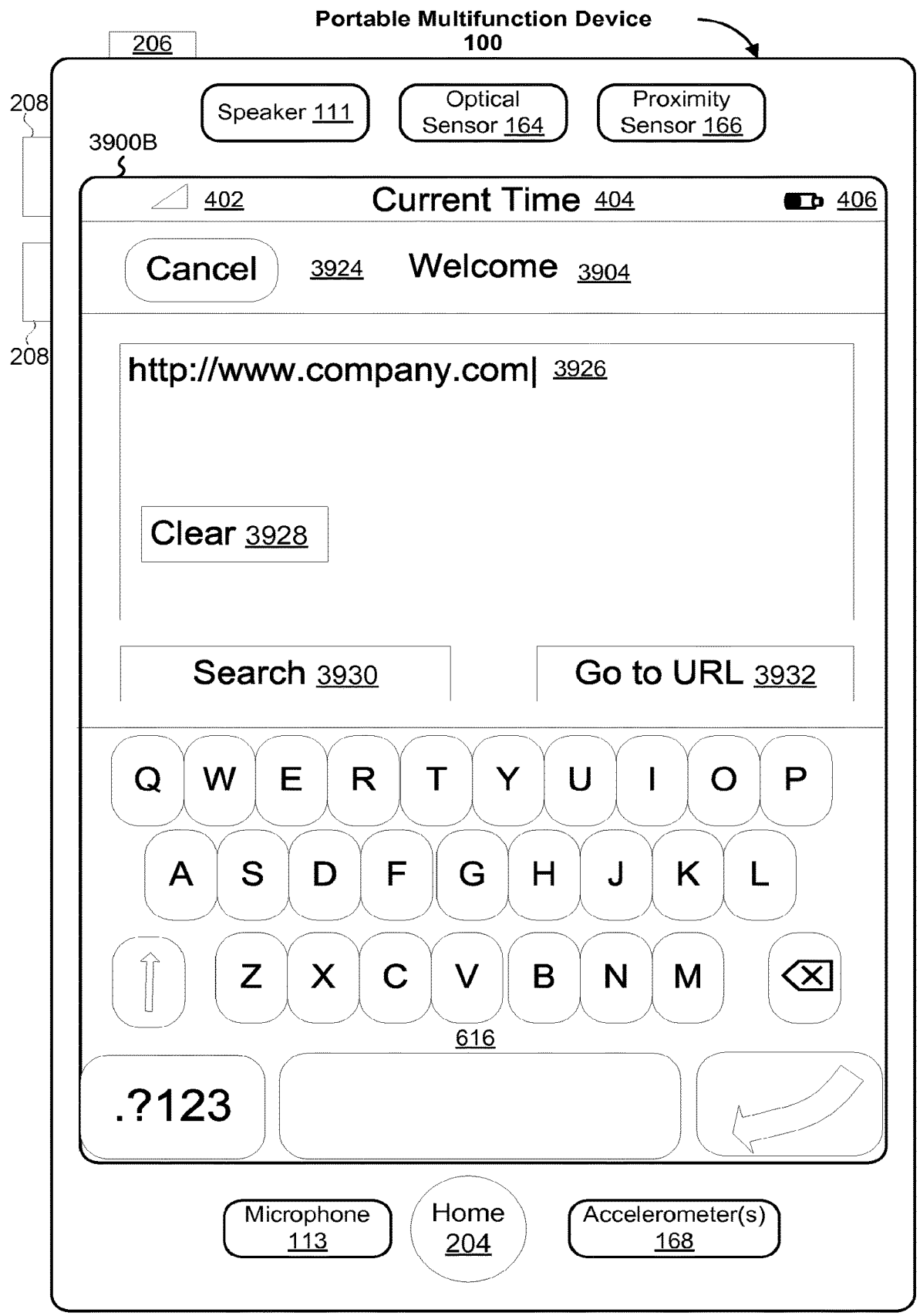
Figure 20C:
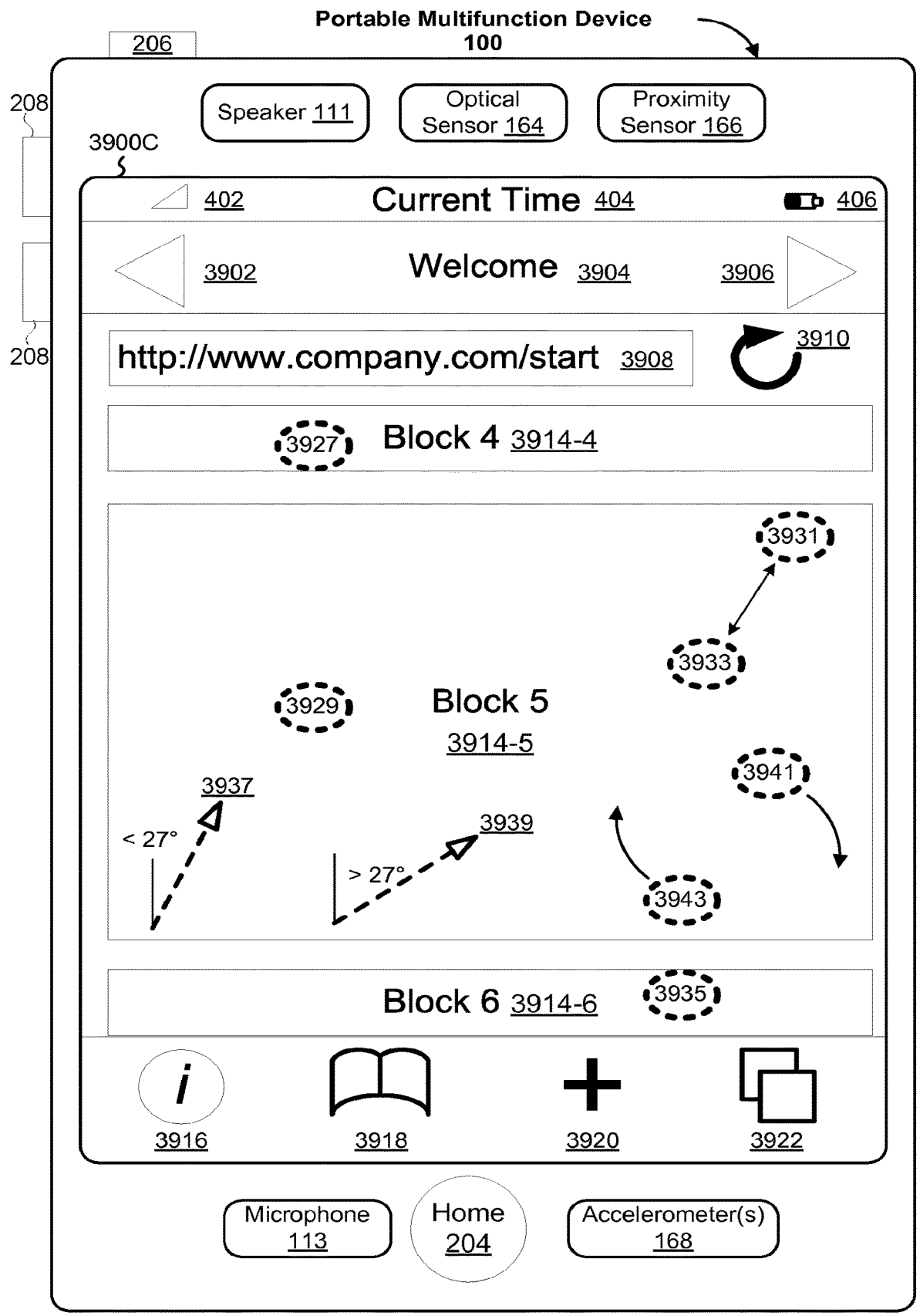
Figure 20D:
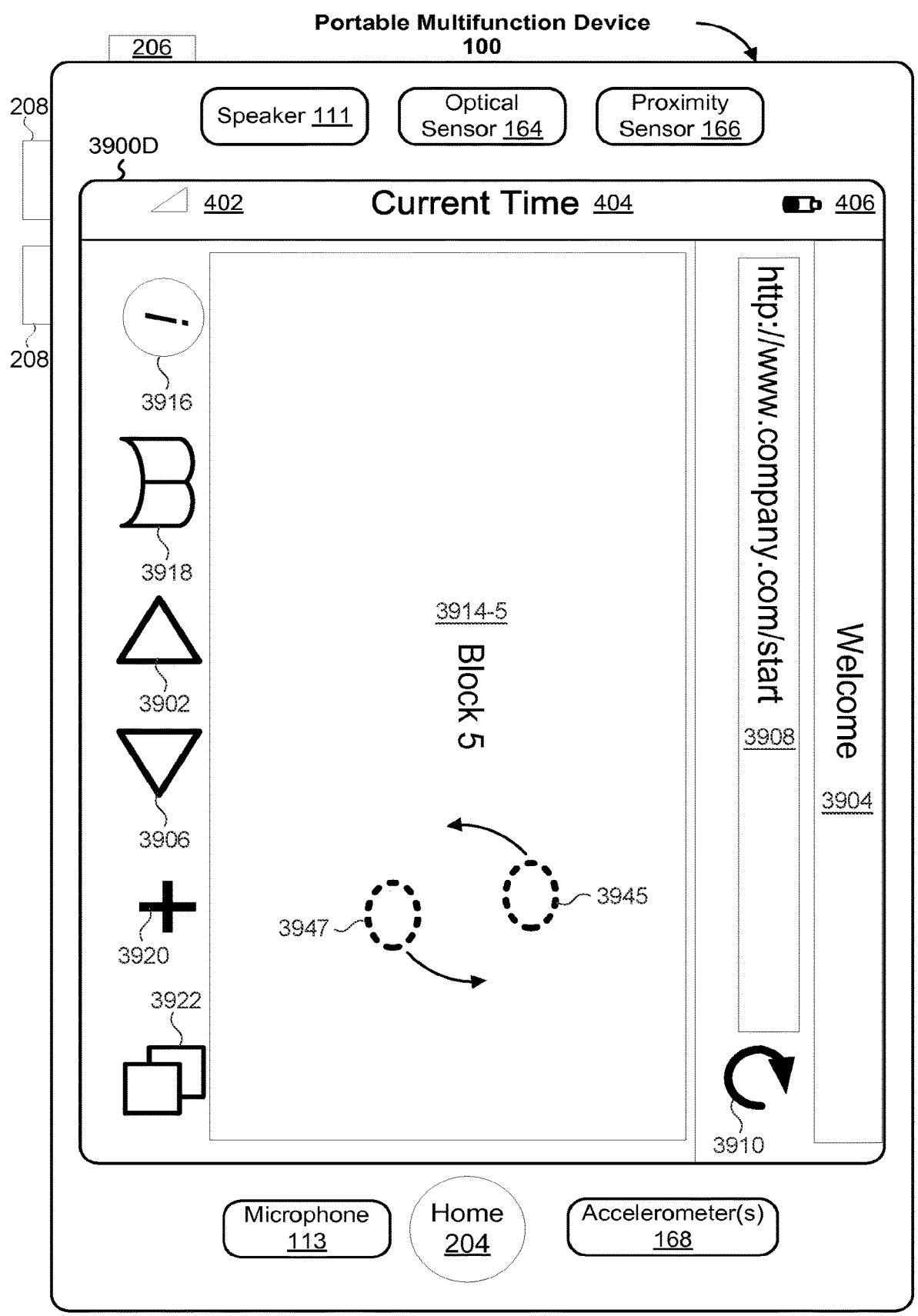

In some embodiments, the touch screen display is rectangular with a short axis and a long axis; the display width corresponds to the short axis when the structured electronic document is seen in portrait view (e.g., FIG. 20C); and the display width corresponds to the long axis when the structured electronic document is seen in landscape view (e.g., FIG. 20D).

In some embodiments, prior to displaying at least a portion of a structured electronic document, borders, margins, and/or paddings are determined for the plurality of boxes and adjusted for display on the touch screen display. In some embodiments, all boxes in the plurality of boxes are adjusted. In some embodiments, just the first box is adjusted. In some embodiments, just the first box and boxes adjacent to the first box are adjusted.

A first gesture is detected at a location on the displayed portion of the structured electronic document (e.g., gesture 3923, FIG. 20A). In some embodiments, the first gesture is a finger gesture. In some embodiments, the first gesture is a stylus gesture.

In some embodiments, the first gesture is a tap gesture. In some embodiments, the first gesture is a double tap with a single finger, a double tap with two fingers, a single tap with a single finger, or a single tap with two fingers.

A first box (e.g., Block 5 3914-5, FIG. 20A) in the plurality of boxes is determined at the location of the first gesture. In some embodiments, the structured electronic document has an associated render tree with a plurality of nodes and determining the first box at the location of the first gesture comprises: traversing down the render tree to determine a first node in the plurality of nodes that corresponds to the detected location of the first gesture; traversing up the render tree from the first node to a closest parent node that contains a logical grouping of content; and identifying content corresponding to the closest parent node as the first box. In some embodiments, the logical grouping of content comprises a paragraph, an image, a plugin object, or a table. In some embodiments, the closest parent node is a replaced inline, a block, an inline block, or an inline table.

The first box is enlarged and substantially centered on the touch screen display (e.g., Block 5 3914-5, FIG. 20C). In some embodiments, enlarging and substantially centering comprises simultaneously zooming and translating the first box on the touch screen display. In some embodiments, enlarging comprises expanding the first box so that the width of the first box is substantially the same as the width of the touch screen display.

In some embodiments, text in the enlarged first box is resized to meet or exceed a predetermined minimum text size on the touch screen display. In some embodiments, the text resizing comprises: determining a scale factor by which the first box will be enlarged; dividing the predetermined minimum text size on the touch screen display by the scaling factor to determine a minimum text size for text in the first box; and if a text size for text in the first box is less than the determined minimum text size, increasing the text size for text in the first box to at least the determined minimum text size. In some embodiments, the first box has a width; the display has a display width; and the scale factor is the display width divided by the width of the first box prior to enlarging. In some embodiments, the resizing occurs during the enlarging. In some embodiments, the resizing occurs after the enlarging.

In some embodiments, text in the structured electronic document is resized to meet or exceed a predetermined minimum text size on the touch screen display. In some embodiments, the text resizing comprises: determining a scale factor by which the first box will be enlarged; dividing the predetermined minimum text size on the touch screen display by the scaling factor to determine a minimum text size for text in the structured electronic document; and if a text size for text in the structured electronic document is less than the determined minimum text size, increasing the text size for text in the structured electronic document to at least the determined minimum text size. In some embodiments, the text resizing comprises: identifying boxes containing text in the plurality of boxes; determining a scale factor by which the first box will be enlarged; dividing the predetermined minimum text size on the touch screen display by the scaling factor to determine a minimum text size for text in the structured electronic document; and for each identified box containing text, if a text size for text in the identified box is less than the determined minimum text size, increasing the text size for text in the identified box to at least the determined minimum text size and adjusting the size of the identified box.

In some embodiments, a second gesture (e.g., gesture 3929, FIG. 20C) is detected on the enlarged first box. In response to detecting the second gesture, the displayed portion of the structured electronic document is reduced in size. In some embodiments, the first box returns to its size prior to being enlarged.

In some embodiments, the second gesture and the first gesture are the same type of gesture. In some embodiments, the second gesture is a finger gesture. In some embodiments, the second gesture is a stylus gesture.

In some embodiments, the second gesture is a tap gesture. In some embodiments, the second gesture is a double tap with a single finger, a double tap with two fingers, a single tap with a single finger, or a single tap with two fingers.

In some embodiments, while the first box is enlarged, a third gesture (e.g., gesture 3927 or gesture 3935, FIG. 20C) is detected on a second box other than the first box. In response to detecting the third gesture, the second box is substantially centered on the touch screen display. In some embodiments, the third gesture and the first gesture are the same type of gesture. In some embodiments, the third gesture is a finger gesture. In some embodiments, the third gesture is a stylus gesture.

In some embodiments, the third gesture is a tap gesture. In some embodiments, the third gesture is a double tap with a single finger, a double tap with two fingers, a single tap with a single finger, or a single tap with two fingers.

In some embodiments, a swipe gesture (e.g., gesture 3937 or gesture 3939, FIG. 20C) is detected on the touch screen display. In response to detecting the swipe gesture, the displayed portion of the structured electronic document is translated on the touch screen display. In some embodiments, the translating comprises vertical, horizontal, or diagonal movement of the structured electronic document on the touch screen display. In some embodiments, the swipe gesture is a finger gesture. In some embodiments, the swipe gesture is a stylus gesture.

In some embodiments, a fifth gesture (e.g., multi-touch gesture 3941/3943, FIG. 20C) is detected on the touch screen display. In response to detecting the fifth gesture, the displayed portion of the structured electronic document is rotated on the touch screen display by 90°. In some embodiments, the fifth gesture is a finger gesture. In some embodiments, the fifth gesture is a multifinger gesture. In some embodiments, the fifth gesture is a twisting multifinger gesture.

In some embodiments, a change in orientation of the device is detected. In response to detecting the change in orientation of the device, the displayed portion of the structured electronic document is rotated on the touch screen display by 90°.

In some embodiments, a multi-finger de-pinch gesture (e.g., multi-touch gesture 3931/3933, FIG. 20C) is detected on the touch screen display. In response to detecting the multi-finger de-pinch gesture, a portion of the displayed portion of the structured electronic document is enlarged on the touch screen display in accordance with a position of the multi-finger de-pinch gesture and an amount of finger movement in the multi-finger de-pinch gesture.

A graphical user interface (e.g., UI 3900A, FIG. 20A) on a portable electronic device with a touch screen display comprises at least a portion of a structured electronic document (e.g., web page 3912, FIG. 20A). The structured electronic document comprises a plurality of boxes of content (e.g., blocks 3914, FIG. 20A). In response to detecting a first gesture (e.g., gesture 3923, FIG. 20A) at a location on the portion of the structured electronic document, a first box (e.g., Block 5 3914-5, FIG. 20A) in the plurality of boxes at the location of the first gesture is determined and the first box is enlarged and substantially centered on the touch screen display (e.g., Block 5 3914-5, FIG. 20C).

Figure 20E:
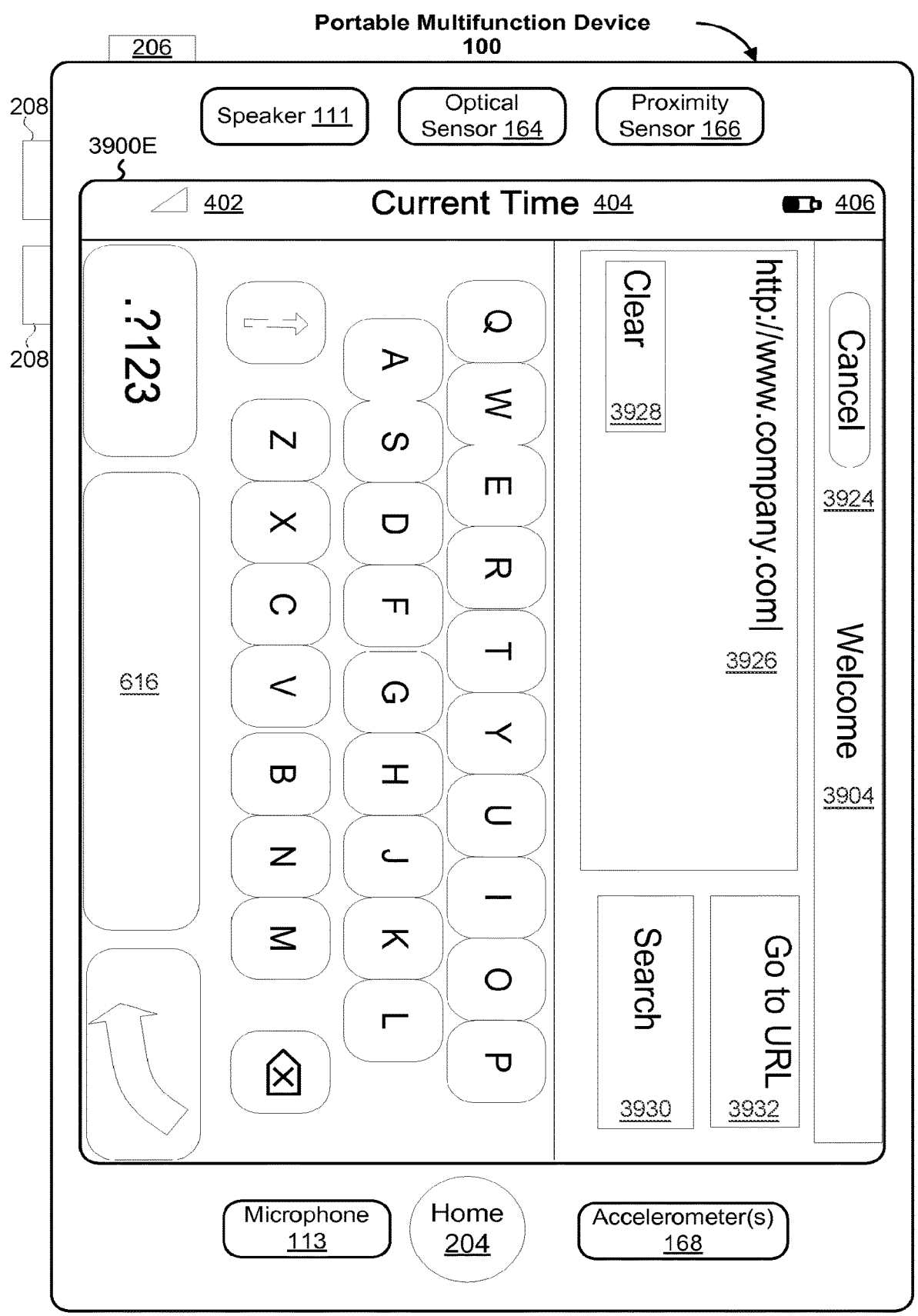
Figure 20F:
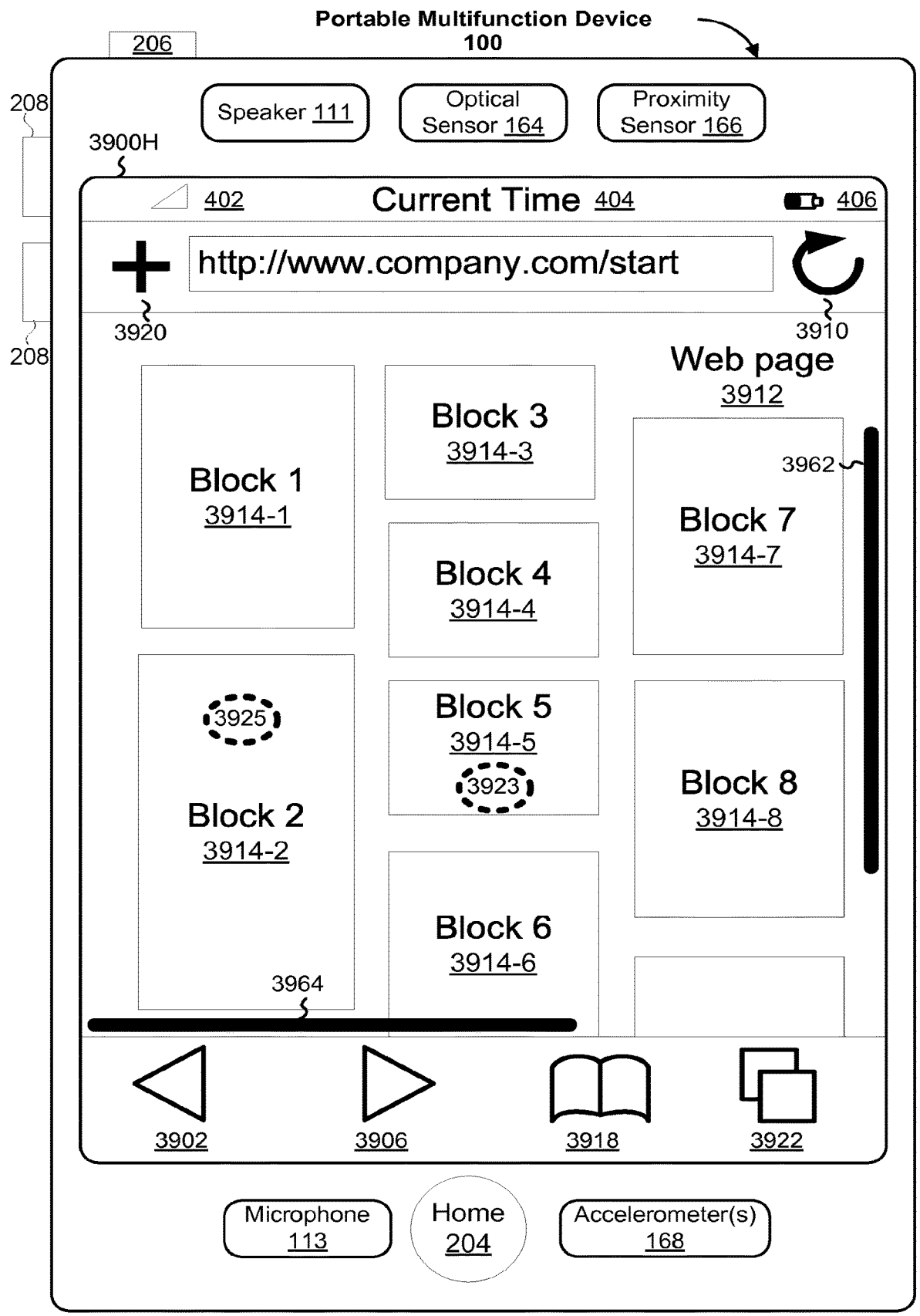
Figure 20G:
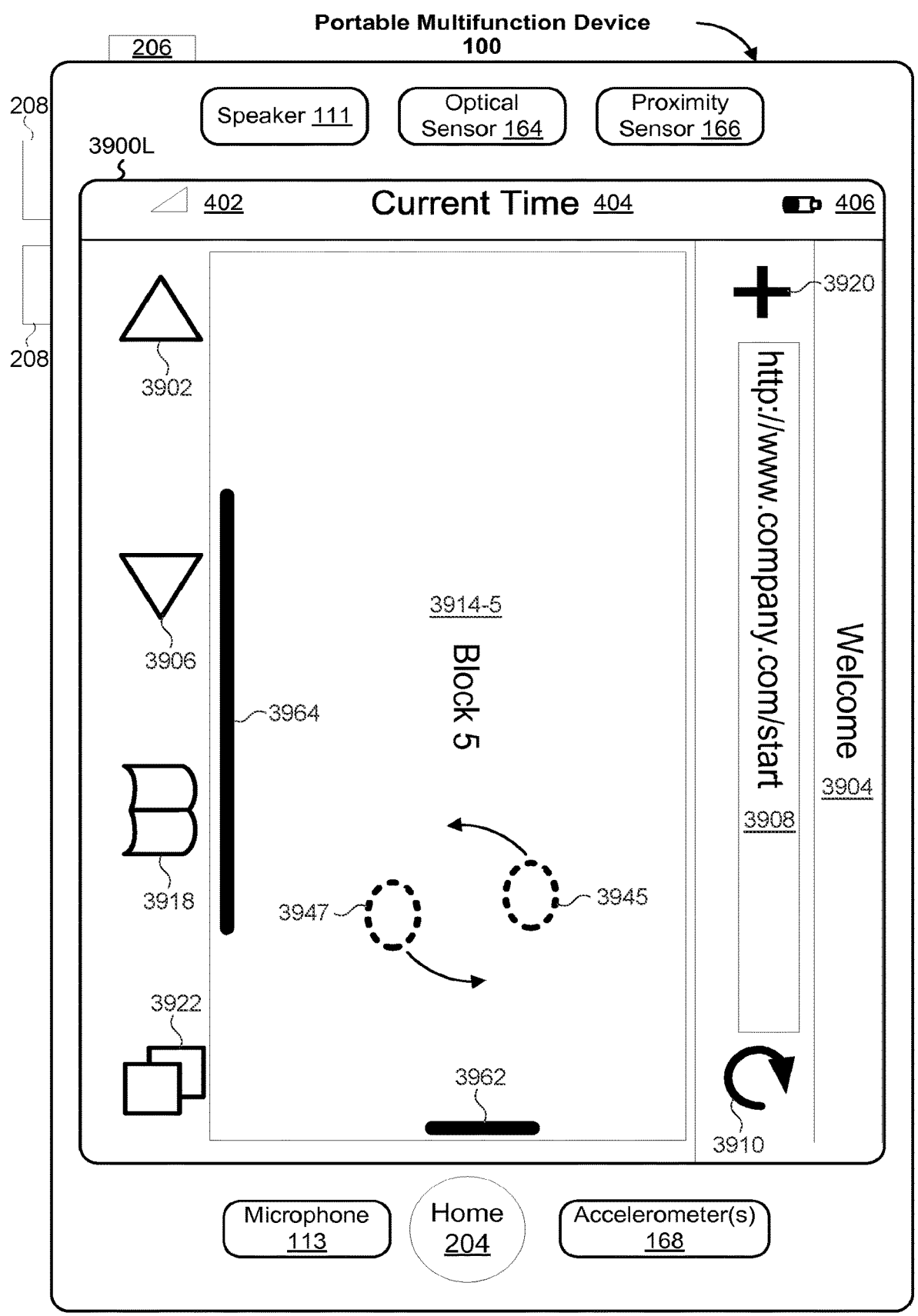

In some embodiments, in response to a tap or other predefined user gesture on URL entry box 3908, the touch screen displays an enlarged entry box 3926 and a keyboard 616 (e.g., UI 3900B, FIG. 20B in portrait viewing and UI 3900E, FIG. 20E in landscape viewing). In some embodiments, the touch screen also displays:

Contextual clear icon 3928 that when activated (e.g., by a finger tap on the icon) initiates deletion of all text in entry box 3926;

a search icon 3930 that when activated (e.g., by a finger tap on the icon) initiates an Internet search using the search terms input in box 3926; and Go to URL icon 3932 that when activated (e.g., by a finger tap on the icon) initiates acquisition of the web page with the URL input in box 3926;

Thus, the same entry box 3926 may be used for inputting both search terms and URLs. In some embodiments, whether or not clear icon 3928 is displayed depends on the context.

FIGS. 21A-21I illustrate exemplary user interfaces for a music and video player 152 in accordance with some embodiments.

Figure 21A:
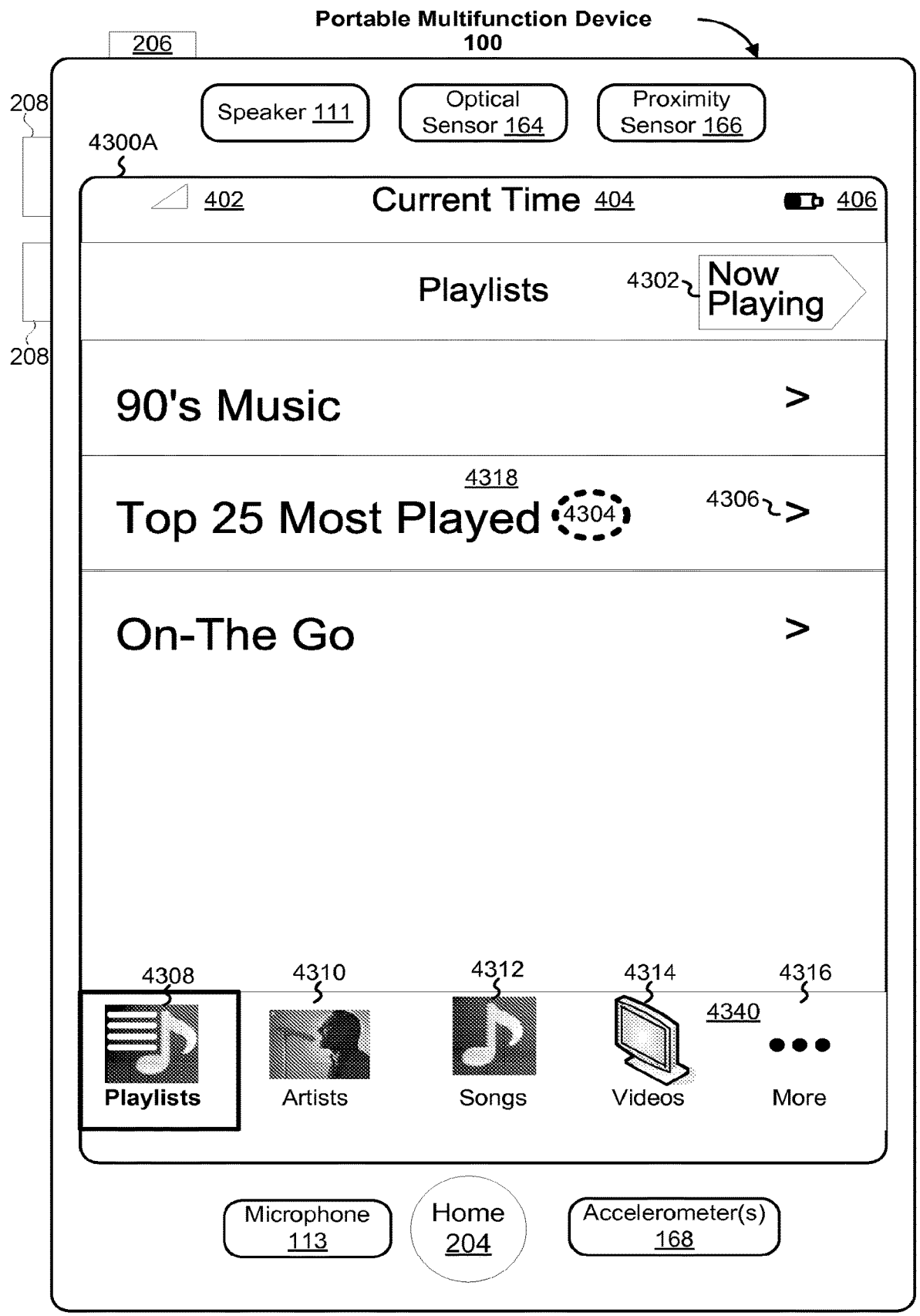
FIGS. 21A-21I illustrate exemplary user interfaces for a music and video player in accordance with some embodiments.

In some embodiments, icons for major content categories (e.g., playlists 4308, artists 4310, songs 4312, and video 4314) are displayed in a first area of the display (e.g., 4340, FIG. 21A). In some embodiments, the first area also includes an icon (e.g., more icon 4316) that when activated (e.g., by a finger tap on the icon) leads to additional content categories (e.g., albums, audiobooks, compilations, composers, genres, and podcasts in FIG. 43J).

In some embodiments, the player 152 includes a now playing icon 4302 that when activated (e.g., by a finger tap on the icon) takes the user directly to a UI displaying information about the currently playing music (not shown).

In some embodiments, in response to a series of gestures (e.g., finger taps) by the user, the device displays a series of content categories and sub-categories. For example, if the user activates selection icon 4306 (e.g., by a finger tap on the icon) or, in some embodiments, taps anywhere in the Top 25 row 4318, the UI changes from a display of playlist categories (UI 4300A, FIG. 41A) to a display of the Top 25 sub-category (UI 4300B, FIG. 21B).

Figure 21B:
Figure 21C:
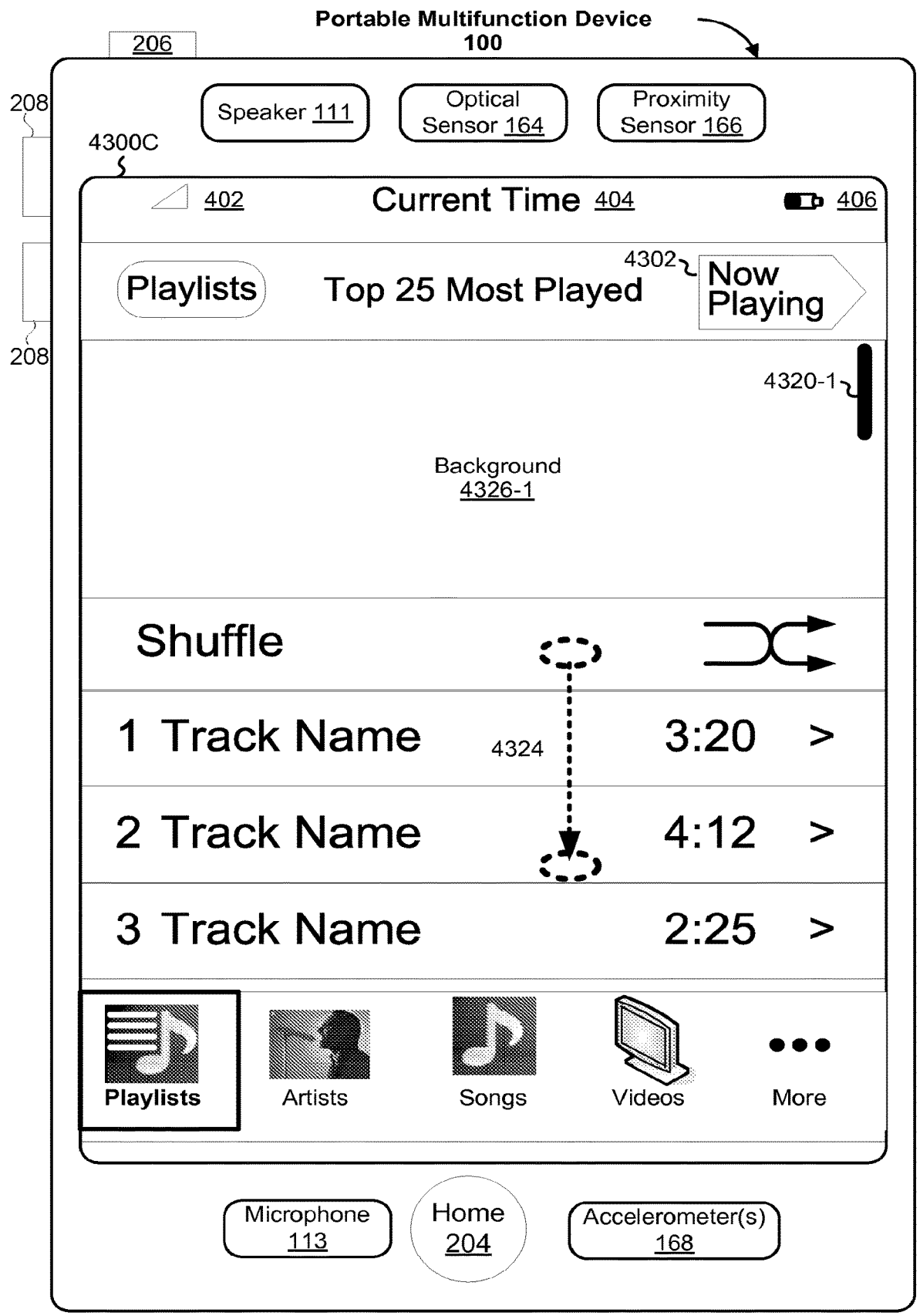
Figure 21D:
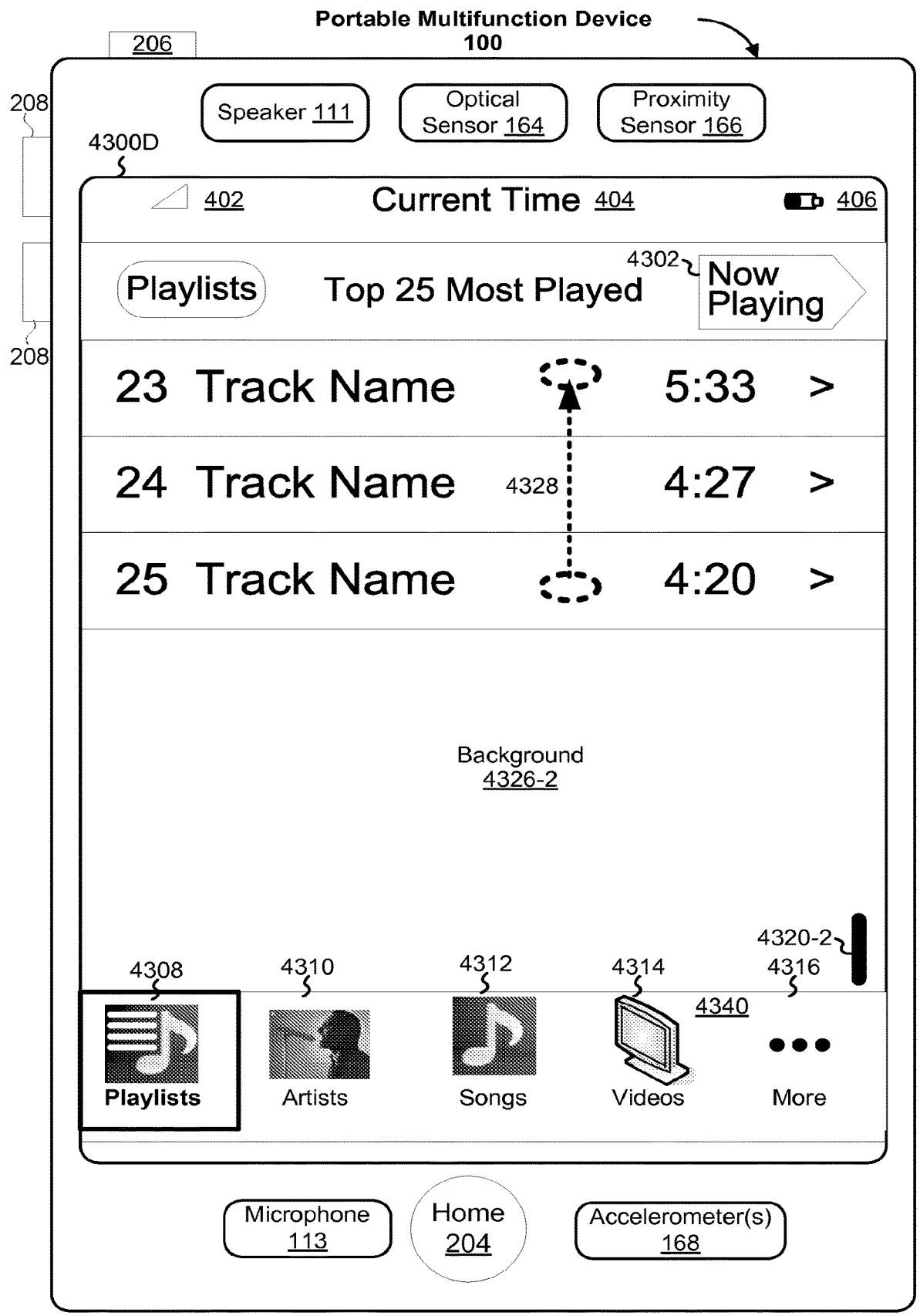

If just a portion of a category or sub-category is displayed, a vertical bar, analogous to the vertical bars described above, is displayed on top of the category/sub-category that helps a user understand what portion of the category/sub-category is being displayed (e.g., vertical bar 4320, FIG. 21B). In some embodiments, a user can scroll through the list of items in the category/sub-category by applying a vertical or substantially vertical swipe gesture 4322 to the area displaying the list. In some embodiments, a vertically downward gesture scrolls the list downward and a vertically upward gesture scrolls the list upward.

In some embodiments, if the user scrolls to the top of the list and then continues to apply a scrolling gesture (e.g., 4324, FIG. 21C), background 4326-1 appears and the vertical bar 4320-1 may start to reduce in length to indicate to the user that the top of the list has been reached. When the user's finger breaks contact with the touch screen display, the list may move back to the top of the display and the background 4326-1 shrinks to nothing. Similarly, if the user scrolls to the bottom of the list and then continues to apply a scrolling gesture (e.g., 4328, FIG. 21D), background 4326-2 appears and the vertical bar 4320-2 may start to reduce in length to indicate to the user that the bottom of the list has been reached. When the user's finger breaks contact with the touch screen display, the list may move back to the bottom of the display and the background 4326-2 shrinks to nothing. This "rubber band-like" behavior at the terminus of lists may be applied to many other types of lists and documents that have vertical scrolling. Similar behavior may be applied to all of the edges of documents that can be translated in two dimensions (e.g., web pages, word processing documents, and photographs and other images). Additional description of this "rubber band-like" scrolling and translation behavior can be found in U.S. Patent Application No. 60/883,801, "List Scrolling And Document Translation On A Touch-Screen Display," filed Jan. 7, 2007, the content of which is hereby incorporated by reference in its entirety.

Figure 21E:
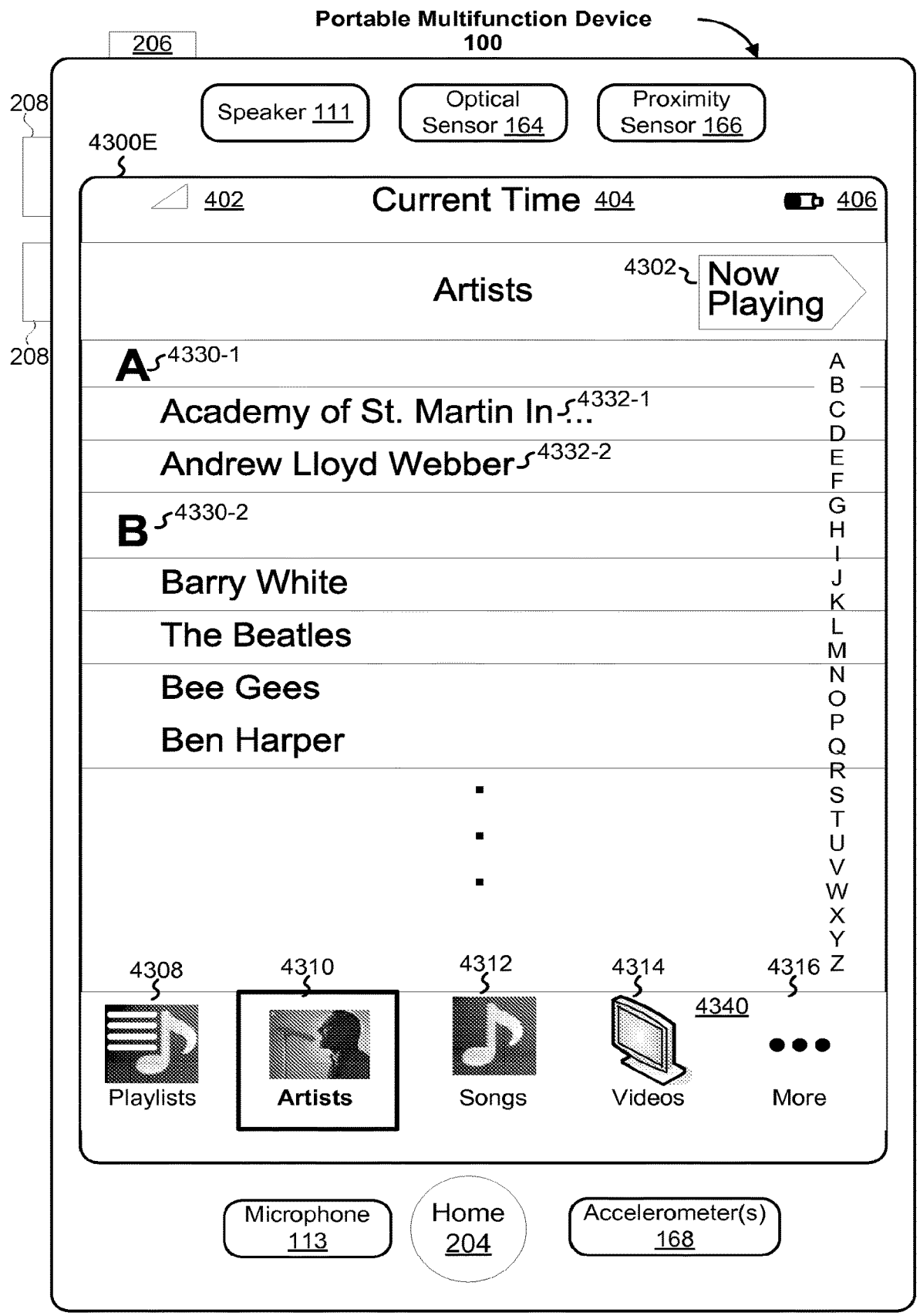
Figure 21F:
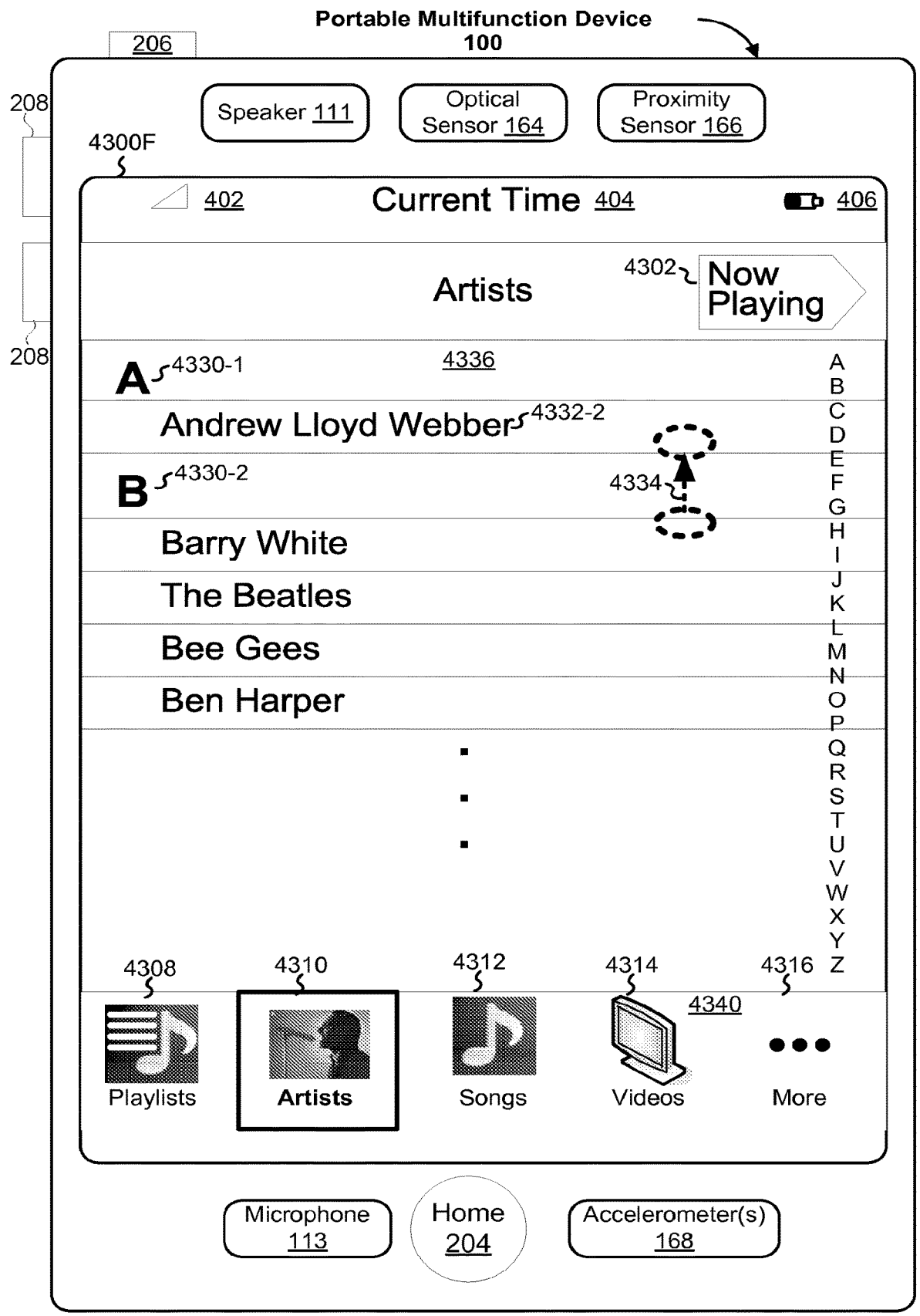

In some embodiments, if the user activates artists icon 4310 (e.g., by a finger tap on the icon), the artists category will be displayed (FIG. 21E). In some embodiments, such as when the artists list is arranged alphabetically, an index item/symbol (e.g., the letter A 4330-1) may remain adjacent to a respective information item subset (e.g., artists 4332 whose name begins with the letter A). When scrolling up through the list of information items (e.g., in response to an upward swipe on the touch sensitive display by the user), the index item/symbol may move to the upper edge of a window (e.g., window 4336, FIG. 21F). As the scrolling continues (e.g., in response to gesture 4334, FIG. 21F), the index item/symbol may remain there until the end of the respective information item subset is reached, at which time the index item/symbol may be replaced with a subsequent index item/symbol (e.g., the letter B 4330-2). An analogous scrolling effect is shown for the Movies 4330-3 and Music Videos 4330-4 index items in UI 4300H and UI 4300I (FIGS. 21H and 21I). Additional description of such scrolling is described in U.S. patent application Ser. No. 11/322,547, "Scrolling List With Floating Adjacent Index Symbols," filed Dec. 23, 2005; Ser. No. 11/322,551, "Continuous Scrolling List With Acceleration," filed Dec. 23, 2005; and Ser. No. 11/322,553, "List Scrolling In Response To Moving Contact Over List Of Index Symbols," filed Dec. 23, 2005, which are hereby incorporated by reference in their entirety.

Figure 21G:
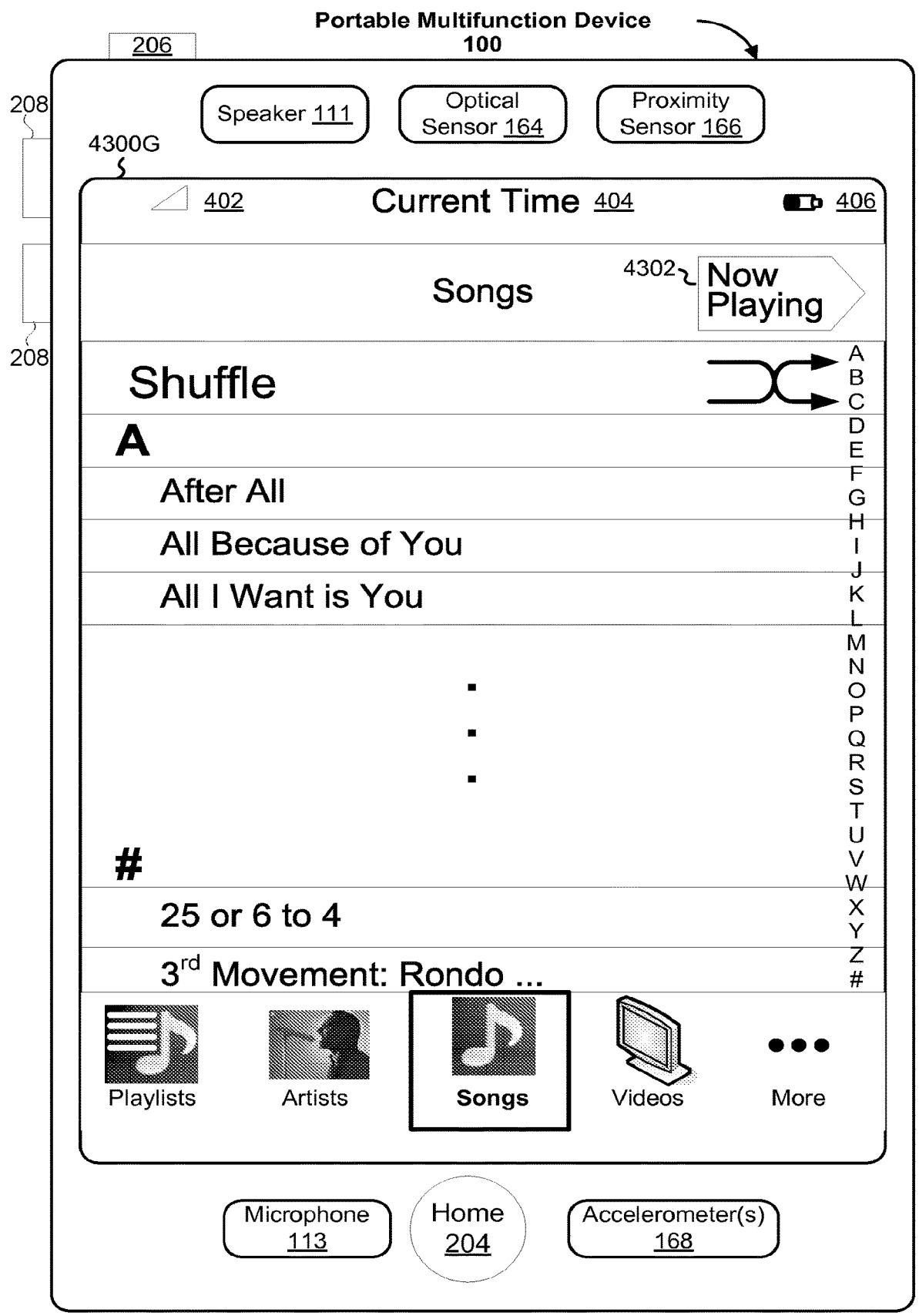
Figure 21H:
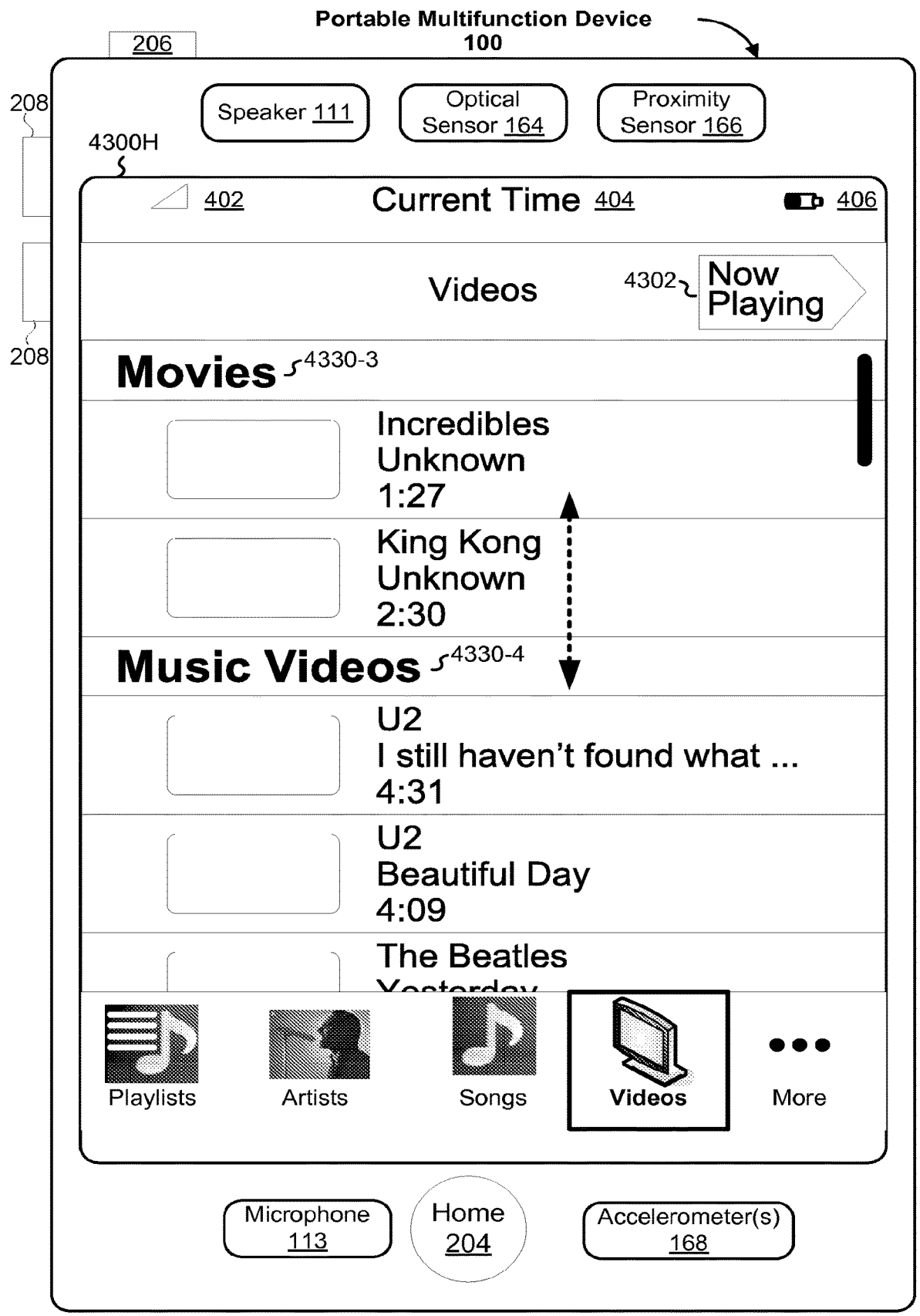
Figure 21I:
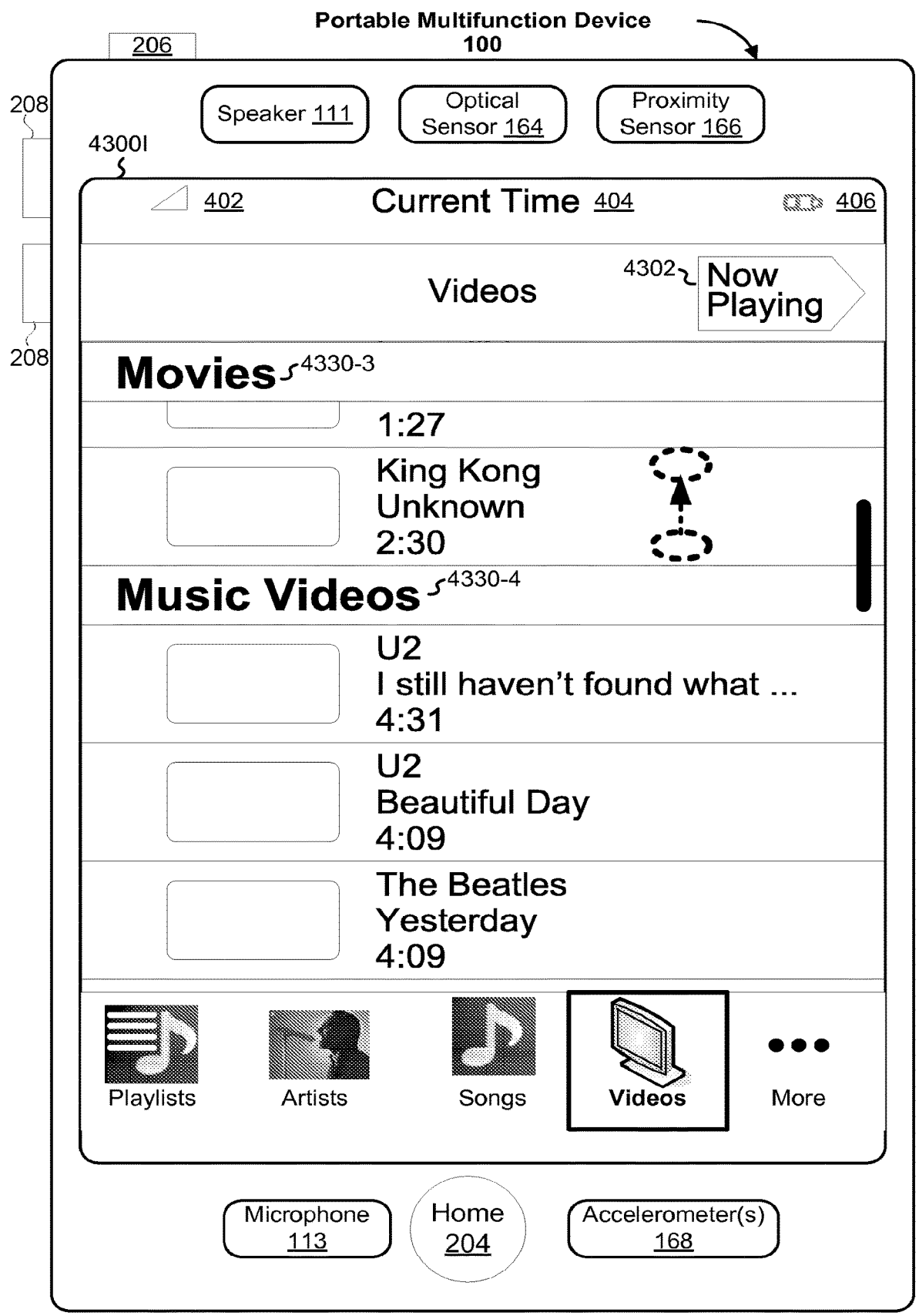
Figure 22A:
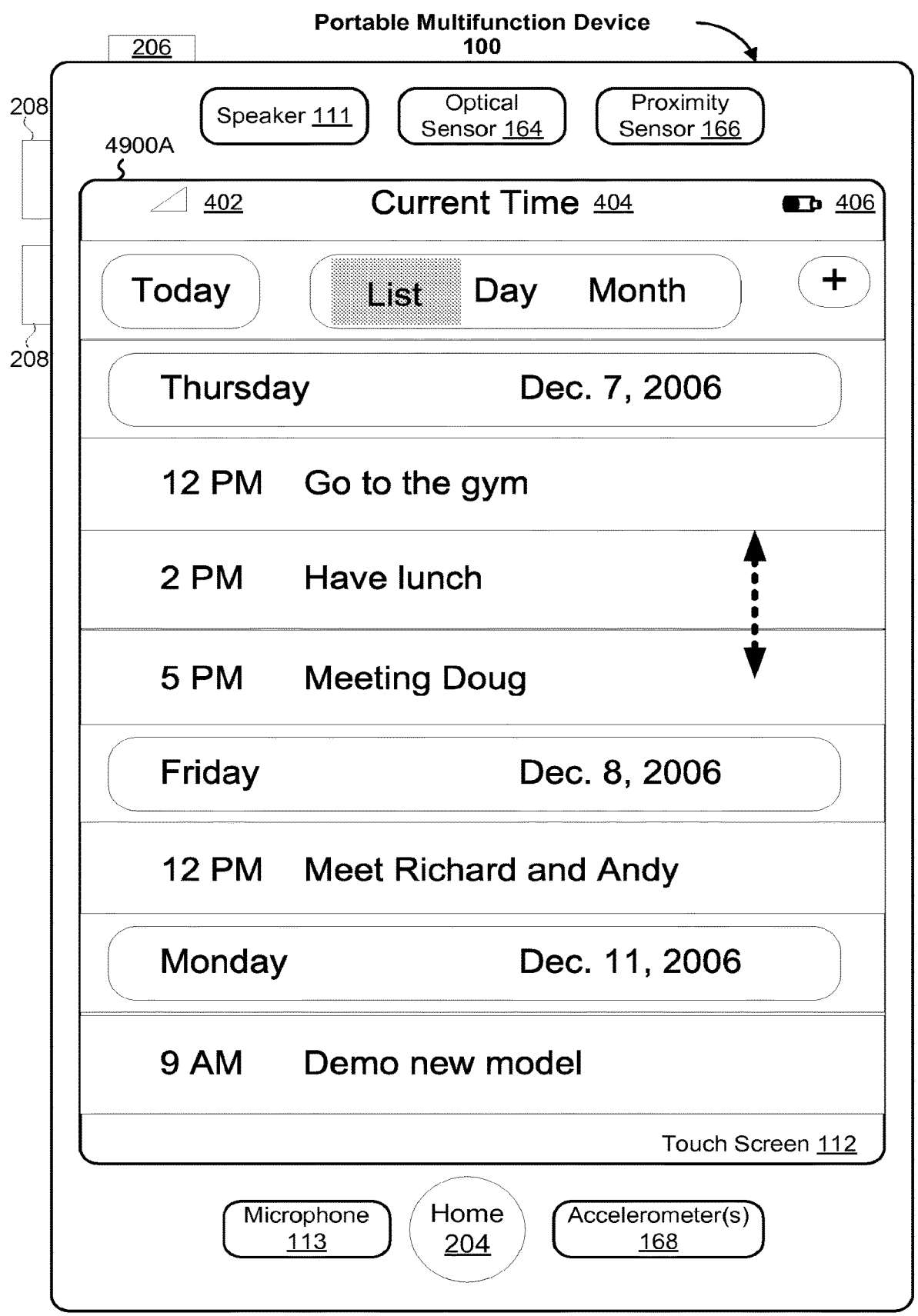
FIGS. 22A-22E illustrate exemplary user interfaces for a calendar in accordance with some embodiments.
Figure 22B:
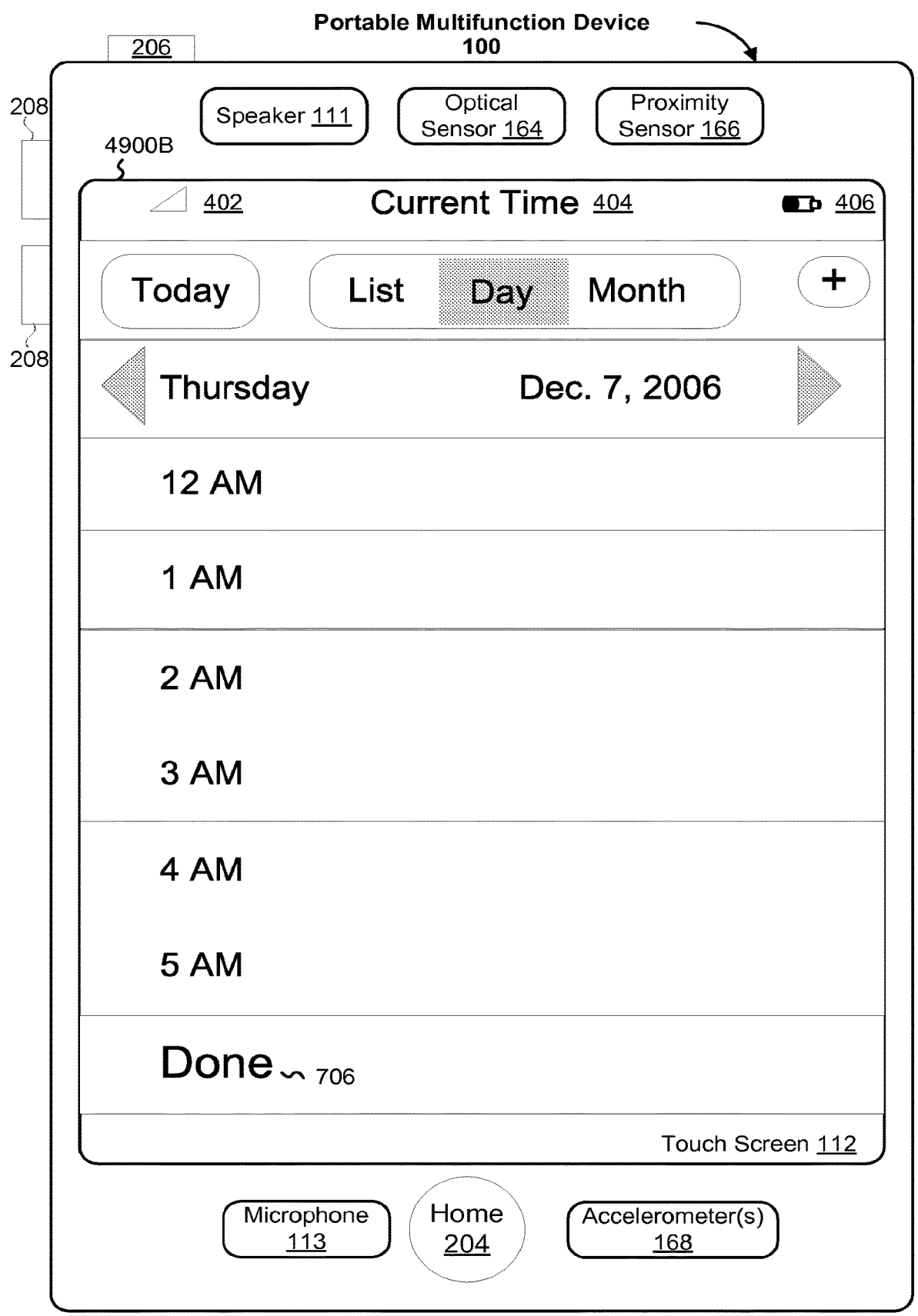
Figure 22C:
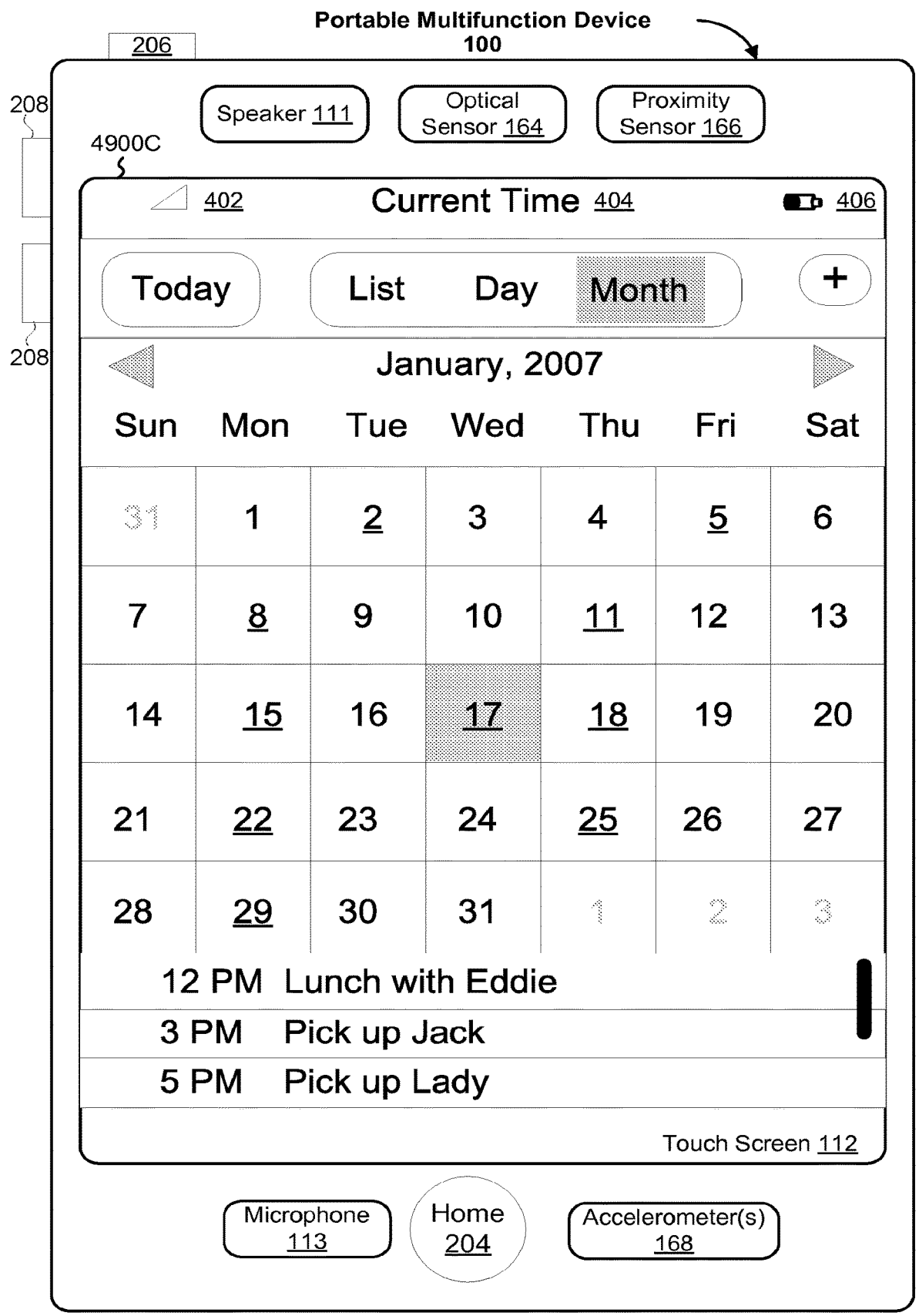
Figure 22D:
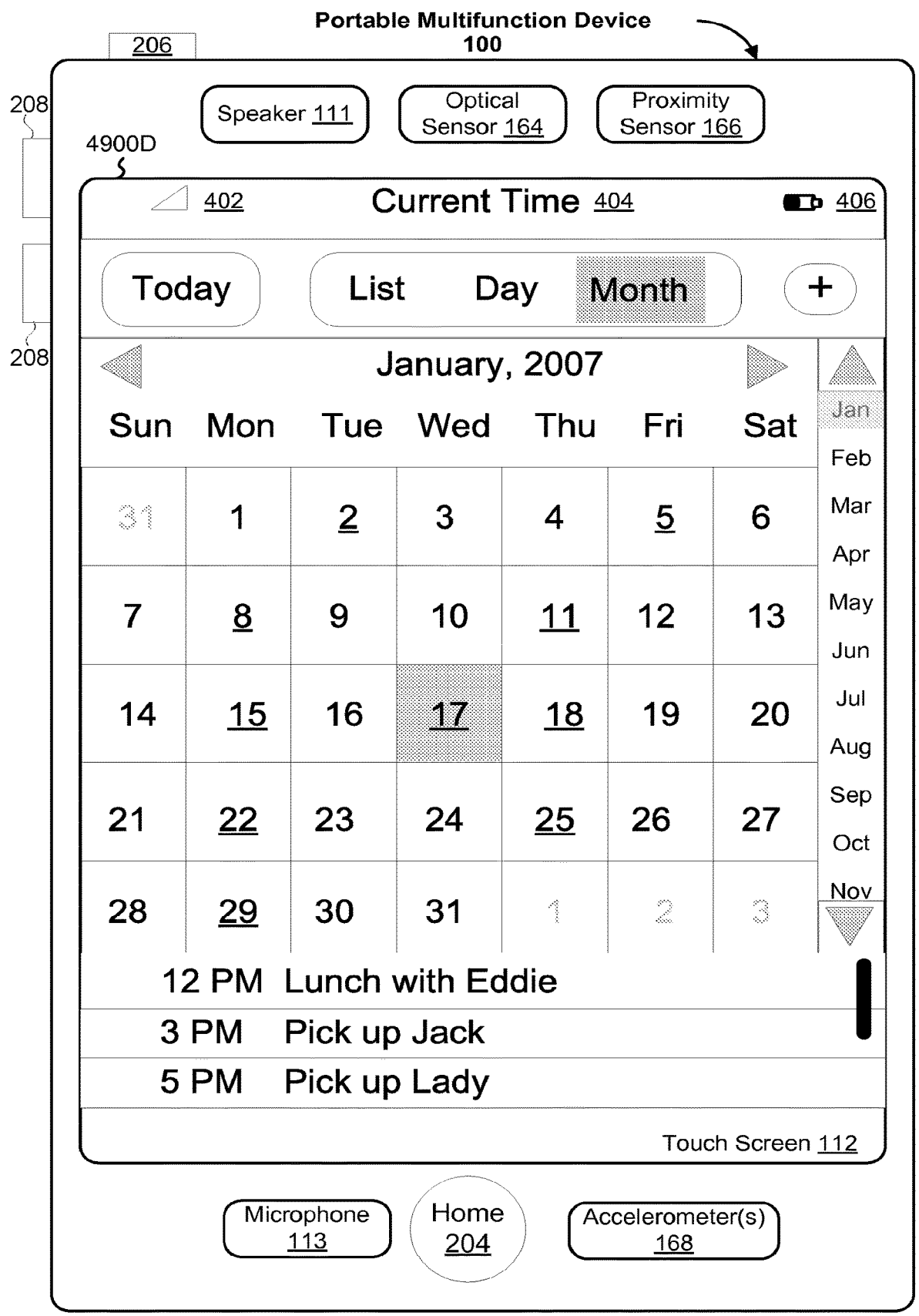
Figure 22E:
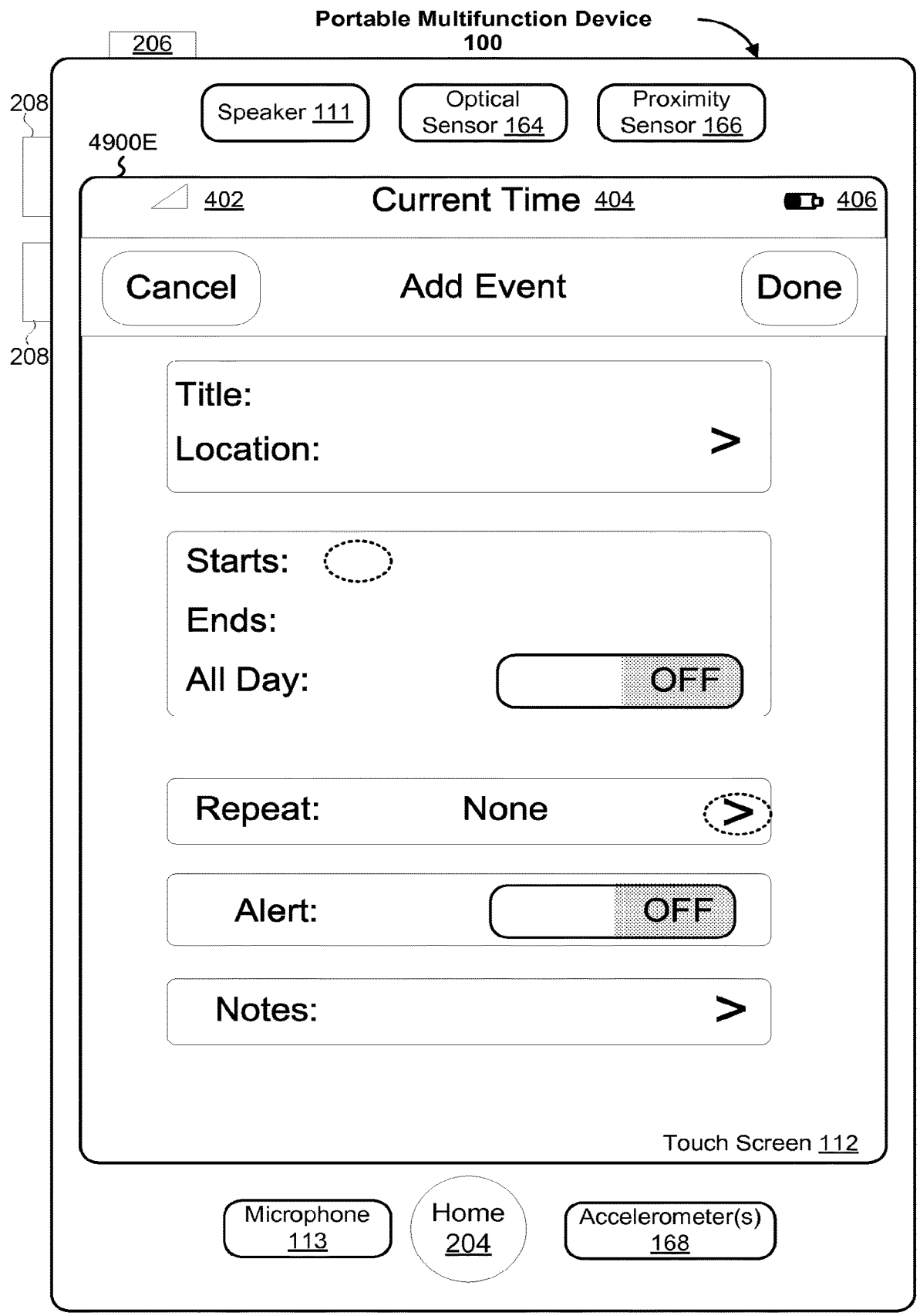

In some embodiments, if the user activates songs icon 4312 (e.g., by a finger tap on the icon), the songs category will be displayed (FIG. 21G).

In some embodiments, if the user activates videos icon 4314 (e.g., by a finger tap on the icon), the video category will be displayed (FIG. 21H).

FIGS. 22A-22E illustrate exemplary user interfaces for a calendar in accordance with some embodiments. Additional description of calendars can be found in U.S. Patent Application No. 60/883,820, "System And Method For Viewing And Managing Calendar Entries," filed Jan. 7, 2007, the content of which is hereby incorporated by reference in its entirety.

In some embodiments, vertical and horizontal bars help a user understand what portion of a list or document is being displayed.

Figure 23A:
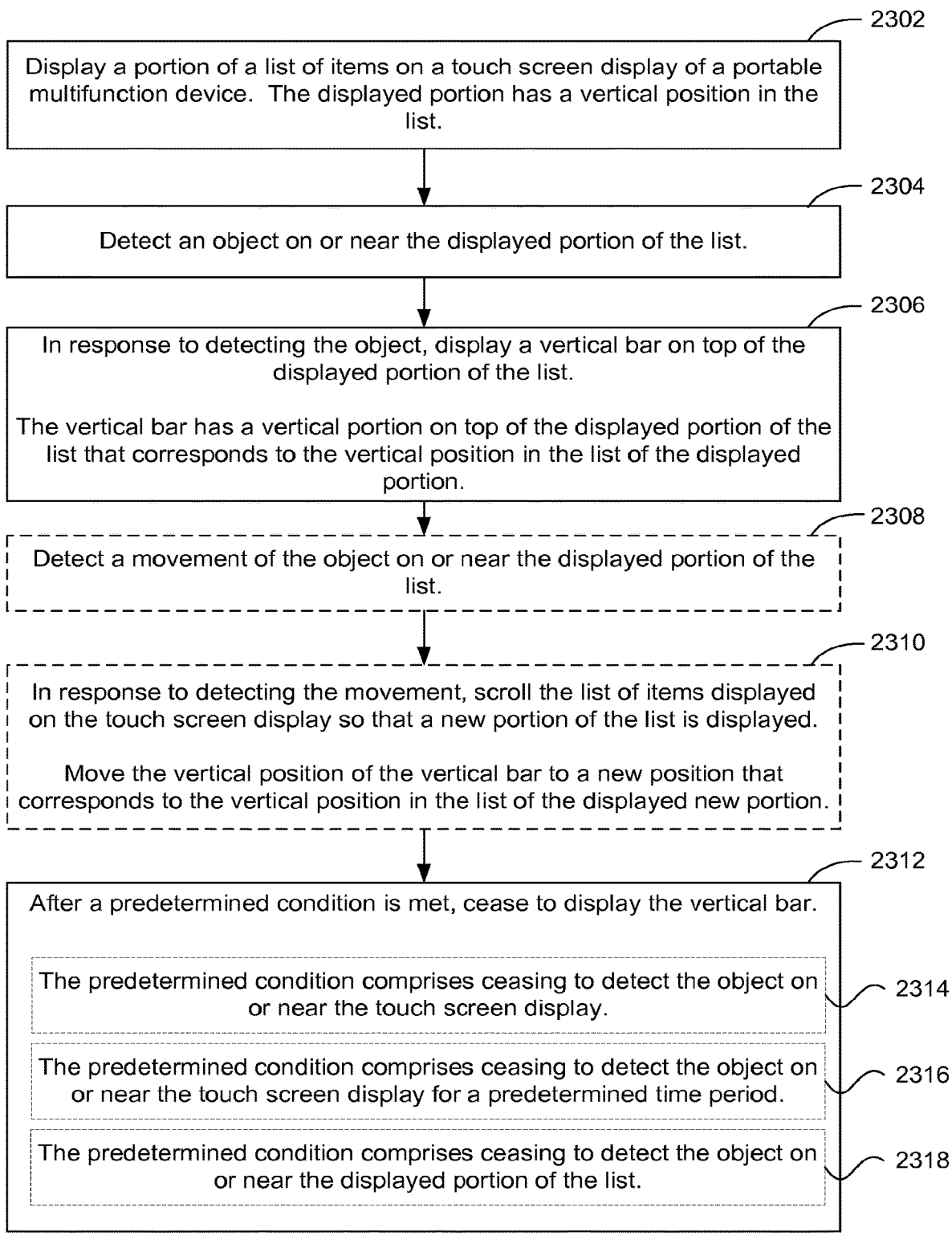
FIG. 23A is a flow diagram illustrating a process of displaying a portion of a list of items in accordance with some embodiments.

FIG. 23A is a flow diagram illustrating a process 2300 of displaying a portion of a list of items in accordance with some embodiments. A portable multifunction device displays (2302) a portion of a list of items on a touch screen display. The displayed portion of the list has a vertical position in the list.

In some embodiments, the list of items is a list of contacts (e.g. FIG. 7A), a list of instant message conversations (e.g. FIG. 5), a list of instant messages (e.g. FIG. 6A), a list of photo albums (e.g. FIG. 11B), a list of audio content (e.g., FIG. 21B), a list of video content (e.g. FIG. 14C), a list of calendar entries (e.g. FIG. 22C), a list of recent calls (e.g. FIG. 15B), a list of mailboxes (e.g. FIG. 17), a list of emails (e.g. FIG. 19A), a list of settings (e.g., FIG. 19J), or a list of voicemail messages (e.g. FIG. 16C).

An object is detected (2304) on or near the displayed portion of the list. In some embodiments, the object is a finger.

In response to detecting the object on or near the displayed portion of the list, a vertical bar is displayed (2306) on top of the displayed portion of the list. See, for example, vertical bar 640 in FIG. 6G, and vertical bar 1314 in FIG. 11A. The vertical bar has a vertical position on top of the displayed portion of the list that corresponds to the vertical position in the list of the displayed portion of the list. In some embodiments, the vertical bar has a vertical length that corresponds to the portion of the list being displayed. In some embodiments, the vertical bar is located on the right hand side of the displayed portion of the list. In some embodiments, the vertical bar is translucent or transparent. The vertical bar has a major axis and a portion of the list along the major axis of the vertical bar is not covered by the vertical bar.

In some embodiments, a movement of the object is detected (2308) on or near the displayed portion of the list. In some embodiments, the movement of the object is on the touch screen display. In some embodiments, the movement is a substantially vertical movement.

In response to detecting the movement, the list of items displayed on the touch screen display is scrolled (2310) so that a new portion of the list is displayed and the vertical position of the vertical bar is moved to a new position such that the new position corresponds to the vertical position in the list of the displayed new portion of the list. In some embodiments, scrolling the list has an associated speed of translation that corresponds to a speed of movement of the object. In some embodiments, scrolling the list is in accordance with a simulation of an equation of motion having friction.

After a predetermined condition is met, the display of the vertical bar is ceased (2312) while the displayed portion of the electronic document continues to be displayed, even though displayed portion of the electronic document has a vertical extent less than a vertical extent of the electronic document. In some embodiments, the predetermined condition comprises ceasing to detect the object on or near the touch screen display (2314). In some embodiments, the predetermined condition comprises ceasing to detect the object on or near the touch screen display for a predetermined time period (2316). In some embodiments, the predetermined condition comprises ceasing to detect the object on or near the displayed portion of the list (2318).

A graphical user interface on a portable multifunction device with a touch screen display comprises a portion of a list of items displayed on the touch screen display, wherein the displayed portion of the list has a vertical position in the list, and a vertical bar displayed on top of the portion of the list of items. In response to detecting an object on or near the displayed portion of the list, the vertical bar is displayed on top of the portion of the list of items. The vertical bar has a vertical position on top of the displayed portion of the list that corresponds to the vertical position in the list of the displayed portion of the list. After a predetermined condition is met, the display of the vertical bar is ceased while the displayed portion of the electronic document continues to be displayed, wherein the displayed portion of the electronic document has a vertical extent that is less than a vertical extent of the electronic document.

Figure 23B:
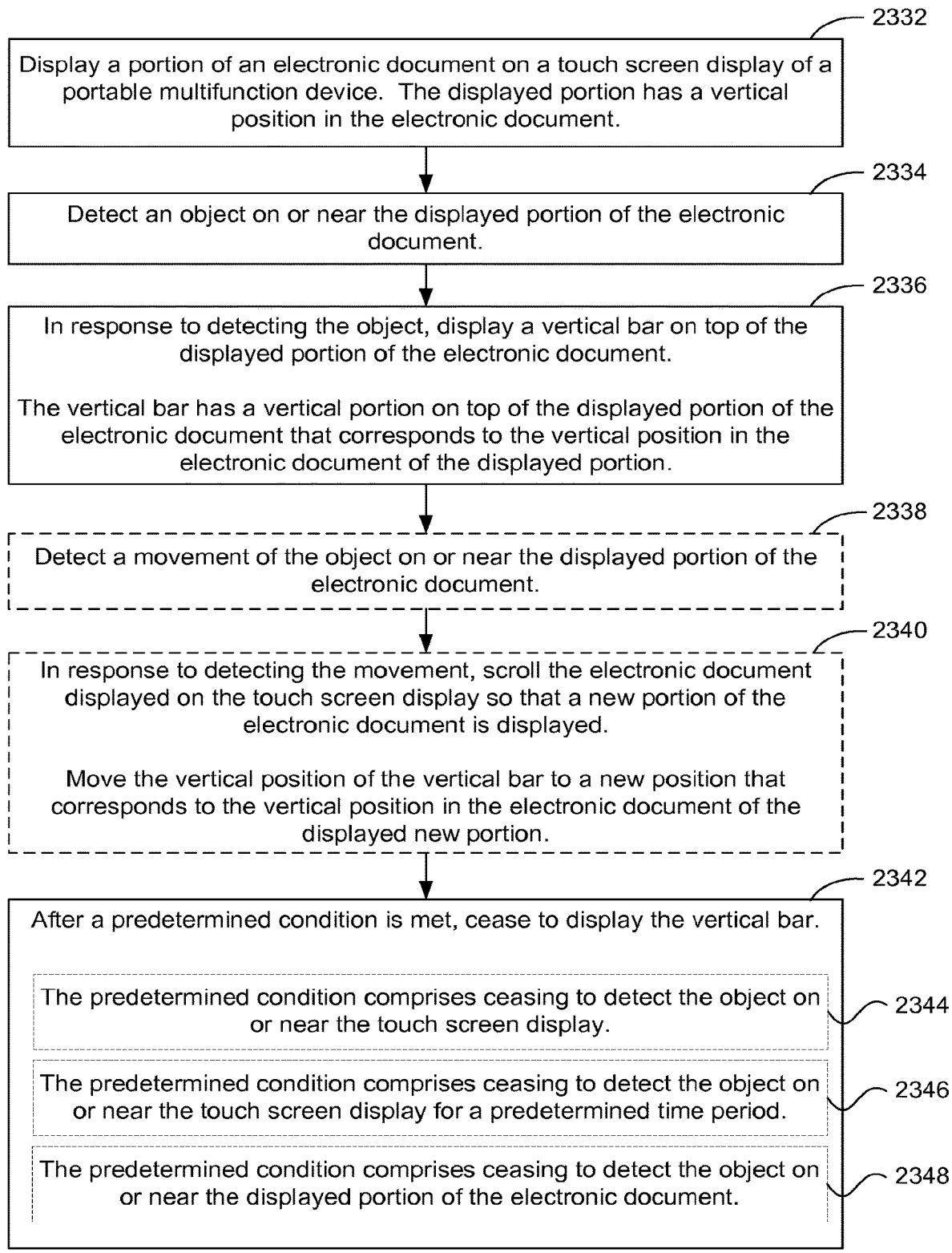
FIGS. 23B and 23C are flow diagrams illustrating processes of displaying a portion of an electronic document in accordance with some embodiments.

FIG. 23B is a flow diagram illustrating a process 2330 of displaying a portion of an electronic document in accordance with some embodiments. A portable multifunction device displays (2332) a portion of an electronic document on a touch screen display. The displayed portion of the electronic document has a vertical position in the electronic document. In some embodiments, the electronic document is a web page (e.g., FIG. 20A). In some embodiments, the electronic document is a word processing, spreadsheet, email (e.g., FIG. 19B), or presentation document.

An object is detected (2334) on or near the displayed portion of the electronic document. In some embodiments, the object is a finger.

In response to detecting the object on or near the displayed portion of the electronic document, a vertical bar is displayed (2336) on top of the displayed portion of the electronic document. See for example vertical bar 1222 in FIG. 10A and vertical bar 3962 in FIG. 20F. The vertical bar has a vertical position on top of the displayed portion of the electronic document that corresponds to the vertical position in the electronic document of the displayed portion of the electronic document. In some embodiments, the vertical bar has a vertical length that corresponds to the portion of the electronic document being displayed. In some embodiments, the vertical bar is located on the right hand side of the displayed portion of the electronic document. In some embodiments, the vertical bar is translucent or transparent. The vertical bar has a major axis and a portion of the electronic document along the major axis of the vertical bar is not covered by the vertical bar (see, for example, vertical bar 1222 in FIG. 10, and vertical bar 3962 in FIG. 20H).

In some embodiments, a movement of the object is detected (2338) on or near the displayed portion of the electronic document. In some embodiments, the movement of the object is on the touch screen display. In some embodiments, the movement is a substantially vertical movement.

In response to detecting the movement, the electronic document displayed on the touch screen display is scrolled (2340) so that a new portion of the electronic document is displayed, and the vertical position of the vertical bar is moved to a new position such that the new position corresponds to the vertical position in the electronic document of the displayed new portion of the electronic document. In some embodiments, scrolling the electronic document has an associated speed of translation that corresponds to a speed of movement of the object. In some embodiments, scrolling the electronic document is in accordance with a simulation of an equation of motion having friction.

After a predetermined condition is met, the display of the vertical bar is ceased (2342). In some embodiments, the predetermined condition comprises ceasing to detect the object on or near the touch screen display (2344). In some embodiments, the predetermined condition comprises ceasing to detect the object on or near the touch screen display for a predetermined time period (2346). In some embodiments, the predetermined condition comprises ceasing to detect the object on or near the displayed portion of the electronic document (2348) while the displayed portion of the electronic document continues to be displayed, wherein the displayed portion of the electronic document has a vertical extent that is less than a vertical extent of the electronic document.

A graphical user interface on a portable multifunction device with a touch screen display comprises a portion of an electronic document displayed on the touch screen display, wherein the displayed portion of the electronic document has a vertical position in the electronic document, and a vertical bar displayed on top of the portion of the electronic document. In response to detecting an object on or near the displayed portion of the electronic document, the vertical bar is displayed on top of the portion of the electronic document. The vertical bar has a vertical position on top of the displayed portion of the electronic document that corresponds to the vertical position in the electronic document of the displayed portion of the electronic document. After a predetermined condition is met, the display of the vertical bar is ceased while the displayed portion of the electronic document continues to be displayed, wherein the displayed portion of the electronic document has a vertical extent that is less than a vertical extent of the electronic document.

Figure 23C:
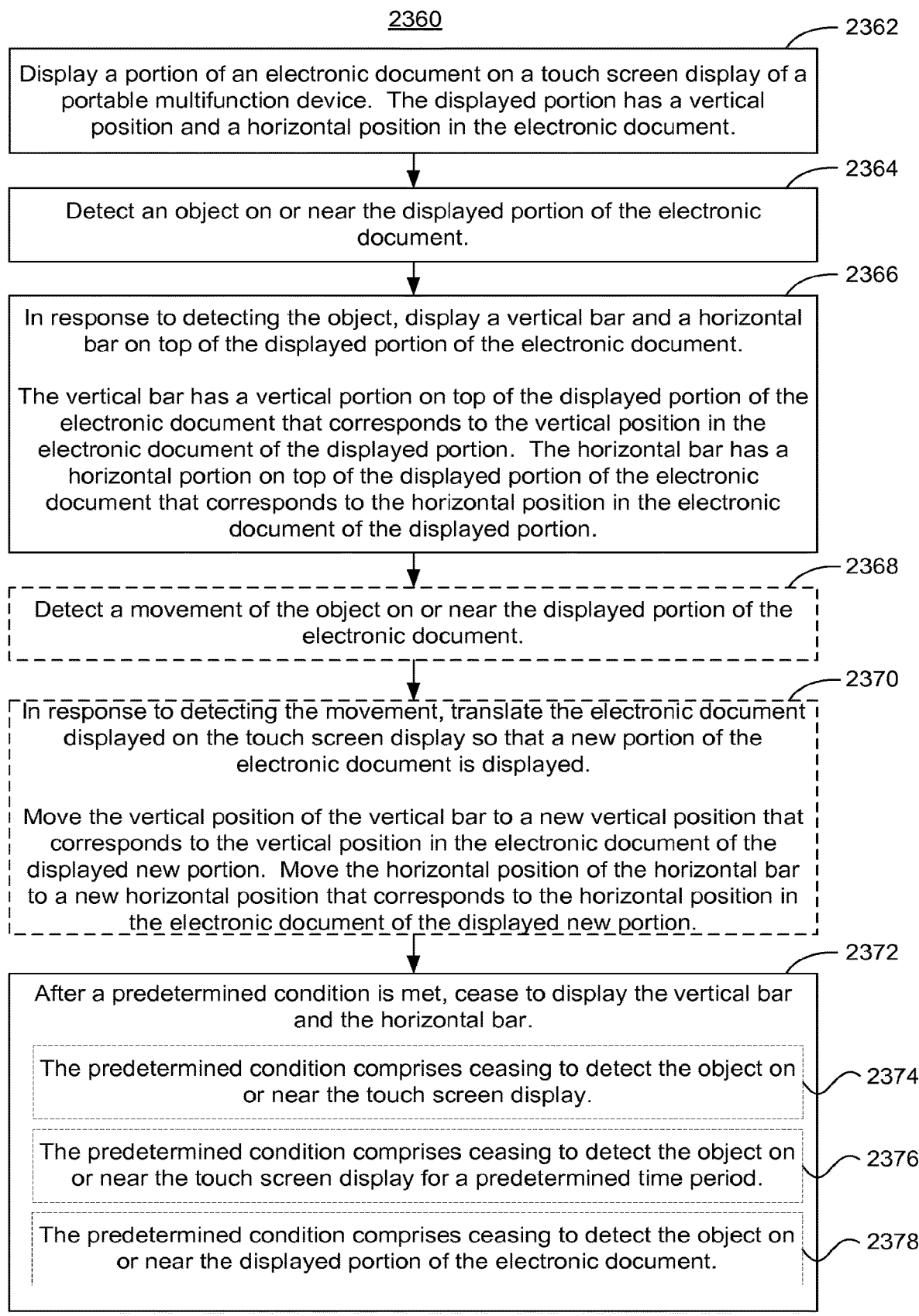

FIG. 23C is a flow diagram illustrating a process 2360 of displaying a portion of an electronic document in accordance with some embodiments. A portable multifunction device displays (2362) a portion of an electronic document on a touch screen display. The displayed portion of the electronic document has a vertical position in the electronic document and a horizontal position in the electronic document. In some embodiments, the electronic document is a web page (e.g., FIG. 20A). In some embodiments, the electronic document is a word processing, spreadsheet, email (e.g., FIG. 19B), or presentation document.

An object is detected (2364) on or near the displayed portion of the electronic document. In some embodiments, the object is a finger.

In response to detecting the object on or near the displayed portion of the electronic document, a vertical bar and a horizontal bar are displayed (2366) on top of the displayed portion of the electronic document. See for example vertical bar 3962 and horizontal bar 3964 in FIG. 20H. In some embodiments, the vertical bar is located on the right hand side of the displayed portion of the electronic document and the horizontal bar is located on the bottom side of the displayed portion of the electronic document. In some embodiments, the vertical bar and the horizontal bar are translucent or transparent.

The vertical bar has a vertical position on top of the displayed portion of the electronic document that corresponds to the vertical position in the electronic document of the displayed portion of the electronic document. In some embodiments, the vertical bar has a vertical length that corresponds to the vertical portion of the electronic document being displayed. In some embodiments, the vertical bar has a major axis and a portion of the electronic document along the major axis of the vertical bar is not covered by the vertical bar.

The horizontal bar has a horizontal position on top of the displayed portion of the electronic document that corresponds to the horizontal position in the electronic document of the displayed portion of the electronic document. In some embodiments, the horizontal bar has a horizontal length that corresponds to the horizontal portion of the electronic document being displayed. In some embodiments, the horizontal bar has a major axis, substantially perpendicular to the major axis of the vertical bar, and a portion of the electronic document along the major axis of the horizontal bar is not covered by the horizontal bar.

In some embodiments, a movement of the object is detected (2368) on or near the displayed portion of the electronic document. In some embodiments, the movement of the object is on the touch screen display.

In response to detecting the movement, the electronic document displayed on the touch screen display is translated (2370) so that a new portion of the electronic document is displayed. In some embodiments, the electronic document is translated in a vertical direction, a horizontal direction, or a diagonal direction. In some embodiments, the electronic document is translated in accordance with the movement of the object. In some embodiments, translating the electronic document has an associated speed of translation that corresponds to a speed of movement of the object. In some embodiments, translating the electronic document is in accordance with a simulation of an equation of motion having friction.

In response to detecting the movement, the vertical position of the vertical bar is moved to a new vertical position such that the new vertical position corresponds to the vertical position in the electronic document of the displayed new portion of the electronic document.

In response to detecting the movement, the horizontal position of the horizontal bar is moved to a new horizontal position such that the new horizontal position corresponds to the horizontal position in the electronic document of the displayed new portion of the electronic document.

After a predetermined condition is met, the display of the vertical bar and the horizontal bar is ceased (2372) while the displayed portion of the electronic document continues to be displayed, wherein the displayed portion of the electronic document has a vertical extent and a horizontal extent that are less than a vertical extent and horizontal extent of the electronic document, respectively. In some embodiments, the predetermined condition comprises ceasing to detect the object on or near the touch screen display (2374). In some embodiments, the predetermined condition comprises ceasing to detect the object on or near the touch screen display for a predetermined time period (2376). In some embodiments, the predetermined condition comprises ceasing to detect the object on or near the displayed portion of the electronic document (2378).

A graphical user interface on a portable multifunction device with a touch screen display comprises a portion of an electronic document displayed on the touch screen display. The displayed portion of the electronic document has a vertical position in the electronic document and a horizontal position in the electronic document. The GUI also comprises a vertical bar displayed on top of the portion of the electronic document, and a horizontal bar displayed on top of the portion of the electronic document. In response to detecting an object on or near the displayed portion of the electronic document, the vertical bar and the horizontal bar are displayed on top of the portion of the electronic document. The vertical bar has a vertical position on top of the displayed portion of the electronic document that corresponds to the vertical position in the electronic document of the displayed portion of the electronic document. The horizontal bar has a horizontal position on top of the displayed portion of the electronic document that corresponds to the horizontal position in the electronic document of the displayed portion of the electronic document. After a predetermined condition is met, the display of the vertical bar and the horizontal bar is ceased while the displayed portion of the electronic document continues to be displayed, wherein the displayed portion of the electronic document has a vertical extent and a horizontal extent that are less than a vertical extent and horizontal extent of the electronic document, respectively.

Vertical and horizontal bars may have, without limitation, a rectangular cross section, a rectangular cross section with rounded corners, or a racetrack oval cross section with two opposing flat sides and two opposing rounded sides.

In some embodiments, the vertical and/or horizontal bars appear for a predetermined period of time (e.g., 1-2 seconds) when an electronic document or list of items is first displayed, even if no object is detected on or near the electronic document or list of items. This initial display of the vertical and/or horizontal bars signals to the user that the electronic document or list of items is scrollable.

In some embodiments, the vertical and/or horizontal bars appear for a predetermined period of time (e.g., 1-2 seconds) when only a portion of an electronic document or list of items is first displayed, even if no object is detected on or near the electronic document or list of items. This initial display of the vertical and/or horizontal bars signals to the user that the electronic document or list of items is scrollable and that only a portion of the electronic document or list of items is being displayed.

As described above, the vertical and/or horizontal bars provide portable multifunction devices with more transparent and intuitive user interfaces for navigating portions of electronic documents and/or lists of items that are easy to use. In addition, the vertical and/or horizontal bars do not reduce the screen area available for the display of documents, lists, and other content.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display;
   one or more processors; and
   memory storing one or more programs configured to be executed by the one or more processors, the one or more programs including instructions for:
   displaying a portion of scrollable content via the display, wherein the displayed portion of the scrollable content has a vertical position in the scrollable content;
   displaying a vertical bar on top of the displayed portion of the scrollable content, wherein the vertical bar has a vertical position on top of the displayed portion of the scrollable content that corresponds to the vertical position in the scrollable content of the displayed portion of the scrollable content;
   detecting a user input corresponding to translating the displayed portion of the scrollable content in a first direction, wherein detecting the user input includes detecting movement of an object that is interacting with the scrollable content;
   in response to detecting the user input corresponding to translating the displayed portion of the scrollable content in the first direction:
      scrolling the scrollable content in a direction corresponding to the first direction so that a new portion of the scrollable content is displayed via the display; and
      moving the vertical bar to a new vertical position such that the new vertical position corresponds to the vertical position in the scrollable content of the displayed new portion of the scrollable content; and
   in response to a predetermined condition being met, ceasing to display the vertical bar while continuing to display the displayed portion of the scrollable content, wherein the predetermined condition includes detecting that the object has ceased interacting with the scrollable content, and wherein the displayed portion of the scrollable content has a vertical extent that is less than a vertical extent of the scrollable content.

2. The electronic device of claim 1, wherein the one or more programs further include instructions for:
   when the portion of the scrollable content is initially displayed:
      displaying the vertical bar for a predetermined time period; and
      ceasing to display the vertical bar immediately following the predetermined time period.

3. The electronic device of claim 1, wherein the detected movement of the object is in the first direction.

4. The electronic device of claim 1, wherein the detected movement of the object includes a gesture performed by a portion of a hand of the user.

5. The electronic device of claim 1, wherein the predetermined condition includes detecting that the object has ceased interacting with the scrollable content for a predetermined time period.

6. The electronic device of claim 1, wherein the object includes a finger.

7. The electronic device of claim 1, wherein the electronic device includes a touch-sensitive surface.

8. The electronic device of claim 7, wherein detecting the user input corresponding to translating the displayed portion of the scrollable content in a first direction includes detecting movement of a finger contact on the touch-sensitive surface.

9. The electronic device of claim 1, wherein the vertical bar is translucent or transparent.

10. The electronic device of claim 1, wherein the vertical bar has a major axis and a portion of the scrollable content along the major axis of the vertical bar is not covered by the vertical bar.

11. A non-transitory computer-readable storage medium storing one or more programs configured to be executed by one or more processors of an electronic device with a display, the one or more programs including instructions for:
   displaying a portion of scrollable content via the display, wherein the displayed portion of the scrollable content has a vertical position in the scrollable content;
   displaying a vertical bar on top of the displayed portion of the scrollable content, wherein the vertical bar has a vertical position on top of the displayed portion of the scrollable content that corresponds to the vertical position in the scrollable content of the displayed portion of the scrollable content;
   detecting a user input corresponding to translating the displayed portion of the scrollable content in a first direction, wherein detecting the user input includes detecting movement of an object that is interacting with the scrollable content;
   in response to detecting the user input corresponding to translating the displayed portion of the scrollable content in the first direction:

scrolling the scrollable content in a direction corresponding to the first direction so that a new portion of the scrollable content is displayed via the display; and moving the vertical bar to a new vertical position such that the new vertical position corresponds to the vertical position in the scrollable content of the displayed new portion of the scrollable content; and in response to a predetermined condition being met, ceasing to display the vertical bar while continuing to display the displayed portion of the scrollable content, wherein the predetermined condition includes detecting that the object has ceased interacting with the scrollable content, and wherein the displayed portion of the scrollable content has a vertical extent that is less than a vertical extent of the scrollable content.

12. A method, comprising:

at an electronic device with a display:

displaying a portion of scrollable content via the display, wherein the displayed portion of the scrollable content has a vertical position in the scrollable content;

displaying a vertical bar on top of the displayed portion of the scrollable content, wherein the vertical bar has a vertical position on top of the displayed portion of the scrollable content that corresponds to the vertical position in the scrollable content of the displayed portion of the scrollable content;

detecting a user input corresponding to translating the displayed portion of the scrollable content in a first direction, wherein detecting the user input includes detecting movement of an object that is interacting with the scrollable content;

in response to detecting the user input corresponding to translating the displayed portion of the scrollable content in the first direction:

scrolling the scrollable content in a direction corresponding to the first direction so that a new portion of the scrollable content is displayed via the display; and moving the vertical bar to a new vertical position such that the new vertical position corresponds to the vertical position in the scrollable content of the displayed new portion of the scrollable content; and in response to a predetermined condition being met, ceasing to display the vertical bar while continuing to display the displayed portion of the scrollable content, wherein the predetermined condition includes detecting that the object has ceased interacting with the scrollable content, and wherein the displayed portion of the scrollable content has a vertical extent that is less than a vertical extent of the scrollable content.

13. The non-transitory computer-readable storage medium of claim 11, wherein the one or more programs further include instructions for:

when the portion of the scrollable content is initially displayed:

displaying the vertical bar for a predetermined time period; and ceasing to display the vertical bar immediately following the predetermined time period.

14. The non-transitory computer-readable storage medium of claim 11, wherein the detected movement of the object is in the first direction.

15. The non-transitory computer-readable storage medium of claim 11, wherein the detected movement of the object includes a gesture performed by a portion of a hand of the user.

16. The non-transitory computer-readable storage medium of claim 11, wherein the predetermined condition includes detecting that the object has ceased interacting with the scrollable content for a predetermined time period.

17. The non-transitory computer-readable storage medium of claim 11, wherein the object includes a finger.

18. The non-transitory computer-readable storage medium of claim 11, wherein the electronic device includes a touch-sensitive surface.

19. The non-transitory computer-readable storage medium of claim 18, wherein detecting the user input corresponding to translating the displayed portion of the scrollable content in a first direction includes detecting movement of a finger contact on the touch-sensitive surface.

20. The non-transitory computer-readable storage medium of claim 11, wherein the vertical bar is translucent or transparent.

21. The non-transitory computer-readable storage medium of claim 11, wherein the vertical bar has a major axis and a portion of the scrollable content along the major axis of the vertical bar is not covered by the vertical bar.

22. The method of claim 12, further comprising:

when the portion of the scrollable content is initially displayed:

displaying the vertical bar for a predetermined time period; and ceasing to display the vertical bar immediately following the predetermined time period.

23. The method of claim 12, wherein the detected movement of the object is in the first direction.

24. The method of claim 12, wherein the detected movement of the object includes a gesture performed by a portion of a hand of the user.

25. The method of claim 12, wherein the predetermined condition includes detecting that the object has ceased interacting with the scrollable content for a predetermined time period.

26. The method of claim 12, wherein the object includes a finger.

27. The method of claim 12, wherein the electronic device includes a touch-sensitive surface.

28. The method of claim 27, wherein detecting the user input corresponding to translating the displayed portion of the scrollable content in a first direction includes detecting movement of a finger contact on the touch-sensitive surface.

29. The method of claim 12, wherein the vertical bar is translucent or transparent.

30. The method of claim 12, wherein the vertical bar has a major axis and a portion of the scrollable content along the major axis of the vertical bar is not covered by the vertical bar.

* * * * *

UNITED STATES PATENT AND TRADEMARK OFFICE
CERTIFICATE OF CORRECTION

| | | |
|---|---|---|
| PATENT NO. | : 11,972,103 B2 | Page 1 of 1 |
| APPLICATION NO. | : 17/962353 | |
| DATED | : April 30, 2024 | |
| INVENTOR(S) | : Scott Forstall et al. | |

It is certified that error appears in the above-identified patent and that said Letters Patent is hereby corrected as shown below:

In the Specification

Column 1, Line 10: Delete "17/114,776," and insert -- 17/114,176, --.

Column 1, Line 32: Delete "Device." and insert -- Device, --.

Column 1, Line 38: Delete "2007" and insert -- 2007. --.

Signed and Sealed this
Thirty-first Day of December, 2024

Derrick Brent
*Acting Director of the United States Patent and Trademark Office*